United States Patent
Okazaki

(10) Patent No.: US 6,767,987 B2
(45) Date of Patent: Jul. 27, 2004

(54) LOWLY LACTONE-MODIFIED REACTIVE MONOMER COMPOSITION, ACRYLIC POLYOL RESINS PRODUCED WITH THE SAME, CURABLE RESIN COMPOSITIONS AND COATING COMPOSITIONS

(75) Inventor: Akira Okazaki, Ohtake (JP)

(73) Assignee: Daicel Chemical Industries, Ltd., Sakai (JP)

(*) Notice: Subject to any disclaimer, the term of this patent is extended or adjusted under 35 U.S.C. 154(b) by 0 days.

(21) Appl. No.: 09/890,321

(22) PCT Filed: Nov. 30, 2000

(86) PCT No.: PCT/JP00/08482

§ 371 (c)(1),
(2), (4) Date: Oct. 12, 2001

(87) PCT Pub. No.: WO01/40329

PCT Pub. Date: Jun. 7, 2001

(65) Prior Publication Data

US 2003/0149227 A1 Aug. 7, 2003

(30) Foreign Application Priority Data

Nov. 30, 1999 (JP) ........................................... 11-341331
Nov. 30, 1999 (JP) ........................................... 11-341332
Sep. 18, 2000 (JP) ...................................... 2000-282199

(51) Int. Cl.⁷ ........................ C08G 63/08; C08L 67/04; C08L 67/06

(52) U.S. Cl. ....................... 528/310; 528/354; 528/355; 528/358; 528/359; 525/410; 525/411; 525/413; 525/414; 525/415; 525/921; 523/500; 524/538; 524/541

(58) Field of Search ................................ 528/310, 354, 528/355, 357, 359; 525/410, 411, 413–415, 921, 130, 127; 523/500; 524/490, 541, 871, 878; 560/185, 189, 209

(56) References Cited

U.S. PATENT DOCUMENTS

| 4,188,472 A | 2/1980 | Chang |
| 4,701,483 A | 10/1987 | Okitsu |
| 5,627,240 A | 5/1997 | Furukawa et al. |

FOREIGN PATENT DOCUMENTS

EP       0 291 761      11/1988

*Primary Examiner*—P. Hampton Hightower
(74) *Attorney, Agent, or Firm*—Morgan & Finnegan, LLP

(57) ABSTRACT

This invention provides a hydroxyalkyl(meth)acrylate composition modified by a small amount of lactones in which a proportion of monomers having two or more continuous chains of lactone is less than 50% (area % by GPC). This invention also provides methods for synthesizing such a composition. This invention also provides an acrylic polyol resin comprising the hydroxyalkyl(meth)acrylate composition, a carboxylic group-containing acrylate composition modified by a small amount of lactones, and a polyester unsaturated monomer modified by a small amount of lactones. Uses of these materials in curable resins, coating compositions, and finishing agents are also provided.

13 Claims, 1 Drawing Sheet

LOWLY LACTONE-MODIFIED REACTIVE MONOMER COMPOSITION, ACRYLIC POLYOL RESINS PRODUCED WITH THE SAME, CURABLE RESIN COMPOSITIONS AND COATING COMPOSITIONS

TECHNICAL FIELD

The present invention I relates to a hydroxyalkyl(meth)acrylate composition modified by a small amount of lactones in which there is decreased the amount of adducts containing two or more continuous lactone chains, a method for the preparation thereof, and an acrylic polyol resin which can be employed as an industrial finishing agent having a high quality and which is variously well-balanced, for example, coatings and a pressure-sensitive adhesive, an ultraviolet ray- or electron beam-curable coating agent, and a reactive modifier.

Further, the present invention II relates to a method for the preparation of a hydroxyalkyl(meth)acrylate composition modified by a small amount of lactones.

Still further, the present invention III relates to a curable resin composition comprising an acrylic polyol resin containing the hydroxyalkyl(meth)acrylate composition modified by a small amount of lactones as a polymerizable component and a melamine resin, by which there can be prepared a coating having an improved acid resistance and being well-balanced in abrasion resistance and an acid resistance.

Furthermore, the present invention IV relates to a melamine-curable type water-based coating composition comprising the acrylic polyol resin containing the hydroxyalkyl(meth)acrylate composition modified by a small amount of lactones and an amino-plasto resin, and which is appropriate as a water-based coating for cars, home electric appliances, and cans for beverages and foods, particularly, which is appropriate as a clear coating for finishing an outer surface of cans.

In addition, the present invention V relates to a curable resin composition containing an acrylic polyol resin obtained by employing the hydroxyalkyl(meth)acrylate composition modified by a small amount of lactones in which there are decreased adducts containing two or more continuous lactone chains and a polyisocyanate compound as essential components, by which there can be prepared a coating having a long pot life and an excellent abrasion resistance and water resistance.

Also, the present invention VI relates to a coating containing a curable resin composition and crosslinked particles obtained from the curable resin composition or urethane-urea/ethylenic resin-composite type crosslinked particles as essential coating layer-formable components. The curable resin composition essentially contains a hydroxyalkyl(meth)acrylate composition modified by a small amount of lactones and a polyisocyanate compound as essential components. The hydroxyalkyl(meth)acrylate composition is a vinyl-based copolymer having carboxylic group and a crosslinkable functional group. The vinyl-based copolymer is obtained by allowing to react the hydroxyalkyl(meth)acrylate composition (a) modified by a small amount of lactones with a carboxylic group-contained vinyl-based monomer and other vinyl-based monomers.

The vinyl-based copolymer is the acrylic polyol resin (A) in the curable resin composition of the present invention V.

And also, the present invention VII relates to a thermosetting resin composition comprising an acrylic polyol resin containing the hydroxyalkyl(meth)acrylate composition modified by a small amount of lactones and an alkoxysilyl group-contained acrylic copolymer, and relates to a top-coat clear coating primarily containing the thermosetting resin composition, and which is employed as an outer coating for buildings, a variety of coatings for cars, industrial machines, a steel-made furniture, home electric appliances, and plastics, in which durability is particularly required.

Besides, the present invention VIII relates to a carboxylic group-contained acrylate modified by a small amount of lactones which is useful as a raw material for resins.

Also, the present invention IX relates to a curable resin composition, a clear coating composition, and a method for coating, and the curable resin composition is employed as a finishing coating for cars and coil coating, etc., which is composed of an acrylic polycarboxylic acid resin containing a carboxylic group-contained acrylate monomer modified by a small amount of lactones and a polyepoxide.

And also, the present invention X relates to a polyester unsaturated monomer composition modified by a small amount of lactones, a method for the preparation thereof, and an acrylic resin prepared therefrom which does not show tackiness.

By allowing to react these monomer compositions with other ethylenic unsaturated monomer and formulating with a variety of crosslinking agents and other components which are usually employed, there can be prepared an industrial finishing agent which is variously well-balanced, for example, a coating, an pressure-sensitive adhesive, an ultraviolet ray- or electron beam-curable coating agent, a curable oligomer and a polymer which can be employed as a reactive modifier, etc.

BACKGROUND ART

I and II

In recent years, there has been raised an importance of an acrylic-based coating in a coating field.

It is a reason that it has an excellent characteristic in weatherability, chemical resistance, and staining resistance, etc. compared to other alkyd resins, polyester resins, and epoxy resins.

For that reason, an acrylic-based coating has been employed in many fields such as cars, home electric appliances, metals, and construction materials.

Of acrylic resins, an acrylic polyol in which a monomer having hydroxyl group is copolymerized is applied as an ordinary temperature-curable coating or a baking-curable coating in which there is formulated a crosslinking agent which is capable of reacting with hydroxyl group, for example, a polyisocyanate and a melamine resin, etc. The monomer having hydroxyl group is indispensable in order to give adhesion to a coating layer and a gasoline resistance.

As the monomer having hydroxyl group, there have been conventionally employed a hydroxyethyl(meth)acrylate and hydroxypropyl(meth)acrylate, etc. Herein, the (meth)acrylate means an acrylate and a methacrylate.

However, hydroxyl groups in an acrylic polyol prepared by copolymerization of the monomers do not show a sufficient reactivity with the crosslinking agent because it is situated in a position which is exceedingly near by a main chain of a rigid acrylic resin skeleton.

For the purpose of improvement thereof, although 4-hydroxybutylacrylate is proposed, it is difficult to say that reactivity thereof is sufficient.

In order to solve problems, there has been employed a means for synthesizing a lactone-modified acrylic polyol in which ε-caprolactone is allowed to addition-react to a hydroxyalkylacrylate or a hydroxalkylmethacrylate, followed by copolymerizing with other monomers.

By the means, although reactivity with the crosslinking agent and ductility can be solved, a distribution of lactone continuous chains is broad in a conventional lactone-modified (meth)acrylate, and the number (n) of the lactone continuous chains becomes large and, whereby, although curing reactivity and ductility are improved, there is occasionally caused a problem that there lower hardness and acid resistance, etc.

For example, in the case that there is employed a hydroxyalkylacrylate or a hydroxyalkylmethacrylate having the large number of the lactone continuous chain in which ε-caprolactone is added as a raw material in a top-coat coating for cars, since a hydroxyl value per the unit weight of a product becomes lower, a large amount of the acrylate or methacrylate must be employed in order to adjust the hydroxyl value, whereby, there are occasionally deteriorated other requiring items such as a glossiness and an acid resistance other than the abrasion resistance.

Further, although it is occasionally controlled using a hydroxyethylacrylate or hydroxyethylmethacrylate in order to adjust the hydroxyl value without feeding a large amount of a lactone-modified hydroxyalkylacrylate or hydroxyalkyl methacrylate, in the case, there becomes smaller a proportion of a hydroxyalkyl(meth)acrylate containing 1 mol of the lactone single chain in which the number of "n" is 1, in which ductility and hardness are well-balanced.

III

In a coating layer for cars, it is looked upon that there are problematic a durability of the coating layer, particularly, blurs by acidic rain, scratches caused by sand particles which are blown up by a washing brush and by running. For example, a clear coat which is an over-coating in a car body is often composed of an acrylic resin and a melamine resin, and it becomes clear that the melamine resin causes a problem of decline in the acid resistance and, there are proposed (JP-A-63221123 Official Gazette and JP-A-63108048 Official Gazette) coatings by a novel crosslinking style not containing the melamine resin. However, the coatings are higher in price compared to a melamine-based thermosetting coating, and include a problem that those are poor in adhesion to the melamine-based thermosetting coating.

Of the acrylic resins, an acrylic polyol in which there is copolymerized a monomer having hydroxyl group is employed in an ordinary temperature-curable or thermosetting-curable coating in which there is formulated a crosslinking agent which can react with hydroxyl group, for example, such as a polyisocyanate and a melamine resin. In order to give an adhesion to a coating layer and a gasoline resistance, acrylic monomers having hydroxyl group are indispensable.

As such the monomers having hydroxyl group, there have been conventionally employed a hydroxyethyl(meth)acrylate and a hydroxypropyl(meth)acrylate, etc.

However, since the hydroxyl group in an acrylic polyol prepared by copolymerization of the (meth)acrylates is situated in an exceedingly near position to a main chain of an acrylic resin structure which is rigid, a reactivity with the crosslinking agent is not sufficient.

For the purpose of improvement thereof, although 4-hydroxybutylacrylate is proposed, it is difficult to say that a reactivity thereof is sufficient.

As a method for solving such the problems, in relation to a abrasion resistance, for example, there has been conventionally known (JP-A-64066274 Official Gazette) a coating using a clear coat in which there are employed an ε-caprolactone-modified acrylic resin obtained by copolymerization of an ε-caprolactone-added hydroxyalkyl(meth)acrylate with other vinyl monomers and a melamine curing agent and, further, for an acidic rain, for example, there has been conventionally known (JP-A-04114069 Official Gazette) a coating using a clear coat in which there are simultaneously employed a reaction of carboxylic acid with an epoxy and a reaction of an acrylic resin with a melamine curing agent.

However, since the lactone-modified (meth)acrylate in a technology of the JP-A-64066274 Official Gazette has a broad distribution of continuous lactone chains and the number (n) of the continuous lactone chains is large, there is occasionally caused the above-described problem that although curing reactivity and flexibility are improved, there lower hardness and acid resistance, etc.

On the other hand, although there is obtained a coating layer having an excellent acid resistance in a technology of the JP-A-04114066 Official Gazette, abrasion resistance is insufficient.

Further, there has been known that it is an effective method to elevate a glass transition temperature in a cured coating layer formed from a clear coat which is a most outside surface layer in order to obtain an advanced acid resistance. However, in the case, there has been a problem that there is caused an unpreferred situation that there lower not only the abrasion resistance in the coating layer but also flexural resistance and adhesion in recoating. Accordingly, it has been an exceedingly difficult technology to obtain a coating layer which is highly well-balanced in the acid resistance and abrasion resistance, and which is also excellent in the flexural resistance and adhesion in recoating.

IV

Metal cans have been widely employed as a vessel for filling a variety of beverages and foods.

Outside surface of the cans is coated in order to prevent corrosion by outside circumstances, and printed in view of a fine sight, and for showing contents. In printing and coating of the outside surface of the cans, a size-coating is coated on a metal plate, and then, a white coating is coated and, printing is conducted thereon by inks, etc. and a clear coating is coated for finishing. The size-coating and white coating are also occasionally omitted. Hitherto, as the clear coating for finishing, there has been widely employed an organic solvent solution containing an acrylic/amino-based resin, a polyester/amino-based resin, and an epoxy/amino-based resin, etc.

JP-A-06207137 Official Gazette discloses a water-based coating for an outer surface of cans, which is a coating primarily containing a resin mixture composed of (A) 40–60 parts by weight of an acrylic resin having a specified composition which has a weight average molecular weight of 6,000–15,000 and a glass transition temperature of exceeding 0° C., (B) 10–20 parts by weight of an acrylic resin having a specified composition which has a weight average molecular weight of 5,000–50,000 and a glass transition temperature of not more than 0° C., and (C) 20–50 parts by weight of an amino-plasto resin, and the resins (A) and (B) are neutralized by a base and, the resins (A), (B), and (C) are dissolved or dispersed in water. However, a coating layer obtained from the above-described technology is not sufficient in hardness.

Publicly-known water-based coatings include two types of a water-dispersed type one and a water-soluble type one, and since the water-dispersed type one is usually synthesized by an emulsion polymerization method using a surface active agent, there has been a problem that the surface active agent remains in a coating layer after having formed the coating layer, and it causes a decline of water resistance. On the other hand, although there is also a method synthesizing a resin containing carboxylic groups in an organic solvent system without employing the surface active agent and making dipersible or water-soluble by neutralizing in a volatile base, the water-based coating requires an acidic component having an acid value of not less than 20 in a basic resin structure, and there has been a drawback of poor water resistance and alkali resistance, etc.

A variety of coatings have been proposed and, although there is observed an improvement of water resistance in a coating layer, properties are not in a level being resistible to a thermally sterilizing treatment (retorting) in 130° C. for 30 minutes.

JP-A-07316489 Official Gazette discloses a water-based coating composition characterized by containing 20–80 parts by weight of a water-based acrylic resin obtained by copolymerization of (i) α, β-ethylenic unsaturated carboxylic acid, (ii) a hydroxyl group-contained mono(meth)acrylate including an ε-caprolactone-modified monomer, (iii) an N-alkoxymethyl(meth)acrylic amide having an alkyl group of a carbon number of not more than 4, and an aromatic vinyl monomer which is copolymerizable with the (i)–(iii) and/or an alkyl(meth)acrylate and 10–60 parts by weight of a water-based amino resin. However, water resistance is not sufficient in the coating composition obtained by the above-described technology.

Further, a water-based coating composition has been also employed for coating in cars and home electric appliances.

For example, in recent years, a design value in resin-made parts such as a bumper for cars is elevated by coating the same color as in car bodies. In the case of coating a bumper made from a polypropylene, etc. like a body color, there is firstly coated a primer made from a chlorinated polypropylene, etc. in order to ensure adhesion. A coating layer is formed by a two coating-one baking method (hereinafter, referred to as a 2C1B method) in which a coating layer of the primer is thermally cured and a coating for a base coat and an over coating are coated by a wet-on-wet method and those are thermally cured collectively.

However, there has become problematic a staining in a coating layer which is called a rain-blot under the influence of an acidic rain in recent years. Particularly, in a baked coating layer made from a melamine resin, it is known that an ether bond in the vicinity of melamine is broken by the acidic rain, and a stain penetrates therein, resulting in that it becomes difficult to remove the stain by a water-washing level. Accordingly, it must be rubbed off by a compound, etc. and, in the case, there is a problem that a coating layer is also shaved off, resulting in that the thickness of the coating layer becomes thinner.

Comparing a coating layer on an outside plate of cars to a coating layer on a bumper, the rain-blot is more readily caused in the coating layer on a bumper, there is a problem that the rain-blot once caused is not apt to be removed compared to the coating layer on an outside plate. It is thought that it depends upon a crosslinking density. In other words, since the coating layer on an outside plate is cured by heating conditions such as 140° C. for 30 minutes or so, a crosslinking density is high. However, in the coating layer on a resin-made bumper, since heating temperature is suppressed in 120° C. for 20 minutes or so in order to prevent deformation, a crosslinking density becomes lower compared to the coating layer on an outside plate for cars. For that reason, an acid rain resistance is not sufficient, and it is thought that the above-described difference is caused.

Therefore, it is thought that a blocked polyisocyanate compound is employed as a crosslinking agent without using a melamine resin. However, curability is poor at a low temperature in a coating composition in which the blocked polyisocyanate compound is employed as a crosslinking agent. For that reason, when the coating composition is coated on a resin-made bumper, etc., since heating temperature is 120° C. to the utmost, crosslinking density is low, resulting in that there become insufficient physical properties such as solvent resistance, staining resistance, and water resistance.

JP-A-11012533 discloses a water-based coating composition comprising a neutralized product of an amino resin-modified polymer in which structural units based on the above-described component (a) in the copolymer composed of (a) radically polymerizable compound having a specified structural formula, (b) an α,β-ethylenic unsaturated carboxylic acid, and (c) other radically polymerizable monomers are modified by a reaction of hydroxyl group in the units with an amino resin. However, a coating layer from the composition is not sufficient in retort resistance.

V

As described hereinabove, in recent years, an acrylic-based coating is becoming important in a coating field and, in a coating layer for cars, durability of a coating layer, particularly, there become problematic a rain-blot by an acidic rain, abrasions by sand particles blown up by a washing brush and during driving, and the above-described various methods are proposed. However, there have still been the above-described various problems.

On the other hand, although an isocyanate curing system shows an excellent acid resistance, adhesion, water resistance, and hardness, there is a problem that a pot-life is shorter compared to a melamine coating and, crosslinking of a resin is insufficient, and abrasion resistance is lower in a coating layer. Although the abrasion resistance can be improved by employing a modified hydroxy(meth)acrylate, etc. (PCL F, etc.), a pot-life further becomes short by an existing PCL F having a long lactone continuous chain length, and there is caused a problem that it cannot become taken a working time of period.

VI

For the above-described problems in an isocyanate curing system, JP-A-05148313 Official Gazette proposes a coating which possesses various properties such as profitability and workability without loss of a fine spectacle and, moreover, which can also satisfy a corrosion resistance, and which can provide a coating layer for a metal having an advanced corrosion resistance and, moreover, which primarily contains a coating layer-formable resinous component in which there are employed specified crosslinked particles which do not cause any problems in corrosion resistance even though a conventional melamine curing agent is employed. Although the abrasion resistance can be improved by employing a modified hydroxy(meth)acrylate, etc. (PCL F, etc.), the abrasion resistance, the improvement is insufficient by the PCL F having a long lactone continuous chain length.

VII

In a conventional thermosetting coating, there has been employed a melamine resin such as an alkyd melamine resin, an acrylic melamine resin, and an epoxy melamine resin as a crosslinking agent, and an odor from the melamine resin has been largely problematic. Further, in an acrylic melamine resin and an alkyd melamine resin which are usually employed as a coating for cars, there are not always sufficiently satisfied properties such as weatherability, staining resistance, acidic resistance, and a water-repellent property, and an improvement thereof is strongly desired.

As a method for solving the problems, there is proposed a technology (JP-A-01141952 Official Gazette, etc.) concerning a composition which is cured by a crosslinking style using a polyol resin and a hydrolyzable silyl group-contained resin, and which is quite different from a crosslinking style using a conventional polyol resin and melamine resin. However, there are not still sufficiently satisfied hardness, abrasion resistance, water resistance, and solvent resistance.

VIII

Since a polyalkyleneglycol di(meth)acrylate forms a flexible thin layer after curing, it is one of exceedingly useful raw materials for employing as an ink and coating, etc. Further, a low molecular weight one is important also as a reactive diluent in an acrylic resin field.

It is to be noted that in the present invention, an acrylate and methacrylate are called a (meth)acrylate, and acrylic acid and methacrylic acid are called a (meth)acrylic acid. However, an acrylic resin and a methacrylic resin are merely called an acrylic resin.

On the other hand, an acrylic resin having carboxylic group (—COOH) is effective for improving adhesion to a material which includes a resin such as a nylon having amino group, and an inorganic compound such as a metal having hydroxyl group and a silica. Further, it is recognized that it is effective for improving a water-solubility and an aqueous alkali solution-solubility of an acylic resin, above all, shortening of developing time of period in an alkali development step and a removing ability of uncured portion in the case of forming a pattern using ultraviolet ray-curability.

For that reason, there is desired a carboxylic group-contained acrylate such as a carboxylic group-contained lactone acrylate, and there has been desired a method for the preparation thereof which is industrially and readily operated.

IX

In a binder for employing as an over-coating for cars, a polymer having hydroxyl group is usually employed in combination with a melamine resin curing agent. However, in a cured thin layer obtained by employing a melamine resin as a curing agent, an acid resistance is usually poor. Accordingly, such the thin layer is apt to be particularly deteriorated by an acidic rain which is recently talked about, resulting in that a problem is caused in an outer appearance.

It is thought that a poor acid resistance in a thin layer obtained by employing a melamine resin as a curing agent is caused by a triazine ring in the melamine resin. Accordingly, so far as a melamine resin is employed as a curing agent, a drawback of the poor acid resistance is not solved.

For example, JP-A-02045577 and JP-A-03287650 Official Gazettes propose a novel coating composition in which a melamine resin is not employed. In the coating composition, since a crosslinking is initiated in an ester bond which is produced by a reaction of an acid group with an epoxy group, an acid resistance is excellent.

However, in the curing system, since functional group concentration is higher and viscosity is high, it is difficult to prepare a high solid type coating having a high solid content, and it is required that a large amount of solvents are employed.

On the other hand, in recent years, there is desired a high solid coating which does not emit a large amount of solvents in circumstances in order to reduce a bad influence to circumstances.

JP-A-06166741 Official Gazette discloses a high solid coating composition in which a silicone polymer is employed. However, in the inventions, in order to introduce a hydroxyl group-functional silicone polymer into a coating composition, an acid-functionalty is given by a reaction with an acid anhydride. As a result, there is caused a drawback that an amount of functional groups cannot be elevated, and Tg is lowered in resins and, Tg cannot be elevated in a coating layer.

On the other hand, JP-B-94041575 Official Gazette discloses a high solid coating composition containing (a) a polyepoxide and (b) a polyester polycarboxylic acid. However, solid content in the coating composition is not high from a viewpoint of not adversely affecting to circumstances, resulting in that a coating layer formed is poor in an acid resistance Further, in an acid-epoxy curing type coating system, a clear coating layer when being thermally cured remarkably yellows compared to a conventional melamine type coating system, and it is difficult to design a light color such as a white mica color.

X

As described hereinabove, in recent years, an acrylic-based coating is becoming important in a coating field, and an acrylic-based coating is becoming employed in every fields.

In a conventional lactone modified (meth)acrylate, since distribution of lactone continuous chains becomes broad and the number (n) of continuous chain length becomes large, although a curing reactivity and flexibility are improved, there is occasionally caused a problem of a decline of hardness and acid resistance.

On the other hand, as radically polymerizable unsaturated monomers having carboxylic group, there are known (meth)acrylic acid, itaconic acid, maleic acid, β-(meth)acryloyloxyethyl succinic acid, β-meth)acryloyloxyethyl maleic acid, and β-(meth)acryloyloxyethyl phthalic acid, etc.

The radically polymerizable unsaturated monomers having carboxylic group are employed in exceedingly wide range uses as a raw material and an intermediate for a thermosetting coating, an adhesive, an modifier for processing papers, a crosslinking agent, and a processing agent for fibers, etc., it is required that a kind of the radically polymerizable unsaturated monomers is carefully selected like being appropriate for respective uses.

Generally speaking, as a method for synthesizing a polyester unsaturated monomer having carboxylic group at a terminal, there are known a method in which an ω-hydroxycarboxylic acid is allowed to react with a radically polymerizable unsaturated monomers having carboxylic group, a method in which an α,ω-polyester dicarboxylic acid is allowed to react with a radically polymerizable unsaturated monomers having hydroxyl group, and a method, etc. in which an acid anhydride is allowed to react with a radically polymerizable unsaturated monomers having carboxylic group and an epoxy compound.

However, the methods include a problem that there are largely produced products quite not having a radically polymerizable functinal group or products having two radically polymerizable functinal group as by-products.

Further, as another method, there is a method in which a metal salt of a radically polymerizable unsaturated monomers having carboxylic group, for example, sodium acrylate is allowed to react with an ω-halogenocarboxylic acid, for example, ε-chlorocaproic acid.

However, in the methods, an ω-halogenocarboxylic acid which is a raw material is prepared through many steps for the preparation, and a plurality of steps are required for introducing two or more pieces of a radically polymerizable functional groups and, further, there is also required a step for separating a halogenated metal salt by-produced, as a result, an industrial preparation method is not still actualized.

As a method for intending to improve such the drawbacks, for example, JP-A-60067446 proposes a method. In the method, a radically polymerizable unsaturated monomers having carboxylic group is allowed to react with ε-caprolactone under the presence of an acidic catalyst to prepare a caprolactone polyester unsaturated monomer, and a fair result is obtained as an industrial method for the preparation. However, an acrylic resin prepared using the monomer often shows tackiness, and it includes a problem as an electric material.

Purpose of the present invention I is to provide a hydroxyalkyl(meth)acrylate composition modified by a small amount of lactone which is employed as an industrial finishing agent (a coating) having a high quality and which is well-balanced in a variety of physical properties in a coating layer, for example, through using as a comonomer in a polymerization reaction with other monomers, and to provide an acrylic polyol resin using the composition.

Purpose of the present invention II is to provide a method for the preparation of the composition.

Purpose of the present invention III is to provide a curable type coating composition in which an acid resistance is elevated even though in a melamine type which is low in price, and which is well-balanced in abrasion resistance and the acid resistance.

Purpose of the present invention IV is to provide a melamine-curable type water-based coating composition which is excellent in hardness, water resistance, restoring resistance, and processability, etc. of a coating layer, and which is excellent for cars, home electric appliances, and cans for beverages and foods.

Purpose of the present invention V is to provide an isocyanate system curable type coating composition which has a sufficient pot-life and, in which a problem of abrasion resistance is solved while maintaining an excellent acid resistance, adhesion, water resistance, and hardness.

Purpose of the present invention VI is to provide an isocyanate system curable type coating composition which has a sufficient pot-life and, in which a problem of abrasion resistance is solved while maintaining excellent acid resistance, adhesion, water resistance, and hardness.

Purpose of the present invention VII is to provide a thermosetting resin composition in which a problem of the above-described acid resistance and odor is solved which are important in a coating for cars, and in which hardness and abrasion resistance, water resistance, and solvent resistance are improved by elevating a crosslinking density, and to provide a top-coat clear coating using the composition.

Purpose of the present invention VIII is to provide an industrially-feasible method for the preparation of a carboxylic group-contained acrylate composition modified by a small amount of lactones.

Purpose of the present invention IX is to provide a high solid curable resin composition in which the above-described problems are solved and, which is capable of forming a thin layer which is excellent in acid resistance to an acid rain, abrasion resistance, yellowing resistance, and outer appearance, and to provide a method for coating (hereinafter, also occasionally referred to as a method for forming a coating layer) using the composition.

Purpose of the present invention X is to provide a polyester unsaturated monomer composition modified by a small amount of lactone which is obtained through an addition reaction of lactone by decreasing lactone chains, which is employed as an industrial finishing agent (a coating) having a high quality which is well-balanced in various physical properties of a coating layer by employing as a comonomer in a polymerization reaction with other monomers, and to provide a method for the preparation thereof, and to provide an acrylic resin using thereof which does not show tackiness so much.

DISCLOSURE OF THE INVENTION

The present inventor, as a result of an intensive investigation for attaining the purpose of the present invention I, found out that the above-described requirements can be satisfied by a hydroxyalkyl(meth)acrylate composition in which there is decreased a proportion of monomers containing two or more continuous chains (n≧2) of lactones by allowing to react in a large reaction ratio (the former mol number/the latter mol number) of a hydroxyalkyl(meth) acrylate with respect to a lactone monomer, and the present invention has been completed.

That is, No. 1 in the present invention I provides a hydroxyalkyl(meth)acrylate composition modified by a small amount of lactones, in which a proportion of monomers having two or more continuous chains (n≧2) of lactones is less than 50% (area % by GPC) which is represented by general formula (1) described below,

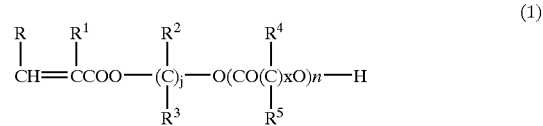

(in the formula, R, $R^1$, $R^2$, and $R^3$ are independently a hydrogen or a methyl group, j is an integer of 2–6, xn pieces of $R^4$ and $R^5$ are independently a hydrogen or an alkyl group having a carbon number of 1–12, "x" is 4–7, "n" is 0 or an integer of not less than 1, and an average value of "n" in the composition is not less than 0.3 to less than 1.0).

Further, No. 2 in the present invention I provides a hydroxyalkyl(meth)acrylate composition modified by a small amount of lactones as described in No. 1 of the present invention I, in which the hydroxyalkyl(meth)acrylate is a hydroxyethyl (meth)acrylate.

Still further, No. 3 in the present invention I provides a hydroxyalkyl(meth)acrylate composition modified by a small amount of lactones as described in No. 1 of the present invention I, in which the lactone monomer which is employed as a raw material is ε-caprolactone and/or valerolactone.

Furthermore, No. 4 in the present invention I provides a hydroxyalkyl(meth)acrylate composition modified by a small amount of lactones as described in No. 1 of the present invention I, in which the content of the lactone monomer remained in the composition is 0–10% by weight.

Besides, No. 5 in the present invention I provides a hydroxyalkyl(meth)acrylate composition modified by a small amount of lactones as described in No. 1 of the present invention I in which the content of the hydroxyalkyl(meth)acrylate remained in the composition is not less than 20% by weight and not more than 50% by weight.

Also, No. 6 in the present invention I provides a hydroxyalkyl(meth)acrylate composition modified by a small amount of lactones as described in No. 1 of the present invention I, in which the content of a di(meth)acrylate which is a by-product in the composition is not more than 2% by weight.

And also, No. 7 in the present invention I provides a hydroxyalkyl(meth)acrylate composition modified by a small amount of lactones as described in No. 1 of the present invention I, in which the content of by-products is not more than 10% by weight in the composition, which are produced by side reactions such as a Michaels addition, an acrylic polymerization, a transesterification, and other side reactions.

And also, No. 8 in the present invention I provides a hydroxyalkyl(meth)acrylate composition modified by a small amount of lactones as described in any one of Nos. 1–7 of the present invention I, in which the amount of a catalyst to be employed in the ring-opening polymerization for the preparation of the composition is less than 1000 ppm (by weight) based on total amount of materials to be fed.

Also, No. 9 in the present invention I provides a hydroxyalkyl(meth)acrylate composition modified by a small amount of lactones as described in any one of Nos. 1–8 of the present invention I, in which a polymerization inhibitor is not more than 1% by weight based on total amount, which is employed for the hydroxyalkyl(meth)acrylate in the ring-opening polymerization for the preparation of the composition.

And also, No. 10 in the present invention I provides an acrylic polyol resin which is obtained using a hydroxyalkyl (meth)acrylate composition modified by a small amount of lactones as described in any one of Nos. 1–9 of the present invention I as a component for polymerization.

The present inventor, as a result of an intensive investigation for attaining the purpose of the present invention II, found out that there can be obtained a lactone-modified hydroxyalkyl(meth)acrylate composition in which lactone continuous chains are decreased by allowing to react a hydroxyalkyl(meth)acrylate with a lactone in a reaction molar ratio of more than 1 (mol number of the former/mol number of the latter), and the present invention has been completed.

That is, No. 1 in the present invention II provides a method for the preparation of a lactone-modified hydroxyalkyl (meth)acrylate composition in which a proportion of monomers having not less than 2 continuous chains (n≧2) of lactones is less than 50% by mol (GPC area %), characterized in that a hydroxyalkyl (meth)acrylate is allowed to react with a lactone in a reaction molar ratio of more than 1 in the case of preparing the polylactone-modified hydroxyalkyl(meth)acrylate through allowing to react the hydroxyalkyl(meth)acrylate with a lactone monomer by ring-opening polymerization according to a reaction represented by a general formula (2) described below.

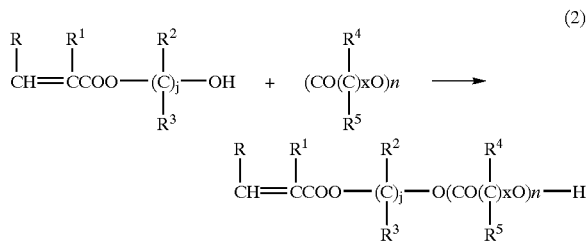

(in the formula, R, $R^1$, $R^2$, and $R^3$ are independently a hydrogen or a methyl group, "j" is an integer of 2–6, xn pieces of $R^4$ and $R^5$ are independently a hydrogen or an alkyl group having a carbon number of 1–12, "x" is 4–7, "n" is 0 or an integer of not less than 1, and an average value of "n" in the composition is not less than 0.3 to less than 1.0).

Further, No. 2 in the present invention II provides a method for the preparation of a hydroxyalkyl(meth)acrylate composition modified by a small amount of lactones as described in No. 1 of the present invention II, in which the hydroxyalkyl(meth)acrylate is hydroxyethylacrylate or hydroxyethylmethacrylate.

Still further, No. 3 in the present invention II provides a method for the preparation of a hydroxyalkyl(meth)acrylate composition modified by a small amount of lactones as described in No. 1 or 2 of the present invention II, in which the lactone monomer is ε-caprolactone and/or valerolactone.

Furthermore, No. 4 in the present invention II provides a method for the preparation of a hydroxyalkyl(meth)acrylate composition modified by a small amount of lactones as described in any one of Nos. 1–3 of the present invention II in which an average value of n is not less than 0.35 and not more than 1.0.

Besides, No. 5 in the present invention II provides a method for the preparation of a hydroxyalkyl(meth)acrylate composition modified by a small amount of lactones as described in any one of Nos. 1–3 of the present invention II, in which the content of the lactone monomer remained in the composition is 0–10% by weight.

Also, No. 6 in the present invention II provides a method for the preparation of a hydroxyalkyl(meth)acrylate composition modified by a small amount of lactones as described in any one of Nos. 1–3 of the present invention II in which the content of the hydroxyalkyl(meth)acrylate remained in the composition is not less than 20% by weight and not more than 50% by weight.

And also, No. 7 in the present invention II provides a method for the preparation of a hydroxyalkyl(meth)acrylate composition modified by a small amount of lactones as described in any one of Nos. 1–3 of the present invention II, in which the content of a di(meth)acrylate which is a by-product in the composition is not more than 2% by weight.

And also, No. 8 in the present invention II provides a method for the preparation of a hydroxyalkyl(meth)acrylate composition modified by a small amount of lactones as described in any one of Nos. 1–3 of the present invention II, in which the content of by-products is not more than 10% by weight in the composition, which are produced by side reactions such as a Michaels addition, an acrylic polymerization, a transesterification, and other side reactions.

And also, No. 9 in the present invention II provides a method for the preparation of a hydroxyalkyl(meth)acrylate composition modified by a small amount of lactones as described in any one of Nos. 1–8 of the present invention II, in which the amount of a catalyst to be employed in the reaction of the lactone with the hydroxyalkyl(meth)acrylate is less than 1000 ppm (by weight) based on total amount of materials to be fed.

And also, No. 10 in the present invention II provides a method for the preparation of a hydroxyalkyl(meth)acrylate composition modified by a small amount of lactones as described in any one of Nos. 1–9 of the present invention II, in which the content of an inhibitor in polymerization of the hydroxyalkyl(meth)acrylate with the lactones is not more than 1% by weight based on total amount of materials to be fed.

The present inventor, as a result of an intensive investigation for attaining the purpose of the present invention III, found out that the above-described requirement can be satisfied by a curable resin composition containing 0.5–80 parts by weight of an acrylic polyol resin (A) obtained using a hydroxyalkyl(meth)acrylate composition (a) in which a proportion of monomers having not less than 2 continuous chains (n≧2) of lactones is decreased and 0.5–50 parts by weight of a melamine resin (III-B) as essential components, and the present invention has been completed.

That is, No. 1 in the present invention III provides a curable resin composition containing 0.5–80 parts by weight of an acrylic polyol resin (A) obtained using a hydroxyalkyl (meth)acrylate composition (a) modified by a small amount of lactones in which a proportion of monomers having not less than 2 continuous chains (n≧2) of lactones is less than 50% (GPC area %) as polymerizing components and 0.5–50 parts by weight of a melamine resin (B) [total of the (A) and (B) does not exceed 100 parts by weight].

Further, No. 2 in the present invention III provides a curable resin composition as described in No. 1 of the present invention III, in which the hydroxyalkyl(meth) acrylate composition (a) modified by a small amount of lactones is obtained using a hydroxyethyl(meth)acrylate.

Still further, No. 3 in the present invention III provides a curable resin composition as described in No. 1 or 2 of the present invention III, in which the hydroxyalkyl(meth) acrylate composition (a) modified by a small amount of lactones is obtained using ε-caprolactone, δ-valerolactone, γ-butyrolactone, or a mixture thereof as lactone monomers.

Besides, No. 4 in the present invention III provides a curable resin composition as described in any one of Nos. 1–3 of the present invention III, in which the acrylic polyol resin (A) is composed of 5–70 parts by weight of the hydroxyalkyl(meth)acrylate composition (a) modified by a small amount of lactones, 0–90 parts by weight of an alkyl(meth)acrylate having a carbon number of 1–20, 0–30 parts by weight of a (meth)acrylic acid, and 0–40 parts by weight of other polymerizable unsaturated monomer.

Also, No. 5 in the present invention III provides a curable resin composition as described in any one of Nos. 1–4 of the present invention III, in which the acrylic polyol resin (A) has a hydroxyl group value of 5–250 and a number average molecular weight of 3,000–300,000.

The present inventor, as a result of an intensive investigation for attaining the purpose of the present invention IV, found out that the above-described problems can be solved by using a melamine-curable type water-based coating composition composed of an acrylic polyol resin (A) obtained by a specified hydroxyalkyl(meth)acrylate composition (a) modified by a small amount of lactones and an amino-plasto resin (B), and the present invention has been completed.

That is, No. 1 in the present invention IV provides a melamine-curable type water-based coating composition containing 5–30 parts by weight of an acrylic polyol resin (A) obtained using a hydroxyalkyl(meth)acrylate composition (a) modified by a small amount of lactones represented by the above-described general formula (1), in which a proportion of monomers having not less than 2 continuous chains (n≧2) of lactones is less than 50% (GPC area %) as polymerizing components and 10–60 parts by weight of an amino-plasto resin (IV-B).

No. 2 in the present invention IV provides a melamine-curable type water-based coating composition as described in No. 1 of the present invention IV, characterized in that the acrylic polyol resin (A) is composed of (i) 3–40% by weight of the hydroxyalkyl (meth)acrylate composition (a) modified by a small amount of lactones, (ii) 1–20% by weight of α,β-unsaturated carboxylic acid, (iii) 1–25% by weight of an N-alkoxymethyl(meth)acrylate having a carbon number of 1–6 in an alkyl group, and (iv) an aromatic vinyl monomer and an alkyl(meth)acrylate which are contained in an amount that 100% by weight minus the total weight of the above components (i), (ii), and (iii).

No. 3 in the present invention IV provides a melamine-curable type water-based coating composition as described in No. 1 or 2 of the present invention IV, in which the acrylic polyol resin (A) has a number average molecular weight of 2,000–50,000, a hydroxyl group value of 10–150, and a Tg point of 0–60° C.

No. 4 in the present invention IV provides a melamine-curable type water-based coating composition as described in any one of Nos. 1–3 of the present invention IV, in which the amino-plasto resin (IV-B) is at least one of a melamine resin (j), a guanamine resin (k) selected from benzoguanamine, spyroguanamine, acetoguanamine, and phthaloguanamine, and/or a melamine-guanamine cocondensed resin (l).

No. 5 in the present invention IV provides a melamine-curable type water-based coating composition as described in any one of Nos. 1–4 of the present invention IV, which is employed for cars, home electric appliances, and cans for beverages and foods.

The present inventors, as a result of an intensive investigation for attaining the purpose of the present invention V, found out that the above-described requirement can be satisfied by a curable resin composition essentially containing 50–90 parts by weight of an acrylic polyol resin (A) obtained using a hydroxyalkyl(meth)acrylate composition (a) in which a proportion of monomers having not less than 2 continuous chains (n≧2) of lactones is reduced and which is obtained by a large reaction molar ratio of a hydroxyalkyl (meth)acrylate with lactone monomers (the former mol number/the latter mol number), and 10–50 parts by weight of a polyisocyanate compound (V-B), and the present invention has been completed.

That is, No. 1 in the present invention V provides a curable resin composition containing 50–90 parts by weight of an acrylic polyol resin (V-A) obtained using a hydroxyalkyl(meth)acrylate composition (a) modified by a small amount of lactones which is represented by the above-described general formula (1) in which a proportion of monomers having not less than 2 continuous chains (n≧2) of lactones is less than 50% (GPC area %) as polymerizing components and 50–10 parts by weight of a polyisocyanate compound (V-B) [total of the (V-A) and (V-B) does not exceed 100 parts by weight].

No. 2 in the present invention V provides a curable resin composition as described in No. 1 of the present invention V, in which the acrylic polyol resin (V-A) is composed of 5–65% by weight of the hydroxyalkyl(meth)acrylate composition (a) modified by a small amount of lactones, 0–30% by weight of a vinyl monomer having hydroxyl group, 0.1–20% by weight of a polyester resin having a copolymerizable unsaturated group, and other vinyl monomers (residual weight).

The present inventor, as a result of an intensive investigation for attaining the purpose of the present invention VI, found out that the above-described requirement can be satisfied by a curable resin composition essentially containing 0.5–80 parts by weight of an acrylic polyol resin (A) obtained using a hydroxyalkyl(meth)acrylate composition (a) modified by a small amount of lactones, and which is obtained by a large reaction molar ratio of a hydroxyalkyl (meth)acrylate with lactone monomers (the former mol number/the latter mol number), and in which a proportion of monomers having not less than 2 continuous chains (n≧2) of lactones is reduced, and 0.5–50 parts by weight of a polyisocyanate compound (C), and the present invention has been completed.

That is, No. 1 in the present invention VI provides a curable resin composition containing 0.5–80 parts by weight of an acrylic polyol resin (VI-A) having carboxylic group and a functional group obtained by allowing to react a hydroxyalkyl(meth)acrylate composition (a) modified by a small amount of lactones represented by the general formula (1) described in claim 1 in which a proportion of monomers having not less than 2 continuous chains (n≧2) of lactones is less than 50% (GPC area %) with a vinyl monomer having carboxylic group and other vinyl monomers, and 0.5–50 parts by weight of a polyisocyanate compound (VI-B) [total of the (VI-A) and (VI-B) does not exceed 100 parts by weight] as essential components.

Further, No. 2 of the present invention VI provides a curable resin composition as described in No. 1 of the present invention VI, in which the acrylic polyol resin (VI-A) is a vinyl copolymer having carboxylic group and a functional group obtained by allowing to react a reaction product of a hydroxyl group-contained resin obtained by copolymerizing a hydroxyalkyl(meth)acrylate composition (a) modified by a small amount of lactones with a (meth) acrylic anhydride, and then, by allowing to react the reaction product with a vinyl-based monomer having carboxylic group and other vinyl-based monomers.

Still further, No. 3 of the present invention VI provides a curable resin composition as described in No. 2 of the present invention VI, in which the acrylic polyol resin (VI-A) is a resin obtained using the hydroxyl group-contained resin in the No. 2 of the present invention VI and at least one selected from a urethane resin having hydroxyl groups, an epoxy resin having hydroxyl groups, a cellulose derivative having hydroxyl groups, and a polyester resin having hydroxyl groups as the resin having hydroxyl groups.

Furthermore, No. 4 of the present invention VI provides a curable resin composition as described in No. 2 of the present invention VI, in which the acrylic polyol resin (VI-A) is a resin obtained using the hydroxyl group-contained resin in the No. 2 of the present invention VI and a urethane resin having hydroxyl groups as the resin having hydroxyl groups.

Besides, No. 5 in the present invention VI provides a curable resin composition as described in any one of Nos. 1–4 of the present invention VI, in which the polyisocyanate compound (VI-B) is a polyisocyanate compound containing an epoxy resin.

Also, No. 6 in the present invention VI provides a curable resin composition as described in any one of Nos. 1–5 of the present invention VI, in which the hydroxyalkyl(meth) acrylate composition (a) modified by a small amount of lactones is a product obtained using hydroxyethyl(meth) acrylate.

And also, No. 7 of the present invention VI is a coating characterized by containing (i) crosslinked particles obtained by dispersing a mixture of the acrylic polyol resin (VI-A) with the polyisocyanate compound (VI-B) into a water-based medium and by crosslinking thereof, or (ii) composite-type crosslinked particles composed of a urethane-urea/ethylene-based resin obtained through polymerizing polymerizable ethylene-based unsaturated compounds containing the hydroxyalkyl(meth)acrylate composition (a) modified by a small amount of lactones in water in which crosslinked urethane-urea particles are dispersed, as resin components for forming a thin layer.

And also, No. 8 of the present invention VI is a coating as described in No. 7 of the present invention VI characterized by containing more than 50% by weight of crosslinked particles having particle diameter of not more than 1 m and, moreover, an average molecular weight between crosslinking points of a range of 300–2,000, as resin components for forming a thin layer.

And also, No. 9 of the present invention VI is a coating as described in No. 7 or 8 of the present invention VI, in which the crosslinked particles have a thin layer-formable temperature of not more than 100° C.

And also, No. 10 of the present invention VI is a coating as described in any one of Nos. 7–9 of the present invention VI, in which the content of the crosslinked particles is not less than 70% in the resin components for forming a thin layer.

And also, No. 11 of the present invention VI is a coating as described in any one of Nos. 7–10 of the present invention VI, characterized by containing 1–25% by weight of a crosslinking agent together with the crosslinked particles as the resin components for forming a thin layer.

And also, No. 12 of the present invention VI is a coating as described in any one of Nos. 7–11 of the present invention VI, characterized by further containing a thin layer-formable resin having a reactive group other than the crosslinked particles as the resin components for forming a thin layer.

And also, No. 13 of the present invention VI is a coating as described in any one of Nos. 7–12 of the present invention VI, in which the crosslinked particles contain pigments in an inside thereof.

The present inventor, as a result of an intensive investigation for attaining the purpose of the present invention VI, found out that the problems can be solved by using a curable resin composition which comprises an acrylic polyol resin (VII-A) having hydroxyl groups composed of a hydroxyalkyl(meth)acrylate composition (a) modified by a small amount of lactones which has hydroxyl group at a terminal, and an acrylic copolymer (VII-B) having an alkoxysilyl group, and the present invention has been completed.

That is, No. 1 in the present invention VII provides a thermosetting resin composition which contains at least 2–50 parts by weight of an acrylic polyol resin (VII-A) containing a hydroxyalkyl(meth)acrylate composition (a) modified by a small amount of lactones represented by the general formula (1) in which a proportion of monomers having not less than 2 continuous chains (n≧2) of lactones is less than 50% (GPC area %) as a polymerizable component, and 30–80 parts by weight of an acrylic copolymer (VII-B) having an alkoxysilyl group [total of the (VII-A) and (VII-B) does not exceed 100 parts by weight], as polymerizable components.

No. 2 of the present invention VII provides a thermosetting resin composition as described in No. 1 of the present invention VII, in which the acrylic polyol resin (VII-A) further has at least one kind selected from an acid anhydride group, an epoxy group, amino group, and carboxylic group.

No. 3 of the present invention VII provides a thermosetting resin composition as described in No. 1 or 2 of the present invention VII, in which the acrylic copolymer (VII-B) having an alkoxysilyl group has a group represented by general formula (VII-3) described below,

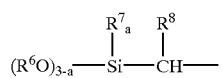

(VII-3)

(in the formula, $R^6$ represents an alkyl group having a carbon number of 1–10, $R^7$ and $R^8$ are a hydrogen atom or a monovalent hydrocarbon group selected from an alkyl group, an aryl group, and an aralkyl group which have a carbon number of 1–10, "a" is the number of a substituted group, and it represents an integer of 0, 1, or 2).

No. 4 of the present invention VII provides a thermosetting resin composition as described in No. 3 of the present invention VII, in which the acrylic copolymer (VII-B) having an alkoxysilyl group further has at least one kind selected from an acid anhydride group, an epoxy group, amino group, and carboxylic group.

No. 5 of the present invention VII provides a thermosetting resin composition as described in No. 3 or 4 of the present invention VII, in which the acrylic copolymer (VII-B) having an alkoxysilyl group has a number average molecular weight of 1,000–30,000.

No. 6 of the present invention VII provides a thermosetting resin composition as described in any one of Nos. 3–5 of the present invention VII, in which the acrylic copolymer (VII-B) having an alkoxysilyl group contains 5–90% by weight of an alkoxysilyl group-contained monomer (VII-b) having a polymerizable unsaturated double bond as a polymerizing component.

No. 7 of the present invention VII provides a thermosetting resin composition containing 0.1–20 parts by weight of a catalyst (VII-C) for curing based on 100 parts by weight of the thermosetting resin composition as described in any one of Nos. 1–6 of the present invention VII.

No. 8 of the present invention VII provides a thermosetting resin composition as described in No. 7 of the present invention VII, in which the catalyst (VII-C) for curing is an organic tin compound, an acidic phosphate, a mixture or a reaction product of the acidic phosphate with an amine, a saturated or unsaturated polycarboxylic acid, a saturated or unsaturated polycarboxylic anhydride, a reactive silicone compound, an organic titanate compound, an organic aluminum compound, or a mixture thereof.

No. 9 of the present invention VII provides a top coat clear coating essentially containing a thermosetting resin composition as described in Nos. 1–8 of the present invention VII.

The present inventor, as a result of an intensive investigation for attaining the purpose of the present invention VIII, found out that there can be industrially and advantageously prepared a carboxylic group-contained acrylate monomer modified by small amount of lactones by allowing to react a hydroxyalkyl(meth)acrylate composition modified by a small amount of lactones which has hydroxyl group at a terminal with a carboxylic acid or an anhydride thereof, and the present invention has been completed.

That is, No. 1 of the present invention VIII provides a method for the preparation of a carboxylic group-contained acrylate composition (a') modified by a small amount of lactones represented by a general formula (VIII-3) described below by allowing to react the hydroxyalkyl(meth)acrylate composition (a) modified by a small amount of lactones represented by the above-described general formula (1) in which a proportion of monomers having not less than 2 continuous chains (n≧2) of lactones is less than 50% (GPC area %) with a carboxylic acid or anhydride (VIII-b) thereof represented by a general formula (VIII-2) described below,

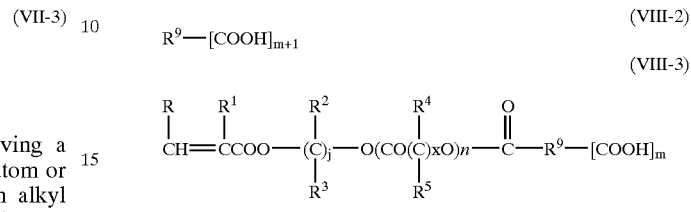

(VIII-2)

(VIII-3)

(in the formula, R, $R^1$, $R^2$, and $R^3$ are independently a hydrogen or a methyl group, "j" is an integer of 2–6, xn pieces of $R^4$ and $R^5$ are independently a hydrogen atom or an alkyl group having a carbon number of 1–12, "x" is 4–7, "n" is 0 or an integer of not less than 1, an average value of "n" in the composition is not less than 0.3 to less than 1.0, $R^9$ is a residual group of a carboxylic acid, and "m" is an integer of 1–3).

No. 2 of the present invention VIII provides a method for the preparation of a carboxylic group-contained acrylate composition (a') modified by a small amount of lactones as described in No. 1 of the present invention VIII, characterized in that a reaction of the hydroxyalkyl(meth)acrylate composition (a) modified by a small amount of lactones with the carboxylic acid or anhydride (VIII-b) thereof is conducted at a range of 40–160° C.

No. 3 of the present invention VIII provides a method for the preparation of a carboxylic group-contained acrylate composition (a') modified by a small amount of lactones as described in No. 1 or 2 of the present invention VIII, characterized in that a reaction of the hydroxyalkyl(meth)acrylate composition (a) modified by a small amount of lactones with the carboxylic acid or anhydride thereof (VIII-b) is conducted under the presence of oxygen and a polymerization inhibitor.

No. 4 of the present invention VIII provides a method for the preparation of a carboxylic group-contained acrylate composition (a') modified by a small amount of lactones as described in any one of Nos. 1–3 of the present invention VIII, characterized in that 0.9–1.1 mol of the carboxylic acid or anhydride (VIII-b) thereof is allowed to react with 1 mol of the hydroxy(meth)acrylate composition (a) modified by a small amount of lactones.

The present inventor found out that the purpose of the present invention IX can be attained by using a resin composition comprising an acrylic polycarboxylic acid resin (A') containing a carboxylic group-contained acrylate composition (a') modified by a small amount of lactones as a polymerizing component and a polyoxide (IX-B), and the present invention has been completed.

That is, No. 1 of the present invention IX provides a curable resin composition comprising 10–70 parts by weight of an acrylic polycarboxylic acid resin (A') containing the carboxylic group-contained acrylate composition (a') modified by a small amount of lactones represented by the above-described general formula (VIII-3) in which a proportion of monomers having not less than 2 continuous chains (n≧2) of lactones is less than 50% (GPC area %) as a polymerizing component and 10–80 parts by weight of a polyepoxide (IX-B).

No. 2 of the present invention IX provides a curable resin composition as described in No. 1 of the present invention IX, characterized in that the carboxylic group-contained hydroxy(meth)acrylate composition (a') modified by a small amount of lactones is obtained by allowing to react the hydroxyalkyl(meth)acrylate composition modified by a small amount of lactones represented by the above-described general formula (1) in which a proportion of monomers having not less than 2 continuous chains (n≧2) of lactones is less than 50% (GPC area %) with the carboxylic acid or the anhydride thereof represented by the above-described general formula (VIII-2).

No. 3 of the present invention IX provides a curable resin composition as described in No. 2 of the present invention IX, characterized in that the carboxylic group-contained hydroxy(meth)acrylate composition (a') modified by a small amount of lactones is obtained by allowing to react 0.9–1.1 mol of the carboxylic acid or the anhydride thereof with respect to 1 mol of the hydroxy(meth)acrylate composition (a) modified by a small amount of lactones.

No. 4 of the present invention IX provides a curable resin composition as described in any one of Nos. 1–3 of the present invention IX, characterized in that the acrylic polycarboxylic acid resin (A') is a copolymer of 5–80% by weight of a carboxylic group-contained ethylenic unsaturated monomer with 20–95% by weight of an ethylenic unsaturated monomer not having carboxylic group, provided that the ratio of the carboxylic group-contained hydroxy (meth)acrylate composition (a') modified by a small amount of lactones is 5–50% by weight in the acrylic polycarboxylic acid resin (A'), and the copolymer has at least two carboxylic groups on average in the molecule and an acid value of 5–300 mg KOH/g-solid and a number average molecular weight of 500–8000.

No. 5 of the present invention IX provides a curable resin composition as described in any one of Nos. 1–4 of the present invention IX, characterized in that terminal carboxylic groups in the acrylic polycarboxylic acid resin (A') are an acrylic polycarboxylic acid resin (bA') blocked by a blocking group which can discharge carboxylic groups by heat and/or water.

No. 6 of the present invention IX provides a curable resin composition as described in any one of Nos. 1–5 of the present invention IX, characterized in that the polyepoxide (IX-B) is an acrylic polyepoxide having an epoxy equivalent of 50–700 and a number average molecular weight of 200–10000.

No. 7 of the present invention IX provides a curable resin composition as described in any one of Nos. 1–6 of the present invention IX, characterized in that the polyepoxide (IX-B) is a polyepoxide having hydroxyl group and an epoxy group which is obtained by copolymerization of 5–70% by weight of (i) a hydroxyl group-contained ethylenic unsaturated monomer having a structure represented by a formula (4) described below with 10–60% by weight of (ii) an epoxy group-contained ethylenic unsaturated monomer and optionally 0–85% by weight of (iii) an ethylenic unsaturated monomer not having an epoxy group,

(4)

[in the formula, R is a hydrogen atom or a methyl group, and X is an organic chain shown by formula (5) described below, —O—Y—(OCO—(CH$_2$)$_m$—)$_q$— (5)

(in the formula, Y is a linear or branched alkylene group having a carbon number of 2–8, "m" is an integer of 3–7, and "q" is an integer of 0–4), or an organic chain shown by formula (6) described below,

(in the formula, R is a hydrogen atom or a methyl group, and n is an integer of 2–50)].

No. 8 of the present invention IX provides a curable resin composition as described in any one of Nos. 1–7 of the present invention IX, and which further contains 0.1–10 parts by weight of an antioxidant (IX-C).

No. 9 of the present invention IX provides a curable resin composition as described in any one of Nos. 1–8 of the present invention IX, and which further contains 5–70 parts by weight of a polyester polycarboxylic acid (IX-D) having an acid value of 30–350 mg-KOH/g-solid.

No. 10 of the present invention IX provides a curable resin composition as described in any one of Nos. 1–9 of the present invention IX, and which further contains 0.1–10 parts by weight of crosslinked resin particles (IX-E).

No. 11 of the present invention IX provides a clear coating composition containing a curable resin composition as described in any one of Nos. 1–10 of the present invention IX as a binder.

No. 12 of the present invention IX provides a method for coating which includes a step in which a water-based or a solvent-based base coating is coated on a substrate coated by under-coating or internally-coating; a step in which a clear coating composition of No. 1 in the present invention IX is coated on the base coating layer without curing; and a step in which a layer of the base coating and a layer of the clear coating are cured by heating.

In the above descriptions, part is part by weight.

The present inventor, as a result of an intensive investigation for attaining the purpose of the present invention X, found out that the above-described requirement can be satisfied by a polyester unsaturated monomer composition modified by a small amount of lactones, in which a proportion of monomers having not less than 2 continuous chains (n≧2) of lactones is decreased by a large reaction molar ratio (the former mol number/the latter mol number) of a carboxylic group-contained polymerizable unsaturated monomer, and the present invention has been completed.

That is, No. 1 of the present invention X provides a polyester unsaturated monomer composition modified by a small amount of lactones, in which a proportion of monomers having not less than 2 continuous chains (n≧2) of lactones is less than 50% (GPC area %) with respect to total of polymerizable unsaturated monomers containing carboxylic group, and which are obtained by a ring-opening polymerization of a lactone monomer.

No. 2 of the present invention X provides a polyester unsaturated monomer composition modified by a small amount of lactones as described in No. 1 of the present invention X, in which the polymerizable unsaturated monomers containing carboxylic group are at least one kind selected from a group consisting of a (meth)acrylic acid, itaconic acid, β-(meth)acryloyloxyethyl succinic acid, β-(meth)acryloyloxyethyl maleic acid, β-(meth)acryloyloxyethyl phthalic acid, maleic acid, a monoalkyl maleate (a carbon number in an alkyl group is 1–12), tetrahydrophthalic acid, and an anhydride thereof.

No. 3 of the present invention X provides a polyester unsaturated monomer composition modified by a small amount of lactones as described in No. 2 of the present invention X, in which the polymerizable unsaturated monomers containing carboxylic group are a (meth)acrylic acid, and which is obtained by a reaction represented by formula (11) described below,

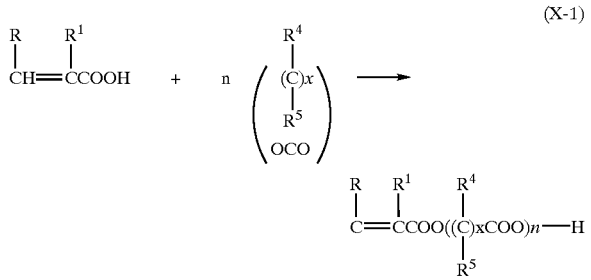
(X-1)

(in the formula, R and $R^1$ are independently a hydrogen atom or a methyl group, xn pieces of $R^4$ and $R^5$ are independently a hydrogen atom or an alkyl group having a carbon number of 1–12, "x" is 4–7, "n" and "n" in the composition are 0 or an integer of not less than 1, and an average value of "n" in the composition is not less than 0.3 to less than 1.0).

No. 4 of the present invention X provides a polyester unsaturated monomer composition modified by a small amount of lactones as described in any one of Nos. 1–3 of the present invention X, in which the lactone monomer is a lactone having 5, 6, 7 and/or 8-members ring.

No. 5 of the present invention X provides a polyester unsaturated monomer composition modified by a small amount of lactones as described in any one of Nos. 1–4 of the present invention X, in which the lactone monomer is ε-caprolactone and/or valerolactone.

No. 6 of the present invention X provides a polyester unsaturated monomer composition modified by a small amount of lactones as described in any one of Nos. 1–5 of the present invention X, characterized in that the proportion of monomers having not less than 2 continuous chains ($n \geq 2$) of lactones is less than 40% (GPC area %).

No. 7 in the present invention I provides a polyester unsaturated monomer composition modified by a small amount of lactones as described in any one of Nos. 1–6 of the present invention X, in which the content of residual lactone monomers is 0–10% by weight.

No. 8 in the present invention X provides a polyester unsaturated monomer composition modified by a small amount of lactones as described in any one of Nos. 1–7 of the present invention X, in which the content of the residual polymerizable unsaturated monomers containing carboxylic group is more than 20% by weight and not more than 50% by weight.

No. 9 in the present invention X provides a polyester unsaturated monomer composition modified by a small amount of lactones as described in any one of Nos. 1–8 of the present invention X, in which the content of a di(meth)acrylate of the polymerizable unsaturated monomers containing carboxylic group which is a by-product is not more than 2% by weight.

No. 10 in the present invention X provides a polyester unsaturated monomer composition modified by a small amount of lactone as described in any one of Nos. 1–9 of the present invention X, in which the content of by-products produced by side reactions such as a Michaels addition, an acrylic polymerization, a transesterification, and other side reactions is not more than 10% by weight.

No. 11 in the present invention X provides a polyester unsaturated monomer composition modified by a small amount of lactone as described in any one of Nos. 1–10 of the present invention X, in which the amount of a catalyst to be employed in the ring-opening polymerization is less than 1000 ppm by weight based on total amount of materials to be fed.

No. 12 in the present invention X provides a polyester unsaturated monomer composition modified by a small amount of lactone as described in any one of Nos. 1–11 of the present invention X, in which a polymerization inhibitor is not more than 1% by weight based on total amount to be fed, which is employed for a (meth)acrylic acid in the ring-opening polymerization.

No. 13 in the present invention X provides a method for the preparation of a polyester unsaturated monomer composition modified by a small amount of lactone, in which 0.3-less than 1.0 mol of a lactone monomer is polymerized by ring-opening with respect to 1 mol of a radically polymerizable unsaturated monomers containing carboxylic group, and a proportion of monomers having not less than 2 continuous chains ($n \geq 2$) of lactones is adjusted to less than 50%.

No. 14 in the present invention X provides a method for the preparation of a polyester unsaturated monomer composition modified by a small amount of lactone as described in No. 13 of the present invention X, in which an acidic catalyst is a Lewis acid or a Brønsted acid.

No. 15 in the present invention X provides an acrylic resin using a polyester unsaturated monomer composition modified by a small amount lactone as described in any one of Nos. 1–12 of the present invention X.

No. 16 in the present invention X is a method for the preparation of polyester unsaturated monomer composition modified by a small amount of lactone, characterized in that 0.3-less than 1.0 mol of a lactone monomer is polymerized by ring-opening with respect to 1 mol of a radically polymerizable unsaturated monomers containing carboxylic group using a stannous halide, monobutyltin tris-2-ethylhexanate, stannous octoate, dibutyltin dilaurate, or a mixture thereof as a catalyst, followed by separating unreacted radically polymerizable unsaturated monomers containing carboxylic group.

No. 17 in the present invention X is a method for the preparation of a polyester unsaturated monomer composition modified by a small amount of lactone as described in claim 12, in which the catalyst to be employed in the ring-opening polymerization is less than 1000 ppm by weight based on total amount of materials to be fed.

By the present invention, there can be prepared a polyester unsaturated monomer modified by a small amount of lactone having the same number of a radically polymerizable functional group as in the radically polymerizable unsaturated monomer having carboxylic group which is employed as a raw material, and in which an average addition amount of lactones is 0.35 to not more than 1.0 mol.

Particularly, in the case that there are employed, for example, acrylic acid and methacrylic acid as the radically polymerizable unsaturated monomer having carboxylic group, there can be prepared the polyester unsaturated monomer modified by a small amount of lactone which essentially contains 1 piece of a radically polymerizable functional group without producing a compound not having a radically polymerizable functional group at all and a compound having two or more pieces of a radically polymerizable functional group.

The polyester unsaturated monomer modified by a small amount of lactone obtained has a reactive carboxylic group at one terminal thereof and, further, it has a feature that there is a radically polymerizable unsaturated group at a position which exists far apart from the carboxylic group.

Further, in the acrylic resin composition using the polyester unsaturated monomer modified by a small amount of lactone of the present invention, since tackiness can be removed by elevating Tg of the resin composition, it is particularly useful in an electric material field, etc.

BEST MODE FOR CARRYING OUT THE INVENTION

Figure 1:
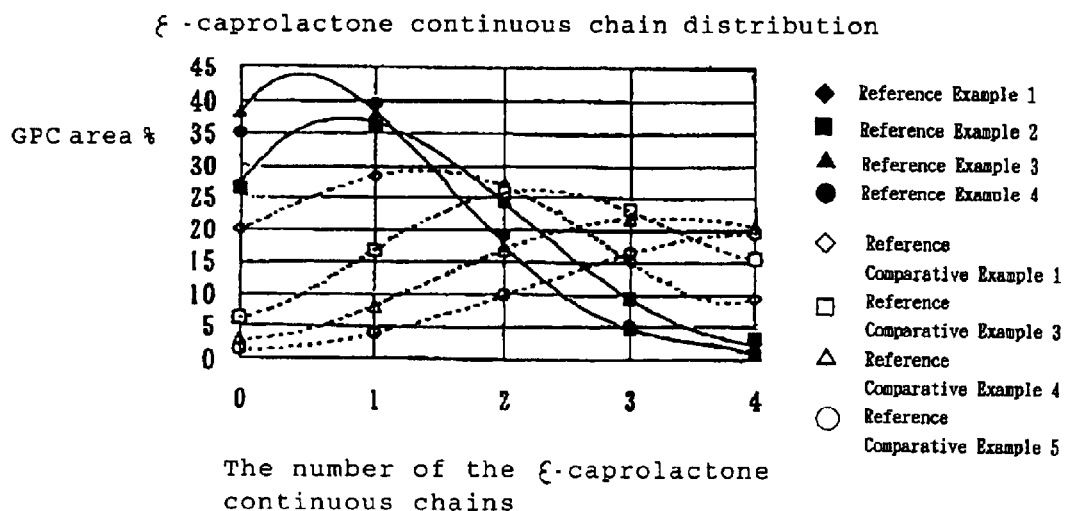
FIG. 1 shows an example of a continuous chain distribution of ε-caprolactone obtained from a gel permeation chromatographic (GPC) analysis in Examples 1–4 and Comparative Examples 1–5.

The present inventions I and II are illustrated hereinafter.

The present invention I is comprised a hydroxyalkyl (meth)acrylate composition (a) modified by a small amount of lactones in which a proportion of monomers having two or more pieces (n≧2) of lactone continuous chains is less than 50% (area % by GPC) which is represented by formula (1), and the composition (a) is a composition obtained by a method for the preparation in the present invention II, that is, a method in which a hydroxyalkyl (meth)acrylate is allowed to react with a lactone in a reaction molar ratio of more than 1 in the case of preparing the polylactone-modified hydroxyalkyl(meth)acrylate through allowing to react the hydroxyalkyl(meth)acrylate with a lactone monomer by ring-opening polymerization. In more detail, it relates to a composition obtained by allowing to react a lactone with a hydroxyalkyl (meth)acrylate in an atmosphere containing oxygen under the presence of less than 1000 ppm of a catalyst and less than 1% of an inhibitor for preventing polymerization of the hydroxyalkyl(meth)acrylate at a temperature of approximately 80–140° C.

In obtaining the composition (a) of the present invention, a reaction is conducted by feeding lactones at a feeding molar ratio of less than 1 mol with respect to the hydroxyalkyl(meth)acrylate such as hydroxyethylacrylate (HEA) and hydroxyethylmethacrylate (HEMA) in order to decrease lactone continuous chains. The catalyst to be employed in the present invention is a variety of organic and inorganic metal compounds, and preferred catalysts are a tin-based compound such as stannous chloride, monobutyltin tris-2-ethylhexanate, stannous octoate, and dibutyltin dilaurate. By the catalysts, there can be prepared the caprolactone-modified hydroxyalkyl(meth)acrylate composition in which the lactone continuous chains are decreased. In addition to decreasing the lactone continuous chains, although unreacted HEA and HEMA, etc. are remained, since the HEA and HEMA, etc. are often employed alone, if those are not more than 50% by weight, those can be often approved even though a mixed monomer.

Heretofore, in the case that ε-caprolactone is ring-opening polymerized on a compound having hydroxyl groups, although the ring-opening polymerization is conducted by adding a titanium-based catalyst such as tetrabutyl titanate, tetraethyl titanate, and tetrapropyl titanate at 130–230° C., even though intending to add ε-caprolactone to a (meth) acrylate having hydroxyl group at temperature conditions of not less than 130° C., the (meth)acrylate itself causes a thermal polymerization, resulting in that it is difficult to obtain a desired product.

In a temperature lower than 130° C., although there can be prevent the thermal polymerization of the (meth)acrylate itself, a ring-opening reaction rate of ε-caprolactone becomes very slow.

Since the titanium-based catalyst is relatively strong in catalytic activity, a desired product can be obtained. However, since the catalyst has a strong activity also as a catalyst for transesterification, a transesterification reaction proceeds during the ring-opening polymerization, resulting in that a polyvalent alcohol is removed from 2 mol of the hydroxyalkyl(meth)acrylate, and an alkyleneglycol di(meth) acrylate is by-produced.

Since such the di(meth)acrylate has a high boiling point, it is difficult to be separated from a desired product. Moreover, if the desired product containing such a by-product is radically copolymerized in other (meth) acrylates and solvents, three dimensional crosslinking is caused in a resin, and viscosity is remarkably increased or it ends to cause gelation. For that reason, there is desired the use of a catalyst having a strong activity which allows to sufficiently proceed the reaction at a low temperature such as 80–130° C. and in a small amount and, moreover, during which the di(meth)acrylate is not produced so much by the transesterification reaction.

As the catalyst to be employed in the present invention, there can be enumerated a stannous chloride, monobutyltin tris-2-ethyl hexanate, stannous octoate, and dibutyltin dilaurate, etc. Of those, since there can more decrease discoloration and the transesterification reaction by the use of monobutyltin tris-2-ethylhexanate, concentration of the catalyst can be elevated, and it is also very excellent in view of reduction of reaction time of period.

Addition amount of the catalyst is 1–1000 ppm, and preferably (hereinafter, in this specification, "unpreferably" means "undesirably" or "unfavorably") 10–500 ppm.

As the hydroxyalkyl(meth)acrylate to be employed in the present invention, there are enumerated 2-hydroxyethyl methacrylate, 2-hydroxyethylacrylate, hydroxypropylmethacrylate, hydroxypropylacrylate, 1,4-butyleneglycol monomethacrylate, and 1,4-butyleneglycol monoacrylate, etc.

In the case that 1 mol of a lactone is allowed to react with 1 mol of the hydroxyalkyl(meth)acrylate, a reaction product is obtained as a mixture of compounds represented by a formula described below (I-2) because a ring-opening reaction rate of the lactone to hydroxyl group in the hydroxyalkyl(meth)acrylate nearly equals to a ring-opening reaction rate of the lactone to hydroxyl groups at terminals in a caprolactone which is a product.

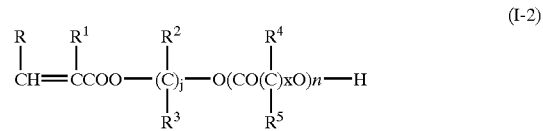

(I-2)

(in the formula, R, $R^1$, $R^2$, and $R^3$ are independently a hydrogen atom or a methyl group, "j" is an integer of 2–6, xn pieces of $R^4$ and $R^5$ are independently a hydrogen atom or an alkyl group having a carbon number of 1–12, "x" is 4–7, "n" is 0 or an integer of not less than 1, and an average value of "n" in the composition is not less than 0.3 to less than 1.0)

In the above-described reaction composition, there statistically distributes an unreacted product having n=0 and polycaprolactones having n=1, 2, 3, 4, 5, . . . . Herein, it is preferred that n is not more than 2, and an average value of "n" in the reaction composition is not less than 0.3 to less than 1.0, preferably 0.35 to less than 1.0 and, particularly, preferably 0.5 to 0.75.

In the case that the average value of "n" is less than 0.3, adhesion to various materials becomes unpreferably insufficient and, in the case of not less than 1, tackiness becomes too unpreferably strong.

In the case that the mol number of the lactone is not less than 1 mol, there are prepared products having two or more lactone continuous chains and the purpose of the present invention cannot be unpreferably attained. However, since the products cannot be separately refined in an industrial fashion, the amount of lactone to be fed is decreased to less than 1 with respect to 1 mol of the hydroxyalkyl(meth) acrylate in order to decrease the amount of the products having two or more lactone continuous chains. The lactone is allowed to react in not less than 0.3 mol to less than 1.0 mol, preferably not less than 0.35 mol to less than 1.0 mol, and more preferably not less than 0.5 mol to less than 0.75 mol with respect to 1 mol of the hydroxyalkyl(meth) acrylate. In the case of a large amount of the lactone in the reaction, there are produced a large amount of products having long chains of the lactone and, resulting in that the average value of "n" becomes too large and although a reaction curability and flexibility are improved in the use as raw materials for a coating, there lower hardness and acid resistance in a cured article. Contrarily, it is less than 0.3, the average value of "n" becomes too small and abrasion resistance becomes unpreferably too worse.

Further, as the lactone, there can be employed ε-caprolactone, trimethylcaprolactone, δ-valerolactone, γ-butyrolactone, and a mixture thereof.

Reaction temperature is 80–150° C., and preferably 100–140° C.

In the case of lower than 80° C., reaction rate is slow and, in the case of higher than 150° C., there is caused a thermal polymerization of a (meth)acrylate during the reaction, and gelation is possibly caused. In a reaction system, a polymerization inhibitor is preferably added. As the polymerization inhibitor, there are employed hydroquinone, hydroquinone monomethylether, and phenothiazine, etc. in a range of 0.01–1%, and preferably 0.03–0.5%.

In the reaction system, if an inert gas such as nitrogen is streamed, since a radical polymerization is apt to be caused, it is useful that any gases are not streamed or air is streamed in order to prevent the radical polymerization.

In the hydroxyalkyl(meth)acrylate composition modified by a small amount of lactones prepared by a method in the present invention, the content of residual lactones is 0–10% by weight, the content of the residual hydroxyalkyl(meth) acrylate is not less than 20 and not more than 50% by weight at most, the content of the di(meth)acrylate which is a by-product is 2% or less by weight, the content of the by-products by a Michaels addition, a (meth)acrylic polymerization, a transesterification, or other side reactions is not more than 10% by weight, the content of the catalyst is less than 1000 ppm, and the content of the polymerization inhibitor is not more than 1% by weight.

The lactone-modified acrylate composition having hydroxyl group of the present invention can provide an acrylic polyol of the present invention having rich flexibility which is excellent in reactivity with a crosslinking agent by allowing to polymerize alone or copolymerize with other radically-polymerizable monomers.

Further, the acrylic polyol resin of the present invention is useful as a raw resin for a flexible polyfunctional (meth) acrylate resin coating which includes urethane bonds by allowing to react the acrylic polyol resin of the present invention with polyisocyanates. The acrylic polyol resin of the present invention, as described hereinabove, can be utilized as a raw material for, in addition to the coating, a photo-curable resin, a reactive diluent for the photo-curable resin, a flexibility modifier for an AS and an ABS resin, an acrylic resin, a tackifier, an adhesive, a flexible lens for a glass, an acrylic emulsion (particularly, a reaction type one), a reactive diluent having flexibility instead of styrene in an unsaturated polyester resin, and also materials for a polymerizable polyurethane elastomer, etc.

As the other radically-polymerizable monomers for copolymerizing with the lactone-modified acrylate or methacrylate composition having hydroxyl groups of the present invention, there are enumerated an unsaturated monomer having an isocyanate group, a polymerizable monomer having an active hydrogen, and other polymerizable unsaturated monomers.

The other polymerizable unsaturated monomers are exemplified below.

As (meth)acrylates, for example, there are enumerated an alkyl or cycloalkyl ester having a carbon number of 1–20 of a (meth)acrylic acid such as methyl(meth)acrylate, ethyl (meth)acrylate, propyl(meth)acrylate, butyl(meth)acrylate, 2-ethylhexyl(meth)acrylate, octyl(meth)acrylate, lauryl (meth)acrylate, cyclohexyl(meth)acrylate, isobonyl(meth) acrylate, and adamantyl(meth)acrylate; an alkoxyalkyl ester having a carbon number of 2–8 of a (meth)acrylic acid such as methoxybutyl (meth)acrylate, methoxyethyl (meth) acrylate, and ethoxybutyl(meth)acrylate.

As other monomers except the (meth)acrylates, glycidyl (meth)acrylate; styrene, α-methylstyrene, vinyltoluene, (meth)acrylonitrile, (meth)acrolein, butadiene, isoprene, (meth)acrylic acid, etc., and these can be employed in mixing.

As the polymerizable monomer having an active hydrogen, there are enumerated a vinyl monomer having hydroxyl group and a vinyl monomer having amino group, these can be employed in mixing.

As the (meth)acrylate having hydroxyl group, for example, there are enumerated a hydroxyalkyl ester of a (meth)acrylic acid having a carbon number of 2–8 such as 2-hydroxylethyl(meth)acrylate and 2-hydroxypropyl(meth) acrylate, 2-hydroxylethyl vinylether, N-methylol(meth) acrylic amide, Alonix 5700 manufactured by Toa Gosei Kagaku Kogyo, Ltd., 4-hydroxystyrene, HE-10, HE-20, HP-10, and HP-20 (all of those are an acrylate oligomer having hydroxyl group at a terminal) which are manufactured by Nihon Shokubai Kagaku Kogyo, Ltd., Blemmer PP series (a polypropyleneglycol methacrylate), Blemmer PE series (a polyethyleneglycol monomethacrylate), Blemmer PEP series (a polyethyleneglycol-polypropyleneglycol methacrylate), Blemmer AP-400 (a polypropyleneglycol monoacrylate), Blemmer AE-350 (a polyethyleneglycol monoacrylate), Blemmer NKH-5050 (a polypropyleneglycol polytrimethylene monoacrylate), and Blemmer GLM (glycerol monoacrylate) which are manufactured by Nihon Yushi, Ltd., and an ε-caprolactone-modified hydroxyalkylvinyl monomer which is obtained by a reaction of a vinyl compound having hydroxyl group with ε-caprolactone, etc.

As typical examples of the ε-caprolactone-modified hydroxyalkylvinyl monomer, there are enumerated Placcel FA-1, Placcel FA-4, Placcel FM-1, and Placcel FM-4, etc. which are manufactured by Daicel Kagaku Kogyo, Ltd., TONE M-100 and TONE M201 which are manufactured by UCC, Ltd., etc., and an average polymerization degree "n" is not less than 1.

As typical examples of the vinyl monomer having amino group, there are enumerated a variety of dialkylaminoalkyl (meth)acrylates such as dimethylaminoethyl(meth)acrylate, diethylaminoethyl (meth)acrylate, diethylaminopropyl (meth)acrylate, and dimethylaminopropyl(meth)acrylate; N-dialkylaminoalkyl(meth)acrylic amides such as N-dimethylaminoethyl (meth)acrylic amide, N-diethylaminoethyl(meth)acrylic amide, N-dimethylaminopropyl(meth)acrylic amide, and N-diethylaminopropyl(meth)acrylic amide; t-butylaminoethyl(meth)acrylate, t-butylaminopropyl(meth) acrylate, azilidinylethyl(meth)acrylate pyrolidinylethyl (meth)acrylate, piperidinylethyl(meth)acrylate, vinylpiridine, and aminoethylvinylether, etc. and, the dialkylaminoalkyl(meth)acrylates and N-dialkylaminoalkyl (meth)acrylic amides are particularly preferred from a viewpoint of curability, etc.

As the monomer having isocyanate group, for example, there are enumerated isocyanate ethyl(meth)acrylate, isocyanate propyl(meth)acrylate, isocyanate butyl(meth)acrylate, isocyanate hexyl(meth)acrylate, m-isopropenyl-$\alpha,\alpha'$-dimethylbenzyl isocyanate, and m-ethylenyl-$\alpha,\alpha'$-dimethylbenzyl isocyanate, etc., and an unsaturated compound obtained by addition of a polyisocyanate such as hexamethylene diisocyanate compound to the above-described polymerizable monomer having an active hydrogen such as the hydroxyethyl(meth)acrylate, and these can be employed in mixing.

The above-described radically-polymerizable monomers can be also employed in mixing and, those are selectively employed according to desired physical properties.

The acrylic polyol resin of the present invention is prepared by radically-polymerizing the polylactone-modified hydroxyalkylacrylate or methacrylate of the present invention and the above-described radically-polymerizable monomers under the presence of a radical polymerization initiator by publicly-known solution polymerization methods.

As the radical polymerization initiator, there can be employed a peroxide initiator such as benzoyl peroxide, t-butylhydroperoxide, cumylhydroperoxide, cumenhydroperoxide, t-butyl peroxybenzoate, and t-butylperoxy-2-ethylhexanoate, and an azo-based initiator such as azobisisobutyronitrile and azobisdimethylvaleronitrile.

As solvents for polymerization to be employed in the solution polymerization, if those are a nonreactive solvent, there can be employed hydrocarbons (benzene, toluene, xylene, n-hexane, and cyclohexane, etc.), acetates (ethyl acetate, propyl acetate, and butyl acetate, etc.), alcohols (methanol, ethanol, isopropanol, and n-butanol, etc.), ethers (ethyl cellosolve, butyl cellosolve, and cellosolve acetate, etc.), ketones (methylethylketone, acetoethyl acetate, acetylacetone, diacetone alcohol, methyl isobutyl ketone, and acetone, etc.) without any limitation. The solvents may be employed solely or in combination of two or more kinds.

As a reaction vessel to be employed for the above-described polymerization, there are preferably employed a reaction vessel equipped with an agitation and a reflux condenser equipped with a drying tube and a twin-screw extruder.

Polymerization temperature and polymerization time of period depend upon respective kinds and feeding ratio of the polylactone-modified hydroxyalkyl acrylate or methacrylate composition of the present invention and the above-described radically-polymerizable monomer, kind and amount of the catalyst and, further, reaction vessels, and those are not particularly limited, and those are appropriately decided by the use of a desired acrylic resin, for example, physical properties of a coating layer to be required in the case of a coating.

Hereinafter, the present invention III is illustrated.

The present invention III is a curable resin composition containing an acrylic polyol resin (A) obtained using a hydroxyalkyl(meth)acrylate composition (a) modified by a small amount of lactones in which a proportion of monomers having not less than 2 continuous chains (n≧2) of lactones is less than 50% (GPC area %), which is represented by the above-described general formula (I) as polymerizing components, and a melamine resin (B).

The hydroxyalkyl(meth)acrylate composition (a) modified by a small amount of lactones is as illustrated in the present invention I.

The acrylic polyol resin (A) to be employed in the present invention is comprised 5–70 parts by weight of the hydroxyalkyl (meth)acrylate composition (a) modified by a small amount of lactones, 0–90 parts by weight of an alkyl(meth) acrylate having an alkyl group of a carbon number of 1–20, 0–30 parts by weight of a (meth)acrylic acid, and 0–40 parts by weight of other polymerizable unsaturated monomer. As the other polymerizable unsaturated monomer, there are enumerated radically-polymerizable monomers other than the alkyl(meth)acrylate as exemplified in the present invention I. Conditions for the preparation thereof are as illustrated in the present invention I.

In the acrylic polyol resin (A), hydroxyl value is 5–250, and a number average molecular weight is 3,000–300,000.

As the melamine resin (B) to be employed in the present invention, there can be employed a usual melamine resin for coating without any modification, and an imino type or methylol type melamine resin is employed. Since an isocyanate compound is not employed as a curing agent, it is excellent in handling and safeness. The imino type or methylol type melamine resin is not particularly limited, and as a resin capable of reacting with hydroxyl group, if it is a melamine to be employed for a coating system in which hydroxyl group is employed as a functional group, it is not particularly limited. As such the imino type melamine resin, for example, there are enumerated Yuban 22R (solid content of 60%), Yuban 21R (solid content of 50%), and Yuban 2028 (solid content of 75%) (all of those are an imino type melamine resin), etc. which are manufactured by Mitsui Kagaku. On the other hand, as the methylol-type melamine resin, there can be employed a melamine resin having a condensation degree of 1.1–20 or so which is prepared by melamine, formaldehyde, a monoalcohol having a carbon number of 1–4, and optionally, water which are raw materials. For example, there are enumerated Yuban 60R (solid content of 50%) manufactured by Mitsui Kagaku and Super-bekkamine L-121-60 (solid content of 60%) manufactured by Dainippon Ink Kagaku Kogyo, Ltd.

The curable resin composition of the present invention contains 0.5–80 parts by weight of the acrylic polyol resin (A) obtained using the composition (a) and 0.5–50 parts by weight of the melamine resin (B). Total of the (A) and the (B) does not exceed 100 parts by weight.

In the case that the acrylic polyol resin (A) is less than 0.5 part by weight, bending resistance becomes insufficient and, in the case of exceeding 80 parts by weight, abrasion resistance unpreferably lowers. In the case that the melamine resin (B) is less than 0.5 part by weight, solvent resistance is not sufficient and, in the case of exceeding 50 parts by weight, acid resistance becomes unpreferably insufficient.

By another representation of the use ratio of the acrylic polyol resin (A) with respect to the melamine resin (B), 60–10% by weight of the melamine resin (B) is employed together with 40–90% by weight of the acrylic polyol resin (A). In the case that the use ratio of the acrylic polyol resin (A) is less than 40% by weight, a self condensation reaction of the melamine resin (B) itself increases, resulting in that a coating layer becomes brittle and, for example, it does not become appropriate as a coating for a molded article of a polyolefine-based resin. On the other hand, in the case that the use ratio of the acrylic polyol resin (A) exceeds 90% by weight, crosslinking becomes insufficient, and solvent resistance and weatherability lower. A preferred use ratio of the acrylic polyol resin (A) is 60–80% by weight, and the use ratio of the melamine resin (B) is 40–20% by weight.

In the the acrylic polyol resin (A), the melamine resin (B), and the acidic catalyst for curing which is optionally employed in the present invention, total acid value is 5–50, and preferably 15–35. In the case that the total acid value is less than 5, crosslinkable reactivity lowers and crosslinking becomes insufficient, and there lower gasoline resistance and weatherability. On the other hand, in the case that the total acid value exceeds 50, storage stability lowers, and water resistance lowers. As described above, by controlling the acid value, a coating composition can be modified to low temperature curability.

In order to give an acid value to the acrylic polyol resin (A), a monomer having carboxylic group and a phosphoric acid group is employed together as the polymerizable vinyl monomer to introduce the acid groups into the acrylic polyol resin (A). Further, adjustment of the acid value can be conducted by formulating the acidic catalyst for curing into a coating composition. As such the acidic catalyst for curing, a weak acidic catalyst for curing is employed. As such the weak acidic catalyst for curing, for example, there are enumerated phosphoric acids, a monophosphate, a monophosphite, a phosphate containing an unsaturated group, and carboxylic acids, etc. As such the weak acidic catalyst for curing, phosphoric acids and phosphates thereof are particularly preferred. As such the phosphoric acids and phosphates thereof, for example, there are enumerated a phosphoric acid, a pyrophosphoric acid, and a mono or diphosphate, etc. As the monophosphate, for example, there are enumerated monooctyl phosphate, monopropyl phosphate, and monolauryl phosphate, etc. As the diphosphate, for example, there are enumerated dioctyl phosphate, dipropyl phosphate, and diraulyl phosphate, etc. Further, mono(2-(meth)acryloyloxyethyl)acid phosphate is enumerated. Still further, there may be even employed a compound obtained by allowing to react a compound having an acid anhydride group with a polyol or an alcohol. Besides, an oligomer having an acid value may be also blended. In the case, as a method for introducing an acid value into the acrylic polyol resin (A) and other oligomers, for example, there is a method in which there is employed a polymerizable vinyl monomer having carboxylic group or a phosphoric acid group in the case of graft-polymerizing or (co)polymerizing. It is to be noted that the carboxylic group or the phosphoric acid group preferably exists at not less than 10 atoms-apart position from a main chain of the oligomer, whereby, it readily reacts at a low temperature.

The acidic catalyst for curing is employed in the amount of 0.001–10% by weight, and preferably 0.001–5% by weight based on total weight of the acrylic polyol resin (A) and the melamine resin (B).

The coating composition of the present invention is modified to a coating composition without any modification or by appropriately formulating, optionally, a variety of additives which are conventionally employed in a coating field, for example, coloring pigments, extender pigments, an aluminum powder, a pearl mica powder, an anti-dropping agent or an anti-sedimentation agent, a levelling agent, a dispersant, a defoaming agent, an ultraviolet ray absorbent, a photo-stabilizer, an antistatic agent, and a thinner, etc.

As the coloring pigments, for example, there are enumerated inorganic pigments such as titanium oxide (for example, titanium oxide pigments, Taipek CR-95 (manufactured by Ciba Geigy, AG)), carbon black, iron oxide, iron red, lead molybdenum acid, chromium oxide, and lead chromate, phthalocyanine pigments such as phthalocyanine blue and phthalocyanine green, organic pigments such as quinaklidone red, azo pigments, and anthraquinone pigments, etc.

As the extender pigments, for example, there can be employed kaoline, talc, silica, mica, barium sulphate, and calcium sulphate, etc. As the anti-dropping agent or an anti-sedimentation agent, for example, there can be preferably employed bentonite, a linseed oil wax, an amide wax, micro gel (for example, MG100S (manufactured by Dainippon Ink)), and an aluminum acetate, etc.

As the levelling agent, for example, there can be preferably employed a silicone-based surface active agent such as KF69, Kp321, and Kp301 (hereinabove, manufactured by Shin-etsu Kagaku), Modaflow (a surface controlling agent manufactured by Mitsubishi Monsant), BYK301, and 358 (manufactured by Bickchemie Japan), and Diaaide AD9001 (manufactured by Mitsubishi Rayon), etc.

As the dispersant, for example, there can be preferably employed Anti-Terra U or Anti-Terra P and Disperbyk-101 (hereinabove, manufactured by Bickchemie Japan), etc.

As the defoaming agent, for example, there can be preferably employed BYK-0 (manufactured by Bickchemie Japan), etc.

As the ultraviolet ray absorbent, for example, there can be preferably employed a benzotriazole-based ultraviolet ray absorbent such as Tinuvin 900, Tinuvin 384, and Tinuvin P (hereinabove, manufactured by Ciba Geigy), an anilide oxalate-based ultraviolet ray absorbent such as Sandbar 3206 (manufactured by Sand), etc.

As the photo-stabilizer, for example, there can be preferably employed a hindered amine-based photo-stabilizer such as Sanol LS292 (manufactured by Sankyo) and Sandbar 3058 (manufactured by Sand), etc.

As the thinner, for example, there can be preferably employed an aromatic compound such as toluene, xylene, and ethylbenzene, alcohols such as methanol, ethanol, propanol, butanol, and isobutanol, ketones such as acetone, methylisobutyl ketone, methylamyl ketone, cyclohexanone, isophorone, and N-methylpyrrolidone, ester compounds such as ethyl acetate, butyl acetate, and methylcellosolve, or a mixture thereof, etc. As the antistatic agent, for example, there can be preferably employed Esocard C25 (manufactured by Lion Armer), etc. In the case of preparing the coating composition of the present invention, there are mixed the acrylic polyol resin (A), the melamine resin (B), and optionally, additives such as acidic catalysts and pigments, and uniformly dispersed by a dispersing machine such as a sandgrind mill, a ball mill, and an atlighter to prepare (a curable coating composition) of the present invention.

As a method for coating the curable coating composition (a coating composition) of the present invention, an article to be coated is coated using a publicly-known dewaxing cleaning apparatus, for example, after dewaxing by an organic solvent such as 1,1,1-trichloroethane, cleaning by an alkali, cleaning by an acid, wiping by a solvent, etc., further, optionally, in order to further elevate an adhesive power of a coating to the article to be coated, for example, the coating composition of the present invention is directly coated by an air-spraying coating method and an airless coating method after coating a primer such as Primac NO. 1500 (manufactured by Nihon Yushi), and optionally, it is set for 0.5–120 minutes, and preferably 1–20 minutes, and thermally cured (baked) at a low temperature of 90–140° C., and preferably 100–120° C.

A clear coating may be coated onto a base coat coating which is an under layer by a wet-on-wet method. In the present invention, since curing can be conducted at a low temperature of not more than 140° C. by the above-described construction, it does not give a damage even on a polyolefine-based resin molded article, and there can be formed a coating layer having excellent properties of a coating layer.

In the case that a primer is coated, layer thickness after drying is generally 3–20 μm, and preferably 5–15 μm. Further, layer thickness after drying of the clear coat coating is generally 15–45 μm, and preferably 20–35 μm. As a method for the coating composition of the present invention, there are enumerated a 2-coat/1-baking type coating method and 3-coat/2-baking type coating method, etc.

Herein, the 2-coat/1-baking type is one of coating methods by an over coating and, first of all, there is coated a base coat coating in which pigments and/or metal powder are formulated in a large amount and, there is coated a transparent clear coating or a top coating which is a color clear coating containing a small amount of pigments, and those coatings are simultaneously baked.

In the case of the 2-coat/1-baking type coating method, as a base coat, a usual coating composition is employed and, the coating composition of the present invention can be employed as a top coat.

In the case of the 3-coat/2-baking type coating method, there is coated and baked a coating in which there are formulated pigments, dyes, and metal powder and, there is further coated thereon and baked a base coat in which there are formulated pigments, dyes and/or metal powder, and then, there is coated thereon and collectively baked a transparent clear coating or a top coat which is a color clear coating containing a small amount of pigments or dyes.

IV

Hereinafter, the present invention IV is illustrated.

The melamine curable type water-based coating composition of the present invention IV is comprised 5–60 parts by weight of an acrylic polyol resin (A) and 10–60 parts by weight of an amino-plasto resin (IV-B), and preferably, 10–50 parts by weight of an acrylic polyol resin (A) and 20–40 parts by weight of an amino-plasto resin (IV-B). The acrylic polyol resin (A) to be employed in the present invention can provide an acrylic polyol resin (A) which is excellent in a reactivity with a crosslinking agent and rich in flexibility by allowing to polymerize alone the hydroxyalkyl (meth)acrylate composition (a) modified by a small amount of lactones represented by the above-described general formula (1) or to copolymerize with other radically-polymerizable monomers, and it can be employed as a material for the melamine curable type water-based coating composition of the present invention.

As other radically-polymerizable monomers for copolymerizing with the hydroxyalkyl(meth)acrylate composition (a) modified by a small amount of lactones in the present invention, there can be employed at least one or more kinds selected from the group consisting of (b)–(i) described below.

(b) a polymerizable monomer containing an active hydrogen.

(c) an N-alkoxymethyl(meth)acrylic amide having an alkyl group of a carbon number of 1–6.

(d) an alkyl(meth)acrylate having an alkyl group of a carbon number of 1–20.

(e) an aliphatic or cycloaliphatic vinyl monomer having a carbon number of 2–12.

(f) an aromatic vinyl monomer.

(g) an adduct of a glycidyl ester of a (meth)acrylic acid with a fatty acid having a carbon number of 8–20.

(h) an adduct of a (meth)acrylic acid with an monoepoxy compound having a carbon number of 8–20.

(i) an unsaturated monomer containing an isocyanate group.

As the polymerizable monomer containing an active hydrogen (b), there are enumerated a (meth)acrylate having hydroxyl group, a (meth)acrylate having amino group, and α,β-ethylenic unsaturated carboxylic acid (b), etc., which are described hereinafter.

As the (meth)acrylate having hydroxyl group, for example, there are enumerated hydroxyalkyl(meth)acrylates having a carbon number of 2–8 such as hydroxyethyl(meth) acrylate, hydroxypropyl(meth)acrylate, and 4-hydroxybutyl (meth)acrylate, and those can be employed in mixing.

As the (meth)acrylate having amino group, for example, there are enumerated amino alkyl esters such as dimethylaminoethyl (meth)acrylate, diethylaminoethyl(meth) acrylate, (meth)acrylic amide, and N-isopropylmethyl (meth)acrylic amide, etc.

Further, N,N-dimethylaminoethyl(meth)acrylate and dimethyl(meth)acrylic amide, etc. are employed together.

As the α,β-ethylenic unsaturated carboxylic acid, there are enumerated ethylenic unsaturated carboxylic acids such as acrylic acid, methacrylic acid, crotonic acid, maleic acid (anhydride), itaconic acid (anhydride), and fumaric acid.

As the N-alkoxymethyl (meth)acrylic amide (c) having an alkyl group of a carbon number of 1–6, there are enumerated N-methoxy(meth)acrylic amide, N-ethoxymethyl(meth) acrylic amide, N-butoxymethyl(meth)acrylic amide, etc., and N-methoxymethyl acrylic amide is preferred. Further, use amount thereof is 1–25% by weight in a water-based acrylic resin. In the case of less than 1% by weight, water resistance of a coating layer becomes insufficient because of lack of curability and, in the case of not less than 25% by weight, adhesion and processability are poor, and an aesthetic market value lowered because of a remarkable discoloration in a coating layer.

As the alkyl(meth)acrylate (d) having an alkyl group of a carbon number of 1–20, for example, there are enumerated an alkyl or cycloalkyl(meth)acrylate having a carbon number of 1–20, such as methyl(meth)acrylate, ethyl(meth) acrylate, propyl(meth)acrylate, butyl(meth)acrylate, 2-ethylhexyl(meth)acrylate, octyl(meth)acrylate, lauryl (meth)acrylate, cyclohexyl(meth)acrylate, isobonyl(meth) acrylate, and adamantyl(meth)acrylate. As alkoxyalkylester (d') having an alkyl group of a carbon number of 2–8, there are enumerated methoxybutyl (meth)acrylate, methoxyethyl (meth)acrylate, and ethoxybutyl (meth)acrylate.

As the aliphatic or cycloaliphatic vinyl monomer (e) having a carbon number of 2–12, there are enumerated (meth)acrylonitrile and (meth)acrolein; butadiene and isoprene; vinyl esters or isopropenyl esters such as vinylacetate, vinylpropionate and isopropenyl acetate;

vinylethers such as ethyl vinylether, butyl vinylether, cyclohexyl vinylether, and phenylvinyl ether.

As the aromatic vinyl monomer (f), there are enumerated styrene, α-methylstyrene, and vinyl toluene, etc.

As the glycidyl ester (g) of a (meth)acrylic acid, for example, there is enumerated a glycidyl(meth)acrylate, etc.

As the adduct (g') of a glycidyl ester of a (meth)acrylic acid with a fatty acid having a carbon number of 8–20, there is enumerated an adduct of a glycidyl(meth)acrylate with a fatty acid having a carbon number of 8–20 such as oleic acid, lauric acid, and stearic acid.

As the adduct (h) of a (meth)acrylic acid with an monoepoxy compound having a carbon number of 8–20, there is enumerated an adduct of a (meth)acrylic acid with Kardula E10 (a glycidyl ester of a branched higher fatty acid manufactured by Shell Chemicals, Ltd.).

As the monomer (i) containing an isocyanate group, for example, there are enumerated isocyanate ethyl(meth) acrylate, isocyanate propyl(meth)acrylate, isocyanate butyl (meth)acrylate, isocyanate hexyl(meth)acrylate, m-isopropenyl-α,α'-dimethylbenzyl isocyanate, and m-ethylenyl-α,α'-dimethylbenzyl isocyanate, etc., and further, an unsaturated compound in which a polyisocyanate compound such as hexamethylene diisocyanate is added to the above-described polymerizable monomer containing an active hydrogen such as hydroxyethyl(meth)acrylate and, those can be employed in mixing.

The above components (b)–(i) can be employed by mixing of one or more kind in or between respective components.

In the acrylic polyol resin (A), for example, there can be preferably employed 3–40% by weight of the hydroxyalkyl (meth)acrylate composition (a) modified by a small amount of lactones, 1–20% by weight of the α,β-unsaturated carboxylic acid, 1–25% by weight of the N-alkoxymethyl (meth)acrylate having an alkyl group of a carbon number of 1–6, and the aromatic vinyl monomer and the alkyl(meth) acrylate in the residual amount which is that 100% by weight minus total amount of the above.

In the acrylic polyol resin (A), for example, preferably, a number average molecular weight is 2,000–50,000, a hydroxyl value is 10–150 mg-KOH/g, and Tg point is 0–60° C.

The acrylic polyol resin (A) to be employed in the present invention is as illustrated in the present invention I.

Amino-plasto resin (IV-B)

Melamine resin (j) is at least one kind of a guanamine resin (k) selected from the group consisting of benzoguanamine, spyroguanamine, acetoguanamine, and phthaloguanamine; and/or a melamine-guanamine cocondensation resin (I), and it is partially etherized by a monovalent alcohol having a functional group of a carbon number of 1–6.

As the alcohol, for example, there is employed an alkyl alcohol having a carbon number of 1–4 such as methanol, ethanol, n-propanol, isopropanol, n-butanol, and isobutanol, etc., alone or in mixing.

Specifically, there are enumerated a methyletherized methylol melamine resin, a methyletherized methylol benzoguanamine resin, a methyletherized melamine-benzoguanamine cocondensation resin, a butyletherized methylol melamine resin, a butyletherized methylol benzoguanamine resin, and a methoxy-ethoxy mixed etherized benzoguanamine resin, etc. Of those, there are particularly preferred the methyletherized, and methoxy-ethoxy mixed etherized or methoxy-ethoxy mixed etherized melamine-benzoguanamine copolymerized resin from a viewpoint of retort resistance and processability.

The melamine curable type water-based coating composition of the present invention is comprised 5–60 parts by weight of an acrylic polyol resin (A) and 10–60 parts by weight of an amino-plasto resin (IV-B), and preferably, 10–50 parts by weight of an acrylic polyol resin (A) and 20–40 parts by weight of an amino-plasto resin (IV-B). In the case that the acrylic polyol resin (A) is less than 5 parts by weight, hardness of a coating layer remarkably lowers and, in the case of exceeding 60 parts by weight, retort resistance is unpreferably deteriorated. In the case that the amino-plasto resin (IV-B) is less than 10 parts by weight, curability lowers and, in the case of exceeding 60 parts by weight, processability unpreferably lowers.

The alkyletherized melamine resins are employed in an amount of 5–40% by weight in an over coat coating. In the case that the amount of the alkyletherized melamine resins is less than 5% by weight, a crossslinking reaction does not sufficiently proceed, and there lower solvent resistance and acid rain resistance. Further, in the case of exceeding 40% by weight, flexibility lowers in a coating layer, and there lowers bending resistance and impact resistance. In the case that the alkyletherized melamine resins alone are employed as a crosslinking agent, the alkyletherized melamine resins are employed in an amount of 20–40% by weight in an over coat coating. In the case of being less than 20% by weight, a crosslinking reaction does not sufficiently proceed, and there lower solvent resistance and acid rain resistance.

It is to be noted that it is preferred to optionally employ together a blocked polyisocyanate compound as a crosslinking agent.

By the use thereof, use amount of the alkyletherized melamine resins can be reduced and, a staining resistance is further improved owing to a relative decrease of an ether bond. Use amount thereof is 20% by weight at most, and in the case that it is formulated in exceeding 20% by weight, there lowers curability at a low temperature unpreferably.

As the blocked polyisocyanate compound, there are exemplified a polyhexamethylene diisocyanate which is an active methylene compound isocyanurate type and a polytetramethyl xylilene diisocyanate which is a methylethylketoxime blocked adduct type.

In the melamine-curable water-based coating composition of the present invention, there can be optionally employed an acidic catalyst, or amine-block agent thereof, for example, p-toluene sulphonic acid, dodecylbenzene sulphonic acid, dinonylnaphthalene sulphonic acid, and an amine blocking agent thereof in an amount of 0.1–4.0 parts by weight based on 100 parts by weight of solid content of resins as a curing catalyst. Likewise, there can be also added a defoaming agent, a leveling agent, and a lubricant, etc.

Further, there can be added pigments such as titanium oxide, an aluminum pigment, and quinaklidone by dispersing and kneading in the above-described water-based acrylic resin or a mixture of the water-based acrylic resin with other water-based resin using a publicly-known dispersing machine such as a sandmill or disper to prepare a pigment paste, followed by preparing a coating using the same method described hereinabove.

Still further, the melamine curable type water-based coating composition can be mixed with a water-soluble resin and a water-dispersible resin, for example, a resin such as a polyester, a polyetherpolyol, a polyesterpolyol, a polyurethanepolyol, a maleic-modified fatty acid, and an adduct of ethyleneoxide or propyleneoxide to bisphenol A, which are usually employed.

Furthermore, in the melamine curable type water-based coating composition, there can be also mixed an acrylic resin having a glass transition temperature of exceeding 0° C. or an acrylic resin having a glass transition temperature of not more than 0° C. according to uses thereof.

The melamine curable type water-based coating composition can be coated on a substrate by publicly-known means such as a roll coating, spray coating, and brush coating, etc.

A metallic base plate includes an extended steel plate, a stainless steel plate, and an aluminum alloy plate which have a plate thickness of 0.01–2.0 mm. In the metallic plates, surface is treated by at least one or more kinds of alloy or a composite which include an inorganic metal such as chromium, tin, zinc, and nickel an organic material such as an acrylic resin, using such as methods as plating, vapor deposition, coating, zirconium, alumite, and phosphate, etc. Further, there can be employed a metal plate in which a resin film such as a polyethylene terephthalate or a polybutylene terephthalate is laminated with the plates.

Hereinafter, the present invention IV is illustrated.

The present invention IV is a curable resin composition containing an acrylic polyol resin (V-A) obtained using a hydroxyalkyl(meth)acrylate composition (a) modified by a small amount of lactones in which a proportion of monomers having not less than 2 continuous chains (n 2) of lactones is less than 50% (GPC area %), and which is represented by the above-described general formula (1), and a polyisocyanate compound (V-B).

The hydroxyalkyl(meth)acrylate composition (a) modified by a small amount of lactones to be employed in the present invention is as illustrated in the present invention I.

By allowing to polymerize the hydroxyalkyl(meth) acrylate composition modified by a small amount of lactones to be employed in the present invention alone or copolymerize with other radically-polymerizable monomers, there can be provided an acrylic polyol resin having an excellent reactivity with an crosslinking agent and rich flexibility, and it can be utilized as a material for the curable resin composition for a coating of the present invention.

As the other radically-polymerizable monomers to be copolymerized with the (meth)acrylate composition having hydroxyl group modified by a small amount of lactones to be employed in the present invention, there are enumerated a polymerizable monomer having an active hydrogen and other polymerizable unsaturated monomers, which include monomers exemplified in the present invention I.

The other radically-polymerizable monomers can be also employed in mixing, and those are selectively employed depending upon desired physical properties.

Preferably, the acrylic polyol resin (V-A) is comprised 5–65% by weight of the hydroxyalkyl(meth)acrylate composition (a) modified by a small amount of lactones, 0–30% by weight of the vinyl monomer having hydroxyl group, and other vinyl-based monomers of a residual amount which is that 100% by weight minus total amount of the above monomers.

The acrylic polyol resin (V-A) to be employed in the present invention is prepared according to the methods in the present invention II.

The polyisocyanate compound (V-B) to be employed in the present invention is an aromatic, aliphatic, and cycloaliphatic polyisocyanate and, there are preferred an aromatic polyisocyanate having a carbon number of 6–30, an aliphatic polyisocyanate having a carbon number of 4–30, and a cycloaliphatic polyisocyanate having a carbon number of 8–30. For example, there are typically enumerated 2,4-naphthalene diisocyanate, 1,5-naphthalene diisocyanate, 4,4'-diphenylmethane diisocyanate, 4,4'-diphenyldimethylmethane diisocyanate, dialkyldiphenyl-methane diisocyanate, tetraalkyldiphenylmethane diisocyanate, 4,4'-diphenylenemethane diisocyanate, 4,4'-dibenzyl diisocyanate, 1,3-phenylene diisocyanate, 1,4-phenylene diisocyanate, a tolylene diisocyanate such as 2,4-tolylene diisocyanate and 2,6-tolylene diisocyanate, xylilene diisocyanate such as p-xylilene diisocyanate and m-xylilene diisocyanate, 1,4-tetramethylene diisocyanate, 1,5-pentamethylene diisocyanate, 1,6-hexamethylene diisocyanate, 2,2,4-trimethylhexamethylene-1,6-diisocyanate, 2,4,4-trimethylhexamethylene-1,6-diisocyanate, ridine diisocyanate, cyclohexane-1,4-diisocyanate, isophorone diisocyanate, 4,4'-diisocyanatedicyclohexane, 4,4'-diisocyanate dicyclohexane, dicyclohexylmethane-4,4'-diisocyanate, 1,3-bis(isocyanatemethyl)cyclohexane, and methyl cyclohexane diisocyanate such as methyl cyclohexane-2,4-(or -2,6-) diisocyanate, etc., or an adduct of the diisocyanates to a polyvalent alcohol such as ethylene glycol, propylene glycol, a polyethylene glycol, a polypropylene glycol, a polycaprolactone polyol, trimethylol ethane, and trimethylol propane, a polyester resin (including an oil-modified type) having a functional group which reacts with isocyanate group, an acrylic resin, etc., and water, etc., a buret compound, a polymer allowed to react between isocyanates, or an equal mol adduct of 2-hydroxypropyl (meth)acrylate-hexamethylene diisocyanate, a copolymer essentially containing a vinyl-based monomer having a copolymerizable unsaturated group with an isocyanate group such as isocyanateethyl (meth)acrylate, or compounds described in JP-A-61072013 Official Gazette, and a blocked compound blocked by a blocking agent such as a lower monovalent alcohol, phenols, methylethylketoxime, and a lactam, etc.

The diisocyanates may be employed solely or even in combination of tow or more kinds.

From a viewpoint of a color tone in a coating layer obtained using the curable resin composition of the present invention, as a polyisocyanate compound, nonyellowing type polyisocyanates are preferred, and the following ones are disclosed as an example.

There are enumerated aliphatic-based polyisocyanates such as 1,4-tetramethylene diisocyanate, 1,5-pentamethylene diisocyanate, 1,6-hexamethylene diisocyanate, 2,2,4-trimethyl-1,6-hexamethylenediisocyanate, and ridine diisocyanate; cycloaliphatic-based polyisocyanates such as isophorone diisocyanate, methyl cyclohexane-2,4-(or -2,6-) diisocyanate, dicyclohexyl methane-4,4'-diisocyanate, and 1,3-bis(isocyanatemethyl) cyclohexane, and the above-described derivatives (including an adduct) therefrom. Of those, there are preferably enumerated 1,6-hexamethylene diisocyanate (hereinafter, abbreviated as HMDI), isophorone diisocyanate (hereinafter, abbreviated as IPDI), and a derivative (including an adduct) therefrom in view of weatherability and an ease of industrially-obtaining.

Since the polyisocyanate compounds react with polyols in a base material even at room temperatures, those include a drawback that those are poor in storage stability, and handling is troublesome and, those are unpreferred in view of safeness and hygiene. Accordingly, blocked type polyisocyanates are preferred as the polyisocyanate compounds.

Although the blocked type polyisocyanates (hereinafter, occasionally referred to as a highly-branched block polyisocyanate) are obtained even only by allowing to react the polyisocyanates with a polyvalent alcohol, more preferably, those can be obtained by cyclic trimerization of an isocyanate, that is, isocyanuration after allowing to react a diisocyanates with the polyvalent alcohol.

As the polyvalent alcohol in the case, there is preferred an alcohol having three or more functionalities and, as a polyvalent alcohol having a low molecular weight, for example, there are enumerated trimethylol propane, glycerine, 1,1,7-trimethylol heptane, 1,2,7-trimethylol heptane, and pentaerythritol, etc. As a polyvalent alcohol having a higher molecular weight, for example, there are enumerated aliphatic hydrocarbon polyols, polyether polyols, polyester polyols, and epoxy resins, etc.

As the aliphatic hydrocarbon polyols, for example, there are enumerated a polybutadiene having hydroxyl group at terminals and a hydrogenate product therefrom, etc. Further, as the polyether polyols, for example, there are enumerated so-called polymer polyols, etc. obtained by polymerizing acrylic amides in media which are polyether polyols in which an alkylene oxide such as ethyleneoxide or propyleneoxide is added alone or in a mixture to polyvalent alcohols such as glycerine or propyleneglycol, polytetramethylene glycols, or polyethers in which polyfunctional compounds such as ethylenediamine or ethanolamines are added to an alkylene oxide.

As the polyester polyols, there are enumerated polyester polyol resins obtained by condensation reaction of at least one of a polybasic acid with at least one of polyvalent alcohols, and polycaprolactones obtained by ring-opening polymerization of $\epsilon$-caprolactone using polyvalent alcohols.

As the polybasic acid, for example, there are enumerated phthalic acid (anhydride), terephthalic acid, isophthalic acid, tetrahydrophthalic acid (anhydride), hexahydrophthalic acid (anhydride), 3-methylhexahydrophthalic acid (anhydride), 4-methylhexahydrophthalic acid (anhydride), 3-methyltetrahydrophthalic acid (anhydride), trimellitic acid (anhydride), pyromellitic acid (anhydride), het acid (anhydride), hymic acid (anhydride), adipic acid, sebasic acid, azelaic acid, succinic acid (anhydride), maleic anhydride, fumaric acid, itaconic acid, and a dimer acid, etc. The acid may be employed even in the form of an ester of a lower alcohol such as dimethylisophthalate and dimethylterephthalate.

The polyvalent alcohols are a compound having at least two alcoholic or phenolic hydroxyl groups in the molecule, for example, there are specifically enumerated ethylene glycol, diethylene glycol, triethyleneglycol, polyethyleneglycol, 1,6-hexanediol, pentanediol, cyclohexane dimethanol, propylene glycol, butylene glycol, butylene diglycol, trimethylol ethane, trimethylol propane, glycerine, neopentyl glycol, sorbitol, tris(2-hydroxyethyl) isocyanurate, diethanol amine, diisopropanol amine, bisphenol A, and bisphenol F, etc.

As the epoxy resins, for example, there are enumerated a novolak type, $\beta$-methylepichlorohydrin type, a cyclic oxirane type, a glycidylether type, a glycolether type, an epoxy type of an aliphatic unsaturated compound, an epoxidized fatty acid ester type, a polycarboxylic acid ester type, an aminoglycidyl type, a halogenated type, and resorcinol type, etc.

Of the polyols, there are preferably employed the above-described polyvalent alcohol having a low molecular weight and a polyether polyol having 3–8 pieces of hydroxyl groups in the molecule, the aliphatic hydrocarbon polyols, and polyester polyols and, particularly preferably, the polyester polyols. These may be employed solely or in combination of two or more kinds. Aliphatic or cycloaliphatic diisocyanate and the polyvalent alcohols are allowed to react at 50–200° C., and preferably 50–150° C. In the case, solvents may be even employed, and there are preferably employed solvents which are inactive to an isocyanate. As such the inactive organic solvents, for example, there are employed at least one kind of aliphatic hydrocarbons such as hexane, heptane, and octane; aromatic hydrocarbons such as benzene, toluene, and xylene; esters; and ketones. Since the solvents occasionally contain moisture, it is preferred to optionally remove the moisture. Although the reaction can be conducted even after an isocyanuration reaction, it is preferably conducted prior to the isocyanuration reaction.

In the isocyanuration reaction, catalysts are usually employed. In usual, the catalysts to be employed herein are preferably basic, for example, there are employed a quaternary ammonium salts and a weak organic acid salt thereof, an alkyl metal salt of an alkyl carboxylic acid, an metal alcholate, and a compound having an aminosilyl group, etc. Concentration of the catalysts is usually selected from a range of 210 ppm to 1.0% based on isocyanate compounds.

In the reaction, solvents may be employed or even not employed. In the case that the solvents are employed, there should be employed solvents which are inert to an isocyanate group.

Reaction temperature is usually 20–160° C., and preferably 40–130° C. Termination point of the reaction depends upon the kind of the polyvalent alcohols to be employed, and it is a period of at which yield attains to approximately 30%. When the reaction attains to a target yield, for example, the reaction is terminated by deactivation of the catalysts by, for example, sulphonic acid, phosphoric acid, and phosphates, etc.

In a highly-branched polyisocyanate having an isocyanurate structure after removal of unreacted diisocyanates and solvents, viscosity at 25° C. is preferably 0.5 to 300 Pas. In the case that the viscosity exceeds 300 Pas, outer appearance in a coating layer is adversely affected occasionally and, in the case of being less than 0.5 Pas, it is difficult to obtain a range of an average functional group number of the polyisocyanate regulated in the present invention.

As a blocking agent for obtaining the highly-branched block polyisocyanate, for example, there are enumerated phenol-based ones such as phenol, cresol, xylenol, ethylphenol, o-isopropylphenol, butylphenol such as p-tert-butylphenol, p-tert-octylphenol, nonylphenol, dinonylphenol, styrenized phenol, oxybenzoic acid phenol, thymol, p-naphthol, p-nitrophenol, p-chlorophenol; alcohol-based ones such as methanol, ethanol, propanol, butanol, ethyleneglycol, methylcellosolve, butylcellosolve, methylcarbitol, benzyl alcohol, phenylcellosolve, fulfurylalcohol, and cyclohexanol; active methylene-based ones such as dimethyl maloate, diethyl maloate, methylacetoacetate, ethylacetoacetate, and acetyl acetone; mercaptan-based ones such as butyl mercaptan, thiophenol, and tert-dodecyl mercaptan; amine-based ones such as diphenyl amine, phenylnaphtyl amine, aniline, and carbazole; acid amide-based ones such as acetanilide, acetoanisidide, amide acetate, and benzamide; lactam-based ones such as $\epsilon$-caprolactam, $\delta$-valerolactam, $\gamma$-butyrolactam, and $\beta$-propiolactam; acid imide-based ones such as succinic acid imide and maleic acid imide; imidazole based ones such as imidazole, 2-methylimidazole, and 2-ethylimidazole; urea-based ones such as urea, thiourea, an ethylene urea; carbamide acid salt-based ones such as N-phenylcarbamic acid phenyl and oxazolidone; imine-based ones such as ethyleneimine and a polyethylene imine; oxime-based ones such as formaldoxime, acetoaldoxime, acetoxime, methylethylketoxime, methylisobutylketoxime, and cyclohexanoeoxime; bisulphite-based ones such as sodium bisulphite and potassium bisulphite, etc., and these may be even as a mixture.

Of those, there are preferred the phenol-based ones, lactam-based ones, alcohol-based ones, and oxime-based ones and, there are particularly preferred nonylphenol, styrenized phenol, oxybenzoic acid ester, acetoxime, methylethylketoxime, and ε-caprolactam.

In the case that a low temperature (not more than 140° C.) baking is demanded, particularly, an oxime-based blocking agent is most preferred.

By allowing to react the blocking agent with the highly-branched polyisocyanate, the highly-branched block polyisocyanate can be obtained. Reaction of the isocyanate with the blocking agent can be conducted regardless of the presence or absence of solvents.

In the case that the solvents are employed, there must be employed solvents which are inert to an isocyanate group.

In the reaction for blocking, there may be even employed catalysts such as organic salts of metals such as tin, zinc, lead, and a tertiary amine, etc. The reaction can be conducted at −20 to 150° C. and, preferably, 0 to 100° C. In the case of exceeding 100° C., side reactions are possibly caused and, on the other hand, in the case of too low temperatures, reaction rate becomes slow, and it is disadvantageous.

The block polyisocyanate to be employed in the present invention has the average number of functional group of 4.5–10, preferably, 5–8 per 1 molecule of the block polyisocyanate.

The average number of functional group in the block polyisocyanate is a number of an isocyanate functional group to be statistically possessed in 1 molecule of the block polyisocyanate, and it is calculated by the following equation (1) from a number average molecular weight of the polyisocyanate before the blocking reaction and an isocyanate concentration (%).

$$\frac{(\text{Number average molecular weight}) \times \frac{(\text{isocyanate concentrtion})}{100}}{\text{molecular weight of isocyanate group (42)}} = \text{Equation (1)}$$

Average number of an isocyanate functional group

The acrylic polyol resin (V-A) and the polyisocyanate compound (V-B) in the present invention are employed as a raw material for a coating, which construct a primary component in the curable resin composition of the present invention. Equivalent ratio of the isocyanate group in the polyisocyanate or the blocked isocyanate group with respect to hydroxyl group in the resin containing hydroxyl groups is decided according to physical properties of a coating layer to be desired.

Formulation ratio of the acrylic polyol resin (V-A) with respect to the polyisocyanate compound (V-B) in the present invention is preferably NCO/OH=0.8–1.3 (equivalent ratio) from a viewpoint of properties in a coating layer. In the case that the NCO/OH is less than 0.8, residual hydroxyl group occasionally causes a decline of water resistance in a coating layer and, in the case of exceeding 1.3, residual isocyanate group unpreferably makes the coating layer brittle.

The curable resin composition of the present invention contains 50–90 parts by weight of the acrylic polyol resin (V-A) and 10–50 parts by weight of the polyisocyanate compound (V-B) as essential components, provided that total of the (V-A) and the (V-B) does not exceed 100 parts by weight.

Use ratio of the acrylic polyol resin (V-A) with respect to the polyisocyanate compound (V-B) is 50-10 parts by weight of the polyisocyanate compound (V-B) with respect to 50–90 parts by weight of the acrylic polyol resin (V-A). In the case that the use ratio of the acrylic polyol resin (V-A) is less than 50 parts by weight, a coating layer becomes brittle, for example, resulting in that it becomes not appropriate as a coating for a molded article of a polyolefine-based resin.

On the other hand, in the case that the use ratio of the acrylic polyol resin (V-A) exceeds 90 parts by weight, crosslinking becomes insufficient and, resulting in that there lower water resistance, solvent resistance, and weatherability. A preferred use ratio of the acrylic polyol resin (V-A) is 60–80 parts by weight, accordingly, a preferred use ratio of the polyisocyanate compound (V-B) becomes 40–20 parts by weight In the present invention, an acidic catalyst for curing is employed in order to cure by allowing to react the acrylic polyol resin (V-A) with the polyisocyanate compound (V-B).

Total acid value of in the acidic catalyst for curing is 5–50, and preferably 15–35. In the case that the total acid value is less than 5, crosslinking reactivity lowers, resulting in that crosslinking becomes insufficient, and there lower gasoline resistance and weatherability.

On the other hand, the acid value is higher than 50, there lower storage stability and water resistance.

As described hereinabove, a coating composition can be changed to a lower temperature curability by controlling the acid value. As such the acidic catalyst for curing, a weak acidic catalyst is employed. As such the weak acidic catalyst, for example, there are enumerated phosphoric acids, a monophosphate, a phosphite, a phosphate having an unsaturated group, and carboxylic acids, etc.

As the weak acidic catalyst, the phosphoric acids and phosphates are particularly preferred. As such the phosphoric acids and phosphates, for example, there are enumerated phosphoric acid, pyrophosphoric acid, etc., and mono or diphosphates, etc. As the monophosphates, for example, there are enumerated monooctyl phosphate, monopropyl phosphate, and monolauryl phosphate, etc. As the diphosphates, for example, there are enumerated dioctyl phosphate, dipropyl phosphate, and dilauryl phosphate, etc.

The acidic catalyst for curing is employed in an amount of 0.001–10% by weight, and preferably 0.001–5% by weight based on total weight of the acrylic polyol resin (V-A) and the polyisocyanate compound (V-B).

In the case that the polyisocyanate is prepared as a block type, it is a single-liquid type and, although there can be solved a problem concerning storage stability, dissociation temperature of the blocking agent becomes high and, it must become occasionally heated to not less than 150° C., and there is occasionally caused a problem that compatibility with a base resin is not sufficient and, an outer appearance in finishing becomes worse in a coating layer.

In the cases, the polyisocyanate compound to be employed in the present invention is preferably employed as a self-crosslinkable type resin which simultaneously contains a block isocyanate group and hydroxyl group in a molecule, which is described hereinafter.

The self-crosslinkable type resin is comprised a product in which a vinyl polymer having a block isocyanate group in a molecule is connected to a polyol resin having hydroxyl group in the molecule through urethane bond and, for example, it is obtained by (I) allowing to react a portion of hydroxyl groups in the polyol resin (A0) having at least two hydroxyl groups in the molecule with a portion of free isocyanate groups in a vinyl polymer (B0) having at least two free isocyanate groups in the molecule, and then, allowing to react a blocking agent with residual all the free isocyanate groups, or (II) allowing to react a portion of hydroxyl groups in the polyol resin (A0) having at least two hydroxyl groups in the molecule with all of free isocyanate groups in a vinyl polymer simultaneously having free isocyanate groups and block isocyanate groups in the molecule.

The vinyl polymer (B0) is a vinyl polymer having at least two free isocyanate groups in the molecule and, specifically, it is a polymer in which a vinyl monomer containing isocyanate group (hereinafter, abbreviated as "NCO group-contained monomer") is employed as an essential component, and further, other monomers are optionally employed, and which has isocyanate groups at terminals and/or side chains in a linear chain polymer.

The NCO group-contained monomer is a compound having at least one of a nonblocked free isocyanate group and at least one of a radically-polymerizable double bond, respectively.

For example, there are employed at least one or two kinds selected from isocyanatemethyl methacrylate, 2-isocyanate ethylmethacrylate, m- or p-isopropenyl-$\alpha,\alpha'$-dimethylbenzyl isocyanate, and a 1:1 (molar ratio) adduct of a vinyl monomer having hydroxyl group with a diisocyanate compound, etc.

The diisocyanate compound has two isocyanate groups in the molecule, and there are enumerated the above-described aliphatic, aromatic, or cycloaliphatic-based diisocyanate compounds.

Of the above compounds, a preferred compound as the NCO group-contained monomer is 2-isocyanate ethylmethacrylate, m-isopropenyl-$\alpha,\alpha'$-dimethylbenzyl isocyanate, and an equimolar adduct of 2-hydroxyethylacrylate with isophorone diisocyanate, etc.

The vinyl monomer having hydroxyl group, which is employed for preparing the NCO group-contained monomer, is a compound having at least one hydroxyl group and at least one radically-polymerizable double bond, respectively, in the molecule, for example, there are enumerated 2-hydroxyethyl(meth)acrylate, 2-hydroxypropyl (meth)acrylate, hydroxybutylacrylate, 2,3-dihydroxypropylacrylate, 2-hydroxy-3-phenoxyethylacrylate, and 2-hydroxy-3-ethoxyethylacrylate, etc. Further, there is enumerated an equimolar adduct of acrylic acid or methacrylic acid with a glycol (a carbon number of 2–20), etc.

The vinyl polymer (B0) is obtained by polymerizing the NCO group-contained monomer alone or by copolymerizing the monomer with other vinyl monomers.

As the other vinyl monomers, there is preferred a compound which contains one radically-polymerizable double bond in the molecule and, moreover, which does not contain an active hydrogen which can react with isocyanate group, specifically, there are enumerated aromatic vinyl-based monomers such as styrene, $\alpha$-methylstyrene, and vinyltoluene; (meth)acrylates such as methyl(meth)acrylate, ethyl (meth)acrylate, butyl(meth)acrylate, 2-ethylhexyl(meth) acrylate, lauryl(meth)acrylate, tridecyl (meth)acrylate, stearyl(meth)acrylate, cyclohexyl(meth)acrylate, and benzyl (meth)acrylate; a fluorine-contained vinyl-based monomer such as Viscose 3F (a trade name, manufactured by Osaka Yuki Kagaku, Ltd., hereinafter, it shows a same mean), Viscose 3MF, Viscose 8F, Viscose 8MF, perfluorocyclohexyl(meth)acrylate, N-2-propylperfluoro octane sulphonic amide ethyl(meth)acrylate, vinylfluoride, and vinylidene fluoride; a nitrogen-contained vinyl monomer such as N,N'-diethylaminoethyl(meth)acrylate, N,N'-diethylaminoethyl(meth)acrylate, N,N'-diethylaminoethyl (meth)acrylate, and N,N'-diethyl(meth)acrylic amide; a vinylether-based monomer such as vinylethylether and vinylbutylether; and glycidyl(meth)acrylate, 3,4-epoxycyclohexylmethyl(meth)acrylate, an alkyletherized compound such as arylglycidyl ether and methylol acrylic amide, (meth)acrylic amide, (meth)acrylic chloride, vinylchloride, vinylidenechloride, (meth)acrylonitrile, and γ-methacryloxyalkyl trimethoxy silane, etc., and these are employed solely or as a mixture of two or more kinds.

Ratio of the NCO group-contained monomer with respect to the other vinyl monomers, if it is within a range containing at least two free isocyanate groups in one molecule of the polymer (B0), is not particularly limited, and the NCO group-contained monomer/the other vinyl monomers (weight ratio) ranges in 100/0-1/99, preferably 65/35-30/70.

Further, in usual, a polymerization reaction of the NCO group-contained monomer alone or a copolymerization reaction of the other vinyl monomers is preferably conducted in an inert organic solvent not having an active hydrogen which can react with isocyanate group. As such the inert organic solvent, there are employed the above-described solvent or a mixture thereof. Since the solvents occasionally contain moisture, the moisture is optionally in advance removed.

The (co)polymerization reaction is usually conducted at a temperature of 50–180° C. using a radical polymerization initiator, a molecular weight of the polymer (B0) can be controlled by a reaction concentration and the amount of the radical polymerization initiator, etc. The reaction concentration ranges in 20–80% by weight as a polymer. Particularly, in order to elevate a polymerization ratio, there is employed a peroxide-based or carbonate-based polymerization initiator, and the reaction is preferably conducted at a temperature of not less than 100° C.

More preferably, there is apt to be obtained a polymer having a high polymerization ratio by employing together an acrylate-based monomer. Concentration of the polymerization initiator ranges in 0.01–15% by weight based on total monomers, and it preferably ranges in 0.1–10% by weight.

Further, it can be also polymerized by utilizing an electron beam or ultraviolet ray in place of employing the polymerization initiator.

Still further, other than a radical polymerization, there can be also utilized an ion polymerization method and a group transfer polymerization method.

In the polymer (B0) to be employed in the present invention, a weight average molecular weight ranges in preferably 1000–100000 and, particularly, preferably 3000–30000. Further, an isocyanate value appropriately ranges in 30–200 g/1000 g of a resin.

The polymer (B0) has at least two free isocyanate groups in the molecule and, preferably, it does not have at all an active hydrogen which can react with isocyanate group.

The polyol resin (A0): It is a resin having at least two hydroxyl groups in the molecule. Specifically, there are enumerated an acrylic resin (A0–1), a polyester resin (A0–2), and a fluorocarbon resin (A0–3), etc. which have at least two hydroxyl groups in the molecule, and all of the already-known products can be employed, provided that the polyol resin (A0) contains the above-described polyol resins (A) in a proportion of 0.5–80 parts by weight.

First of all, the acrylic resin (A0–1) is an acrylic-based resin having at least two hydroxyl groups in the molecule. The acrylic resin (A0–1) is a polymer which containing a monomer unit (hereinafter, referred to "hydroxyl group-contained monomer") having at least one of hydroxyl groups and at least one of radically-polymerizable double bonds, respectively, in the molecule as an essential component, and in which other vinyl monomers are further employed, and which does not contain the the NCO group-contained monomer.

As the hydroxyl group-contained monomer, for example, there are enumerated 2-hydroxyethyl(meth)acrylate, 2-hydroxypropyl (meth)acrylate, hydroxybutylacrylate, 2,3-dihydroxypropyl acrylate, 2-hydroxy-3-phenoxyethylacrylate, and 2-hydroxy-3-ethoxyethylacrylate, etc. Further, there is enumerated an equimolar adduct of acrylic acid or methacrylic acid with a glycol (a carbon number of 2–20), etc., a caprolactone-modified(meth)acrylate such as Placcel FM-1, FM-2, FM-3, FM-4, FM-5, FA-1, FA-2, FA-3, FA-4, and FA-5 (which are manufactured by Daicel Chemical Industries, Ltd., a trade name, hereinafter, the same), and the hydroxyalkyl(meth) acrylate composition modified by a small amount of lactones, in which a proportion of monomers having not less than 2 continuous chains (n≧2) of lactones is less than 50% of the present invention, etc. These may be also employed as a mixture of two or more kinds.

The other monomers, which can be copolymerized with the hydroxyl group-contained monomer, have a radically-polymerizable double bond in the molecule and, moreover, do not preferably contain an active hydrogen which can react with isocyanate group, specifically, there are preferred the vinyl monomers enumerated as other monomers in the illustration for the above-described vinyl polymer (B0).

Further, the acrylic resin (A0–1) is a resin essentially containing a (meth)acrylate (also including the hydroxyl group-contained monomer), etc., and the content thereof is preferably 20–100% by weight and, particularly, preferably 30–100% by weight in total monomers employed for the preparation of the acrylic resin (A0–1).

Construction ratio of the above-described monomers in the acrylic resin (A0–1) is not particularly limited, and the hydroxyl group-contained monomer is 1–100% by weight and, particularly, 10–60% by weight, a vinyl monomer having a carboxylate group is 0–20% by weight and, particularly, 0–5% by weight, and other vinyl monomers are 0–99% by weight and, particularly, preferably 40–90% by weight based on total weight of the monomer composition.

The acrylic resin (A0–1), as exemplified in the preparation of the polymer (A), can be obtained by a radical polymerization method using a polymerization initiator, a photo-polymerization method utilizing an electron beam or an ultraviolet ray, an ionic polymerization method, and a group transfer polymerization method, As organic solvents to be employed in the polymerization methods, there is preferred an inert organic solvent not containing an active hydrogen which reacts with isocyanate group and, specifically, there are preferred the solvents exemplified in the item of the above-described block type isocyanate, and there are also preferred hydrophilic or water-soluble solvents not having an active hydrogen, for example, there are preferred diethyleneglycol dimethylether and ethyleneglycol dimethylether, etc.

On the other hand, in the case that the acrylic resin (A0–1) is synthesized in an organic solvent having an active hydrogen, it can be employed in a urethanation reaction with the polymer (A0) after removing the organic solvent under a reduced pressure or by condensing or spray drying.

In the acrylic resin (A0–1), a weight average molecular weight ranges in preferably 500–50000 and, particularly, preferably 2000–35000 and, hydroxyl group particularly appropriately ranges in 5–250 based on a hydroxyl value.

The polyester resin (A0–2) is a polyester-based resin having at least two hydroxyl groups in the molecule. The polyester resin (A0–2) is obtained by an esterification or transesterification reaction using a polybasic acid having at least two carboxylic groups in the molecule and a polyvalent alcohol having at least two hydroxyl groups in the molecule as essential components and, optionally, using a fatty acid and/or a fatty acid ester as raw materials, so that free hydroxyl groups are contained.

As the polybasic acid and the polyvalent alcohol, for example, there are enumerated the polybasic acid and the polyvalent alcohol for the polyester polyols exemplified in the item of the block type isocyanate.

As the fatty acids, for example, there can be employed a (semi)drying oil fatty acid such as a safflower oil fatty acid, a linseed oil fatty acid, a soybean oil fatty acid, an eno oil fatty acid, a corn oil fatty acid, a tall oil fatty acid, a sunflower oil fatty acid, a cotton seed oil fatty acid, and a tung oil fatty acid; a coconut oil fatty acid; an olive oil fatty acid; and a palm oil fatty acid, etc. of those, the (semi)drying oil fatty acid is preferably employed from a viewpoint of an improvement of properties in a coating layer.

In the polyester resin (A0–2), in general, an acid value (mgKOH/g of a resin) desirably ranges in not more than 200 and, preferably not more than approximately 100, and a hydroxyl value (mgKOH/g of a resin) ranges in approximately 5–400 and, preferably approximately 20–250. In the case that the hydroxyl value is less than approximately 5, curability in a coating layer lowers, and there is unpreferably observed a tendency of a decline of properties in a coating layer such as hardness and bending resistance and, on the other hand, in the case that the hydroxyl value becomes more than approximately 400, there is unpreferably observed a decline of properties in a coating layer such as water resistance and corrosion resistance.

Introduction of hydroxyl groups into the polyester resin (A0–2) is preferably conducted by employing together a compound having at least three hydroxyl groups in the molecule, for example, as the polyvalent alcohol.

Further, in the polyester resin (A0–2), a weight average molecular weight ranges in generally approximately 500 to approximately 50000, and preferably approximately 1000 to approximately 30000 and, a softening point is not more than 150° C., and preferably not more than approximately 115° C.

The esterification reaction by respective components for the preparation of the polyester resin (A0–2) is preferably conducted under the presence of an organic solvent. As the organic solvent to be employed in the esterification reaction, there is preferred an inert organic solvent not having an active hydrogen which reacts with isocyanate group in consideration of an introduction of urethane bond derived from a urethane reaction with the vinyl polymer (B0) and, specifically, there are preferred the solvents exemplified in the item of the above-described block type isocyanate, and there are also preferred hydrophilic or water-soluble solvents not having an active hydrogen, for example, there are preferred diethyleneglycol dimethylether and ethyleneglycol dimethylether, etc.

On the other hand, in the case that the polyester resin (A0–2) having hydroxyl groups is synthesized in an organic solvent having an active hydrogen, it can be employed in a urethanation reaction with the polymer (B0) after removing the organic solvent under a reduced pressure or by condensing or spray drying.

Further, as the polyester resin (A0–2) having hydroxyl groups, there can be also employed a ring-opened polymer of ε-caprolactone and, as a specific example thereof, there are enumerated Placcel 208, 240, 305, and 308 which are manufactured by Daicel Chemical Industries, Ltd.

The fluorocarbon resin (A0–3) is a resin having at least two hydroxyl groups, and hving fluorine atoms at a main structure or side chains.

The fluorocarbon resin (A0–3) is obtained by allowing to copolymerize partially or wholly employing a fluorine-contained polymerizable unsaturated monomer as other vinyl monomers which are occasionally employed for the preparation of the acrylic resin (A0–1) with the hydroxyl group-contained monomer.

As the fluorine-contained polymerizable unsaturated monomer, for example, there are enumerated a fluoroolefine represented by a general formula $CX_2=CX_2$ (in the formula, X may be identical to or different from each other, and represents H, Cl, Br, F, an alkyl group or haloalkyl group, provided that it contains at least one piece of F): a perfluoroalkyl(meth)acrylate such as a perfluorobutyl ethyl (meth)acrylate, a perfluoroisononyl ethyl(meth)acrylate, a perfluorooctyl ethyl(meth)acrylate, Viscose 3MF, Viscose 8F, Viscose 8MF, perfluorocyclohexyl(meth)acrylate, and N-2-propylperfluoro octane sulphonic amide ethyl(meth)acrylate, etc.

In the fluorocarbon resin (A0–3), properties such as a hydroxyl value and a weight average molecular weight may be nearly identical to the above-mentioned acrylic resin (A0–1).

In the preparation of the self-crosslinkable resin (I), a reaction of the vinyl polymer (B0) with the polyol resin (A0) is a urethanation reaction of isocyanate group with hydroxyl group and, specifically, the urethanation reaction is conducted by formulating the polyol resin (A0) into an organic solution of the vinyl polymer (B0) at a temperature of usually 20–100° C., and preferably 25–60° C.

The reaction is controlled by the reduction amount of isocyanate group, that is, an isocyanate value. Further, in the reaction, a tin-based catalyst, etc. may be optionally even employed. Formulating amount of the polyol resin (A0) appropriately ranges in 0.1–10.0, and preferably 0.5–5.0 based on a functional group ratio in the vinyl polymer (B0) with respect to the polyol resin (A0), that is, NCO/OH ratio and, based on total weight of the both, the vinyl polymer (B0) ranges in 1–99% by weight, and preferably 10–70% by weight, the polyol resin (A0) ranges in 1–99% by weight, and preferably 30–90% by weight, provided that the polyol resin (A0) contains 0.5–80 parts by weight of the acrylic polyol resin (V-A) obtained using the hydroxyethyl(meth) acrylate composition modified by a small amount of lactones of the present invention with respect to 0.5–50 parts by weight of the polyisocyanate compound (V-B).

Further, formulation is conducted so that at least average 0.1 piece of urethane bond is introduced with respect to 1 molecule of the vinyl polymer (B0) having a weight average molecular weight of 500–50000, and preferably, average 0.5–1.5 piece of urethane bond is introduced with respect to 1 molecule of the vinyl polymer (B0) having a weight average molecular weight of 500–30000 and, particularly, 1 piece of urethane bond is most preferably introduced with respect to 1 molecule of the vinyl polymer (B0).

Further, in the preparation of the self-crosslinkable resin (I), gelation in the reaction with the polyol resin (A0) can be prevented by employing the vinyl polymer (B0) containing m-isopropenyl-α, α'-dimethylbenzyl isocyanate having a tertiary isocyanate group as a vinyl polymer (B0), whereby, a coating layer can be preferably cured at a low temperature.

As described hereinabove, urethane bonds are introduced by allowing to react the polyol resin (A0) and, the self-crosslinkable resin (I) is obtained by completely blocking the residual free isocyanate group which is contained in the vinyl polymer (B0) in which the polyol resin (A0) is added through allowing to react with a blocking agent. As the blocking agent, for example, there are enumerated the compounds described hereinabove.

In principle, the blocking agent is preferably formulated in an amount to be required so as to react with all residual free isocyanate groups.

Reaction of a polymer in which the polyol resin (A0) is added with the blocking agent is usually conducted at a temperature of 20–100° C. Further, a tin-based catalyst may be even optionally employed.

The self-crosslinkable resin (II) is a self-crosslinkable resin simultaneously containing a block isocyanate group and hydroxyl group coexist in the molecule, and which is prepared by allowing to partially react hydroxyl groups in the polyol resin (A0) having at least two hydroxyl groups with all the free isocyanate groups in a vinyl polymer (V-C) in which free isocyanate groups and block isocyanate groups coexist in the molecule.

The vinyl polymer (V-C) is a vinyl polymer simultaneously containing free isocyanate groups and block isocyanate groups coexist in the molecule and, specifically, it is obtained by allowing to partially react free isocyanate groups in the above-described vinyl polymer (B0) with a blocking agent. In relation to the vinyl polymer (B0) to be employed for the preparation of the vinyl polymer (V-C), as an NCO group-contained monomer, the above-described monomers can be employed and, particularly, there is preferred a vinyl polymer (B0) obtained by using an equimolar adduct of 2-isocyanate ethylmethacrylate, m-isopropenyl-α, α'-dimethylbenzyl isocyanate, and 2-hydroxyethylacrylate with isophorone diisocyanate.

Formulating amount of the blocking agent into the polymer may be an amount to be required for remaining the free isocyanate groups so that an introducing amount of urethane bonds derived from a reaction with the polyol resin (A0) in a succeeding step becomes a same level as in the above-described self-crosslinkable resin (I) and, particularly preferably, a reaction is preferably conducted by allowing to remain free isocyanate group being capable of introducing one piece of urethane bond per one molecule of the polymer (V-A) and by formulating an amount of the blocking agent to be required for completely blocking the remained free isocyanate.

And, the self-crosslinkable resin (II) is obtained by allowing to partially react hydroxyl groups in the polyol resin (A0) with all the remained free isocyanate in the polymer obtained by allowing to react the blocking agent with a polymer. In other words, it is required that the amount of the hydroxyl groups in the resin (A0) is larger than the amount of the remained free isocyanate.

The reaction with the blocking agent for obtaining the self-crosslinkable resin (II) and the reaction of the polymer obtained with the resin (A0) are likewise conducted as illustrated in the self-crosslinkable resin (I).

In the self-crosslinkable resins (I) and (II), a molecule of a resin containing a block isocyanate group is connected to a molecule of the polyol resin through a urethane bond derived from a reaction of isocyanate group with hydroxyl group. Accordingly, those are also looked upon as a graft polymer by the both molecules.

Thus-obtained self-crosslinkable resins (I) and (II) have at least one piece of the block isocyanate group and one piece of hydroxyl group, and a weight average molecular weight is 1000–120000 or so and, particularly, preferably 5000–50000 or so.

In the self-crosslinkable resins to be employed in the present invention, crosslinking degree becomes highest as a self-crosslinkable coating layer by adjusting the amount of the block isocyanate group and hydroxyl group in the molecule to an equimolar amount, and hydroxyl group is preferably adjusted to an excessive amount in consideration of adhesion of a intermediate coating layer to a substrate and an over coating layer. In the resins, a hydroxyl value (mgKOH/g of a resin) appropriately ranges in 10–200, an isocyanate value (g/1000 g of a resin) appropriately ranges in 15–150, and an acid value (mgKOH/g of a resin) appropriately ranges in not more than 200.

Coating in relation to the present invention contains the above-described curable resin composition as an essential component, and it is obtained by dissolving or dispersing the resin into an organic solvent or a water-based solvent and, optionally, there can be appropriately formulated a variety of additives which are conventionally employed in a coating field, for example, an ultraviolet ray absorbent, a photostabilizer, an antioxidant, a pigment for coloring, an extender pigment, a metallic pigment, an aluminum powder, a pearly mica powder, an anti-dropping agent or an anti-sedimentation agent, a leveling agent, a dispersant, a defoaming agent, an antistatic agent, a catalyst for curing, a flowability-adjusting agent, a cellulose acetate-butylate, and a thinner which are publicly- and commonly-known to prepare a two-liquid type coating or a single-liquid type coating composition.

Further, there can be employed other resins such as an epoxy resin and a polyester resin or a high molecular weight compound which has a good compatibility within a range in which an effect by the present invention is not decreased. Thus-obtained coating can be coated by publicly- and commonly-known methods such as spray coating, roller coating, and brush coating. It is to be noted that it goes without saying that the resin composition for a coating of the present invention can be employed as a clear coating in which pigments are not employed, or an enamel coating in which pigments are employed.

In the coating in relation to the present invention, there can be actualized a more exceedingly excellent acid resistance which does not include any practical problems compared to a coating prepared from a conventional polyol and melamine resin even though being further employed together with other polyols and crosslinking agents (for example, a melamine resin). In the coating in relation to the present invention, in the case of simultaneously employing other polyol resins and melamine resins, the content of the curable resin composition of the present invention is not less than 10% by weight, and preferably not less than 25% by weight in total solid resin components, the content of the melamine resins are not more than 30% by weight, and preferably not less more than 20% by weight, in total solid resin components.

In the case that the curable resin composition of the present invention is less than 10% by weight or, the melamine resins are more than 30% by weight, an acid resistance cannot be unpreferably elevated.

As the melamine resins to be simultaneously employed, usual melamine resins for coatings can be employed without any modification, and imino type or methylol type melamine resins are employed. The imino type or methylol type melamine resins are not particularly limited in employing and, if those are resins to be employed for a coating-system in which hydroxyl group is employed as a functional group. As such the imino type melamine resins, for example, there are enumerated Yuban 22R (solid content of 60%), Yuban 21R (solid content of 50%), and Yuban 2028 (solid content of 75%) which are manufactured by Mitsui Kagaku (all of those are a imino type melamine resin), etc. On the other hand, as the methylol type melamine resins, there can be employed a melamine resin having a condensation degree of 1.1–20 or so which is prepared using melamine, formaldehyde, a monoalcohol of a carbon number of 1–4, and optionally water as raw materials. For example, there are enumerated Yuban 60R (solid content of 50%) manufactured by Mitsui Kagaku and Superbekkamine L-121-60 (solid content of 60%) manufactured by Dainippon Ink Kagaku Kogyo, Ltd., etc.

As the polyol resins to be employed together with the curable resin composition of the present invention, for example, there are preferred the above-described acrylic resin (A0–1), polyester resin (A0–2), and fluorine resin (A0–3).

Provided, in the case of simultaneously employing the polyol resins, the polyol resins and the polyol resins (A0) definitively contain the acrylic polyol resin (V-A) in a proportion of 0.5–80 parts by weight with respect to 0.5–50 parts by weight of the polyisocyanate compound (V-B).

In the curable resin composition of the present invention, above all, in order to elevate weatherability such as retention of a gloss during exposure and a high extentionable property, there is preferably employed a mixture composed of an ultraviolet ray absorbent/hindered amine-based photostabilizer=(40–60)/(60–40) (ratio of solid components) within a range of 0–10 wt % based on solid components in the acrylic polyol resin (V-A). In the case that addition amount is not less than 10 wt %, since a price of a coating becomes expensive and, crystallines are occasionally formed at a low temperature and water resistance occasionally lowers, and a resin solution occasionally discolors, it is not preferred so much. Even in an outside value of the above mixing ratio of the ultraviolet ray absorbent with respect to the hindered amine-based photo-stabilizer, although an effective action is observed, the effective action is most excellently observed in a range of the above mixing ratio.

As typical examples of the ultraviolet ray absorbent, there can be preferably employed benzophenone, 2,4-dihydrobenzophenone, 2,2',4,4'-tetrahydroxy benzophenone, 2-hydroxy-4-methoxybenzophenone, 2,2'-dihydroxy-4,4'-dimethoxybenzophenone, 2,2'-dihydroxybenzophenone, 2-hydroxy-4-octoxybenzophenone, 2-hydroxy-4-dodecyloxybenzophenone, 2-hydroxy-4-methoxy-5-sulphobenzophenone, 5-chloro-2-hydroxybenzophenone, 2,2'-dihydroxy-4,4'-dimethoxy-5-sulphobenzophenone, 2-hydroxy-4-methoxy-2'-carboxybenzophenone, and 2-hydroxy-4-(2-hydroxy-3-methyl-acryloxyisopropoxy) benzophenone; 2-(2'-hydroxy-5-methyl-phenyl)-benzotriazole, 2-(2-hydroxy-3,5-di-t-amyl-phenyl)-2H-benzotriazole, 2-(2'-hydroxy-3',5'-di-t-butyl-phenyl) benzotriazole, 2-(2'-hydroxy-3',5'-di-t-butyl-phenyl)-5-methyl-benzotriazole, 2-(2'-hydroxy-3',5'-di-t-butyl-phenyl)-5-chloro-benzotriazole, 2-(2'-hydroxy-3',5'-di-t-isoamyl-phenyl)benzotriazole, and (2-hydroxy-5-t-butyl-phenyl)benzotriazole; phenylsalicylate, 4-t-butyl-phenylsalicylate, and p-octyl-phenylsalicylate; ethyl-2-cyano-3,3'-diphenylacrylate, 2-ethylhexyl-2-cyano-3,3'-diphenylacrylate; hydroxy-5-methoxy-acetophenone, 2-hydroxy-naphtophenone; 2-ethoxyethyl-p-methoxycinnamate; nickel-bisoctylphenylsulphide; and anilide oxalate, etc., for example, a benzotriazole-based ultraviolet ray absorbent such as Tinuvin 900, Tinuvin 383, and Tinuvin P (manufactured by Ciba Geigy), an anilide oxalate-based ultraviolet ray absorbent such as Sandbar 3206 (manufactured by Sand), etc. A fixed amount of the absorbents may be added in a terminating period of a copolymerization reaction of the acrylic polyol or in the preparation of a coating. On the other hand, in the case of T-17, T-37, and T-38 (all of those are a product by Adeka Argus Kagaku, Ltd.) which are a reactive ultraviolet ray absorbent containing an organic group having an ultraviolet ray absorbing ability such as an O-hydroxybenzophenone group and an ethylenic copolymerizable unsaturated bond such as methacrylic acid group in an identical molecule, a fixed amount thereof may be simultaneously introduced by copolymerizing at a copolymerization step of the acrylic polyol resin (A) components.

As examples of the hindered amine-based photo-stabilizer, there can be preferably employed a piperidine-based one which is usually called HALS (HALS) and typically includes 4-benzoyloxy-2,2,6,6-tetramethylpiperidine, bis(2,2,6,6-tetramethyl-4-piperidine) sebacate, or Tinuvin 144, 292, and 765 (all of those are a product manufactured by Ciba Geigy, A.G.), MARK LA-57, 62, 63, 67, and 68 (all of those are a product by Adeka Argus Kagaku, Ltd.), Sanol LS292 (manufactured by Sankyo), and Sandbar 3058 (manufactured by Sand). A fixed amount of the stabilizers may be added in a terminating period of a copolymerization reaction of the acrylic polyol resin (A) or in the preparation of a coating. In the case of a hindered amine-based compound containing an organic group having a photo-stabilizing ability and an ethylenic copolymerizable unsaturated bond such as (meth)acrylic acid group such as the MARK LA-82, 87, and T-41 (all of those are a product by Adeka Argus Kagaku, Ltd.), a fixed amount thereof may be simultaneously introduced by copolymerizing at a synthesis step of the acrylic polyol resin (A) components.

Further, in order to increase an effectiveness thereof, optionally there can be simultaneously employed an antioxidant such as "Sumilizer BHT" (a product manufactured by Sumitomo Kagaku Kogyo, Ltd.), "Seenox BCS" (a product manufactured by Shiroishi Calcium, Ltd.), "Iranox 1010 or 1076" (a product manufactured by Ciba Geigy, A.G.), "Noclizer TNP" (a product manufactured by West Germany/Bayer, A.G.), which are well known and commonly-used.

As the catalysts for curing, there are enumerated a phosphate, an organic acid such as dodecylbenzene sulphonic acid or paratoluene sulphonic acid and an amino acid thereof, an organic tin compound such as dibutyltin dilaurate and dibutyltin maleate and a chelating compound thereof, etc.

As the coloring pigments, extender pigments, leveling agents, dispersants, defoaming agents, photostabilizers, thinners, and antistatic agents, for example, there are enumerated ones exemplified in the above-described present invention III.

In the case of preparing a coating composition using the curable resin composition of the present invention, there are mixed the acrylic polyol resin (V-A), the polyisocyanate compound (V-B), and optionally, additives such as acidic-dissociation catalysts and pigments, and uniformly dispersed by a dispersing machine such as a sand grind mill, a ball mill, and Atlighter to prepare a curable type coating composition.

Coating of the coating composition obtained as described hereinabove may be conducted according to the methods illustrated in the present invention III.

VI

Hereinafter, the present invention VI is illustrated.

The present invention VI is a curable resin composition comprising an acrylic polyol resin (VI-A) obtained by using a hydroxyalkyl(meth)acrylate composition (a) modified by a small amount of lactones, in which a proportion of monomers having not less than 2 continuous chains (n≧2) of lactones represented by the general formula (1) is less than 50% (GPC area %), and a polyisocyanate compound (VI-B).

The hydroxyalkyl(meth)acrylate composition (a) modified by a small amount of lactones to be employed in the present invention is as illustrated in the present invention I.

By allowing to polymerize alone the hydroxyalkyl (meth) acrylate composition (a) modified by a small amount of lactones to be employed in the present invention or by allowing to copolymerize with other radically-polymerizable monomers, there can be provided a curable acrylic polyol which is excellent in reactivity with a crosslinking agent and rich in flexibility, and it can be utilized as a material for the curable resin composition for coating of the present invention.

In the present invention, the other radically-polymerizable monomers are employed to copolymerize with the lactone-modified (meth)acrylate having hydroxyl group. The acrylic polyol resin (VI-A) in relation to the present invention is a vinyl copolymer having carboxylic group and a crosslinkable functional group, which is obtained by allowing to react a hydroxyalkyl(meth)acrylate composition (a) modified by small amount of lactones with a vinyl monomer having carboxylic group and other vinyl-based monomers.

As the vinyl-based monomer having carboxylic group to be employed in the present invention, only particularly typical examples are exemplified, and which include an α,β-ethylenic unsaturated carboxylic acid such as acrylic acid, methacrylic acid, crotonic acid, itaconic acid, maleic acid (anhydride) or fumaric acid (anhydride), itaconic acid, itaconic anhydride, and citraconic acid.

As the other vinyl-based monomer, there are enumerated a polymerizable vinyl monomer containing an active hydrogen and other polymerizable unsaturated monomers, and the following compounds are exemplified.

As a (meth)acrylate, for example, an alkyl or cycloalkyl ester having a carbon number of 1–20 of a (meth)acrylic acid such as methyl(meth)acrylate, ethyl(meth)acrylate, propyl (meth)acrylate, isopropyl(meth)acrylate, butyl(meth) acrylate, hexyl(meth)acrylate, 2-ethylhexyl(meth)acrylate, octyl(meth)acrylate, lauryl(meth)acrylate, tridecyl(meth) acrylate, stearyl (meth)acrylate, cyclohexyl(meth)acrylate, isobonyl(meth)acrylate, and adamantyl(meth)acrylate; a (meth)acrylate such as benzyl(meth)acrylate; an alkoxyalkyl ester having a carbon number of 2–8 of a (meth)acrylic acid such as methoxybutyl(meth)acrylate, methoxyethyl(meth) acrylate, and ethoxybutyl(meth)acrylate; a fluorine-contained vinyl monomer such as Viscose 3F, 3MF, 8F, and 8MF (manufactured by Osaka Yuki Kagaku, Ltd., a trade name), perfluorocyclohexyl(meth)acrylate, N-2-propylperfluoro octane sulphonic amide ethyl(meth) acrylate, vinylfluoride, and vinylidene fluoride; a nitrogen-contained vinyl monomer such as N,N'-diethylaminoethyl (meth)acrylate, N,N'-diethylaminoethyl(meth)acrylate, N,N'-diethylaminoethyl (meth)acrylate, and N,N'-diethyl (meth)acrylic amide; a vinylether-based monomer such as vinylethylether and vinylbutylether; and glycidyl(meth) acrylate, 3,4-epoxycyclohexylmethyl(meth)acrylate, an alkyletherized compound such as arylglycidyl ether and methylol acrylic amide, (meth)acrylic amide, (meth)acrylic chloride, vinylchloride, vinylidenechloride, (meth) acrylonitrile, and γ-methacryloxyalkyl trimethoxy silane, an aromatic vinyl monomer such as styrene, α-methylstyrene, and vinyltoluene; (meth) acrolein, butadiene, isoprene, methylisopropenyl ketone, etc., and these are employed solely or as a mixture of two or more kinds.

As the polymerizable monomer having an active hydrogen, there are enumerated a (meth)acrylate having hydroxyl group described below and a (meth)acrylate having amino group, these can be employed in mixing.

As the (meth)acrylate having hydroxyl group, for example, there are enumerated hydroxyalkyl(meth)acrylates having a carbon number of 2–8 such as hydroxyethyl(meth) acrylate, hydroxypropyl(meth)acrylate, hydroxybutylacrylate, 2,3-dihydroxypropylacrylate, 2-hydroxy-3-ethoxyethylacrylate, 2-hydroxy-3-ethoxyethylacrylate, etc., an equimolar adduct of acrylic acid or methacrylic acid with a glycol (a carbon number of 2–20), etc., and a caprolactone-modified(meth)acrylate such as Placcel FM-1, FM-2, FM-3, FM-4, FM-5, FA-1, FA-2, FA-3, FA-4, and FA-5 (manufactured by Daicel Chemical Industries, Ltd., a trade name).

These may be also employed as a mixture of two or more kinds.

As the (meth)acrylate having amino group, there are enumerated aminoalkyl(meth)acrylates such as dimethylaminoethyl (meth)acrylate and diethylaminoethyl(meth) acrylate; and a (meth)acryl amide, etc., those can be employed solely or in mixing of two or more kinds.

The above-described other vinyl monomers can be also employed in mixing, and can be selected according to a desired physical property.

The acrylic polyol resin (V-A) to be employed in the present invention is prepared by radically-polymerizing under the presence of a radical polymerization initiator by publicly-known solution polymerization methods.

As the radical polymerization initiator, there can be employed a peroxide initiator such as benzoyl peroxide, t-butylhydroperoxide, cumylhydroperoxide, cumenhydroperoxide, t-butyl peroxybenzoate, and t-butylperoxy-2-ethylhexanoate, and an azo-based initiator such as azobisisobutyronitrile and azobisdimethylvaleronitrile.

As solvents to be employed in the solution polymerization, for example, there are enumerated aromatic hydrocarbons such as benzene, toluene, and xylene; ester-based ones such as ethyl acetate, propyl acetate, butyl acetate, and cellosolve acetate; ether-based ones such as dioxane, and ethylene glycol dibutylether; ketones such as acetone, methylethylketone, and methyl isobutyl ketone. The solvents may be employed solely or in combination of two or more kinds.

As a reaction vessel to be employed for the above-described polymerization, there is preferably employed a reaction vessel equipped with an agitation and a reflux condenser equipped with a drying tube, and a twin-screw extruder.

Polymerization temperature and polymerization time of period depend upon respective kinds and feeding ratio of the hydroxyalkyl(meth)acrylate composition modified by a small amount of lactones of the present invention, the above-described vinyl-based monomer having carboxylic group, the above-described other vinyl-based monomer, a kind and an amount of the catalysts, reaction apparatuses, and those are not particularly limited, and those are appropriately decided by the use of a desired curable oligomers or (co)polymerized acrylic resins, and physical properties of a coating layer in the case of a coating. Such the polymerization reaction is conducted at a temperature of 60–150° C. or so using the usual radical polymerization initiator in the organic solvents.

In the acrylic polyol resin (VI-A) to be employed in the present invention, since there can be readily designed a molecular weight, composition, and a structure, and it is excellent in weatherability, it can provide novel crosslinked particles which can be applied in wide uses which require corrosion resistance.

In the resin having hydroxyl group to be employed in the present invention, content of hydroxyl group is preferably not less than 10 as a hydroxyl value and, in the case that the hydroxyl value is less than 10, vinyl groups are not sufficiently introduced, and it becomes difficult to copolymerize with a variety of polymerizable monomers including the polymerizable monomers having carboxylic group, resulting in that a water dispersion property often lowers.

Further, there becomes insufficient a reaction with the polyisocyanate compound (V-B) (a hydrophobic csosslinking agent) and, as a result, a sufficient corrosion resistance cannot be obtained by a decline of crosslinking degree.

On the other hand, although the copolymer which becomes a hydrophobic portion may even contain acidic components, in the case, an acid value is desirably not more than 10. In the case containing more than 10 of such the acidic components, a hydrophilic property is unavoidably elevated and a core-shell structure is destroyed, resulting in that stability lowers after introduction of a hydrophobic crosslinking agent.

Further, in the acrylic polyol resin (VI-A) to be employed in the present invention, a number average molecular weight appropriately ranges in 3,000–100,000. It preferably ranges in 3,000–50,000. In the case that the number average molecular weight is less than 3,000, since it becomes impossible to stably introduce the polyisocyanate compound (V-B) (a hydrophobic crosslinking agent) into the particles and, further, since there are not occasionally obtained physical properties in a coating layer such as sufficient water resistance and outer appearance of a coating layer, it is not preferred.

On the other hand, in the case that the number average molecular weight is more than 100,000, gelation is unavoidably caused, otherwise, viscosity largely increases during emulsifying by a phase inversion, resulting in that it unpreferably becomes difficult to produce an excellent water-dispersion.

Further, it is also required that content of the vinyl-based monomers having carboxylic group which becomes a hydrophilic segment is at least 10 of an acid value as a minimum limit for self-emulsifying of a resin.

Herein, although carboxylic group is employed as the hydrophilic segment, since a sufficient hydrophilic property is not shown in the case of a state of a carboxylic acid, usually, it is preferred that the hydrophilic property is increased by a change to an amine salt.

Even in the case that the content of carboxylic group is of a large amount, if a carboxylic acid salt neutralized by an amine salt is of a small amount, a resin does not manifest a self-emulsifying property. That is, if a neutralization ratio by the amine salt is excessively high, even in the case that it becomes water-soluble, a water-dispersible resin becomes obtained by decreasing the neutralization ratio. However, even though 100% of carboxylic groups contained in view of composition are neutralized, it should be designed so that it does not become water-soluble.

Further, since the carboxylic group itself is high in polarity, in the case that the content exceeds 60% by weight, it is not preferred because of adversely affecting to corrosion resistance.

As content of the hydroxyalkyl(meth)acrylate composition modified by a small amount of lactones of the present invention, it requires not less than 10 as a hydroxyl value in the vinyl-based copolymer obtained in consideration of a reaction with the crosslinking agent.

However, in the case of a resin in which the content of the hydroxyakyl(meth)acrylate composition modified by a small amount of lactones of the present invention exceeds 300 as a hydroxyl value, such the content is not preferred because of adversely affecting to a corrosion resistance.

The acrylic polyol resin (VI-A) in relation to the present invention may be even a vinyl-based copolymer having carboxylic groups and crosslinkable functional groups which is obtained by allowing to react a resin having hydroxyl groups obtained by polymerization of the hydroxyakyl(meth)acrylate composition modified by a small amount of lactones with (meth)acrylic anhydride, and then allowing to react a reaction product obtained with the above-described vinyl-based monomer having carboxylic group and the above-described other vinyl-based monomers.

Further, the acrylic polyol resin (VI-A) in relation to the present invention may be even a resin having hydroxyl groups obtained by using the above-described resin having hydroxyl groups and at least one of resins selected from the group consisting of the above-described resin having hydroxyl groups, urethane resin having hydroxyl groups, epoxy resin having hydroxyl groups, cellulose derivative having hydroxyl groups, and polyester resin having hydroxyl groups.

In the case, as the resin having hydroxyl groups, there should be employed a hydrophobic resin not having a self-water dispersible property. Vinyl group can be readily introduced by allowing to react such the hydrophobic resin not having a self-water dispersible property with a specified acid anhydride such as (meth)acrylic anhydride.

The kind of copolymers form core-shell structure type particles in which a hydrophobic portion and hydrophilic portion are differently separated from each other. For that reason, there can be formed crosslinked particles which are particularly excellent in a dispersion stability after introduction of the polyisocyanate compound (V-B) (a hydrophobic crosslinking agent).

Further, such the copolymers cannot be modified to a water-soluble resin because of forming a core-shell structure after emulsifying by a phase inversion in spite of a high neutralization ratio in carboxylic groups. In other words, it may safety be said that it is a resin which is excellent in capability of accepting a hydrophobic substance such as the hydrophobic crosslinking agent.

Still further, such the resin having hydroxyl groups can be also employed together with a condensation-based resin without being limited to a radical polymerization-based resin.

It has a merit of capability of selecting an appropriate resin according to various grade of corrosion resistance to be desired or various uses and capability of employing together. In addition, it may safety be said that there has been certainly conventionally nothing in a method for readily preparing the crosslinked particles using a variety of the condensation-based resins.

By using the crosslinked particles having such a novel structure, for the first time, there can become provided a novel and useful coating which is excellent in corrosion resistance Incidentally, glycidyl groups can be also allowed to copolymerize with the resin having hydroxyl group. Such the glycidyl groups are contained in the core portion of a particle after emulsifying by a phase inversion and, whereby, the groups are isolated from carboxylic groups contained in adjacent particles and, as described above, in the case that glycidyl groups are allowed to copolymerize with the vinyl-based resin having hydroxyl group, there can be obtained exceedingly good crosslinked particles which are excellent in a dispersion stability (in more detail, gelation is not caused after a time lapse).

Glycidyl groups act in order to elevate a crosslinking degree by partially reacting with the carboxylic groups contained in the polyisocyanate compound (V-B) (a hydrophobic crosslinking agent) or in a copolymer which forms the core portion after formation of particles.

Further, the glycidyl groups remained in the core portion act also as functional group for self-crosslinking in the crosslinked particles themselves during baking.

In a water-based coating, a high molecular weight type epoxy resin can be simultaneously employed and, if such a method is applied, there can be also employed a low molecular weight epoxy resin such as "Epikote 1001" [a product by Dainippon Ink Kagaku Kogyo, Ltd.], provided that it is desirably employed in a field in which weatherability is not required.

As the aromatic epoxy resins to be employed, for example, there are enumerated a bisphenol A type epoxy resin, a bisphenol F type epoxy resin, and a novolak type epoxy resin, etc.

Of the epoxy resins, there is desired an epoxy resin having an epoxy equivalent of not less than 400, and there is also preferably employed an epoxy resin having an epoxy equivalent of not less than 4,000.

As an epoxy resin having an epoxy equivalent of 400–4,000, for example, there are enumerated "Epikote 1001, 1004, 1007 or 1009" manufactured by Shell, A.G. in Netherlands, or "Epichlone 4055, 7055, and 9055" manufactured by Dainippon Ink Kagaku Kogyo, Ltd., etc.

Further, as an epoxy resin having an epoxy equivalent of not less than 4,000, for example, there are enumerated "Epikote 1010 or 1100L" manufactured by Shell, A.G., or "PKHA", "PKHC", "PKHH", or "PKHJ" which are a phenoxy resin manufactured by Union Carbide, Co. in USA.

Still further, as the epoxy resin, in addition to the above-described ones, there can be also employed a variety of modified epoxy resins such as a fatty acid-modified epoxy resin, a phenol-based compound-modified epoxy resin, or an alcohol-based compound-modified epoxy resin.

As the fatty acids to be employed for modifying, there are enumerated a variety of vegetable oil fatty acids such as a soybean oil fatty acid or a castor oil fatty acid; a variety of organic acids such as benzoic acid or acetic acid and, as the phenol-based compound, there are enumerated bisphenol A, phenol, and cresol, etc. and, further, as the alcohol-based compound, there are enumerated methanol, butanol, or benzyl alcohol, etc. By heating these modifiers with aromatic-based epoxy resin at 100–170° C. or so under the absence or the presence of appropriate reaction catalysts such as a tertiary amine or a quaternary amine, the above-described epoxy resins are obtained.

It is needless to say that there can be employed solely the respective groups of epoxy resins or a plurality of epoxy resins in the respective groups, or there can be (simultaneously) employed a plurality of epoxy resins between the respective groups.

Further, cellulose derivatives having hydroxyl groups can be also simultaneously employed. Such the cellulose derivatives are a resin system which is excellent in, particularly, oil resistance and solvent resistance, and there are obtained crosslinked particles which are different in characteristics from the above-described vinyl-based resin having hydroxyl group in such a viewpoint.

However, in the case that the cellulose derivatives are employed in a water-based coating, since hydrolysis resistance and thermally-yellowing resistance are low and uses are occasionally limited, it must be paid attention to.

As the cellulose derivatives having hydroxyl groups, there is typically enumerated, for example, an ester-modified cellulose derivatives having hydroxyl groups or an ether-modified cellulose derivatives having hydroxyl groups, which is usually for a coating.

First, if there are typically exemplified only the ester-modified cellulose derivatives having hydroxyl groups, there are enumerated a nitrocellulose, a cellulose acetate-butylate, a cellulose acetate-propionate, a cellulose acetate-phthalate, an acetyl cellulose, a cellulose propionate, a cellulose butylate, a cellulose phosphate, and a cellulose sulphate, etc.

Further, if there are typically exemplified only the ether-modified cellulose derivatives having hydroxyl groups, there are enumerated a methyl cellulose, an ethyl cellulose, a butyl cellulose, a benzyl cellulose, a carboxymethyl cellulose, a carboxyethyl cellulose, an aminoethyl cellulose, an oxyethyl cellulose, a hydroxyethyl cellulose, a hydroxypropyl cellulose, and a hydroxypropyl methyl cellulose, etc.

Of the cellulose derivatives having hydroxyl groups, there is particularly desired the use of the cellulose acetate-butylate (hereinafter, it is referred to as CAB) obtained by further butyl-esterifying a partially acetylated cellulose.

In the cellulose derivatives having hydroxyl groups to be employed in the present invention, a number average molecular weight preferably ranges in 3,000–300,000, and more preferably in 5,000–150,000.

Further, in the cellulose derivatives having hydroxyl groups, content of hydroxyl groups is desirably not less than 0.4% by weight. In the case that the content of hydroxyl groups is less than 0.4% by weight, a grafting ratio lowers because (meth)acryloyl groups becomes unavoidably slight which are introduced into the cellulose derivatives having hydroxyl groups, unpreferably resulting in that the modified polymer having carboxylic groups is not apt to be self-emulsified.

If there are typically exemplified only the cellulose derivatives having hydroxyl groups as commercially supplied products, there are enumerated "CAB" series, "CAP" series, and "CA" series which are manufactured by Eastman Kodak, Ltd. in USA.

Further, a urethane resin having hydroxyl groups can be also simultaneously employed. By the use of the urethane resin, there can be obtained characteristics such as elasticity and flexibility derived from the urethane resin, and there can become obtained a coating layer having a corrosion resistance which is tough in impact.

Such the polyurethane resin having hydroxyl groups is obtained by allowing to polymerize an aliphatic and/or cycloaliphatic diisocyanate with an alkyl diol, a polyether diol, a polyester diol, or a mixture thereof and, optionally, a low molecular weight polyhydroxy compound under the presence or absence of an organic solvent not containing an active hydrogen atom (an active hydrogen group) in the molecule in a proportion of OH/NCO equivalent ratio ranging in 1.1–1.9 by a one-shot method or a multi-stage method.

Herein, in the case that the OH/NCO equivalent ratio is less than 1.1, hydroxyl value becomes unavoidably small, resulting in that introduction of vinyl group is apt to become insufficient and, as a result therefrom, copolymerization with a monomer having carboxylic group described later is apt to become insufficient and, as a result, a water dispersion property often lowers.

On the other hand, in the case of exceeding 1.9, products having low molecular weight are unavoidably produced, and there become unpreferably observed various characteristics such as physical properties in a coating layer.

As the above-described aliphatic and cycloaliphatic diisocyanate to be employed for the preparation of such the polyurethane resin having hydroxyl groups, particularly, there are typically enumerated aliphatic diisocyanates having a carbon number of 2–12 such as hexamethylene diisocyanate, 2,2,4-trimethylhexane diisocyanate, or ridinediisocyanate, and particularly, there are typically enumerated cycloaliphatic diisocyanates having a carbon number of 4–18 such as 1,4-cyclohexane diisocyanate, 1-isocyanate-3-isocyanatemethyl-3,5,5-trimethylcyclohexane (isophorone diisocyanate), 4,4'-dicyclohexylmethane diisocyanate, methylcyclohexylene diisocyanate, and isopropylidene dicyclohexyl-4,4'-diisocyanate.

Further, there can be enumerated a modified product (carbodiimide, urethodion or urethoimine-contained modified product) of the various diisocyanates, or a mixture of two or more kinds.

Of those, as a preferred one, there are enumerated the cycloaliphatic diisocyanates, particularly, 1,4-cyclohexane diisocyanate, 1-isocyanate-3-isocyanatemethyl-3,5,5-trimethylcyclohexane or 4,4'-dicyclohexylmethane diisocyanate.

Herein, in the case that an aromatic diisocyanate is employed, a coating layer is apt to yellow in curing for baking and, since the coating layer is apt to discolor by an influence of an ultraviolet ray, there must be paid attention according to uses.

As the polyetherdiol, there are particularly exemplified typical examples alone, and there are enumerated a variety of alkylene oxides such as ethyleneoxide, propylene oxide, or butylene oxide; a compound obtained by polymerization or copolymerization of a variety of heterocyclic ethers such as tetrahydrofuran; or a polyethylene glycol, a polypropylene glycol, a polyethylene-polypropylene glycol, a polytetramethylene etherglycol, and a polyhexamethylene etherglycol, etc.

As the polyesterdiol, there are particularly exemplified typical examples alone, and there are enumerated compounds such as a polyethylene adipate, a polybutylene adipate, a polyhexamethylene adipate, a polyneopentyl adipate, a poly-3-methylpentyl adipate, a polyethylene/polybutylene adipate, a polyneopentyl/hexyl adipate which are obtained by polycondensation of dicarboxylic acids typified by adipic acid, succinic acid, sebasic acid, maleic acid, fumaric acid, and phthalic acid with glycols typified by ethylene glycol, propylene glycol, 1,4-butane diol, 1,6-hexane diol, 3-methyl-1,5-pentane diol, neopentyl glycol, bishydroxymethyl cyclohexane; or polylactone diols typified by a polycaprolactone diol, a poly-3-methyl-valerolactone diol; polycaprbonate diols; or a mixture of two or more kinds thereof, etc.

As the alkyldiol, there are particularly exemplified typical examples alone, and there are enumerated fatty acid esters of glycerine.

Further, as polyhydroxy compounds having a low molecular weight, there are particularly exemplified typical examples alone, and there are enumerated glycols having a number average molecular weight of less than 500 which are enumerated as raw materials for the polyester diols or adducts (a molecular weight of less than 500) in which a small amount of an alkylene oxide is added to the glycols; a variety of trivalent alcohols such as glycerine or trimethylol propane, or adducts (a molecular weight of less than 500) in which a small amount of an alkylene oxide is added to the trivalent alcohols; and a mixture of two or more kinds thereof, etc.

Amount of the polyhydroxy compounds having a low molecular weight appropriately ranges in usually 0.1–20% by weight, and preferably 0.5–10% by weight with respect to the above-described polyether diols or polyester diols.

Further, as polyether diols and/or polyester diols to be employed for the preparation of the above-described urethane resins, there are employed ones having a number average molecular weight of 500–5,000, and preferably 1,000–3,000.

In the case that the number average molecular weight is less than 500, the urethane resins unavoidably becomes rigid, resulting in that desired properties are not obtained in a coating layer and, on the other hand, in the case of excessively exceeding 5,000, a molecular weight in the urethane resins obtained also becomes high and, as a result, a hydroxyl value lowers, resulting in that a modification by a vinyl becomes insufficient.

Further, as described later, it is needless to say that carboxylic groups may be introduced for the purpose of elevating compatibility with a copolymer from a variety of polymerizable monomers including a variety of carboxylic group-contained polymerizable monomers, and adhesion to a body to be covered (a body to be coated). Specifically, for example, it is introduced by allowing to react a variety of dimethylol alkane acids such as dimethylol propionic acid.

However, the introduction of hydrophilic groups such as carboxylic groups elevates a hydrophilicity in the urethane resins and, as a result therefrom, since water resistance is lowered in a coating layer, addition amount is preferably limited to not more than 5% by weight.

Likewise, although the polyester-based resin can be also employed together as a resin having hydroxyl groups, a small molecular weight causes a problem of hydrolysis resistance in the case of a water-based coating. On the other hand, since a large molecular weight occasionally causes an insufficient modification and an amount of crosslinkable functional groups becomes insufficient, crosslinking density cannot be elevated. For that reason, there is observed a tendency of poor solvent resistance.

As described hereinabove, a variety of resins having hydroxyl groups are allowed to react with (meth)acrylic anhydride in an inert organic solvent under the absence of catalysts and, moreover, at a relatively low temperature of 60–80° C. for 1–6 hours or so while agitating to introduce vinyl groups in to the resins.

A reaction (esterification) in the case is conducted by monitoring with, for example, a Fourier transformation ultraviolet ray photometer (FI-IR) until an absorption by a specified acid anhydride such as (meth)acrylic anhydride is not observed or maintained at a low constant value, whereby, completion of the reaction can be confirmed through such means or methods. It is to be noted that a confirmation means is not limited thereto alone.

In the present invention, as the inert organic solvent to be employed in synthesis of the resin having hydroxyl groups and the reaction with an anhydride, there are particularly exemplified typical examples alone, and there are enumerated a variety of ketones such as acetone, methylethyl ketone, methylisobutyl ketone, ethylpropyl ketone, and ethylbutyl ketone; esters; or aromatic hydrocarbons, etc., and those are preferably employed.

The (meth)acrylic anhydrides are allowed to react in a proportion of an amount to be modified by the (meth)acrylic anhydrides of 0.5–30% with respect to hydroxyl group equivalent contained in 100 g of the resin having hydroxyl groups. In the case that the amount to be modified is less than 0.5%, vinyl groups are not sufficiently introduced, resulting in that copolymerization with monomers, which is successively conducted, is not sufficiently conducted and a water dispersion property lowers.

On the other hand, in the case of exceeding 30%, those are highly-polymerized by successive copolymerization, and gelation is unpreferably apt to be caused.

By allowing to react the vinyl group-modified resin having hydroxyl groups obtained herein with a variety of vinyl-based monomers including a carboxylic group-contained vinyl-based monomer as an essential component, the acrylic polyol resin (VI-A) is obtained which is a desired product.

Incidentally, in the case of obtaining the acrylic polyol resin (VI-A), there can be also blended two or more kinds of the vinyl group-modified resin having hydroxyl groups.

For example, in the resin having hydroxyl groups, a crosslinking density can be also controlled by blending a copolymer having glycidyl groups with a copolymer not having glycidyl groups obtained by homopolymerizing or copolymerizing the hydroxyakyl(meth)acrylate composition modified by a small amount of lactones in relation to the present invention.

In the case, since a crosslinking agent and glycidyl groups form a crosslinked structure like an IPN (Interpenetrating polymer network), respectively, there is shown a more excellent corrosion resistance.

Further, by blending the resin having hydroxyl groups with the urethane resin having hydroxyl groups, there can be also conveniently achieved flexibility in a urethane resin and preparation of a vinyl-based polymer.

In the case, even in different kind of resins themselves, since those are partially connected by chemical bonds through simultaneously copolymerizing those, compatibility becomes excellent, and clouding, etc. in a coating layer is not apt to be caused.

As polymerizable monomers to be (co)polymerized with the vinyl group-modified resins having hydroxyl groups, there are basically employed monomers containing at least 10% by weight of the vinyl-based monomer having carboxylic group in total polymerizable monomers. In the case that use amount of the vinyl-based monomer having carboxylic group is less than 10% by weight, there is unpreferably observed a tendency that dispersion stability of a resin becomes unavoidably worse in a water-based medium.

For example, as the vinyl-based monomer having carboxylic group and other vinyl-based monomers, the above-mentioned ones are enumerated. Incidentally, as a reaction ratio of the vinyl group-modified resins having hydroxyl groups with respect to a variety of the vinyl-based monomers having carboxylic group, ratio of the former resins: latter monomers appropriately ranges in 20:80–90:10 by weight ratio.

In the case that the use ratio of the vinyl-modified resins having hydroxyl groups is less than 20% by weight, since there is occasionally observed a case that a variety of properties in a resin are not unavoidably made the most, it is not preferred and, on the other hand, in the case that the use ratio of the resins is more than 90% by weight, the number of carboxylic groups becomes small, and a self-dispersion property becomes insufficient in a resin obtained, unpreferably resulting in that dispersing becomes often impossible in a water-based medium.

There is conducted a polymerization reaction of a variety of the vinyl-based monomers including the carboxylic group-contained vinyl-based monomer with the vinyl-modified resins having hydroxyl groups using a variety of radical polymerization initiators such as azobisisobutyronitrile or benzoyl peroxide which are publicly-known at a temperature of 60–150° C. or so in an inert organic solvent.

As the organic solvent in the case of conducting the reaction, there are particularly exemplified typical examples alone, there are enumerated a variety of ketones such as acetone, methylethyl ketone, and diisobutyl ketone; or aromatic hydrocarbons such as toluene or xylene. Further, there can be also preferably employed a variety of ester-based solvents such as ethyl acetate or butyl acetate.

In a method for the preparation of crosslinked particles in the present invention, a variety of the acrylic polyols (VI-A) (a self-dispersible crosslinking agent) as described hereinabove are mixed with the poyisocyanate compound (VI-B) (a hydrophobic crosslinking agent), and then, emulsified by phase inversion into a water-based medium to involve the hydrophobic crosslinking agent in the particles, followed by accelerating crosslinking in the particles, whereby, desired crosslinked particles can be obtained.

As the poyisocyanate compound (VI-B) to be employed in the present invention, there are aromatic, aliphatic, and cycloaliphatic polyisocyanates and, as the aromatic polyisocyanates, there are preferred polyisocyanates having a carbon number of 6–30, as the aliphatic polyisocyanates, there are preferred polyisocyanates having a carbon number of 4–30, and as the cycloaliphatic polyisocyanates, there are preferred polyisocyanates having a carbon number of 8–30. For example, there are enumerated 2,4-naphthalene diisocyanate, 1,5-naphthalene diisocyanate, 4,4'-diphenylmethane diisocyanate, 4,4'-diphenyldimethylmethane diisocyanate, dialkyldiphenylmethane diisocyanate, tetraalkyldiphenylmethane diisocyanate, 4,4'-diphenylene diisocyanate, 4,4'-dibenzyl diisocyanate, 1,3-phenylene diisocyanate, 1,4-phenylene diisocyanate, tolylene diisocyanate such as 2,4-tolylene diisocyanate and, 2,6-tolylene diisocyanate, xylilene diisocyanate such as p-xylilene diisocyanate and m-xylilene diisocyanate, 1,4-tetramethylene diisocyanate, 1,5-pentamethylene diisocyanate, 1,6-hexamethylene diisocyanate, 2,2,4-trimethylhexamethylene-1,6-diisocyanate, 2,4,4-trimethylhexamethylene-1,6-diisocyanate, ridine diisocyanate, cyclohexane-1,4-diisocyanate, isophorone diisocyanate, 4,4'-diisocyanate dicyclohexane, dicyclohexylmethane-4,4'-diisocyanate, methylcyclohexane diisocyanate such as 1,3-bis (isocyanatemethyl)cyclohexane and methylcyclohexane-2,4 (or 2,6)-diisocyanate, or an adduct of these diisocyanates to a polyvalent alcohol such as ethylene glycol, propylene glycol, a polyethylene glycol, a polypropylene glycol, a polycaprolactone polyol, trimethylol ethane, and trimethylol propane, a polyester resin (including an oil-modified type) having a functional group which reacts with isocyanate group, an acrylic resin, etc., and water, etc., a buret compound, a polymer allowed to react between isocyanates, or an equimolar adduct of 2-hydroxypropyl (meth)acrylate-hexamethylene diisocyanate, a copolymer essentially containing a vinyl-based monomer which has an isocyanurate group such as isocyanatemethyl (meth)acrylate and a copolymerizable unsaturated group, or compounds described in JP-A-61072013 Official Gazette, and a blocked compound blocked by a blocking agent such as a lower monovalent alcohol, phenols, methylethylketoxime, and a lactam, etc.

The diisocyanates may be employed solely or even in combination of tow or more kinds.

From a viewpoint of a color tone in a coating layer obtained using the curable resin composition of the present invention, as a polyisocyanate compound, non-yellowing type polyisocyanates are preferred, and the following ones are disclosed as an example.

There are enumerated aliphatic-based polyisocyanates such as 1,4-tetramethylene diisocyanate, 1,5-pentamethylene diisocyanate, 1,6-hexamethylene diisocyanate, 2,2,4-trimethyl-1,6-hexamethylenediisocyanate, and ridine diisocyanate; cycloaliphatic-based polyisocyanates such as isophorone diisocyanate, methyl cyclohexane-2,4-(or 2,6) diisocyanate, dicyclohexyl methane-4,4'-diisocyanate, and 1,3-bis (isocyanatemethyl) cyclohexane, and the above-described derivatives (including an adduct) therefrom. Of those, there are preferably enumerated 1,6-hexamethylene diisocyanate (hereinafter, abbreviated as HMDI), isophorone diisocyanate (hereinafter, abbreviated as IPDI), and a derivative (including an adduct) therefrom in view of weatherability and an ease of industrially-obtaining.

Since the polyisocyanate compounds reacts with polyols in a base material even at room temperatures, those include a problem that those are poor in storage stability, and handling is troublesome and, those are unpreferred in view of safeness and hygiene. Accordingly, blocked type polyisocyanates are preferred as the polyisocyanate compounds.

Although the blocked type polyisocyanates (hereinafter, occasionally referred to as a highly-branched block polyisocyanate) are obtained even only by allowing to react the polyisocyanates with a polyvalent alcohol, more preferably, those can be obtained by cyclic trimerization of an isocyanate, that is, isocyanuration after allowing to react a diisocyanates with the polyvalent alcohol.

As the polyvalent alcohol in the case, there is preferred an alcohol having three or more functionalities and, as a polyvalent alcohol having a low molecular weight, for example, there are trimethylol propane, glycerine, 1,1,7-trimethylol heptane, 1,2,7-trimethylol heptane, and pentaerythritol, etc. As a polyvalent alcohol having a higher molecular weight, for example, there are enumerated aliphatic hydrocarbon polyols, polyether polyols, polyester polyols, and epoxy resins haing a plurality of hydroxyl groups at terminals, etc.

As the aliphatic hydrocarbon polyols, for example, there are enumerated a polybutadiene having hydroxyl group at terminals and a hydrogenate product therefrom, etc. Further, as the polyether polyols, for example, there are enumerated so-called polymer polyols, etc. that is, polyether polyols or polytetramethyleneglycols obtained by adding alkylene oxides such as ethylene oxide or propylene oxide alone or in a mixture, and components obtained by obtained by polymerizing acrylic amides in media which are polyethers obtained by reacting alkylene oxides with polyfunctional compounds such as ethylenediamine or ethanolamines.

As the polyester polyols, there are enumerated polyester polyol resins obtained by condensation reaction of at least one of a polybasic acid with at least one of polyvalent alcohols and polycaprolactones obtained by ring-opening polymerization of ε-caprolactone using the polyvalent alcohols.

As the polybasic acid, for example, there are enumerated phthalic acid (anhydride), terephthalic acid, isophthalic acid, tetrahydrophthalic acid (anhydride), hexahydrophthalic acid (anhydride), 4-methylhexahydrophthalic acid (anhydride), 3-methylhexahydrophthalic acid (anhydride), 3-methyltetrahydrophthalic acid (anhydride), trimerritic acid (anhydride), pyromerritic acid (anhydride), het acid (anhydride), hymic acid (anhydride), adipic acid, sebasic acid, azelaic acid, succinic acid (anhydride), maleic anhydride, fumaric acid, itaconic acid, and a dimer acid, etc. The acid may be employed even in the form of an ester of a lower alcohol such as dimethylisophthalate and dimethylterephthalate.

The polyvalent alcohols are a compound having at least two alcoholic or phenolic hydroxyl groups in a molecule, for example, there are specifically enumerated ethylene glycol, diethylene glycol, triethyleneglycol, polyethylene glycol, 1,6-hexanediol, pentanediol, cyclohexane dimethanol, propylene glycol, butylene glycol, butylene diglycol, trimethylol ethane, trimethylol propane, glycerine, neopentyl glycol, sorbitol, tris(2-hydroxyethyl)isocyanurate, diethanol amine, diisopropanol amine, bisphenol A, and bisphenol F, etc.

As the epoxy resins, for example, there are enumerated a novolak type, β-methylepichlorohydrin type, a cyclic oxirane type, a glycidylether type, a glycolether type, an epoxy type of an aliphatic unsaturated compound, an epoxidized fatty acid ester type, a polycarboxylic acid ester type, an aminoglycidyl type, a halogenated type, and resorcinol type, etc.

Of the polyols, there are preferably employed the above-described polyvalent alcohol having a low molecular weight and a polyether polyol having 3–8 pieces of hydroxyl groups in a molecule, the aliphatic hydrocarbon polyols, and polyester polyols and, particularly preferably, the polyester polyols. These may be employed solely or in combination of two or more kinds. Aliphatic or cycloaliphatic diisocyanate and the polyvalent alcohols are allowed to react at 50–200° C., and preferably 50–150° C. In the case, solvents may be employed, and there are preferably employed solvents which are inactive to an isocyanate. As such the inactive organic solvents, for example, there are employed at least one kind of aliphatic hydrocarbons such as hexane, heptane, and octane, aromatic hydrocarbons such as benzene, toluene, and xylene, esters, and ketones. Since the solvents occasionally contain moisture, it is preferred to optionally remove the moisture. Although the reaction can be conducted even after an isocyanuration reaction, it is preferably conducted prior to the isocyanuration reaction.

In the isocyanuration reaction, catalysts are usually employed. The catalysts to be employed herein are preferably basic, for example, there are employed a quaternary ammonium salts and a weak organic acid salt thereof, an alkyl metal salt of an alkyl carboxylic acid, an metal alcholate, and a compound having an aminosilyl group, etc. Concentration of the catalysts is usually selected from a range of 210 ppm to 1.0% based on isocyanate compounds.

In the reaction, solvents may be employed or even not employed. In the case that the solvents are employed, there should be employed solvents which are inert to an isocyanate group.

Reaction temperature is usually 20–160° C., and preferably 40–130° C. Termination point of the reaction depends upon the kind of the polyvalent alcohols to be employed, and it is a period at which yield attains to approximately 30%. When the reaction attains to a target yield, for example, the reaction is terminated by deactivation of the catalysts by, for example, sulphonic acid, phosphoric acid, and phosphates, etc.

In a highly-branched polyisocyanate having an isocyanurate structure after removal of unreacted diisocyanates and solvents, viscosity at 25° C. is preferably 0.5–300 Pas. In the case that the viscosity exceeds 300 Pas, outer appearance in a coating layer is adversely affected occasionally and, in the case of being less than 0.5 Pas, it is difficult to obtain a range of an average functional group number of the polyisocyanate regulated in the present invention.

As a blocking agent for obtaining the highly-branched block polyisocyanate, for example, there are enumerated phenol-based ones such as phenol, cresol, xylenol, ethylphenol, o-isopropylphenol, butylphenol such as p-tert-butylphenol, p-tert-octylphenol, nonylphenol, dinonylphenol, styrenized phenol, oxybenzoic acid phenol, thymol, p-naphthol, p-nitrophenol, p-chlorophenol; alcohol-based ones such as methanol, ethanol, propanol, butanol, ethyleneglycol, methylcellosolve, butylcellosolve, methylcarbitol, benzyl alcohol, phenylcellosolve, fulfurylalcohol, and cyclohexanol; active methylene-based ones such as dimethyl maloate, diethyl maloate, methylacetoacetate, ethylacetoacetate, and acetyl acetone; mercaptan-based ones such as butyl mercaptan, thiophenol, and tert-dodecyl mercaptan; amine-based ones such as diphenyl amine, phenylnaphtyl amine, aniline, and carbazole; acid amide-based ones such as acetanilide, acetoanisidide, amide acetate, and benzamide; lactam-based ones such as ε-caprolactam, δ-valerolactam, γ-butyrolactam, and β-propiolactam; acid imide-based ones such as succinic acid imide and maleic acid imide; imidazole based ones such as imidazole, 2-methylimidazole, and 2-ethylimidazole; urea-based ones such as urea, thiourea, an ethylene urea; carbamide acid salt-based ones such as N-phenylcarbamic acid phenyl and 2-oxazolidone; imine-based ones such as ethyleneimine and a polyethylene imine; oxime-based ones such as formaldoxime, acetoaldoxime, acetoxime, methylethylketoxime, methylisobutylketoxime, and cyclohexanoeoxime; bisulphite-based ones such as sodium bisulphite and potassium bisulphite, etc., and these may be even as a mixture.

Of those, there are preferred the phenol-based ones, lactam-based ones, alcohol-based ones, and oxime-based ones and, there are particularly preferred nonylphenol, styrenized phenol, oxybenzoic acid ester, acetoxime, methylethylketoxime, and ε-caprolactam.

In the case that a low temperature (not more than 140° C.) baking is demanded, particularly, an oxime-based blocking agent is most preferred.

By allowing to react the blocking agent with the highly-branched polyisocyanate, the highly-branched blocked polyisocyanate can be obtained. Reaction of the isocyanate with the blocking agent can be conducted regardless of the presence or absence of solvents. In the case that the solvents are employed, there should be employed solvents which are inert to an isocyanate group.

In the reaction for blocking, there may be even employed catalysts such as organic salts of metals such as tin, zinc, lead, and a tertiary amine, etc. The reaction can be conducted at −20 to 150° C. and, preferably, 0 to 100° C. In the case of exceeding 100° C., side reactions are possibly caused and, on the other hand, in the case of too low temperatures, reaction rate becomes slow, and it is disadvantageous.

The block polyisocyanate to be employed in the present invention has the number of average functional group of 4.5–10, preferably, 5–8 per 1 molecule of the block polyisocyanate.

The number of average functional group in the block polyisocyanate is a number of an isocyanate functional group to be statistically possessed in 1 molecule of the block polyisocyanate, and it is calculated by the above-described equation (1) from a number average molecular weight of the polyisocyanate before the blocking reaction and an isocyanate concentration (%).

As the above-described polyisocyanate compound to be employed as the hydrophobic crosslinked particles, there are typically enumerated a variety of toluene diisocyanate (TDI)-based polyisocyanates typified by a trimethylolpropane (TMP) adduct-prepolymer; a variety of hexamethylene diisocyanate(HMDI)-based polyisocyanates typified by a TMP adduct-prepolymer; (HMDI)-based polyisocyanates which are buret type HMDI-based polyisocyanates or an isocyanurate-prepolymer; isophorone diisocyanate(IPDI)-based prepolymers which are an isocyanurate-prepolymer; a variety of xylilene diisocyanate (XDI)-based polyisocyanates typified by a TMP adduct-prepolymer; or 4,4'-diphenylmethane (MDI)-based diisocyanates, etc.

In the above-described hydrophobic crosslinked particles, an epoxy resin can be simultaneously employed. Particularly, typical resins alone are exemplified, and there are enumerated "Epikote 828 or 1001" which is a bisphenol A type one manufactured by Yuka Shell, Ltd.; an epoxidized polybutadiene manufactured by Adeka Argus, Ltd.; "DEN431, 438, XD-7818, XD-7855, or DER331" which is a phenol-novolak type epoxy resin manufactured by Dow Chemical, Ltd.; "ECN268, 273, 280, 285, or 299" which is a cresol-novolak type epoxy resin manufactured by Asahi Kasei Kogyo, Ltd.; or multifunctional glycidyl amines or multifunctional glycidyl ethers, etc.

Further, as such the epoxy resins, there can be also employed copolymers having glycidyl groups obtained by copolymerization of glycidyl(meth)acrylate.

In the present invention, since urethane bonds produced by using the polyisocyanate compound can exhibit more excellent properties such as, above all, chemical resistance and hydrolysis resistance compared to other ether bonds and ester bonds, a mode of the present invention is particularly desired.

The acrylic polyol resin (VI-A) and the polyisocyanate compound (VI-B) in relation to the present invention construct an essential component in the curable resin composition of the present invention, and it is employed as raw materials for a coating.

There is decided an equivalent ratio of isocyanate groups or a blocked isocyanate group in the polyisocyanate with respect to hydroxyl groups in the resin having hydroxyl groups according to physical properties in a coating layer to be required.

The acrylic polyol resin (VI-A) obtained by using the hydroxyakyl(meth)acrylate composition modified by a small amount of lactones and the polyisocyanate compound (VI-B) are preferably formulated in a ratio of OH/NCO=1/0.5-1/1.5 (equivalent ratio) from a viewpoint of characteristics in a coating layer. Above all, those are formulated in a range of OH/NCO=1/0.7-1/1.2 (equivalent ratio).

In the case that NCO is not more than 0.5 equivalent with respect to 1 equivalent of OH, there are not shown physical properties to be desired for a coating layer such as extensibility, weatherability, solvent resistance, and staining resistance and, in the case of not less than 1.5 equivalent, although the physical properties for a coating layer are obtained, it is not preferred from a viewpoint of readily bubbling under a high temperature, and a high price in a coating.

The curable resin composition of the present invention contains 20–90 parts by weight of the acrylic polyol resin (VI-A) obtained by using the hydroxyakyl(meth)acrylate composition modified by a small amount of lactones (a) and 5–50 parts by weight of the polyisocyanate compound (VI-B) as essential components, provided that total of the (VI-A) and (VI-B) does not exceed 100 parts by weight.

In the case that the acrylic polyol resin (VI-A) is less than 20 parts by weight, there lacks an amount of a hydrophilic portion taking charge of a water dispersibility, and there lowers a water dispersion stability and, in the case of exceeding 90 parts by weight, there become unpreferably worse workability and a water dispersibility. In the case that the polyisocyanate compound (VI-B) is less than 5 parts by weight, curability becomes insufficient and, on the other hand, in the case of exceeding 50 parts by weight, a cured coating layer becomes unpreferably too rigid or too brittle.

As use ratio of the acrylic polyol resin (VI-A) with respect to the polyisocyanate compounds (VI-C), the polyisocyanate compounds (VI-B) are 60–10% by weight with respect to the 40–90% by weight of the acrylic polyol resin (VI-A). In the case that the use ratio the acrylic polyol resin (VI-A) is less than 40% by weight, a self-condensation reaction increases in the polyisocyanate compounds themselves, and coating layer becomes brittle, resulting in becoming not appropriate as a coating for, for example, a molded article from a polyolefine-based resin. On the other hand, in the case that the use ratio of the acrylic polyol resin (VI-A) exceeds 90% by weight, crosslinking becomes insufficient, and there lower solvent resistance and weatherability. A preferred use ratio of the acrylic polyol resin (VI-A) is 60–80% by weight and, accordingly, a preferred use ratio of the polyisocyanate compounds (VI-B) is 20–40% by weight. In the case that the use ratio of the polyisocyanate compounds (VI-B) is less than 20% by weight, curability becomes insufficient and, an intermolecular crosslinking density lowers and, as a result, there is readily caused a situation that there are not sufficiently shown characteristics by using the crosslinked particles. On the other hand, in the case of exceeding 40% by weight, a cured coating layer becomes too rigid and, emulsifying through phase inversion often becomes difficult or quite impossible. Accordingly, it is not preferred in both cases.

The present invention basically intends to provide a method for the preparation of crosslinked particles comprising dispersing and crosslinking a mixture of the acrylic polyol resin (VI-A) having carboxylic groups and crosslinkable functional groups with the polyisocyanate compounds (VI-B) (a hydrophobic crosslinking agent) into a water-based medium, or a method for the preparation of urethane-urea/ethylenic resin composite type crosslinked particles obtained by polymerizing a polymerizable ethylenic unsaturated compound containing at least the hydroxyakyl (meth) acrylate composition modified by a small amount of lactones in water in which crosslinked urethane-urea particles are dispersed, and, in addition, intends to provide a coating which comprises containing thus-obtained various crosslinked particles as essential thin layer-formable resin components.

Herein, specified crosslinked particles to be employed in the present invention are obtained by dispersing and crosslinking a mixture of the acrylic polyol resin (VI-A) having carboxylic groups and crosslinkable functional groups with the polyisocyanate compounds (VI-B) (a hydrophobic crosslinking agent) into a water-based medium.

That is, the acrylic polyol resin (VI-A) to be employed for the preparation of the specified crosslinked particles is a so-called self water-dispersible resin which simultaneously contains carboxylic groups which are a hydrophilic segment and crosslinkable functional groups which can react with the polyisocyanate compounds (VI-B) (a hydrophobic crosslinking agent), and which means a resin which forms an O/W discontinuous phase by emulsifying through a phase inversion while adding water into an organic continuous phase (O).

In the case, it is a resin which is basically different from a water-soluble resin. Further, such the self water-dispersible resin is accompanied by a physical and chemical phenomenon of a phase inversion from organic phase to water phase, and it has an ability of forming O/W particles in a water-based medium. In the case, hydrophobic substances can be taken into particles.

The present invention intends to provide highly-crosslinked particles which have not been conventionally prepared by emulsifying the polyisocyanate compounds (VI-B) (a hydrophobic crosslinking agent) together with the self water-dispersible resin into a water-based medium through a phase inversion utilizing characteristics of such the self water-dispersible resin to take the polyisocyanate compounds (VI-B) into the particles, and then, by proceeding a crosslinking reaction.

Further, a coating which contains such the crosslinked particles as an essential component can provide a coating layer having a very excellent corrosion resistance.

If the acrylic polyol resin (VI-A) is a water-soluble resin, since particles are formed by the hydrophobic crosslinking agent which functions as a nucleus, stability becomes insufficient in the water-based medium, and it is apt to be readily gelled during proceeding the crosslinking reaction, or it tends to gel with a lapse of time.

The crosslinked particles obtained by a method for the preparation in the present invention are mixed with the acrylic polyol resin (VI-A) and the polyisocyanate compounds (VI-B) (a hydrophobic crosslinking agent), followed by dispersing into a water-based medium by adding a basic material.

As the basic material to be employed herein, volatile tertiary amines are preferably employed and, contrarily, inorganic basic compounds unpreferably remain in a coating layer, and show a tendency that water resistance becomes worse.

As the amines, there are exemplified particularly typical examples alone, and there are enumerated a variety of alkyl amines such as trimethylamine or triethylamine; a variety of alcohol amines such as dimethylaminoethanol, diethanolamine or aminomethylpropanol; and a variety of cyclic amines such as morpholine.

Subsequently, after dispersing into a water-based medium, solvents are optionally removed and, in the case that the polyisocyanate compounds are contained, heating is conducted at 50–60° C., for 1 hour or so, and, in the case that an epoxy resin is contained, heating is conducted at 80° C. or so for 1–2 hours or so to accelerate a crosslinking, and then, there can be obtained a water dispersion liquid containing crosslinked particles having a desired solid-content by removing water.

Further, in the present invention, there can be employed the following type ones as a urethane/acrylic resin composite type crosslinked particles. That is, the type ones are obtained by 1) first of all, a water dispersion containing crosslinked urethane particles are independently prepared, subsequently, 2) a low polymerizable vinyl-based monomer in relation to the present invention is added dropwise into the water dispersion under the presence of a radical polymerization initiator (it is a so-called seed polymerization method) to effect polymerization.

Herein, as a method for obtaining a water dispersion of crosslinked urethane particles, three methods are outlined. Since all methods are a publicly-known method to a skilled person in the art, outlines alone are illustrated. First of those is a method in which there is emulsified a polyisocyanate prepolymer having isocyanate groups at terminals in the molecule under the presence of an emulsifier and/or a water-soluble resin for a protecting colloid, and then, the isocyanate groups at terminals are crosslinked by adding a crosslinking agent such as polyamines to obtain desired crosslinked particles.

Second of those is a method in which any one of anionic, cationic, and nonionic hydrophilic groups is introduced as pendant groups into a molecule of the polyisocyanate-prepolymer having an isocyanate groups at terminals, whereby, the prepolymer itself is self-emulsified without using an auxiliary agent such as an emulsifier and, polyamines which are a crosslinking agent are likewise added to prepare crosslinked particles.

Third of those is a method in which the same prepolymer as in the second method is mixed with the hydrophobic polyisocyanate compounds, and then, emulsified by a phase inversion into a water-based medium, and a polyamine which is a crosslinking agent is added after introducing the hydrophobic polyisocyanate compounds into particles to prepare crosslinked particles.

Of those, in the second and third methods, although auxiliary agents may be even simultaneously employed, it is preferred to not simultaneously employ the auxiliary agents in consideration of succeeding steps.

For that reason, in the present invention, it is required that it is often desired to employ crosslinked urethane particles obtained by the second and third methods in which the auxiliary agents such as emulsifiers are not simultaneously employed.

In a polymerization step of a polymerizable vinyl-based monomer typified by the hydroxyakyl(meth)acrylate composition modified by a small amount of lactones in relation to the present invention by employing the crosslinked urethane particles dispersion as a seed, a characteristic part is to employ a crosslinked urethane water dispersion as a seed material and, needless to say, as a method for the polymerization of the vinyl-based monomer, conventional methods can be employed without any modification.

As the radical polymerization initiators, any one of water-soluble or oil-soluble ones can be employed and, above all, water-soluble radical initiators can be more readily employed, and those can also contribute to a dispersion stability in the water dispersion of a composite resin obtained, accordingly, those are more desired.

As weight ratio of solid components in the crosslinked urethane resin (GU) with respect to the polymerizable vinyl-based monomer (VM), although there can be applied a range of $0/100 < GU/VM < 100/0$, in the case that there are not employed auxiliary agents such as emulsifiers at all, it appropriately ranges in $20/80 < GU/VM < 100/0$ depending upon a gel density (a crosslinking density) and dispersion stability of a gel-urethane to be employed.

However, since a main purpose of modification for a composite is to allow to manifest all properties of both the above-described crosslinked urethane resin (GU) and a polymer derived from the polymerizable vinyl-based monomer (VM), in order to allow to manifest all the properties of both resins, it ranges in 10/90<GU/VM<90/10, and preferably in 25/75<GU/VM<75/25, and the range is particularly recommended.

The polymerizable vinyl-based monomers may be even added dropwise to a seed system maintained under conditions of reaction temperatures or, may be even added dropwise to a seed system maintained under conditions of reaction temperatures after having absorbed the polymerizable vinyl-based monomers in swelled seed particles under conditions of reaction temperatures.

Such the dropwise addition is mainly conducted for the purpose of controlling a reaction heat accompanied by polymerization, accordingly, a method for the dropwise addition is not particularly limited.

In thus-obtained composite type water dispersion of a crosslinked urethane resin/vinyl-based resin, in the case of employing a multifunctional vinyl-based monomer, networks derived from both resins are intertwined each other and the so-called IPN is formed and, as a result, there can be obtained a product having more excellent solvent resistance and chemical resistance, and a high tensile force.

Incidentally, in a method of the present invention, there can be formed a coating layer which is particularly excellent in corrosion resistance from a coating containing crosslinked particles having characteristics as described hereinabove as an essential thin layer-formable resin component, accordingly, the present inventor names the method as a gel particle layer-forming method.

That is, the present invention intends to provide a method for the formation of a coating layer having a corrosion resistance for a metal, namely, the gel particle layer-forming method in which there is employed a coating agent containing more than 50% by weight of the above-described crosslinked particles having a particle diameter of not more than 1 micron ($\mu$m) as an essential thin layer-formable resin component in the case of the formation of a coating thin layer having corrosion resistance for a metal or a decorative coating layer having corrosion resistance for a metal by coating a liquid coating agent (a liquid coating) onto a metal to be coated and drying and, by heating at a temperature of 100–350° C. or so for a fixed time of period.

After all, there was found that in the gel particle layer-forming method, crosslinked particles themselves are crosslinked each other according to a design level of the crosslinked particles, whereby, a continuous thin layer can be formed, or a continuous thin layer can be formed through a crosslinking between a particle and a particle by employing together a crosslinking agent and, further, the method does not cause any inconveniences and, as a result, any problems even though there is employed together a melamine resin-based curing agent having a problem in a conventional method for forming a layer as a crosslinking agent, and the present invention has been completed.

In other words, a following mechanism is guessed, that is, the crosslinked particles are formed by strong bonds against a variety of chemicals such as acids and alkalis and, in addition, a main component for a thin layer-formable resin is constructed by the crosslinked particles crosslinked in a level of not being apt to swell in solvents, whereby, even though crosslinked bonds between particles are a so-called weak bond against chemicals such as methylene ether bond which is produced in the case of employing the melamine resin-based curing agent, since the bond is protected from every direction by the crosslinked particles, those becomes not apt to be directly attacked by chemicals, as a result therefrom, there manifests an excellent effect that it is suppressed to cause a problem such as decomposition.

In addition, the crosslinked particles are a peculiar one molecule compound having a gelled (cross-linked) giant molecular weight. If roughly estimated, a molecular weight in a one molecule compound particle having a size of 1 $\mu$m will attain to at least 300,000,000.

Needless to say, a thin layer-formable resin to be employed in a form of a conventional coating is of a level of a so-called prepolymer, and the molecular weight is 100000 or so to the utmost.

In the gel layer-formable method in the present invention which starts from the crosslinked particles having a giant molecular weight, a continuous crosslinked gel layer is formed by production amount of chemical binds which are exceedingly slight compared to production amount of chemical binds to be required for preparing a crosslinked gel film having a sufficiently high molecular weight by forming a coating layer through crosslinking thereof, that is, by production amount of 1 piece per 0.3 billion pieces, whereby, a molecular weight in a coating layer produced can attain to an extraordinary level.

In other words, in such the gel particles layer-formable method which starts from a giant molecule, the production amount of chemical binds to be required in layer-forming may be even substantially very slight compared to conventional methods.

This means that temperature, time of period, or an amount of a catalyst which is a condition to be required for producing a chemical bond can be all reduced or shortened and, particularly, in the case that a cross-linking agent is simultaneously employed, use amount thereof can be more reduced.

This is also a large characteristics in the present invention.

In construction of the above-described liquid coating agent (a liquid coating) in the present invention, more than 50% by weight of the cross-linked particles are desirably contained as a resin component for film-forming (a thin layer-formable resin component).

Even in the case of being less than 50% by weight, although an only about effect is shown, it is not sufficient. Preferably, it is not less than 70% by weight.

In order to obtain a glossy coating surface having smoothness, it may safely be said that there is required a particle diameter of not more than 1 m by all means and, moreover, a smaller diameter is more preferred. Further, it is desired to contain a component having a specified chemical bond such as urethane bond, whereby, a coating layer obtained becomes hard, flexible, and tough.

By giving a so-called active atomic group (a polar group) such as hydroxyl group, carboxylic group, glycidyl group, or urethane bond into the particles, gel particles themselves are self crosslinked, or by crosslinking between particles in the form of employing together with a curing agent (a crosslinking agent), a continuous thin layer can be formed herein.

Such the crosslinking reaction is usually induced by forcibly heating, and completed.

Although depending upon a kind of a reactive active group (a reactive polar group), in order to complete the reaction within an appropriate time of period, there is by all means required a temperature of not less than 100° C., and preferably not less than 120° C.

If the reactive active group (are active polar group) is a variety of unsaturated bonds such as vinyl group, since crosslinking is caused even by irradiation of so-called radiation rays such as an ultraviolet ray and an electron beam, although it does not always require to be heated, heating is also preferably conducted in order to proceed a reaction by accelerating a close fusion of particles themselves.

In the case that the curing agent is simultaneously employed, as such the curing agent, there can be employed a variety of compounds such as a melamine resin, a phenol resin, and an isocyanate compound and, in order to obtain a coating layer having a light color by exposure and heating, the melamine resin is preferably employed.

For example, in a water-based coating, a water-soluble or water-dispersible melamine resin is exemplified, and particularly typical examples alone are exemplified below, which include a hexamethoxymethyl melamine such as "MW12LF" manufactured by Sanwa Chemical, Ltd., "Nikalak MW-30" manufactured by Nihon Carbide Kagaku Kogyo, Ltd., or "Sumimal M-100C" manufactured by Sumitomo Kagaku Kogyo, Ltd., and a variety of methoxymethyl melamines which have free methylol group such as "Sumimal M-40W" and "Sumimal M-30W" manufactured by Sumitomo Kagaku Kogyo, Ltd.

Further, there can be also employed a melamine resin in which a so-called hydrophobic melamine resin diluted in a dilution ratio of not more than 20% by weight using water/methanol mixed solvent (weight ratio=35/65) is dispersed by a water-soluble resin or a dispersant and, above all, the hexamethoxy melamine resin is employed.

And, use amount of the curing agent appropriately ranges in 1–25% by weight, and preferably 3–15% by weight based on amount of the crosslinked particles. As a thin layer-formable resin component other than the curing agent typified by the crosslinked particles and the above-described melamine resin, there can be also simultaneously employed a thermoplastic resin having a reactive active group (a reactive polar group), and use amount of the thermoplastic resin having a reactive active group appropriately ranges in not more than 30% by weight, and preferably not more than 20% by weight in the thin layer-formable resin component.

When there more increases the use amount of components other than the curing agent, various inherent properties in the gel layer-forming method are more deteriorated and, there becomes also more deteriorated an effect for manifesting a high corrosion resistance which is a target property.

Further, if an average molecular weight between crosslinking points in the above-described various crosslinked particles ranges in 300–2,000, in the coating of the present invention essentially containing the crosslinked particles, corrosion resistance becomes more preferred.

Incidentally, the average molecular weight between crosslinking points described herein is shown by a weighted average value after having calculated an average molecular weight per 1 piece of a functional group taking part in crosslinking in respective resins (also including the hydrophobic curing agent) to be formulated.

It is to be noted that a temperature for film-forming in the crosslinked particles is preferred in not more than 100° C.

In the case of crosslinked particles which do not form a thin layer without heating at a temperature of more than 100° C. even though a variety of solvents are employed as an auxiliary agent for film-forming, the temperature for film-forming should be designed so as to become not more than 100° C. because of a difficulty in obtaining a coating layer which is excellent in corrosion resistance which is one of purposes in the present invention and, also from a viewpoint of formulating composition or a crosslinking density.

Further, in the case that the average molecular weight between crosslinking points is less than 300, that is, in the case that the crosslinking density is exceedingly high, as a result, it affects to the temperature for film-forming, fusion between particles or film-formation (thin layer-formation) become difficult, and various properties as a coating layer are unpreferably deteriorated.

On the other hand, in the case that the average molecular weight between crosslinking points becomes too large exceeding 3,000, that is, in the case that the crosslinking density is low, as a result, the particles become apt to swell in a solvent, resulting in that solvent resistance also unpreferably lowers.

In the coating of the present invention, needless to say, pigments can be also involved in the crosslinked particles which are an essential component in the coating. By involving the pigments in the crosslinked particles, the present invention has a merit of liberation from various problems by removing all drawbacks such as dispersibility and color-separation of pigments which have still become problematic until now.

Particularly, in a water-based coating, since a excellent dispersant does not exist and, pigments are mainly dispersed using a water-soluble resin and, there is applied a method that the pigments are added and involved. On the other hand, in the present invention, pigments can be optionally involved without any modification in the crosslinked particles and, whereby, there can be removed an influence which depends upon surface conditions of a variety of pigments. Moreover, since the pigments are covered by particles having a crosslinked structure, particles are not swelled or not dissolved by solvents contained in a composition, whereby, there is also produced a merit that pigments are not separated and an excellent dispersibility and stability are shown.

Specifically, the above-described acrylic polyol resin (VI-A) (a self water-dispersible resin) and the pigments are kneaded by a publicly-known and common method, for example, using a variety of apparatuses such as a three-roll and a paint conditioner to prepare a mill base, subsequently, the above-described polyisocyanate compound (VI-B) (a hydrophobic crosslinking agent) is mixed therewith and amines are added, followed by dispersing into an aqueous medium.

After that, there is obtained a desired water dispersion in which pigments are involved in crosslinked particles by accelerating crosslinking. Roughly, there is obtained a desired water dispersion in which pigments are involved through the means and steps as described hereinabove.

Such the methods are particularly effective in the case of producing particles by emulsifying through a phase inversion using the self water-dispersible resin. It is very difficult to prepare a such capsule of pigments by a publicly-known and common means, for example, a method such as an emulsion polymerization or a nonaqueous polymerization (a nonaqueous-dispersion polymerization).

Herein, particularly typical examples alone are enumerated as pigments to be employed, and there are enumerated a variety of inorganic-based pigments such as titanium dioxide (for example, Typek CR-95 (a titanium oxide pigment manufactured by Ciba Geigy, A.G.)), an iron oxide, an iron oxide red, lead molybdenum, chromium oxide, and a chromate or carbon black; or a variety of organic-based pigments such as a phthalocyanine-based pigment such as Phthalocyanine Blue and Phthalocyanine Green, Carbazole Violet, Anthrapyrimidine Yellow, Flavaslone Yellow, Isoindoline Yellow, Indaslone Blue or Quinaklidone Violet, Quinaklidone-based Red, an azo pigment, and an anthraquinone pigment, etc.

Further, although the crosslinked particles as described hereinabove are a water-based one, the crosslinked particles employed in the present invention can be employed in a wider composition range compared to so-called nonaqueous crosslinked particles obtained by a method such as the nonaqueous polymerization (a nonaqueous-dispersion polymerization) and, moreover, a preparation process is also easy.

The crosslinked particles in the present invention can be readily moved into a variety of polar organic solvents such as, for example, butanol and methylethylketone. In the case, it can be returned from carboxylic salts to carboxylic acids by a reverse neutralization and, whereby, it can be readily further moved.

As described hereinabove, in the present invention, water-based crosslinked particles can also become employed in a solvent system. However, although being a little, since it tends to become slightly poor in dispersion stability compared to a water-based one, it may safely be said even that it rather matches with a water-based use in the method for the preparation of the crosslinked particles of the present invention and a coating obtained using the crosslinked particles.

The coating in relation to the present invention essentially contains the above-described curable resin composition, and the coating is obtained by dissolving or dispersing the resin into water and, there can be prepared a two-liquid coating composition or a single-liquid coating composition by optionally formulating a variety of additives which are conventionally employed in a coating field, for example, an ultraviolet ray absorbent, a photostabilizer, an antioxidant, a coloring pigment, an extender pigment, a metallic pigment, an aluminum powder, a pearly mica powder, an anti-dropping agent or an anti-sedimentation agent, a leveling agent, a dispersant, a defoaming agent, an antistatic agent, a catalyst for curing, a flowability-adjusting agent, a cellulose acetate-butylate, and a thinner which are publicly- and commonly-known. Further, there can be employed other resins such as an epoxy resin and a polyester resin or a high molecular weight compound which has a good compatibility within a range in which an effect by the present invention is not decreased.

Thus-obtained coating can be coated by publicly- and commonly-known methods such as spray coating, roller coating, and brush coating. It is to be noted that it goes without saying that the resin composition for a coating of the present invention can be employed as a clear coating in which pigments are not employed, or an enamel coating in which pigments are employed.

In the coating in relation to the present invention, there can be actualized a more exceedingly excellent acid resistance which does not include any problems compared to a coating prepared from a conventional polyol and melamine resin even though being further simultaneously employed other polyols and crosslinking agents (for example, a melamine resin). In the coating in relation to the present invention, in the case of simultaneously employing other polyol resins and melamine resins, the content of the curable resin composition of the present invention is not less than 10% by weight, and preferably not less than 25% by weight, the melamine resins are not more than 30% by weight, and preferably not less more than 20% by weight, in total solid resin components.

In the case that the curable resin composition of the present invention is less than 10% by weight or, the melamine resins are more than 30% by weight, an acid resistance cannot be unpreferably elevated.

In the curable resin composition of the present invention, above all, in order to elevate weatherability such as retention of a gloss during exposure and a high extentionable property, there is preferably employed a mixture composed of an ultraviolet ray absorbent/hindered amine-based photo-stabilizer=(40–60)/(60–40) (solid content ratio) within a range of 0–10 wt % based on solid components in the curable oligomer (a (co)polymer) (a). In the case that addition amount is not less than 10 wt %, since a price of a coating becomes expensive and, crystallines are occasionally formed at a low temperature and water resistance occasionally lowers, and a resin solution occasionally discolors, it is not preferred so much. Even in an outside value of the above mixing ratio of the ultraviolet ray absorbent with respect to the hindered amine-based photo-stabilizer, although an effectiveness is observed, the effectiveness is excellently observed in a range of the above mixing ratio.

As typical examples of the ultraviolet ray absorbent which is publicly-known, there can be preferably employed a benzotriazole-based ultraviolet ray absorbent such as Tinuvin 900, Tinuvin 383, and Tinuvin P (all of those are manufactured by Ciba Geigy), an anilide oxalate-based ultraviolet ray absorbent such as Sandbar 3206 (manufactured by Sand), etc. A fixed amount of the absorbents may be added in a terminating period of a copolymerization reaction of the acrylic polyol or in the preparation of a coating. On the other hand, in the case of T-17, T-37, and T-38 (all of those are a product by Adeka Argus Kagaku, Ltd.) which are a reactive ultraviolet ray absorbent containing an organic group having an ultraviolet ray absorbing ability such as an O-hydroxybenzophenone group and an ethylenic copolymerizable unsaturated bond such as methacrylic acid group in an identical molecule, a fixed amount thereof may be simultaneously introduced at a copolymerization step of the acrylic polyol resin (VI-A) components.

As examples of the hindered amine-based photo-stabilizer, there can be preferably employed a piperidine-based one which is usually called HALS (HALS), and which typically includes 4-benzoyloxy-2,2,6,6-tetramethylpiperidine, bis(2,2,6,6-tetramethyl-4-piperidine) sebacate, or Tinuvin 144, 292, and 765 (all of those are a product manufactured by Ciba Geigy, A.G.), MARK LA-57, 62, 63, 67, and 68 (all of those are a product by Adeka Argus Kagaku, Ltd.), Sanol LS292 (manufactured by Sankyo), and Sandbar 3058 (manufactured by Sand). A fixed amount of the stabilizers may be added in a terminating period of a copolymerization reaction of the curable oligomer (a (co) polymer) (a) or in the preparation of a coating. In the case of a hindered amine-based compound containing an organic group having a photo-stabilizing ability and an ethylenic copolymerizable unsaturated bond such as (meth)acrylic acid group such as the MARK LA-82, 87, and T-41 (all of those are a product by Adeka Argus Kagaku, Ltd.), a fixed amount thereof may be simultaneously introduced at a synthesis step of the curable oligomer (a (co)polymer) (a).

Further, in order to increase an effectiveness thereof, optionally, there can be simultaneously employed an antioxidant such as "Sumilizer BHT" (a product manufactured by Sumitomo Kagaku Kogyo, Ltd.), "Seenox BCS" (a product manufactured by Shiroishi Calcium, Ltd.), "Irganox 1010 or 1076" (a product manufactured by Ciba Geigy, A.G.), "Noclizer TNP" (a product manufactured by Ohuchi Shinko, Ltd.), and "Antioxidant KB" (a product manufactured by West Germany/Bayer. A.G.), which are well known and commonly-used.

As the catalysts for curing, there are enumerated a phosphate, an organic acid such as dodecylbenzene sulphonic acid or paratoluene sulphonic acid and an amine salt thereof, an organic tin compound such as dibutyltin dilaurate and dibutyltin dimaleate and a chelating compound thereof, etc.

As the extender pigment, for example, there are enumerated kaoline, talc, silica, mica, barium sulphate, and calcium carbonate, etc.

As the anti-dropping agent or an anti-sedimentation agent, for example, there can be preferably employed bentonite, a castor oil wax, an amide wax, a micro gel (for example, MG100S (manufactured by Dainippon Ink)), and aluminum acetate, etc.

As the levelling agent, for example, there can be preferably employed a silicone-based surface active agent such as KF69, Kp321 and Kp301 (manufactured by Shin-etsu Kagaku), a silicone-based surface active agent such as Modaflow (a surface-adjusting agent manufactured by Mitsubishi Monsant) and BYK301 and 358 (manufactured by Bickchemie Japan), and Diaaid AD9001 (manufactured by Mitsubishi Rayon), etc.

As the dispersant, for example, there can be preferably employed Anti-Terra U or Anti-Terra P, and Disperbyk-101 (manufactured by Bickchemie Japan), etc. As the defoaming agent, for example, there can be preferably employed BYK-0 (manufactured by Bickchemie Japan), etc.

As the thinner, there can be preferably employed conventionally publicly-known aromatic compounds, alcohols, ketones, ester compounds, or a mixture thereof, etc.

As the antistatic agent, for example, there can be preferably employed Esocard C25 (manufactured by Lion Armer), etc.

In the case of preparing the coating composition of the present invention, there are mixed the above-described acrylic polyol resin (VI-A), the polyisocyanate compound (VI-B), and optionally, additives such as curing agents and pigments, and uniformly dispersed by a dispersing machine such as a sand grind mill, a ball mill, and Atlighter to prepare a curable type coating composition.

A method for coating the curable coating composition (a coating composition) of the present invention is as follows.

That is, an article to be coated is cleaned by a publicly-known dewaxing cleaning, for example, dewaxing by an organic solvent such as 1,1,1-trichloroethane, cleaning by an alkali, cleaning by an acid, wiping by a solvent, etc., further, optionally, in order to further elevate an adhesive power of a coating to the article to be coated, for example, the coating composition of the present invention is directly coated by an air-spraying coating method and an airless coating method after coating a primer such as Primac NO. 1500 (manufactured by Nihon Yushi), and optionally, it is set for 0.5–120 minutes, and preferably 1–20 minutes, and thermally cured (baked) at a low temperature of 90–140° C., and preferably 100–120° C. A clear coating may be even coated onto a base coat coating which is an under layer by a wet-on-wet method. In the present invention, since curing can be conducted at a low temperature of not more than 140° C. by the above-described construction, it does not give a damage even on a polyolefine-based resin molded article, and there can be formed a coating layer having excellent properties of a coating layer.

In the case that a primer is coated, layer thickness after drying is generally 3–20 μm, and preferably 5–15 μm. Further, layer thickness of the clear coat coating is generally 15–45 μm, and preferably 20–35 μm. As a method using the coating composition of the present invention, there are enumerated a 2-coat/1-baking type coating method and 3-coat/2-baking type coating method, etc.

Herein, the 2-coat/1-baking type method is one of coating methods by an over coating and, first of all, there is coated a base coat coating in which pigments and/or metal powder are formulated in a large amount, and then, there is coated a transparent clear coating or a top coating which is a color clear coating containing a small amount of pigments, and those coatings are simultaneously baked. In the case of the 2-coat/1-baking type coating method, a usual coating composition is employed as a base coat and, the coating composition of the present invention can be employed as a top coat. In the case of the 3-coat/2-baking type coating method, there is coated and baked a coating in which there are formulated pigments, dyes, and/or metal powder and, there is further coated thereon and baked a base coat in which there are formulated pigments, dyes, and/or metal powder, and then, there is coated thereon and collectively baked a transparent clear coating or a top coat which is a color clear coating containing a small amount of pigments or dyes.

VII

Hereinafter, the present invention VII is illustrated in detail.

(A) Acrylic Resin

Acrylic polyol resin (VII-A) (also called the component (VII-A)) is an acrylic resin having hydroxyl group composed of the hydroxyalkyl(meth)acrylate composition (a) modified by a small amount of lactones illustrated in the present invention I.

By polymerizing the hydroxyalkyl(meth)acrylate composition (a) modified by a small amount of lactones employed in the present invention, a main chain is substantially composed of an acrylic copolymer chain, whereby, there are improved weatherability, solvent resistance, and water resistance in a cured article.

In the acrylic polyol resin (VII-A), a molecular weight and a hydroxyl value, etc. are not particularly limited, and a number molecular weight is preferably 1,000–50,000, and more preferably 2,000–30,000 from a viewpoint of physical properties in a coating layer such as strength and durability. Further, the hydroxyl value is 10–300 mg-KOH/g, and more preferably 30–150 mg-KOH/g from a viewpoint of physical properties in a coating layer such as strength and durability. Such the component (a) may be employed solely or in combination of two or more kinds.

The acrylic polyol resin (VII-A), in addition to the hydroxyalkyl(meth)acrylate composition (a) modified by a small amount of lactones, can be obtained, for example, by copolymerization of other vinyl monomers having hydroxyl group with monomers for introducing a functional group which is illustrated hereinafter, and a (meth)acrylic acid derivative, etc.

Other Vinyl Monomers having Hydroxyl Group

As specific examples of the other vinyl monomers having hydroxyl group contained as a copolymerizing component in the acrylic polyol resin (VII-A), there are enumerated the monomers exemplified in the present invention I.

For introducing acid anhydride groups into the acrylic polyol resin (VII-A), for example, maleic anhydride and itaconic anhydride, etc. are copolymerized and, for introducing epoxy groups, for example, glycidyl(meth)acrylate, etc. are copolymerized, and for introducing carboxylic groups, for example, there are copolymerized unsaturated carboxylic acids such as (meth)acrylic acid, maleic acid, fumaric acid, and itaconic acid, etc. and, for introducing amino groups, for example, there are copolymerized vinyl-based monomers containing an amino group selected from the group consisting of primary amino group, secondary amino group, and tertiary amino group.

As a typical example of the vinyl-based monomers containing an amino group, there are enumerated the vinyl-based monomers exemplified in the present invention I.

Derivatives of acrylic acid or methacrylic acid copolymerizable with the other vinyl monomers having hydroxyl group are not particularly limited and, as specific examples, there are enumerated methyl(meth)acrylate, ethyl(meth)acrylate, butyl(meth)acrylate, 2-ethylhexyl(meth)acrylate, stearyl(meth)acrylate, benzyl(meth)acrylate, cyclohexyl (meth)acrylate, trifluoroethyl(meth)acrylate, pentafluoropropyl (meth)acrylate, perfluorocyclohexyl(meth)acrylate, (meth)acrylonitrile, (meth)acrylic amide, α-ethyl(meth)acrylic amide, N-butoxymethyl(meth)acrylic amide, N,N-dimethyl acrylic amide, N-methyl acrylic amide, and N-methylol(meth)acrylic amide, a macromer manufactured by Toa Gosei Kagaku Kogyo which includes AS-6, AN-6, AA-6, AB-6, and AK-6, etc, vinyl compounds containing a phosphoric acid ester group which is a condensation product of hydroxyalkyl(meth)acrylates with phosphoric acid or a phosphate, and (meth)acrylates containing a urethane bond and a siloxane bond.

The acrylic polyol resin (A) may even contain a portion of a urethane bond and a siloxane bond in a main chain within a range not exceeding 50% (% by weight, hereinafter, the same) and, further, may even contain a unit derived from monomers other than (meth)acrylic acid derivatives. The monomers are not particularly limited and, as a specific example thereof, in addition to the monomers for introducing the functional groups, there are enumerated an aromatic hydrocarbon-based vinyl compound such as styrene, α-methylstyrene, chlorostyrene, styrenesulphonic acid, and vinyltoluene; unsaturated carboxylic acid salts (an alkali metal salt, an ammonium salt, and an amine salt, etc.) of maleic acid, fumaric acid, and itaconic acid, etc.; unsaturated carboxylic acid esters such as a diester or a half ester of the unsaturated carboxylic acid with a linear or branched alcohol having a carbon number of 1–20; a vinylester such as vinyl acetate, vinyl propionate, and diallyl phthalate, and an allyl compound; vinyl compounds having amide group such as itaconic diamide, croton amide, maleic diamide, fumaric diamide, and N-vinylpyrrolidone; other vinyl compounds such as methylvinyl ether, cyclohexylvinyl ether, vinyl chloride, vinylidene chloride, chloroprene, propylene, butadiene, isoprene, fluoroolefine, maleimide, and vinyl sulphonic acid, etc.

As a polymerization method for the acrylic polyol resin (A), a usual polymerization method is employed and, a solution polymerization is particularly preferred from a viewpoint of easiness of synthesis, in which there is employed an azo-based radical initiator such as azobisisobutyronitrile. Molecular weight can be adjusted by using a chain transfer agent such as n-dodecyl mercaptan and t-dodecyl mercaptan or by controlling a reaction temperature.

(B) Acrylic Copolymer Containing an Alkoxysilyl Group

One of the acrylic copolymer (VII-B) (called also the component (VII-B)) containing an alkoxysilyl group is an acrylic copolymer containing at least one, preferably, at least two alkoxysilyl groups having a group shown by general formula (VII-2) described below in one molecule,

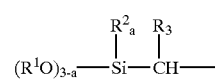

(VII-2)

(in the formula, $R^1$ is an alkyl group having a carbon number of 1–10, $R^2$ and $R^3$ are a hydrogen atom or a monovalent hydrocarbon group selected from an alkyl group, aryl group, and aralkyl group which have a carbon number of 1–10, a is the number of a substituent group, and it is an integer of 0, 1, or 2).

Another one of the acrylic copolymer (VII-B) containing an alkoxysilyl group to be employed in the present invention is an acrylic copolymer containing an alkoxysilyl group, which has at least one, preferably, at least two groups shown by the above-described general formula (VII-2) at terminals or side chains in one molecule, and which has at least one group selected from an acid anhydride group, an epoxy group, an amino group, and carboxylic group.

In the general formula (VII-2), $R^1$ is more preferably an alkyl group of a carbon number of 1–4. In the case that the carbon number exceeds 10, or the $R^1$ is, for example, phenyl group or benzyl group other than the alkyl group, there lowers a reactivity in the alkoxysilyl group. As a specific example of the $R^1$, there are enumerated methyl, ethyl, n-propyl, iso-propyl, n-butyl, and iso-butyl group, etc. As the alkyl group having a carbon number of 1–10 which is one kind of the $R^2$, there are enumerated the same groups as in the $R^1$ and, as the aryl group, for example, there are enumerated phenyl group, tolyl group, xylyl group, etc., as the aralkyl group, for example, there is enumerated benzyl group, etc.

Since in the copolymer (VII-B), a main chain substantially consists of an acrylic copolymer chain, weatherability, solvent resistance, and water resistance are improved in a cured article.

Further, since the alkoxysilyl group connects to carbon, water resistance, alkali resistance, and acid resistance, etc. are more improved.

The alkoxysilyl group reacts with hydroxyl group derived from the hydroxyalkyl(meth)acrylate monomer (a) modified by a small amount of lactones, and it contributes to crosslinking, and the alkoxysilyl group itself also reacts with each other, and it is a component for contributing to crosslinking. In the case that the number of the alkoxysilyl group in one molecule is less than 1 piece in the copolymer (VII-B), there lowers solvent resistance in physical properties of a coating layer.

The group selected from an acid anhydride group, an epoxy group, an amino group, and carboxylic group in the copolymer (VII-B) reacts with the group selected from an acid anhydride group, an epoxy group, an amino group, and carboxylic group in the acrylic polyol resin (VII-A) in a combination of the acid anhydride group/epoxy group, amino group/epoxy group, or carboxylic group/epoxy group, and it elevates solvent resistance and water resistance in a cured coating layer from the composition of the present invention.

The number of the group selected from an acid anhydride group, an epoxy group, an amino group, and carboxylic group is not less than 1 piece per 1 molecule of the copolymer (VII-B) and, preferably 2–30 pieces from a viewpoint of solvent resistance and water resistance in the cured coating layer.

From a viewpoint of physical properties (strength, durability) of a coating layer, a number average molecular weight in the copolymer (VII-B) is 1,000–30,000, and more preferably 3,000–25,000.

The copolymer (VII-B) can be obtained, for example, by copolymerization of a monomer (VII-b) containing the alkoxysilyl group with at least one of (meth)acrylic acid, and a derivative therefrom, or by copolymerization of a monomer (VII-b) containing the alkoxysilyl group with a monomer for introducing a functional group which is described later, (meth)acrylic acid, and a derivative therefrom.

The monomer containing the alkoxysilyl group is not particularly limited except that it has a polymerizable unsaturated double bond and the alkoxysilyl group represented by the above-described general formula (VII-2) and, as a specific example thereof, for example, there are enumerated the following compounds.

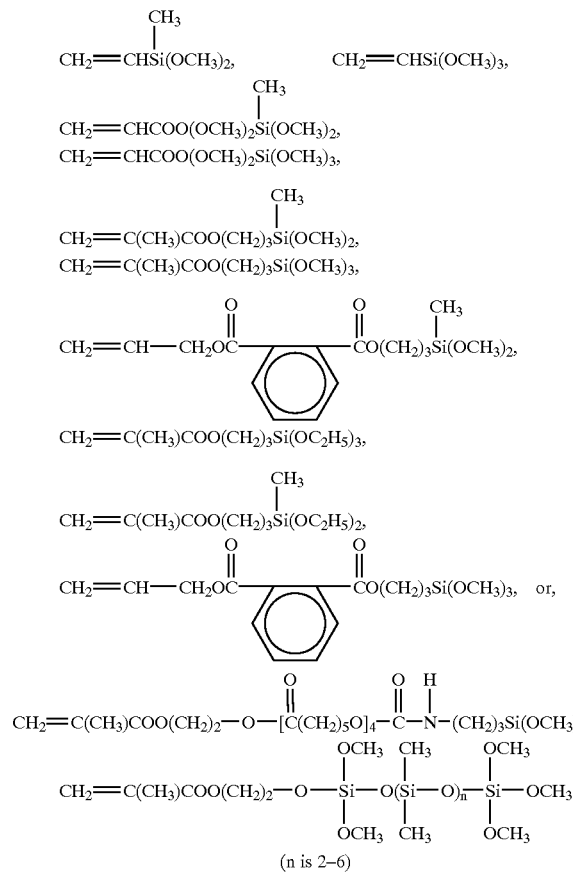

(n is 2–6)

There are enumerated (meth)acrylates having the alkoxysilyl group through urethane bond or a siloxane bond at terminal. These may be even solely or in combination of two or more kinds.

Proportion of the monomer containing the alkoxysilyl group is preferably 5–90% by weight, and more preferably 11–70% by weight in the copolymer (VII-B) from a viewpoint of curability of a composition and durability of a coating layer.

For introducing the acid anhydride group into the copolymer (VII-B), for example, there may be copolymerized the monomers exemplified for introducing the acid anhydride group, epoxy group, carboxylic group, and amino group into the acrylic polyol resin (VII-A).

The (meth)acrylic acid or derivatives thereof to be employed for introducing carboxylic group are not particularly limited and, as specific examples, there are enumerated methyl(meth)acrylate, ethyl(meth)acrylate, butyl(meth) acrylate, 2-ethylhexyl(meth)acrylate, stearyl(meth)acrylate, benzyl(meth)acrylate, cyclohexyl (meth)acrylate, trifluoroethyl(meth)acrylate, pentafluoropropyl (meth) acrylate, perfluorocyclohexyl(meth)acrylate, (meth) acrylonitrile, (meth)acrylic amide, α-ethyl(meth)acrylic amide, N-butoxymethyl(meth)acrylic amide, N,N-dimethyl acrylic amide, N-methyl acrylic amide, 2-hydroxyethyl (meth)acrylate, 2-hydroxypropyl(meth)acrylate, N-methylol (meth)acrylic amide, Alonix M-5700 manufactured by Toa Gosei Kagaku Kogyo, a macromer manufactured by Toa Gosei Kagaku Kogyo which includes AS-6, AN-6, AA-6, AB-6, and AK-5, etc, Placcel FA-1, Placcel FA-A, Placcel FM-1, and Placcel FM-4, etc. manufactured by Daicel Chemical Industries, Ltd., vinyl compounds containing a phosphoric acid ester group which is a condensed product of hydroxyalkyl(meth)acrylates with phosphoric acid or a phosphate, and (meth)acrylates containing a urethane bond and a siloxane bond, etc.

Further, the copolymer (B) may even contain units of a urethane bond and a siloxane bond in a main chain within a range not exceeding 50% and, further, may even contain units of monomers other than (meth)acrylic acid derivatives.

The monomers are not particularly limited and, as a specific example thereof, in addition to the above-described monomers for introducing functional groups, there are enumerated an aromatic hydrocarbon-based vinyl compound such as styrene, α-methylstyrene, chlorostyrene, styrenesulphonic acid, 4-hydroxystyrene, and vinyltoluene; unsaturated carboxylic acid salts (an alkali metal salt, an ammonium salt, and an amine salt, etc.) such as maleic acid, fumaric acid, and itaconic acid, unsaturated carboxylic acid esters such as a diester or a half ester of the unsaturated carboxylic acid with a linear or branched alcohol having a carbon number of 1–20; a vinylester such as vinyl acetate, vinyl propionate, and diallyl phthalate, and an allyl compound; vinyl compounds having amide group such as itaconic diamide, croton amide, maleic diamide, fumaric diamide, and N-vinylpyrrolidone; other vinyl compounds such as 2-hydroxyethylvinyl ether, methylvinyl ether, cyclohexylvinyl ether, vinyl chloride, vinylidene chloride, chloroprene, propylene, butadiene, isoprene, a fluoroolefine, maleimide, and vinyl sulphonic acid, etc.

The copolymer (VII-B) can be obtained, for example, by a method shown in JP-A-54036395 Official Gazette, etc., and a solution polymerization method is most preferred from a viewpoint of easiness of synthesis, in which there is employed an azo-based radical initiator such as azobisisobutyronitrile.

In the solution polymerization method, a molecular weight can be adjusted by using a chain transfer agent such as n-dodecyl mercaptan, t-dodecyl mercaptan, n-butyl mercaptan, γ-mercaptopropyl trimethoxysilane, γ-mercaptopropyl triethoxysilane, γ-mercaptopropyl methyldimethoxysilane, γ-mercaptopropyl methyldiethoxysilane, $(CH_3O)_3$—Si—S—S—Si—$(OCH_3)_3$, and $(CH_3O)_3$—Si—$S_8$—Si—$(OCH_3)_3$. Particularly, the alkoxysilyl group can be introduced in terminals of a polymer by using the chain transfer agent having the alkoxysilyl group in the molecule, for example, γ-mercaptopropyl trimethoxysilane.

As solvents to be employed in the solution polymerization, there may be employed the solvents to be employed in the preparation of the acrylic polyol resin in the present invention I.

As use proportion of the component (VII-A) with respect to the component (VII-B), the component (VII-A)/the component (VII-B) is preferably (2–50)/(30–80) by weight ratio. In the case that the component (VII-A)/the component (VII-B) exceeds the above range, physical properties such as water resistance lowers in a coating layer and, in the case of less than the above range, there does not become sufficiently obtained an effect for improving an outer appearance and hardness of a coating layer by adding the component (VII-A).

In the component (VII-A) and the component (VII-B), reactive functional groups are separately contained in combination of the acid anhydride group/epoxy group; the amino group/epoxy group; and carboxylic group/epoxy group, and the combination may contain one, or two or more combination.

(C) Catalyst for Curing (VII-C)

As the catalyst for curing (VII-C) to be employed in the present invention, for example, there are enumerated an organic tin compound such as dibutyltin dilaurate, dibutyltin dilmaleate, dioctyltin dilaurate, dioctyltin dimaleate, and tin octylate; phosphoric acid or a phosphate such as monomethyl phosphate, monoethyl phosphate, monobutyl phosphate, monooctyl phosphate, monodecyl phosphate, dimethyl phosphate, diethyl phosphate, dibutyl phosphate, dioctyl phosphate, didecyl phosphate; propyleneoxide, butyleneoxide, cyclohexeneoxide, glycidylmethacrylate, glycidol, acrylic glycidylether, γ-glycidoxypropyl trimethoxysilane, γ-glycidoxypropyl triethoxysilane, γ-glycidoxypropyl methyldimethoxysilane, a compound shown by a formula described below,

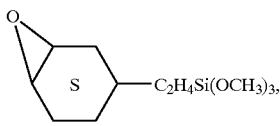

Kardula E manufactured by Yuka Shell Epoxy, Ltd., an adduct of an epoxy compound with a phosphoric acid and/or an acidic monophosphate such as Epikote 828 and Epikote 1001 manufactured by Yuka Shell Epoxy, Ltd.; organic titanate compounds; organic aluminum compounds; acidic compounds such as maleic acid and paratoluene sulphonic acid; amines such as hexyl amine, di-2-ethylhexyl amine, N,N-dimethyldodecyl amine, and dodecyl amine; a mixture or reaction product of the amines with the acidic phosphates; and alkali compounds such as sodium hydroxide and potassium hydroxide, etc.

Of the catalysts for curing (VII-C), there are preferred the organic tin compound, acidic phosphates, mixture or reaction product of the amines with the acidic phosphates, saturated or unsaturated polyvalent carboxylic acid or anhydride thereof, reactive silicone compound, organic titanate compounds, organic aluminum compounds, or a mixture thereof because of a high activity. Such the catalysts for curing (VII-C) may be employed solely or even in combination of two or more kinds.

Use amount of the catalysts for curing (VII-C) is not particularly limited, and it is usually 0.1–20 parts, and preferably 1–10 parts based on 100 parts of solid content of the component (VII-A) and the component (VII-B). In the case that the use amount of the components (VII-C) is less than 0.1 parts, curability tends to lower and, in the case of exceeding 20 parts, physical properties (an outer appearance) in a coating layer tend to lower.

(D) Other Additives (VII-D)

In the composition of the present invention, a dehydrating agent may be optionally added and, there can be ensured a stability, a stability not including any problems even though being repeatedly employed over a long time of period by using the dehydrating agent.

As the dehydrating agent, for example, there are enumerated hydrolyzable ester compounds such as ortho methylformate, ortho ethylformate, ortho methylacetate, ortho ethylacetate, methyltrimethoxy silane, γ-methacryloxypropyl trimethoxy silane, vinyltrimethoxy silane, methyl silicate, and ethyl silicate.

The above hydrolyzable ester compounds may be added before polymerization, after polymerization, and during polymerization of the copolymer (VII-B) containing the alkoxysilyl group.

Use amount of the dehydrating agent is not particularly limited and, it is usually not more than 100 parts by weight, and preferably not more than 50 parts by weight based on 100 parts by weight of solid components in the component (VII-A) and the component (VII-B).

Further, by simultaneously employing an accelerating agent for the dehydrating agent, an effect by the dehydrating agent can be elevated.

As the accelerating agent for the dehydrating agent, for example, there are enumerated an inorganic acid such as hydrochloric acid, sulphuric acid, phosphoric acid, and sulphuric acid; an organic acid such as formic acid, acetic acid, oxalic acid, benzoic acid, phthalic acid, paratoluene sulphonic acid, acrylic acid, and methacrylic acid; a metal salt od carboxylic acid such as an alkyl titanate and lead octylate; a carboxylic acid type organic tin compound such as tin octylate, dibutyltin dilaurate and dioctyltin dimaleate; a sulphide compound such as monobutyltin sulphide and dioctyyltin mercaptide, and a mercaptide type organic compound; an organic tin oxide such as dioctyltin oxide; an organic tin compound by a reaction of the organic tin oxide with an ester compound such as ethylsilicate, ethylsilicate 40, dimethylmaleate and dioctyl phthalate; an amine such as tetraethylene pentamine, triethylene diamine, and N-β-aminoethyl-γ-aminopropyl trimethoxy silane; an alkali catalyst such as potassium hydroxide and sodium hydroxide, etc., and the organic acid, inorganic acid and the organic tin compound are preferred.

The accelerator for the dehydrating agent is employed in 0.0001–20 parts by weight, and preferably 0.001–10 parts by weight based on 100 parts by weight of the dehydrating agent. In the case of employing a compound which is also the above-described component (VII-C) as the accelerator for the dehydrating agent, it is employed in use amount of the component (VII-C).

In the composition of the present invention, a solvent may be added and, nonreactive solvents are preferably employed.

As specific examples of such the solvents, for example, there are enumerated an aliphatic hydrocarbon solvent which is employed for a usual coating and a coating agent, aromatic hydrocarbons, chlorinated hydrocarbons, alcohols, ketones, esters, ethers, alcohol esters, ketone alcohols, ether alcohols, ketone ethers, ketone esters, and ester ethers, etc. Of those, in the case that there is employed a solvent including an alkyl alcohol, a stability is preferably improved in the composition of the present invention.

As the alkyl alcohol, there is preferred an alcohol having a carbon number of 1–10 in the alkyl group and, for example, there are employed methyl alcohol, ethyl alcohol, n-propyl alcohol, isopropyl alcohol, n-butyl alcohol, isobutyl alcohol, sec-butyl alcohol, tert-butyl alcohol, n-amino alcohol, isoamyl alcohol, hexyl alcohol, octyl alcohol, and cellosolves, etc.

Use amount of the alcohols is not particularly limited, and it is not more than 100 parts by weight, and preferably not more than 50 parts by weight based on 100 parts by weight of solid components of the components (VII-A) and (VII-B).

By employing an alcohol, particularly, an alkyl alcohol together with the dehydrating agent, there is observed a remarkable effect in a storage stability in the case that there are stored by mixing the components (VII-A), (VII-B), and (VII-C) in the composition of the present invention.

Use amount of the solvents depends upon a molecular weight or composition of the components (VII-A) and (VII-B), and it is adjusted by fitting to a solid component concentration or viscosity to be practically required.

In order to improve characteristics such as adhesion, hardness, and solvent resistance, there may be even added a hydrolyzable silane compound, a condensate thereof, a reaction product thereof, or a mixture thereof in the composition of the present invention.

As specific examples of the hydrolyzable silane compound, for example, there are enumerated methylsilicate, methyltrimethoxy silane, ethyltrimethoxy silane, butyltrimethoxy silane, octyltrimethoxy silane, dodecyltrimethoxy silane, phenyltrimethoxy silane, vinyltrimethoxy silane, γ-methacryloxypropyl trimethoxy silane, γ-acryloxypropyl trimethoxy silane, γ-glycidoxypropyl trimethoxy silane, γ-mercaptopropyl trimethoxy silane, γ-aminopropyl trimethoxy silane, N-β-aminoethyl-γ-propyl trimethoxy silane, dimethyldimethoxy silane, diethyldimethoxy silane, dibutyldimethoxy silane, diphenyldimethoxy silane, vinylmethyldimethoxy silane, γ-methacryloxyproyl methyl dimethoxysilane, trimethylmethoxy silane, triethylmethoxy silane, triphenylmethoxy silane, ethyl silicate, methyltriethoxy silane, ethyltriethoxy silane, butyltriethoxy silane, octyltriethoxy silane, dodecyltriethoxy silane, phenyltriethoxy silane, vinyltriethoxy silane, γ-methacryloxyproyl triethoxy silane, γ-acryloxyproyl triethoxy silane, γ-glycidoxyproyl triethoxy silane, γ-mercaptopropyl triethoxy silane, γ-aminopropyl triethoxy silane, N-β-aminoethyl-γ-propyl triethoxy silane, dimethyl diethoxy silane, diethyl diethoxy silane, dibutyl diethoxy silane, diphenyl diethoxy silane, vinylmethyldiethoxy silane, γ-methacryloxyproyl methyldiethoxy silane, trimethylethoxy silane, triethylethoxy silane, and triphenylmethoxy silane, etc.

Further, a condensate such as a partially-hydrolyzed condensate of the silane compounds can be readily obtained by the silane compounds solely or in combination and adding necessary amount of water and, optionally adding a small amount of catalysts for condensation such as hydrochloric acid and sulphuric acid, while maintaining at from an ordinary temperature to 100° C., followed by proceeding while removing an alcohol produced. For example, as a compound containing methoxysilyl group which is a partially-hydrolyzed condensate of methyl silicate, there are enumerated Methyl Silicate 47, Methyl Silicate 51, Methyl Silicate 55, Methyl Silicate 58, and Methyl Silicate 60 manufactured by Nihon Kolcoat Kagaku, Ltd., etc.

As the compound containing methoxysilyl group which is a partially-hydrolyzed condensate of methyl trimethoxy silane and dimethyl dimethoxy silane, there are enumerated AFP-1, AFP-2, AFP-6, KP213, KR217, and KR9218 manufactured by Shin-etsu Kagaku Kogyo, Ltd.: TSR165 and TR3357 manufactured by Toshiba Silicone, Ltd.: Y-1587, FZ3701, and FZ3704 manufactured by Nihon Unicar, Ltd., etc.

Further, as the compound containing ethoxysilyl group which is a partially-hydrolyzed condensate of ethyl silicate, there are enumerated Ethyl Silicate 40, HAS-1, HAS-6, and HAS-10 manufactured by Nihon Kolcoat, Ltd., etc.

As the reaction product of the hydrolyzable silane compound, for example, there are enumerated a reaction product of a silane coupling agent containing amino group with a compound containing an epoxy group, a reaction product of a silane coupling agent containing amino group with a silane coupling agent containing an epoxy group such as ethyleneoxide, butyleneoxide, epichlorohydrin, an epoxidized soybean oil, Epikote 828 and Epikote 1001 manufactured by Yuka Shell Epoxy, Ltd.; a reaction product of a silane coupling agent containing an epoxy group with aliphatic amines such as ethyl amine, diethyl amine, triethyl amine, ethylene diamine, hexane diamine, diethylene triamine, triethylene tetramine, and tetraethylene pentamine, aromatic amines such as aniline and diphenyl amine, cycloaliphatic amines such as cyclopentyl amine and cyclohexyl amine, amines such as ethanolamine, etc.

There is not particularly limited use amount of the hydrolyzable silane compound, the condensate thereof, the reaction product thereof, and a mixture thereof, and it is generally not more than 100 parts by weight, and preferably not more than 50 parts by weight based on 100 parts by weight of solid components of the components (VII-A) and (VII-B).

In the composition of the present invention, a polyorganosiloxane may be added in order to give a water repellent property to a cured coating layer. The polyorganosiloxane, if it has a reactive functional group and is compatible with the hydroxyl group-contained polymer (VII-A) and the component (VII-B), can be freely selected and is not particularly limited.

Structure of the polyorganosiloxane may be in any of linear, branched, net-like, and cyclic in a structure and, as an organo group, there are enumerated hydrogen atom, an alkyl group, an alkenyl group, and an aryl group, methyl group, ethyl group, propyl group, butyl group, hexyl group, allyl group, and phenyl group, etc. Of the organo groups, methyl group and phenyl group are practically advantageous because of being industrially prepared and low in price.

As the reactive functional groups, there are preferred a silanol group, an alkoxysilyl group, an alcoholic hydroxyl group, glycidyl group, amino group, mercapto group, carboxylic group, amide group, vinyl group, and (meth) acryloxy group and. Of those, the silanol group, the alkoxysilyl group, and alcoholic hydroxyl group are preferred.

In the polyorganosiloxane, the number of the reactive functional groups is preferably not less than 1 piece in one molecule. In the polyorganosiloxane, although a molecular weight can be freely selected if it is a range having compatibility, since compatibility lowers in a higher molecular weight, silicone atom is preferred in 2–300 pieces, and it is more preferred in 2–100 pieces, and it is particularly preferred in 3–50 pieces.

As a specific example of such the polyorganosiloxane, for example, there are enumerated a silicone rubber, a silicone varnish, a reactive polydimethylsiloxane employed as an intermediate for modifying an organic polymer and a reactive silicone oil, and a reactive polydiphenyl siloxane, a reactive polymethylphenyl siloxane, which is a copolymerized type of dimethyl with diphenyl,

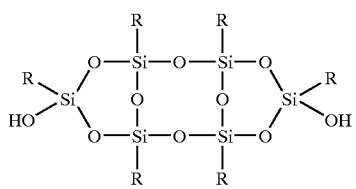

(in the formula, R is a group selected from the group consisting of a phenyl group, an alkyl group having a carbon number of 1–4, and hydroxyl group),

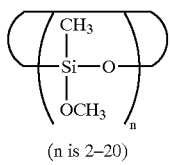

(n is 2–20)

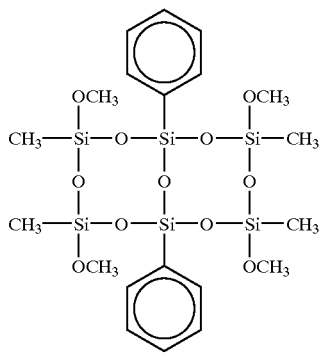

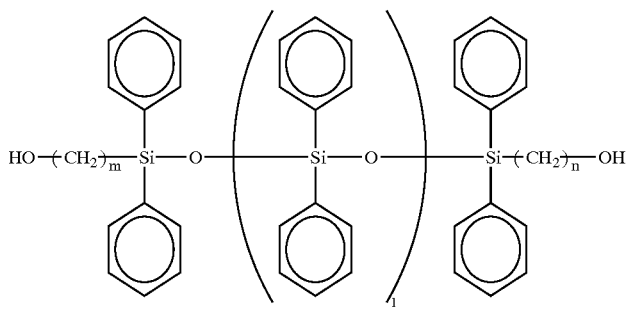

(l is 0–100, m and n are 1–3, respectively)

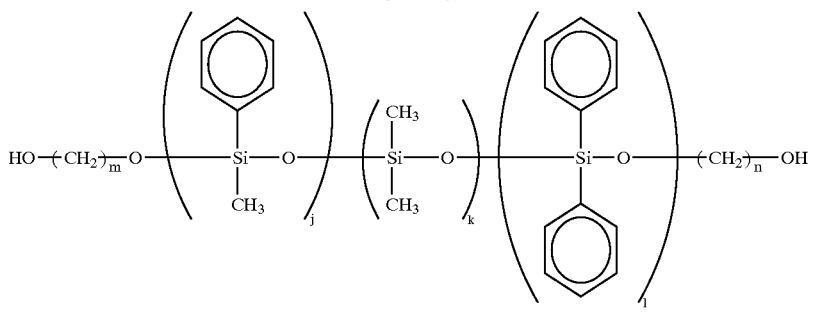

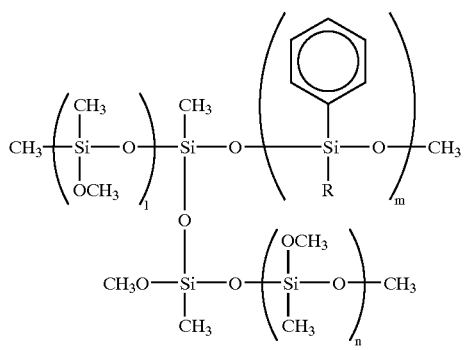

(in the formula, R is a group selected from the group consisting of a phenyl group, an alkyl group having a carbon number of 1–4, and hydroxyl group, and l, m, and n are 1–5, respectively),

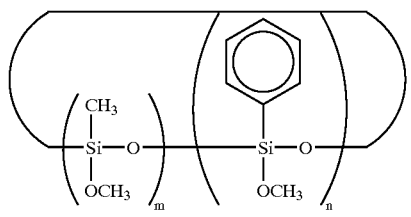

(m and n are 1–10, respectively)

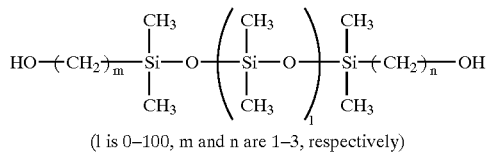

(l is 0–100, m and n are 1–3, respectively)

Use amount of the polyorganosiloxane is generally not less than 100 parts, and preferably not less than 50 parts based on 100 parts of solid components in the components (VII-A) and (VII-B).

In the composition of the present invention, there may be even added additives such as a diluent, pigments (including an extender pigment), an ultraviolet ray absorbent, an anti-sedimentation agent, a leveling agent; celluloses such as a nitrocellulose, and a cellulose acetate butylate; and a resin such as an epoxy resin, a melamine resin, a vinylchloride resin, a chlorinated polyolefin, a chlorinated rubber, a polyvinyl butylal, an alkyd resin, an oil-free alkyd resin, an acrylic-modified alkyd resin, an acrylic resin, a fluorine resin having hydroxyl group, a polyester polyol, a polyether polyol, and a polyurethane polyol, etc.

Hereinafter, there is illustrated a method for the preparation of the composition in relation to the present invention.

The composition of the present invention is composed of the above-described components is not particularly limited, for example, it is prepared by cold-blending of the components (VII-A) and (VII-B), or mixing the components (VII-A) and (VII-B) and after that, heating (hot-blending) to obtain a partially reacted product, and mixing the product with the component (VII-C).

The composition of the present invention can be cured by heating at not less than 30° C., and preferably 55–35° C. after coating on a body to be coated by usual methods using, for example, dipping, spraying, brushing, and a roll coating or a flow coater.

The thermosetting composition of the present invention is useful as a coating, an adhesive, a sealant, and a modifier for plastics, and in the case of employing as the coating, it can provide a coating layer which is excellent in weatherability, adhesion, and hardness and, moreover, which is excellent in durability.

Hereinafter, a coated body of the present invention will be illustrated.

In the coated body of the present invention, there is coated a coating containing metallic powder and/or coloring pigments (a coating containing the metallic powder is called a metallic base coating, and a coating containing the coloring pigments is called a solid color coating), and since a top clear coating (a thermosetting coating) primarily containing the above-described the thermosetting composition is coated on a coated surface, it is a coated body which is excellent in weatherability, acid resistance, and staining resistance, etc.

The coating containing metallic powder and/or coloring pigments is not particularly limited and, for example, there are enumerated compounds primarily containing an amino alkyd resin, an oil-free alkyd resin, a thermosetting acrylic resin, a thermosetting urethane resin, a nitrocellulose lacquer, a modified acrylic lacquer, a straight acrylic lacquer, a ordinary temperature-curable urethane resin, an acrylic enamel resin, an oxidation-curable modified alkyd resin (CAB, etc.), an ordinary temperature- or thermally-curable type fluorine resin, a resin containing a hydrolyzable silyl group, and a mixture of a resin containing a hydrolyzable silyl group with a vinyl-based copolymer having hydroxylic group, etc.

Further, as a type of the coating, there may be even any one of a solution type coating containing an organic solvent as a medium, a nonaqueous dispersion coating, a multi-liquid type coating, a powder coating, a slurry coating, and a water-based coating, etc.

The above-described metallic powder and coloring pigments may be even publicly-known, and there may be even any one of metallic powder and coloring pigments.

As the metallic powder, for example, there are enumerated aluminum powder, copper powder, and mica powder, etc., and, as the coloring pigments, for example, there are enumerated organic-based pigments such as Phthalocyanine Blue, Toluidine Red, and Benzidine Yellow, and inorganic-based pigments such as titanium oxide, carbon black, and iron oxide red, etc. The metallic powder and coloring pigments may be employed solely or in combination of two or more kinds.

In the coating containing the metallic powder and/or coloring pigments, weatherability can be more improved by employing an ultraviolet ray absorbent and a photostabilizer.

As the ultraviolet ray absorbent, conventionally-known ones can be widely employed, for example, there is preferred an ultraviolet ray absorbent such as a benzophenone-based one, a triazole-based one, a phenylsalicylate-based one, a diphenylacrylate-based one, and an acetophenone-based one.

As the photostabilizer, conventionally-known ones can be widely employed, for example, there are enumerated bis(2, 2,6,6-tetramethyl-4-piperidyl)sebacate, bis(1,2,2,6,6-pentamethyl-4-piperidyl)sebacate, 2-(3,5-di-tert-butyl-4-hydroxybenzyl)2-n-butyl maloate bis(1,2,2,6,6-pentamethyl-4-piperidyl), tetrakis(2,2,6,6-tetramethyl-4-piperidyl)-1,2,3,4-butane tetracarboxylate, and tetrakis(1,2, 2,6,6-pentamethyl-4-piperidyl)-1,2,3,4-butane tetracarboxylate, etc. These may be employed solely or even in combination of two or more kinds.

In the coating containing the metallic powder and/or coloring pigments, there may be even added the above-described silane compounds, condensates thereof, reaction product thereof, and a mixture thereof in order to elevate adhesion to a coating layer and a top clear coating layer.

Addition amount thereof is usually not more than 50 parts, and preferably not more than 20 parts in 100 parts of the coating containing the metallic powder and/or coloring pigments.

By formulating the above-described ultraviolet ray absorbent or photostabilizer with the top clear coating, weatherability is remarkably improved. Further, weatherability can be more improved by employing the ultraviolet ray absorbent together with the photostabilizer.

The formulating amount of the ultraviolet ray absorbent is usually 0.1–10 parts, and preferably 1–5 parts based on 100 parts of solid components in the top clear coating. Further, the formulating amount of the photostabilizer is usually 0.1–10 parts, and preferably 1–5 parts based on 100 parts of solid components in the top clear coating.

A method for the preparation of the body to be coated of the present invention is not particularly limited and, for example, it can be prepared by a method (two coat-one bake style) in which after coating the coating containing the metallic powder and/or coloring pigments and setting for several minutes, the top clear coating is coated by a wet-on-wet style, followed by thermally curing, and a method (two coat-two bake style) in which after coating the coating containing the metallic powder and/or coloring pigments and thermally curing, the top clear coating is coated and thermally cured.

Thickness of a coating layer is not also particularly limited and, thickness of a coating layer containing the metallic powder (or) coloring pigments is preferably 10–30 $\mu$m from a viewpoint of concealing, and thickness of the top clear coat is preferably 20–50 $\mu$m from a viewpoint of durability.

Thus-prepared coating layer shows an excellent property in a specific characteristic such as outer appearance and weatherability.

As an object for forming the coating layer, for example, there are enumerated buildings, cars, industrial machines, steel-made furniture, home electric appliances, and plastics products, etc., and the coating is employed for finishing as an over coating.

Hereinafter, the present invention No. VIII is illustrated.

The hydroxyalkyl(meth)acrylate composition (a) modified by a small amount of lactone in which a proportion of monomers having two or more continuous chains ($n \geq 2$) of lactone represented by the above-described general formula (I) to be employed in the present invention is less than 50% is as illustrated in the present invention No. I.

By allowing to react the hydroxyalkyl(meth)acrylate composition (a) modified by a small amount of lactone represented by the above-described general formula (I) with the carboxylic acid represented by the above-described general formula (VIII-2) or the anhydride thereof (VIII-b), there is obtained the hydroxyalkyl(meth)acrylate composition (a') having carboxylic group modified by a small amount of lactone represented by the above-described general formula (VIII-3).

As the carboxylic acid represented by the general formula (VIII-2) or the anhydride thereof (VIII-b), for example, there can be enumerated malonic acid, succinic acid, glutaric acid, adipic acid, sberic acid, azelaic acid, sebasic acid, brasilic acid, maleic acid, fumaric acid, itaconic acid, phthalic acid, isophthalic acid, terephthalic acid, trimerritic acid, tartaric acid, malic acid, mannose acid, 1,4-cyclohexane dicarboxylic acid, 1,2-cyclohexane dicarboxylic acid, 1,4,5,6,7,7-hexachloro-5-norbornene-2,3-dicarboxylic acid, hexahydrophthalic acid, galactose acid, 4,5-cyclohexene dicarboxylic acid, 3,6-methylene-4-cyclohexene-1,2-dicarboxylic acid, citric acid, pyromellitic acid, dimer of phthalic anhydride, diphenylether tetracarboxylic acid, diphenylsulphone tetracarboxylic acid, benzophenone tetracarboxylic acid, butane-1,2,3,4-tetracarboxylic acid, anhydrides thereof, and a mixture thereof. Of those, maleic anhydride, phthalic anhydride, trimerritic anhydride, and pyromerritic anhydride are preferred as a raw material for the present invention because of readily obtaining.

The carboxylic acid may be unsubstituted or can be also substituted by optional groups by which a reaction is not significantly disturbed. Examples of appropriate substituent groups include a halogen, nitro, alkoxy, alkyl, and carbonyl group, etc. Further, a desired product can be prepared by allowing to react an acid chloride which is the component (VIII-b) with a lactone(meth)acrylate.

Otherwise, residual carboxylic group ($R^9$ in the general formula (VIII-2)) of the acid anhydride may contain an inert functional group such as ether, ester, halogen, and ketone, and, for example, there can be employed an ethyleneglycol ester of trimellitic anhydride (Ricacid TMEG™ (manufactured by Shinnihon Rika)) represented by general formula (4) described below, etc.

(4)

By employing an anhydride of a polyvalent carboxylic having at least two carboxylic groups in the molecule, since one carboxylic group of the polyvalent carboxylic acid qualitatively reacts with hydroxyl group at terminal of the hydroxyalkyl (meth)acrylate composition (a) modified by a small amount of lactone, one carboxylic group of the polyvalent carboxylic acid can be controlled so as to add to hydroxyl group at a terminal group.

As a result, there can become obtained the (meth)acrylate compound (a', VIII-3) containing at least one carboxylic group in the molecule in a high selectivity.

A reaction of the above-described component (a) with the component (VIII-b) slowly proceeds at a low temperature and, a polymerization of (meth)acryloyl group is caused at a high temperature. Accordingly, a preferred temperature ranges in 40–160° C.

In order to prevent the polymerization of (meth)acryloyl group, the reaction is preferably conducted under the presence of oxygen and, further, it is preferably conducted under the presence of, for example, a polymerization inhibitor such as hydroquinone monomethylether. The polymerization inhibitor such as quinones is employed in an amount of not more than 5,000 ppm, and preferably not more than 700 ppm in a reaction mass.

Although the reaction proceeds under the absence of a catalyst, the catalyst may be even optionally employed. As the catalyst, there are enumerated a basic compound such as triethylamine, pyridine, N-methylimidazole, diazabicycloundecene, and diazabicyclooctane; an ammonium salt such as trimethylbenzyl ammonium chloride and tetrabutyl ammonium bromide; and a publicly-known catalyst such as other acids and alkalis, etc.

Although the reaction may be conducted under the absence of a solvent, the solvent may be even employed. As the solvent, there are enumerated toluene, methylethyl ketone, ethyl acetate, and 1-methoxy-2-acetoxypropane, etc. Further, there may be employed a reactive diluent such as a polyethyleneglycol monomethylether mono(meth)acrylate or a polyethyleneglycol di(meth)acrylate which are a mono or poly(meth)acrylate.

Feeding ratio of the hydroxyalkyl(meth)acrylate composition (a) modified by a small amount of lactone with the carboxylic acid or the anhydride (VIII-b) is preferably 0.9–1.1 by mol. In the case that molar ratio of the component (VIII-b) exceeds 1.1, there remains a large amount of the component (VIII-b) and, in uses in which an epoxy compound is formulated, a pot-life is unpreferably shortened. Further, in the case of less than 0.9, a high molecular weight diesters or triesters, etc. are by-produced, unpreferably resulting in that a viscosity becomes high.

Method for the preparation according to the present invention can be advantageously conducted by industrial fashion and, moreover, a lactone acrylate compound having carboxylic group obtained is effective for improvement of adhesion to materials such as a resin having amino groups which includes a nylon, an inorganic compound which includes a metal and silica having hydroxyl group and, further, it is exceedingly useful as a raw material for resins, which is effective for solubility of an acrylic resin to water and an aqueous alkali solution, above all, for shortening a developing time of period in an alkali development step when preparing a pattern in which curing by an ultraviolet ray is utilized, and for a removal property of an uncured portion.

Subsequently, the present invention No. IX is illustrated hereinafter in detail.

I. Raw Material for a Curable Resin Composition

First of all, there are illustrated raw materials to be employed for preparation of the curable resin composition in relation to the present invention.

I-1. <Acrylic Polycarboxylic Acid Resin (A')>

The acrylic polycarboxylic acid resin (A') to be employed for the curable resin composition of the present invention has at least two carboxylic groups on average, 5–300 mgKOH/g of an acid value, and preferably 25–250 mgKOH/g, more preferably 50–200 mgKOH/g, 500–8000 of a number average molecular weight, preferably 800–6000, and more preferably 1500–4000.

The acrylic polycarboxylic acid resin (A') is obtained by copolymerizing 5–80% by weight of an ethylenic unsaturated monomer having carboxylic group (a1), provided that a ratio of the hydroxyalkyl(meth)acrylate composition (a') having carboxylic group modified by a small amount of lactone is 5–50% by weight in the ethylenic unsaturated monomer having carboxylic group (a1), with 20–95% by weight of an ethylenic unsaturated monomer not having carboxylic group (a2) according to publicly-known methods.

In the case that the monomer (a') is less than 5% by weight, a coating layer becomes unpreferably hard and, in the case of exceeding 50% by weight, water resistance becomes unpreferably worse.

Further, in the case that the monomer (a1) exceeds 80% by weight, a coating layer becomes unpreferably hard and brittle, and in the case that the monomer (a2) exceeds 95% by weight, curing becomes unpreferably insufficient.

Proportion of the monomer (a') which constructs the acrylic polycarboxylic acid resin (A') is 5–50% by weight, and preferably 10–40% by weight.

Copolymerization can be conducted using an azo-based radical initiator or a peroxide-based initiator as a radical polymerization initiator in an amount of 0.5–15 parts by weight based on 100 parts by weight of total monomers, and at a polymerization temperature of 80–200° C. and a polymerization period of 3–10 hours, and under an ordinary pressure or compressurization. In the case, there may be even added a chain transfer agent and an agent for preventing discoloration, etc.

Further, in the present invention, there may be even employed an acrylic polycarboxylic acid resin (bA') in which terminal carboxylic groups in the acrylic polycarboxylic acid resin (A') are blocked by a block group which produces carboxylic group by heating and/or water, in place of the acrylic polycarboxylic acid resin (A').

I-1-1 <Hydroxyalkyl(meth)acrylate Composition (a') having Carboxylic Group Modified by a Small Amount of Lactone>

The hydroxyalkyl(meth)acrylate composition (a') having carboxylic group modified by a small amount of lactone to be employed for the acrylic polycarboxylic acid resin (A') is a composition obtained by allowing to react the hydroxyalkyl(meth)acrylate composition (a) modified by a small amount of lactone represented by the above-described general formula (1) with the carboxylic acid represented by the above-described general formula (VIII-2) or the anhydride thereof (VIII-b), and the composition is represented by the above-described general formula (VIII-3).

(1) <Hydroxyalkyl(meth)acrylate Composition (a) Modified by a Small Amount of Lactone>

The hydroxyalkyl(meth)acrylate composition (a) modified by a small amount of lactone represented by the above-described general formula (1) is as illustrated in the present invention No. I.

(2) <Carboxylic Acid or Anhydride Thereof>

The carboxylic acid represented by the above-described general formula (VIII-2) or the anhydride thereof is as illustrated in the present invention No. VIII.

For example, there can be enumerated malonic acid, succinic acid, glutaric acid, adipic acid, sberic acid, azelaic acid, sebasic acid, brasilic acid, maleic acid, fumaric acid, itaconic acid, phthalic acid, isophthalic acid, terephthalic acid, trimerritic acid, tartaric acid, malic acid, mannose acid, 1,4-cyclohexane dicarboxylic acid, 1,2-cyclohexane dicarboxylic acid, 1,4,5,6,7,7-hexachloro-5-norbornene-2,3-dicarboxylic acid, hexahydrophthalic acid, galactose acid, 4,5-cyclohexene dicarboxylic acid, 3,6-methylene-4-cyclohexene-1,2-dicarboxylic acid, citric acid, pyromerritic acid, dimer of phthalic anhydride, diphenylether tetracarboxylic acid, diphenylsulphone tetracarboxylic acid, benzophenone tetracarboxylic acid, butane-1,2,3,4-tetracarboxylic acid, anhydrides thereof, and a mixture thereof. Of those, maleic anhydride, phthalic anhydride, trimellitic anhydride, and pyromellitic anhydride are preferred as a raw material for the present invention because of readily obtaining.

The carboxylic acid may be unsubstituted or can be also substituted by optional groups by which a reaction is not significantly disturbed. Examples of appropriate substituent groups include a halogen, nitro, alkoxy, alkyl, and carbonyl group, etc. Further, a desired product can be prepared by allowing to react an acid chloride with a lactone(meth)acrylate.

Otherwise, residual carboxylic group ($R^6$ in the general formula (2)) in the acid anhydride may even contain an inert functional group such as ether, ester, halogen, and ketone, and, for example, there can be employed an ethyleneglycol ester of trimerritic anhydride (Ricacid TMEG™ (manufactured by Shinnihon Rika)), etc.

By employing an anhydride of a polyvalent carboxylic acid having at least two carboxylic groups in the molecule, since one carboxylic group in the polyvalent carboxylic acid qualitatively reacts with hydroxyl group at a terminal of the hydroxyalkyl (meth)acrylate composition (a) modified by a small amount of lactone, one carboxylic group of the polyvalent carboxylic acid can be controlled so as to add to hydroxyl group at a terminal group.

As a result, the hydroxyalkyl(meth)acrylate composition (a') modified by lactone containing carboxylic group can become obtained in a high efficiency.

A reaction of the above-described component (a) with the carboxylic acid or the anhydride thereof slowly proceeds at a low temperature and, a polymerization of (meth)acryloyl group is caused at a high temperature. Accordingly, a preferred temperature ranges in 40–160° C.

In order to prevent the polymerization of (meth)acryloyl group, the reaction is preferably conducted under the presence of oxygen and, it is preferably conducted under the presence of, for example, a polymerization inhibitor such as hydroquinone monomethylether. The polymerization inhibitor such as quinones is employed in an amount of not more than 5,000 ppm, and preferably not more than 700 ppm in a reaction mass.

Although the reaction proceeds under the absence of a catalyst, the catalyst may be even optionally employed. As the catalyst, there are enumerated a basic compound such as triethylamine, pyridine, N-methylimidazole, diazabicycloundecene, and diazabicyclooctane; an ammonium salt such as trimethylbenzyl ammonium chloride and tetrabutyl ammonium bromide; and a publicly-known catalyst such as other acids and alkalis, etc.

The reaction may be conduct under the absence of a solvent and, the solvent may be even employed. As the solvent, there are enumerated toluene, methylethyl ketone, ethyl acetate, and 1-methoxy-2-acetoxypropane, etc. Further, there may be employed a reactive diluent such as a polyethyleneglycol monomethylether mono(meth)acrylate or a polyethyleneglycol di(meth)acrylate which are a mono or poly(meth)acrylate as a solvent.

Feeding ratio of the hydroxyalkyl(meth)acrylate composition (a) modified by a small amount of lactone with the carboxylic acid or the anhydride is preferably 0.9–1.1 by mol. In the case that molar ratio of the carboxylic acid or the anhydride exceeds 1.1, residual amount thereof becomes large and, in uses in which an epoxy compound is formulated, a pot-life is unpreferably shortened.

Further, in the case of less than 0.9, high molecular weight diesters or triesters, etc. are by-produced, unpreferably resulting in that a viscosity becomes high.

I-1-2. <Ethylenic Unsaturated Monomer (a1) having Carboxylic Group>

As the ethylenic unsaturated monomer (a1) having carboxylic group which is other monomer component to be employed for copolymerization of the above-described acrylic polycarboxylic acid resin (A'), for example, there are enumerated acrylic acid, methacrylic acid, itaconic acid, maleic acid, and an adduct of ε-caprolactone therewith (for example, "Alonix M-5300" manufactured by Toa Gosei Kagaku, Ltd.), an adduct of the ethylenic unsaturated monomer (d3) having hydroxyl group represented by the above-described general formula (4) with the carboxylic acid or the anhydride, and an adduct of an ethylenic unsaturated monomer (f) having an acid anhydride group with a monoalcohol (g). These may be employed solely or in combination of two or more kinds.

The carboxylic acid or the anhydride to be employed herein, if it is a compound capable of providing a carboxylic functional property by a half esterification reaction with hydroxyl group at ordinary conditions such as a room temperature to 150° C. and an ordinary pressure, is not particularly limited. Herein, there is preferably employed a compound containing an acid anhydride group having a cyclic (unsaturated or saturated) group having a carbon number of 8–12, particularly, 8–10. By the use of such the compound, compatibility becomes excellent in a resin obtained.

As the acid anhydride, there can be employed an anhydride of the carboxylic acid described in the above-described I-1-1 (2) and, preferably, there are enumerated phthalic anhydride, tetrahydrophthalic anhydride, hexahydrophthalic anhydride, 4-methyl hexahydrophthalic anhydride, and trimellitic anhydride, etc.

As specific examples of the ethylenic unsaturated monomer (f) having an acid anhydride group to be employed herein, there are enumerated itaconic anhydride, maleic anhydride, and cytraconic anhydride, etc.

As specific examples of the monoalcohol (g) to be employed herein, there are enumerated methanol, ethanol, n-propanol, i-propanol, n-butanol, i-butanol, t-butanol, n-hexylalcohol, lauryl alcohol, methylcellosolve, ethylcellosolve, methoxypropanol, ethoxypropanol, fulfuryl alcohol, dimethylaminoethanol, acetol, allyl alcohol, and propalgyl alcohol, etc.

I-1-3. <Ethylenic Unsaturated Monomer (a2) not having Carboxylic Group>

As specific examples of the ethylenic unsaturated monomer (a2) not having carboxylic group which is another monomer component to be employed for the copolymerization of the acrylic polycarboxylic acid resin (A'), for example, there are enumerated styrene, α-methylstyrene, p-t-butylylstyrene, (meth)acrylate (for example, methyl (meth)acrylate, ethyl(meth)acrylate, propyl(meth)acrylate, n-, i-, and t-butyl(meth)acrylate, 2-ethylhexyl(meth)acrylate and lauryl(meth)acrylate, cyclohexyl(meth)acrylate, and isobonyl(meth)acrylate, etc.), Veova-9 and Veova-10 manufactured by Shell, AG.

In the case that styrene and a styrene derivative are employed as the ethylenic unsaturated monomer (a2) not having carboxylic groups, those are preferably employed in an amount of 5–40% by weight.

I-2. <Acrylic Polycarboxylic Acid Resin (A*') having Carboxylic Groups and Carboxylate Groups>

As the acrylic polycarboxylic acid resin (A') to be employed for the curable resin composition of the present invention, the acrylic polycarboxylic acid resin (A*') having carboxylic groups and carboxylate groups is preferably employed, whereby, acid resistance is improved in a coating a composition obtained.

The acrylic polycarboxylic acid resin (A*') having carboxylic groups and carboxylate groups is obtained by allowing to react 5–50% by weight of the hydroxyalkyl(meth) acrylate composition having carboxylic groups (a') modified by a small amount of lactones and 5–50% by weight of the acrylic polyacid anhydride (a3) with 5–50% by weight of the monoalcohols (g).

As proportion of the monomer (a') which constructs the acrylic polycarboxylic acid resin (A*') having carboxylic groups and carboxylate groups, it is preferably 5–50% by weight, and more preferably 10–40% by weight.

In the case that the monomer (a') is less than 5% by weight, a coating layer unpreferably becomes hard and, in the case of exceeding 50% by weight, water resistance unpreferably becomes worse.

Further, in the case that the $(3_3)$ exceeds 50% by weight, unreacted anhydride groups are remained and, resulting in that a storage stability becomes unpreferably worse and, in the case of less than 5% by weight, the monoalcohols (g) are excessively remained, unpreferably resulting in that lack of curing is caused in curing.

The acrylic polyacid anhydride (a3) is obtained by allowing to copolymerize 15–40% by weight, and preferably 15–35% by weight of the ethylenic unsaturated monomer (f) having an acid anhydride group with 60–85% by weight, and preferably 65–85% by weight of the ethylenic unsaturated monomer (d1) not having an acid anhydride group.

In the case that the amount of the ethylenic unsaturated monomer (f) having an acid anhydride group is less than 15% by weight, curability becomes short and, in the case of exceeding 40% by weight, a coating layer becomes excessively brittle, resulting in that weatherability becomes short.

As specific examples of ethylenic unsaturated monomer (f) having an acid anhydride group, there are enumerated ones already illustrated.

The ethylenic unsaturated monomer (d1) not having an acid anhydride group, if it does not adversely affect to the acid anhydride group, is not particularly limited, and there is preferred a monomer having a carbon number of 3–15, particularly, 3–12 and having one ethylenic unsaturated bond.

A mixture of at least two ethylenic unsaturated monomers can be also employed as the ethylenic unsaturated monomer (d1) not having an acid anhydride group. Because, it is effective for elevating a compatibility of resins themselves. Specifically, the above-described monomers are enumerated as the ethylenic unsaturated monomer (a2) not having carboxylic group. Monomers having carboxylic group such as acrylic acid, methacrylic acid, itaconic acid, and maleic acid can be employed as the ethylenic unsaturated monomer (d1) not having an acid anhydride group. Of those, scratch resistance in a coating layer is particularly preferably elevated by the use of a long chain carboxylic acid monomer having a spacer portion of carbon number of 5–20 pieces or so between an ethylenic unsaturated group and carboxylic group such as an adduct thereof with ε-caprolactone (for example, Alonix M-5300).

For example, as the ethylenic unsaturated monomer (d1) not having an acid anhydride group, there can be also employed an ethylenic unsaturated monomer (d2) having carboxylic group obtained by half-esterification reaction of the ethylenic unsaturated monomer (d3) having hydroxyl group with a compound having an acid anhydride group in 1/0.5-1/1.0, preferably, 1/0.8-1/1.0 of a molar ratio of hydroxyl group with respect to the acid anhydride group. In the case that the molar ratio is not less than 1/0.5, viscosity becomes high and workability becomes worse. In the case of not more than 1/1.0, an excessive acid anhydride is remained, and water resistance becomes worse in a coating layer.

In the ethylenic unsaturated monomer (d3) having hydroxyl group to be employed herein, a carbon number is preferably 2–40, and more preferably 4–20. In the case that a chain length is too short, flexibility is lost in the vicinity of crosslinking points, resulting in that a coating layer becomes too hard and, in the case that it is too long, a molecular weight becomes too large between crosslinking points.

In general, there is enumerated the ethylenic unsaturated monomer (d3) having hydroxyl group which has an organic chain shown by the above-described general formula (4) or an organic chain shown by the above-described general formula (6).

Specifically, there are enumerated 2-hydroxyethyl (meth)acrylate, 2-hydroxypropyl(meth)acrylate, 2-hydroxybutyl (meth)acrylate, 4-hydroxybutyl(meth)acrylate, 6-hydroxyhexyl (meth)acrylate, and a reaction product thereof with ε-caprolactone and, a compound which can be prepared by esterification of a (meth)acrylic acid with a largely excessive diol (for example, 1,4-butane diol, 1,6-hexane diol, a polyethylene glycol, and a polypropylene glycol).

Such the compounds are commercially supplied, for example, 4-hydroxybutyl acrylate "4-HBA" and 4-hydroxybutylmethacrylate "4-HBMA" manufactured by Mitsubishi Kasei, Ltd., etc., and "Placcel FM1" and "Placcel FA1" manufactured by Daicel Chemical Industries, Ltd., etc. As a propylene oxide-based monomer, there are "Blemmer PP-1000" and "Blemmer PP-800" manufactured by Nihon Yushi, Ltd., and as an ethylene oxide-based monomer, there is "Blemmer PE-90" manufactured by Nihon Yushi, Ltd. As specific examples of the compound having an acid anhydride group, there are enumerated already exemplified ones.

The half esterification reaction of the ethylenic unsaturated monomer (d3) having hydroxyl group with the compound having an acid anhydride group is conducted according to usual methods, and it is conducted at a temperature of room temperature to 150° C.

Copolymerization of the ethylenic unsaturated monomer (f) having an acid anhydride croup with the ethylenic unsaturated monomer (d1) not having an acid anhydride group is conducted, for example, by a publicly-known method such as a solution polymerization which includes a radical polymerization. For example, it can be conducted at a polymerization temperature of 100–200° C. under an ordinary pressure or compressurization for a polymerization time of period of 3–8 hours.

As an initiator, there is preferably employed an azo-based or peroxide-based initiator. There can be also employed other additives such as a chain transfer agent.

In the acrylic polyacid anhydride (a3) obtained, a number average molecular weight is 500–8000, further, 800–6000, particularly preferably 1500–4000. In the case that the number average molecular weight exceeds 8000, there lower compatibility of resins themselves and an outer appearance. In the case that the number average molecular weight is less than 500, curability becomes insufficient in a coating composition. The acrylic polyacid anhydride (a3) obtained has at least two, preferably 2–15 pieces of acid anhydride groups on an average in one molecule. In the case that the acid anhydride groups are less than 2 pieces in one molecule, curability becomes insufficient in a coating composition. In the case of exceeding 15 pieces, a coating layer becomes hard and too brittle and, weatherability is short.

Subsequently, the acrylic polycarboxylic acid resin (A*') having carboxylic groups and carboxylate groups is prepared by allowing to react the hydroxyalkyl(meth)acrylate composition having carboxylic groups (a') modified by a small amount of lactones and the acrylic polyacid anhydride (a3) with the monoalcohol (g) in an amount of molar ratio of the acid anhydride group with respect to hydroxyl group of 1/10-1/1, preferably 1/5-1/1, and more preferably 1/2.0-1/1. In the case of being less than 1/10, an excessive amount of the monoalcohol is remained, and there is caused lack of curing and, in the case of exceeding 1/1, unreacted acid anhydride groups are remained, and storage stability becomes worse.

The monoalcohol (g) to be employed in the present invention has preferably 1–12 pieces, particularly, 1–8 pieces of carbon numbers, because an alcohol evaporates to excellently reproduce the acid anhydride group by heating. As preferred specific examples of the monoalcohol to be employed, there are enumerated already exemplified ones. There are particularly preferred acetol, fulfuryl alcohol, allyl alcohol, propagyl alcohol, and methanol.

The acrylic polycarboxylic acid resin (A*') having carboxylic groups and carboxylate groups obtained has an acid value of 5–300 mgKOH/g, and preferably 50–250 mgKOH/g. In the case that the acid value is less than 5 mgKOH/g, curability becomes short and, in the case of exceeding 300 mgKOH/g, storage stability unpreferably becomes short.

The acrylic polycarboxylic acid resin (A*') component can be formulated with the curable resin composition in an amount of 10–70% by weight, preferably 15–50% by weight, and more preferably 20–45% by weight based on total solid components in the curable resin composition. In the case that formulating amount of the acrylic polycarboxylic acid resin (A*') component is less than 10% by weight, acid resistance lowers in a coating layer obtained and, in the case of exceeding 70% by weight, the coating layer becomes too hard.

I-3. <Acrylic Polycarboxylic Acid Resin (bA') in which Carboxylic Groups are Blocked>

In the curable resin composition of the present invention, the acrylic polycarboxylic acid resin (bA') in which carboxylic groups are blocked can be employed in place of the acrylic polycarboxylic acid resin (A').

The acrylic polycarboxylic acid resin (bA') in which carboxylic groups are blocked to be employed in the present invention, if it is an acrylic polycarboxylic acid resin having carboxylic groups which are blocked by a blocking group which produces carboxylic group by heat and/or water (for example, moisture in atmosphere or water), can be employed without being particularly limited.

Such the blocked carboxylic group is shown by —COO—Z (Z is a blocked group derived from a blocking agent connected to hydroxyl group in carboxylic group).

As the Z, there can be preferably exemplified a silyl blocking group ($K_1$) or a vinylether blocking group ($K_2$) described below.

As the silyl blocking group (K₁), there can be exemplified a silyl blocking group represented by the following general formula (7).

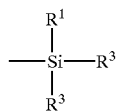

(7)

In the above formula (7), $R^1$–$R^3$ are independently an alkyl group or aryl group. As the alkyl group, there is enumerated a linear or branched lower alkyl group having a carbon atom number of 1–10 and, for example, there are particularly preferred methyl group, ethyl group, propyl group, butyl group, s-butyl group, t-butyl group, pentyl, and hexyl group. As the aryl group, there is enumerated phenyl group, naphtyl group, and indenyl group, etc. which may even have substituent groups, and phenyl group is particularly preferred.

As the silyl blocking group (K₁) represented by the general formula (7), there are enumerated trimethyl silyl group, diethyl methylsilyl group, ethyldimethyl silyl group, butyldimethyl silyl group, butylmethylethyl silyl group, phenyldimethyl silyl group, phenyldiethyl silyl group, diphenylmethyl silyl group, and diphenylethyl silyl group, etc. Particularly, in the $R^1$–$R^3$ having smaller molecular weight, blocking group is readily unfastened, and preferably reactive.

As such blocking agents which produce such the silyl blocking group (K₁), a halogenated silane can be preferably employed. As halogens contained in the halogenated silane, there are enumerated chlorine atom or bromine atom, etc.

As specific blocking agents, for example, there are enumerated trimethyl silyl chloride, diethylmethyl silyl chloride, ethyldimethyl silyl chloride, butyldimethyl silyl bromide, and butylmethylethyl silyl bromide, etc.

As the vinylether blocking group (K₂), there is exemplified the following vinylether blocking group shown by formula (8) described below.

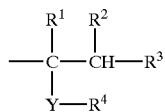

(8)

In the above formula (8), $R^1$–$R^3$ are independently a hydrogen atom or a hydrocarbon group having a carbon atom number of 1–18. $R^4$ is a hydrocarbon group having a carbon atom number of 1–18. Y is an oxygen atom or sulphur atom. Further, $R^3$ and $R^4$ may be mutually connected, and there may be formed a heterocyclic ring containing the Y as a hetero atom.

As the hydrocarbon atom in the above formula, there are enumerated an alkyl group, a cycloalkyl group, and an aryl group.

As the alkyl group, for example, there is particularly preferred a lower alkyl group having a carbon atom number of 1–8 such as methyl group, ethyl group, propyl group, butyl group, s-butyl group, t-butyl group, pentyl group, and hexyl group. As the cycloalkyl group, for example, there are enumerated cyclopentyl group and cyclohexyl group, etc. As the aryl group, there are included phenyl group, naphtyl group, and anthrathene group, etc. which may have a substituent group, and phenyl group is particularly preferred.

Such the vinylether blocking group (K₂) can be formed by allowing to react an aliphatic vinylether or thioether, or a cyclic vinylether, or thioether with hydroxyl group in carboxylic group.

As the aliphatic vinylether, for example, there are enumerated methylvinylether, ethylvinylether, isopropyl vinylether, n-propylvinylether, isobutylvinylether, 2-ethylhexylvinylether, cyclohexylvinylether, or a vinylthioether corresponding thereto.

As the cyclic vinylether, for example, there are enumerated 2,3-dihydrofran, 3,4-dihydrofran, 2,3-dihydro-2H-pyran, 3,4-dihydro-2H-pyran, 3,4-dihydro-2-methoxy-2H-pyran, 3,4-dihydro-4,4'-dimethyl-2H-pyran-2-on, 3,4-dihydro-2-ethoxy-2H-pyran, and 3,4-dihydro-2H-pyran-2-sodium carboxylate, etc.

As an epoxy group which is a second functional group, a nonalicyclic epoxy group and an alicyclic epoxy group are included.

As the nonalicyclic epoxy group, for example, there is exemplified a group in which an epoxy bond by oxygen atom is formed between carbon atoms in an alkyl group such as 1,2-epoxy group and 1,3-epoxy group. As the alicyclic epoxy group, for example, there is exemplified a group in which oxygen atom forms an epoxy bond between carbon atoms which are adjacent to a ring in a 5- or 6-membered ring (there is also included a hydrocarbon having a bridge). Of those, the nonalicyclic epoxy group is more preferably employed than the alicyclic epoxy group in a practical use.

In resins to be employed in the present invention, the above-described first and second functional groups may even exist in an identical resin, or in individual resins, respectively. Carboxylic group produces a secondary hydroxyl group in addition to the formation of an ester bond by reacting with an epoxy group.

Further, a blocked carboxylic group produces a free carboxylic group by disconnection of a blocked group, and the same reaction is caused as the above descriptions. In the curable resin composition of the present invention, a crosslinking (curing) reaction is caused and a resin is formed by a mutual reaction in such the functional groups.

I-4. <Polyepoxide (IX-B)>

Polyepoxide (IX-B) which is another constructing component in the curable resin composition of the present invention, if it is a compound having at least two pieces of epoxy groups on an average in the molecule, preferably 2–10 pieces, and more preferably 3–8 pieces, is not particularly limited.

For example, there are enumerated glycidylethers (B₁) of a polyvalent alcohol and glycidylesters (B₂) of a polybasic acid.

As an example of the glycidylethers (B₁) of a polyvalent alcohol, there are enumerated glycerine triglycidylether, trimethylolpropane triglycidylether, pentaerythyritol tetraglycidylether, and sorbitol hexaglycidylether, etc.

Further, as an example of the glycidylesters (B₂) of a polybasic acid, there is enumerated a glycidylester of hexahydrophthalic acid.

Polyepoxide (B') which is preferably employed in the present invention is an acrylic polyepoxide (B') which is obtained by copolymerization of 10–60% by weight, and preferably 15–50% by weight of an ethylenic unsaturated monomer (e) containing an epoxy group with 40–90% by weight, and preferably 50–80% by weight of an ethylenic unsaturated monomer (h) not containing an epoxy group.

In the case that the ethylenic unsaturated monomer (e) containing an epoxy group is not more than 10% by weight, curability is short and, in the case of more than 60% by weight, a resin becomes too hard and weatherability becomes short.

As the ethylenic unsaturated monomer (e) containing an epoxy group, for example, there are enumerated glycidyl (meth)acrylate, β-methylglycidyl(meth)acrylate, and 3,4-epoxycyclohexenyl (meth)acrylate, etc. In order to prepare a coating composition which is well-balanced between curability and storage stability, glycidyl(meth)acrylate is preferably employed.

As the ethylenic unsaturated monomer (h) not containing an epoxy group, there are enumerated monomers described hereinabove as the ethylenic unsaturated monomer ($d_1$) not containing an acid anhydride group in order to prepare the polymer (A3) containing acid anhydride groups. Copolymerization can be also likewise conducted as described hereinabove.

In the acrylic polyepoxide (B') obtained, a number average molecular weight is 200–10000, preferably 500–8000, and more preferably 800–5000. In the case that the number average molecular weight is less than 200, curability lowers in a coating layer obtained and, in the case of exceeding 10000, solid component lowers in a coating. Further, an epoxy equivalent is 50–700, preferably 80–600, and more preferably 100–500. In the case that the epoxy equivalent is more than the maximum value, curability becomes unpreferably insufficient in a coating composition.

Further, in the case that it is less than the minimum value, a coating layer becomes unpreferably too hard and brittle.

Further, in order to prepare the ethylenic unsaturated monomer ($d_1$) not containing an acid anhydride group, the ethylenic unsaturated monomer ($d_3$) containing hydroxyl group can be employed as the ethylenic unsaturated monomer (h) not containing an epoxy group.

Particularly, in the case that the ethylenic unsaturated monomer ($d_3$) containing hydroxyl group is employed as the ethylenic unsaturated monomer (h) not containing an epoxy group, adhesion and a recoating property, etc. are elevated in a coating layer obtained. Still further, since an acrylic polyepoxide having hydroxy group and epoxy group obtained by employing the ethylenic unsaturated monomer ($d_3$) containing hydroxyl group as the ethylenic unsaturated monomer (h) not containing an epoxy group, as described hereinafter, reacts and connects with an acrylic polycarboxylic acid (A') having carboxylic groups and carboxylate groups at both functional groups which are hydroxyl groups and carboxylic groups, a stronger coating layer can be obtained.

In the acrylic polyepoxide (B') obtained, a hydroxyl value is 5–300 mgKOH/g solid, preferably 10–200 mgKOH/g solid, and more preferably 15–150 mgKOH/g solid. In the case that the hydroxyl value exceeds 300 mgKOH/g solid, solid components lower in a coating and water resistance is insufficient in a cured coating layer and, in the case of less than 5 mgKOH/g solid, adhesion is poor.

A particularly preferred polyepoxide (B") to be employed in the present invention is obtained by copolymerization of (i) 5–70% by weight of the ethylenic unsaturated monomer ($d_3$) containing hydroxyl group which has the organic chain shown by the general formula (4) or the organic chain shown by the general formula (6), (ii) 10–60% by weight of the ethylenic unsaturated monomer (e) containing an epoxy group, and optionally, (iii) 0–85% by weight of the ethylenic unsaturated monomer ($d_4$) not simultaneously containing hydroxyl group and epoxy group.

In the case, the polyepoxide (B") having hydroxyl group and an epoxy group has preferably 2–12 pieces, more preferably 3–10 pieces of epoxy groups on an average and preferably 0.5–10 pieces, more preferably 1–8 pieces of hydroxyl group.

The polyepoxide (B") component can be formulated in an amount of 10–80% by weight, preferably 20–70% by weight, and more preferably 30–65% by weight based on total solid of the curable resin composition. In the case that the amount of the polyepoxide (B") is less than 10% by weight, curability lowers in a coating layer obtained and, in the case of exceeding 80% by weight, yellowing resistance becomes worse.

I-5. <Anti Oxidant (I-C)>

Usually, a hydrocarbon-based polymer suffers an oxidizing deterioration such as heat, light, oxygen, and mechanical shear force during preparation, processing, and using. It is known that the oxidizing deterioration depends upon an action of a self-oxidizing mechanism which is a radical continuous chain reaction.

An antioxidant for preventing the oxidizing deterioration of a polymer is classified into a radical continuous chain inhibitor (a primary antioxidant) such as a phenol-based antioxidant and an amine-based antioxidant, and a peroxide decomposing agent (a secondary antioxidant) such as a phosphorus-based antioxidant and a sulphur-based antioxidant.

The anti oxidant (IX-C) to be employed in the curable resin composition of the present invention is a phenol-based antioxidant ($C_1$), a phosphite-based antioxidant ($C_2$), and a thioether-based antioxidant ($C_3$). Any one of those may be even employed solely, and two or more kinds thereof are effectively employed in combination for an anti-yellowing property because of different anti-oxidizing mechanisms in the respective antioxidants.

The phenol-based antioxidant ($C_1$) is preferably employed in combination with the phosphite-based antioxidant ($C_2$) or the thioether-based antioxidant ($C_3$). By employing the phenol-based antioxidant ($C_1$) in combination with the phosphite-based antioxidant ($C_2$), an anti-yellowing property is particularly preferably improved.

The phenol-based antioxidant ($C_1$) preferably has a highly massive and bulky substituent group such as, for example, t-butyl group at an ortho position of a phenol. Because, there is not apt to be caused a chain transferring of a free radical caught, and stability increases. More preferably, there is enumerated one having a bulky substituent group at both ortho positions.

As the phenol-based antioxidant ($C_1$), there are enumerated 2,6-di-t-butylphenol, 2,4-di-t-butylphenol, 2-t-butyl-4,6-di-methyl-phenol, 2,6-di-t-butyl-4-methylphenol, 2,6-di-t-butyl-4-ethylphenol, 2,4,6-tri-t-butylphenol, 2,6-di-t-butyl-4-hydroxymethylphenol, 2,6-di-t-butyl-2-dimethylamino-p-cresol, n-octadecyl-3-(3',5'-di-t-butyl-4-hydroxyphenyl) propionate, styrenatephenol, 2,2'-methylene-bis-(4-methyl-6-t-butylphenol), 2,2'-methylene-bis-(6-cyclohexyl-4-methylphenol), 2,2'-butylidene-bis-(2-t-butyl-4-methylphenol), 4,4'-methylene-bis-(2,6-di-t-butylphenol), 1,6-hexanediol-bis-[3-(3,5-di-t-butyl-4-hydroxyphenyl) propionate], tris(3,5-di-t-butyl-4-hydroxybenzyl) isocyanurate, tetrakis-[methylene-3-(3',5'-di-t-butyl-4'-hydroxyphenyl)propionate]methane, 1,1,3-tris-(2-methyl-4-hydroxy-5-t-butylphenyl)butane, and 3,9-bis[1,1-di-methyl-2-{-(3-t-butyl-4-hydroxy-5-methylphenyl) propionyloxy}ethyl]-2,4,8,10-tetraoxaspyro[5,5]undecane, etc.

Preferred phenol-based antioxidant ($C_1$) are 2,6-di-t-butylphenol, 2-t-butyl-4,6-di-methyl-phenol, 2,6-di-t-butyl-4-methylphenol, 2,6-di-t-butyl-4-ethylphenol, 2,4,6-tri-t-butylphenol, styrenatephenol, 2,2'-methylene-bis-(4-methyl-6-t-butylphenol), 2,2'-methylene-bis-(6-cyclohexyl-4-methylphenol), 4,4'-methylene-bis-(2,6-di-t-butylphenol), and tetrakis-[methylene-3-(3',5'-di-t-butyl-4'-hydroxyphenyl)propionate]methane, etc.

As commercially supplied phenol-based antioxidant ($C_1$), for example, there are enumerated Sumilizer (Sumilizer) BHT, Sumilizer-S, Sumilizer-BP-76, Sumilizer-MD-PS, Sumilizer-BP-101, Sumilizer-GA-80, Sumilizer-BBM-S, Sumilizer-WX-R, Sumilizer-MW, Sumilizer-GM, and Sumilizer-GS which are manufactured by Sumitomo Kagaku, Ltd., and Adekastab AO–20, Adekastab AO–30, Adekastab AO–40, Adekastab AO–50, Adekastab AO–60, Adekastab AO–75, Adekastab AO–80, Adekastab AO–330, Adekastab AO–616, Adekastab AO–635, Adekastab AO–658, Adekastab AO–15, Adekastab AO–18, Adekastab 328, and Adekastab 37, etc. which are manufactured by Asahi Denka, Ltd.

As the phosphite-based antioxidant ($C_2$), for example, tris(isodecyl)phosphite, tris(tridecyl)phosphite, phenyldiisodecyl phosphite, diphenylisooctyl phosphite, triphenyl phosphite, tris(nonylphenyl)phosphite, 4,4'-isopropylidene-diphenolalkyl phosphite, tris(mono- and di-mixed nonylphenyl)phosphite, tris(2,4-di-t-butylphenyl)phosphite, distearylpentaerythritol diphosphite, di(2,4-di-t-butylphenyl)pentaerythritol diphosphite, di(nonylphenyl) pentaerythritol diphosphite, phenyl-bisphenol A pentaerythritol diphosphite, tetratridecyl-4,4'-butylidenebis-(3-methyl-6-t-butylphenol)-di-phosphite, and hexatridecyl 1,1,3-tris(2-methyl-4-hydroxy-5-t-butylphenyl)butanetriphosphite, etc.

Preferred phosphite-based antioxidant ($C_2$) are tris (isodecyl)phosphite, phenyldiisodecyl phosphite, diphenylisooctyl phosphite, triphenyl phosphite, distearylpentaerythritol diphosphite, di(nonylphenyl)pentaerythritol diphosphite, phenyl-bisphenol A pentaerythritol diphosphite, and tetratridecyl-4,4'-butylidenebis-(3-methyl-6-t-butylphenol)-di-phosphite, etc.

As commercially supplied phosphite-based antioxidant ($C_2$), for example, there are enumerated Sumilizer TMP, and Sumilizer TPP-R, Sumilizer P-16 which are manufactured by Sumitomo Kagaku, Ltd., and Adekastab PEP-2, Adekastab PEP-4C, Adekastab PEP-8, Adekastab PEP-8F, Adekastab PEP-8W, Adekastab PEP-11C, Adekastab PEP-24G, Adekastab PEP-36, Adekastab HP-10, Adekastab 2112, Adekastab 260, Adekastab P, Adekastab QL, Adekastab 522A, and Adekastab 329K, Adekastab 1178, Adekastab 1500, Adekastab C, Adekastab 135A, Adekastab 517, Adekastab 3010, and Adekastab TPP, etc. which are manufactured by Asahi Denka, Ltd.

As the thioether-based antioxidant ($C_3$), for example, there are enumerated dilauryl-3,3'-thiodipropionate, ditridecyl-3,3'-thiodipropionate, dimylistyl-3,3'-thiodipropionate, distearyl-3,3'-thiodipropionate, bis(2-methyl-4-{3-n-alkylthiopropionyloxy}-5-t-butylphenyl) sulphide, pentaerythritol-tetrakis-($\beta$-lauryl-thiopropionate), and 2-mercaptobenzimidazole, etc.

As commercially supplied thioether-based antioxidant ($C_3$), for example, there are enumerated Sumilizer TPL-R, Sumilizer TPM, Sumilizer TPS, Sumilizer TP-D, Sumilizer TL, and Sumilizer MB which are manufactured by Sumitomo Kagaku, Ltd., and Adekastab AO–23, Adekastab AO–412S, and Adekastab AO–503A, etc. which are manufactured by Asahi Denka, Ltd.

The antioxidant (IX-C) is formulated in a proportion of 0.1–10% by weight, preferably 0.5–8% by weight, and more preferably 1–7% by weight based on total solid components in the curable resin composition [A'+(IX-B)+(IX-C)]. In the case that the amount of the antioxidant is less than 0.1% by weight, yellowing is remarkably observed in baking and, in the case of exceeding 10% by weight, curability lowers in a coating layer.

II. <Curable Resin Composition>
II-1. <Formulation of the Curable Resin Composition>

The curable resin composition of the present invention is obtained by formulating the acrylic polycarboxylic acid resin (A') and the polyepoxide (IX-B), or the acrylic polycarboxylic acid resin (A'), the polyepoxide (IX-B), and the antioxidant (IX-C).

Formulation of the acrylic polycarboxylic acid resin (A'), the polyepoxide (IX-B), and the antioxidant (IX-C) can be readily conducted in an amount and method well known by a skilled person in the art. Particularly, in the case of using an acrylic polycarboxylic acid resin (A*') having carboxylic groups and carboxylate groups, and a polyepoxide (B') having hydroxyl group and an epoxy group as a polyepoxide, there can be obtained a curable resin composition having a high solid content which can provide a coating layer having an excellent acid resistance.

In the case, the formulation is conducted in a molar ratio of the carboxylic groups contained in the acrylic polycarboxylic acid resin (A*') with respect to the epoxy group contained in the polyepoxide (B') of 1/1.2-1/0.6, and preferably 1/1.0-1/0.8, and molar ratio of the carboxylate groups contained in the acrylic polycarboxylic acid resin (A*') with respect to the hydroxyl group contained in the polyepoxide (B') of 1/1.5-1/0.2, preferably 1/1.2-1/0.25, and more preferably 1/1-1/0.3.

In the case that the molar ratio of the carboxylic groups contained in the resin (A*') with respect to the epoxy group contained in the polyepoxide (B') is less than 1/1.2, a coating layer yellows and, in the case of exceeding 1/0.6, curability lowers in a resin composition obtained. In the case that the molar ratio of the carboxylate groups contained in the resin (A*') with respect to the hydroxyl group contained in the polyepoxide (B') is less than 1/1.5, water resistance lowers because of excessive hydroxyl groups and, in the case of exceeding 1/0.2, curability lowers in a resin composition obtained. The formulating amount can be calculated from a hydroxyl value, acid value, and epoxy equivalent of resins according to a calculating method well known by a skilled person in the art.

In thus-obtained curable resin composition of the present invention, a curing mechanism is as follows. First of all, the carboxylic group react with the carboxylate groups in the acrylic polycarboxylic resin (A') or the resin (A*') by heating to form acid anhydride groups in a polymer, and a free monoalcohol is produced. The monoalcohol produced is removed out of a system by evaporation. The acid anhydride groups produced in a polymer form again carboxylic groups by forming crosslinking points through a reaction with the hydroxyl groups contained in the polyepoxide (IX-B). The carboxylic groups form crosslinking points by a reaction with the epoxy groups in the polyepoxide (IX-B). As described hereinabove, a high crosslinking density can be provided by an advance of a curing.

II-2. <Polyester Polycarboxylic Acid>

In addition to the above-described essential components, there can be optionally formulated a binder component such as a polyester polycarboxylic acid (IX-D) into the curable resin composition of the present invention. It is effective for elevating a solid content in a coating layer obtained.

The polyester polycarboxylic acid (IX-D) to be employed in the curable resin composition of the present invention is obtained by a half-esterification reaction of a polyester polyol (k) having at least three hydroxyl groups with an acid anhydride.

In the present invention, the polyester polyol (k) means a polyvalent alcohol having at least one ester bond chain, and preferably at least two ester bond chains.

The polyester polycarboxylic acid (IX-D) to be employed in the curable resin composition of the present invention has an acid value of 50–350 mgKOH/g solid, preferably 100–300 mgKOH/g solid, and more preferably 150–250 mgKOH/g solid, a number average molecular weight of 400–3500, preferably 500–2500, and more preferably 700–2000, and weight average molecular weight/number average molecular weight of not more than 1.8, preferably not more than 1.5, and more preferably not more than 1.35.

In the case that the acid value exceeds 350 mgKOH/g solid, polymer viscosity becomes too high, resulting in that concentration of solid components lowers and, in the case that the acid value is less than 50 mgKOH/g solid, curability is short in a coating layer.

In the case that the molecular weight exceeds 3,500, polymer viscosity becomes too high, resulting in that handling becomes difficult and concentration of solid components lowers in a coating composition and, in the case that the molecular weight is less than 400, curability is short in a coating layer or water resistance lowers in a coating layer. In the case that the weight average molecular weight/number average molecular weight exceeds 1.8, water resistance lowers or weatherability lowers in a coating layer.

Further, the polyester polycarboxylic acid (IX-D) may even have a hydroxyl value of not more than 150 mgKOH/g solid, preferably 5–100 mgKOH/g solid, and more preferably 10–80 mgKOH/g solid, whereby, adhesion elevates in a coating layer obtained. In the case that the hydroxyl value exceeds 150 mgKOH/g solid, water resistance lowers in a coating layer.

Half-esterification can be conducted by same operations using the above-described acid anhydride for preparing the ethylenic unsaturated monomer having carboxylic group to be employed as the ethylenic unsaturated monomer ($d_1$) not having an acid anhydride group. However, the hydroxyl groups may be even remained without necessity of changing all the hydroxyl groups in the polyester polyol (k) to carboxylic groups. The polyester polycarboxylic acid ($D_1$) having hydroxyl groups provides a coating layer having an excellent adhesion such as a recoating property compared to the polyester polycarboxylic acid ($D_2$) not having hydroxyl group.

Further, since the polyester polycarboxylic acid ($D_3$) having hydroxyl groups and carboxylic groups, as described hereinafter, can react and connect to both of the polyepoxide (B') and the acrylic polycarboxylic acid resin (A'), there can be obtained a tough coating layer.

There is preferred one having not less than 0.1 piece of hydroxyl groups on an average in the molecule.

In general, mol amount of acid anhydride groups with respect to mol amount of OH groups in the polyester polyol (k) is desirably controlled in 0.2–1.0 times and, particularly 0.5–0.9 times. In the case that the mol amount of acid anhydride groups with respect to mol amount of OH groups is less than 0.2, curability is short in a coating layer.

The polyester polyol (k) to be employed herein provides a polyester polycarboxylic acid (D) having at least two acid-functional groups in the molecule and the above-described characteristics by reacting with an acid anhydride.

In general, such the polyester polyol (k) is prepared by condensation of a low molecular weight polyvalent alcohol having at least three hydroxyl groups and a carbon number of 3–16 with a linear aliphatic dicarboxylic acid. By introducing a linear aliphatic group into the low molecular weight polyvalent alcohol, flexibility is given in a coating layer obtained, whereby, impact resistance elevates.

As the low molecular weight polyvalent alcohol to be employed, there are enumerated trimethylol propane, trimethylol ethane, 1,2,4-butanetriol, ditrimethylol propane, pentaerythritol, dipentaerythritol, glycerine, and a mixture thereof.

As the dicarboxylic acid, there are enumerated a dibasic acid such as phthalic acid, isophthalic acid, terephthalic acid, succinic acid, adipic acid, azelaic acid, sebasic acid, tetrahydrophthalic acid, hexahydrophthalic acid, maleic acid, fumaric acid, and a mixture thereof. Further, there can be employed an acid anhydride such as succinic anhydride, phthalic anhydride, tetrahydrophthalic anhydride, hexahydrophthalic anhydride, hymic anhydride, trimellitic anhydride, methylcyclohexene tricarboxylic anhydride, pyromellitic anhydride, and a mixture thereof.

The polyester polyol (k) is synthesized by a usual esterification reaction. That is, it is polyesterized by a dehydrating condensation reaction of a polyvalent alcohol with a polybasic acid, an esterification of a polyvalent alcohol with an acid anhydride and then a dehydrating reaction with an alkyl component. By such the operations, an oligomer of a polyester polyol (k) having a relatively low molecular weight, and there is provided a coating composition having a high solid.

A particularly preferred polyester polyol (k) to be employed in the present invention is obtained by chain extending through addition of a lactone compound such as $\epsilon$-caprolactone to a low molecular weight polyvalent alcohol. Since a molecular weight distribution becomes sharp, a coating composition becomes high-solid, and there is obtained a coating layer having an excellent weatherability and water resistance.

As a low molecular weight polyvalent alcohol to be particularly preferably employed in the case, there are enumerated trimethylol propane, ditrimethylol propane, and pentaerythritol, etc.

The lactone compound to be employed in the present invention may be a cyclic compound which produces hydroxyl group at a terminal by ring-opening through reacting with a nucleophilic agent because of the presence of oxygen atom in the ring. A preferred lactone compound has a carbon number of 4–7. Because, it readily causes a ring-opening addition reaction.

As a specific example of the lactone to be preferably employed, already exemplified ones are enumerated, and there are preferably employed $\epsilon$-caprolactone, $\delta$-varelolactone, and $\gamma$-butyrolactone.

Chain extension can be conducted by the same conditions as in a usual ring opening addition reaction. For example, a polyester polyol (k) is obtained by allowing to react at 80–200° C. within 5 hours in an appropriate solvent or the absence of a solvent, which is chain-extended by a low molecular weight polyvalent alcohol. A tin-based catalyst may be even employed.

In the case, a mol amount of the lactone compound is 0.2–10 times, preferably 0.25–5 times, and more preferably 0.3–3 times with respect to a mol amount of OH group in the low molecular weight polyvalent alcohol. In the case that the mol amount of the lactone compound with respect to a mol amount of OH group is less than 0.2 times, a resin becomes hard, and impact resistance lowers in a coating layer and, in the case of exceeding 10 times, hardness lowers in the coating layer.

The polyester polycarboxylic acid (IX-D) component can be formulated within 70% by weight, preferably 5–50% by weight, and more preferably 10–40% by weight based on total solid in the curable resin composition. In the case that amount of the polyester polycarboxylic acid (IX-D) is less than 5% by weight, solid concentration does not increase in a coating and, in the case of exceeding 70% by weight, weatherability lowers in a coating layer obtained.

II-3. <Silicone Polymer (IX-L)>

In the curable resin composition of the present invention, there can be optionally formulated a binder component such as a silicone polymer (IX-L). It is effective for elevating a solid component concentration in a coating layer obtained.

The silicone polymer (IX-L) to be employed in the present invention is, for example, a silicone polymer having an epoxy group and/or an alkoxy group.

As the silicone polymer ($L_1$) having epoxy groups, for example, there is enumerated a "NUC silicone" series manufactured by Nihon Unicar, Ltd.

As the silicone polymer ($L_2$) having alkoxy groups, for example, there is enumerated "KC89-S", etc. manufactured by Shin-etsu Kagaku Kogyo, Ltd.

As the silicone polymer ($L_3$) having epoxy groups and alkoxy groups, for example, there are enumerated "MKC silicate MSEP 2" series manufactured by Mitsubishi Kagaku, Ltd., and a "NUC silicone" series manufactured by Nihon Unicar, Ltd.

A method for the preparation of such the silicone polymers is described in pages 29–30 of Abstracts in Organic Silicone Material Chemical Symposium in 1990. The epoxy group can exist at middle portions or terminals of a linear or cyclic hydrocarbon chain.

In the present invention, an epoxy equivalent represents g-number of a compound containing 1 g equivalent of an epoxy group, an alkoxy equivalent represents g-number of a compound containing 1 g equivalent of an alkoxy group, and a hydroxyl group equivalent represents g-number of a compound containing 1 g equivalent of hydroxyl group.

In the silicone polymer (IX-L), the epoxy equivalent is 100–1500, and the alkoxy equivalent is 50–1500. In the case that the epoxy equivalent is less than 100, storage stability becomes poor in a coating and, in the case of exceeding 1500, curability becomes poor. A range of the epoxy equivalent is preferably 140–1000, and more preferably 180–700. A range of the alkoxy equivalent is preferably 60–800, and more preferably 80–500.

Such the silicone polymer ($L_3$) component having epoxy groups and alkoxy groups can be formulated within 30% by weight based on the total solid weight of the curable resin composition, preferably 3–20% by weight, and more preferably 5–15% by weight.

In the case that an amount of the silicone polymer ($L_3$) component exceeds 30% by weight, storage stability becomes poor in a coating obtained.

In the present invention, a silicone polymer ($L_4$) having hydroxyl groups and carboxylic groups can be employed together with or in place of the silicone polymers ($L_1$, $L_2$, and $L_3$) having epoxy groups and/or alkoxy groups. The silicone polymer ($L_4$) having hydroxyl groups and carboxylic groups is obtained by a half-esterification reaction of a silicone polymer having hydroxyl group with a compound having an acid anhydride group.

In the silicone polymer ($L_4$), a number average molecular weight is 500–6000, and preferably 1000–4500, a hydroxyl group value is 2–120 mgKOH/g solid, and preferably 10–80 mgKOH/g solid, and an acid value is 20–180 mgKOH/g solid, and preferably 35–150 mgKOH/g solid. In the case that the number average molecular weight and hydroxyl group value or acid value exceed maximum value of the ranges, it becomes difficult to prepare a coating having a sufficiently high solid content and, in the case of less than minimum value of the ranges, curability lowers in a coating.

The silicone polymer having hydroxyl groups is commercially supplied, for example, there are enumerated KR-2001 manufactured by Shin-etsu Silicone, Ltd., and NUC silicone series manufactured by Nihon Unicar, Ltd., etc.

The silicone polymer having hydroxyl groups has preferably 3–12 pieces of hydroxyl groups on an average in the molecule. In the case that the hydroxyl groups is less than 3 on an average, curability is short and, in the case of exceeding 12, viscosity becomes high, resulting in that it becomes difficult to increase solid content in the case of preparation of a coating composition.

The compound having an acid anhydride group, if it is a compound which can provide a carboxyl-functional property by reacting with hydroxyl group in usual reaction conditions such as a room temperature to 120° C. and an ordinary pressure, is not particularly limited. By the use of a compound having an acid anhydride group and having a saturated or unsaturated cyclic group of a carbon number of 8–12, compatibility with a resin becomes preferably excellent.

As the compound having an acid anhydride group, for example, there are enumerated hexahydrophthalic anhydride, phthalic anhydride, 4-methylhexahydrophthalic anhydride, tetrahydrophthalic anhydride, and trimellitic anhydride, etc.

Half-esterification reaction of the silicone polymer having hydroxyl group with the compound having an acid anhydride group is conducted according to usual methods, for example, at room temperature to 120° C. for 30 minutes to 8 hours. In the case that the reaction is conducted for a long time of period exceeding 120° C., polyesterization reaction is caused and there is produced a silicone polyester (IX-L) having a high molecular weight. Since such the silicone polyester (IX-L) has a small amount of functional groups and high viscosity, it is not preferred to be employed in the present invention.

Such the silicone polymer ($L_4$) having hydroxyl groups and carboxylic groups can be formulated within 30% by weight based on the total solid weight of the curable resin composition, preferably 3–20% by weight, and more preferably 5–15% by weight. In the case that an amount of the silicone polymer ($L_4$) component exceeds 30% by weight, storage stability becomes poor in a coating obtained.

In the case that the silicone polymer (L3) having epoxy groups and alkoxy groups is employed together with the silicone polymer ($L_4$) having hydroxyl groups and carboxylic groups, total amount is within 30% by weight based on the total solid weight of the curable resin composition, preferably 3–20% by weight, and more preferably 5–15% by weight. In the case that an amount of the silicone polymers ($L_3+L_4$) component exceeds 30% by weight, storage stability becomes poor in a coating obtained.

II-4. <Catalyst for Curing>

In addition to the above-described components, a catalyst for curing (IX-F) is employed in the curable resin composition of the present invention. For example, there may even contain a catalyst for curing ($F_1$) such as a quaternary ammonium salt to be usually employed for an esterification reaction of an acid with an epoxide. As specific examples of other catalyst for curing ($F_2$) to be employed in the curable resin composition of the present invention, there are enumerated benzyltriethyl ammonium chloride or bromide, tetrabutyl ammonium chloride or bromide, salysilate or glycolate, paratoluene sulphonate, nitrate, dibutyl phosphate, di-2-ethylhexyl phosphate, trimethylbenzyl ammonium dibutylphosphate, trimethylcetyl ammonium butylphosphate, octyl trimethyl ammonium dimethylphosphate, and dodecyltrimethyl ammonium diphenylphosphate, etc. These catalysts for curing may be even employed in mixing.

The catalyst for curing (IX-F) can be usually employed in 0.01–3.0% by weight based on the total solid weight of resin composition, preferably 0.1–1.5% by weight, and more preferably 0.4–1.2% by weight. In the case that an amount of the catalyst for curing (IX-F) is less than 0.01% by weight, curability lowers and, in the case of exceeding 3.0% by weight, storage stability lowers.

II-5. <Tin-Based Catalyst (IX-G)>

Further, as described in JP-A-02151651 and JP-A-02279713 Official Gazettes, a tin-based compound may be even employed together therewith. As the tin-based catalyst (IX-G), for example, there are enumerated dimethyltin bis(methylmaleate), dimethyltin bis(ethylmaleate), dimethyltin bis(butylmaleate), and dibutyltin bis(butylmaleate), etc.

The tin-based compound (IX-G) can be usually employed in 0.2–6% by weight based on the total solid weight of resin composition, preferably 0.3–4.0% by weight, and more preferably 0.4–3.0% by weight.

In the case that an amount of the tin-based compound (IX-G) to be employed is less than 0.2% by weight, storage stability lowers and, in the case of exceeding 6% by weight, weatherability lowers.

In the case that the catalyst (IX-F) for curing is employed together with the tin-based catalyst (IX-G), weight ratio of the catalyst (IX-F) for curing with respect to the tin-based catalyst (IX-G) is preferably adjusted to 1/4-1/0.2.

II-6. <Other Additives (H)>

In order to elevate water resistance by elevating crosslinking, a blocked isocyanate may be even added in the curable resin composition of the present invention. Further, in order to improve weatherability in a coating layer, there may be even added an ultraviolet ray absorbent and a hindered amine photostabilizer, and an antioxidant, etc.

Still further, as a rheology controlling agent, a crosslinked resin particles (IX-E) may be added and, in order to control an outer appearance, a surface controlling agent may be even added.

In the case that the crosslinked resin particles (IX-E) are employed, those are added in an amount of 0.01–10 parts by weight, preferably 0.1–5 parts by weight with respect to 100 parts by weight of solid resin of the curable resin composition of the present invention. In the case that the amount of the crosslinked resin particles (IX-E) exceed 10 parts by weight, outer appearance becomes worse and, it is less than 0.01 part by weight, a rheology controlling effect is not obtained.

Further, as a dilution agent in order to control a viscosity, there may be even added an alcohol-based solvent (for example, methanol, ethanol, propanol, and butanol, etc.), a hydrocarbon-based and ester-based solvent, etc.

Still further, the resin to be employed in the present invention has an acid group as a functional group. Accordingly, by neutralization using an amine, it can be also changed to a water-based composition containing water as a medium.

III. <Coating Composition and Preparation of a Coating Layer>

Method for the preparation of the coating composition of the present invention is not particularly limited and, there can be applied all methods which are well known in skilled person in the art.

The coating composition of the present invention can be coated by spray coating, brush coating, immersion coating, roll coating, and flow coating, etc. A substrate may be even optionally under-coated or middle-coated. As an under coating and a middle coating, publicly-known ones can be employed.

The coating composition of the present invention can be advantageously employed for, for example, woods, metals, glass, cloth, plastics, and foams, etc., particularly, surface of the plastics and metals, for example, steels, aluminum, and an alloy thereof. In general, layer thickness changes depending upon desired uses. In many cases, it is useful in 0.5–3 mil.

After coating onto the substrate, coating layer is cured.

A cured coating layer having a high crosslinking degree is obtained at a curing temperature of 100–180° C., preferably 120–160° C. Curing time of period changes depending upon the curing temperature, etc., and it is appropriate in 120° C.–160° C. for 10–30 minutes.

By the curable resin composition in relation to the present invention, a high solid coating can be prepared, and a coating layer derived from the coating is excellent in acid resistance against an acid rain, abrasion resistance, yellowing resistance, and outer appearance, and it is an exceedingly useful composition.

Hereinafter, the present invention X is illustrated in detail.

As a polymerizable unsaturated monomer having carboxylic group to be employed in the present invention, for example, there are enumerated at least one selected from the group consisting of (meth)acrylic acid, itaconic acid, β-(meth)acryloyloxy ethylsuccinate, β-(meth)acryloyloxy ethylmaleate, β-(meth)acryloyloxy ethylphthalate, maleic acid, a monoalkylmaleate (a carbon number of 1–12 in the alkyl group), tetrahydrophthalic acid, and an anhydride thereof. Of those, acrylic acid and methacrylic acid are particularly preferred.

The present invention is comprised a composition obtained by allowing to react in a reaction molar ratio of a radical polymerizable unsaturated monomer having carboxylic group of more than 1 in the case of preparing a lactone-modified radically polymerizable unsaturated monomer having carboxylic group by ring-opening polymerization of a lactone with the radically polymerizable unsaturated monomer having carboxylic group. In more detail, it is comprised a composition obtained by allowing to react the lactone with the polymerizable unsaturated monomer having carboxylic group at a temperature of approximately 80° C. to approximately 140° C. in an atmosphere containing oxygen under the presence of a catalyst less than 1000 ppm and an inhibitor less than 1000 ppm in order to prevent a polymerization of the polymerizable unsaturated monomer having carboxylic group.

Use amount of ε-caprolactone with respect to the radically polymerizable unsaturated monomer having carboxylic group is decided depending upon a molecular weight of a desired product, and it is particularly affected by an amount of the catalyst, a kind of a solvent, and an amount of the solvent. In order to reduce a lactone continuous chain, it is allowed to react with respect to not less than 0.3 mol and not more than 1 mol, preferably 0.35–1 mol, and more preferably 0.5–0.75 mol with respect to 1 mol of the radically polymerizable unsaturated monomer having carboxylic group. In the case that the reaction amount of the lactone is more than 1 mol, the lactone continuous chain becomes large and, in the case that it is employed, for example, as a raw material for a coating, although curing reactivity and flexibility become good, hardness and acid resistance lower in a cured article. Further, in the case of less than 0.35, abrasion resistance becomes worse.

As a catalyst to be employed in Nos. 15–16 of the present invention X, for example, there are enumerated a Lewis acid such as aluminum chloride and stannous chloride, a Br nsted acid such as sulfuric acid, p-toluene sulphonate, benzene sulphonate, and a sulfonic acid-type ion-exchange resin, and there are preferred sulfuric acid, p-toluene sulphonate, and benzene sulphonate, since these are soluble in reaction liquid.

Use amount of the catalyst is preferably 0.1–50 parts by weight, and more preferably 0.1–20 parts by weight with respect to 100 parts by weight of the polymerizable unsaturated monomer having carboxylic group. In the case of employing the sulfonic acid-type ion-exchange resin, a large amount is required compared to sulfuric acid and p-toluene sulphonate.

As a catalyst to be employed in Nos. 15–16 of the present invention, although there have been conventionally employed aluminum chloride, stannous chloride, sulfuric acid, p-toluene sulphonate, benzene sulphonate, and the sulfonic acid-type ion-exchange resin, etc., even though intending to allow to add $\epsilon$-caprolactone at a high temperature, since (meth)acrylic acid itself thermally-polymerizes, it is difficult to obtain a desired product, or there is observed discoloration of a product. At a low temperature, event though being capable of preventing a polymerization of acrylic acid itself, a ring-opening reaction rate of $\epsilon$-caprolactone is very slow.

In the present invention, there is desirably employed a catalyst having a strong catalytic activity by which a reaction sufficiently proceeds at a low temperature such as 80–130° C. and a small amount of the catalyst, and discoloration is low in a product obtained. From such a viewpoint, there are employed stannic chloride, monobutyltin tris-2-eyhylhexanoate, stannic octoate, and dibutyltin dilaurate, etc. Of those, discoloration can be decreased by the use of monobutyltin tris-2-eyhylhexanoate, and concentration of a catalyst can be increased, and it is very excellent in a viewpoint of shortening of a reaction time of period.

Addition amount of the catalyst is 1–1000 ppm, and preferably 10–500 ppm.

By the use of the catalyst, there can become prepared a polyester unsaturated monomer composition modified by a small amount of lactones in which lactone continuous chains are decreased, and which is useful for preparing a polyester unsaturated monomer composition modified by a small amount of lactone. In contrast of a decrease of the lactone continuous chains, although there are remained unreacted polymerizable unsaturated monomers having carboxylic groups, since the unreacted polymerizable unsaturated monomers having carboxylic groups are often employed solely, if it is within 50 wt %, even mixed monomers can be often employed.

However, in the case that 1 mol of the lactone is added to 1 mol of the polymerizable unsaturated monomers having carboxylic groups, a reaction product is the compound represented by the above-described formula (1).

In a reaction composition, there are statistically distributed an unreacted substance having n=0 and polylactones having n=1, 2, 3, 4, 5 . . . . Herein, n is preferably not more than 2 and, an average value of n in the composition is not less than 0.3 and less than 1.0.

However, since it is difficult to industrially separate and refine those, in order to decrease products having not less than 2 continuous chains, a feeding amount for reaction of the lactone such as $\epsilon$-caprolactone is decreased to not more than 1 mol with respect to 1 mol of the polymerizable unsaturated monomers having carboxylic groups.

As the lactone monomers, there is preferred a lactone having 5, 6, 7, and 8-membered ring, for example, $\epsilon$-caprolactone and/or varelolactone, etc. are enumerated. Further, in the case that $\epsilon$-caprolactone is employed as the lactones, other cyclic lactones such as trimethylcaprolactone and varelolactone can be also partially employed in addition to $\epsilon$-caprolactone.

The polyester unsaturated monomer composition modified by a small amount of lactones in relation to the present invention Nos. 15–16 is obtained by separating and removing unreacted (meth)acrylic acid from a reaction mass. As a method for separating and removing the unreacted (meth) acrylic acid, there are enumerated distilling separation, neutralizing separation (further, water washing may be also conducted) by a basic substance, and ion-exchanging separation, etc.

As solvents to be employed in the present invention, there are enumerated solvents which do not react with the catalysts, the lactones, and the polymerizable unsaturated monomers having carboxylic groups, and which include aromatic hydrocarbons such as benzene, toluene, and xylene. Further, it can be also prepared even in the absence of the solvents.

There is specifically illustrated below a method for the preparation of the polyester unsaturated monomer composition modified by a small amount of lactones of the present invention, in which the reaction is conducted by collectively or continuously adding the lactones under the presence of 0.01–1% by weight, preferably 0.03–0.5% by weight of the catalysts and, optionally, a polymerization inhibitor such as hydroquinone, hydroquinone monomethylether, BHT, and phenothiazine at a reaction temperature of 40–150° C., and preferably 60–150° C. based on 100 parts of the radically polymerizable unsaturated monomer having carboxylic group.

The solvents can be employed in concentration of, for example, 0–95% by weight (amount of solvents) in a reaction liquid.

In the polyester unsaturated monomer composition modified by a small amount of lactones prepared by the above-described method for the preparation of the present invention, residual amount of the lactones is 0–10% by weight (hereinafter, GPC area %), content of the polyester unsaturated monomer modified by a small amount of lactones is not less than 20% by weight and not more than 50% by weight, content of a di(meth)acrylate which is a by-product is not more than 2% by weight, content of other by-products prepared by Michaels addition, acrylic polymerization, esterification or other side reactions is not more than 10% by weight, content of the catalysts is less than 1000 ppm, and content of the polymerization inhibitors is not more than 1%.

The polyester unsaturated monomer composition modified by a small amount of lactones of the present invention can provide an acrylic polyol resin having an excellent reactivity with a crosslinking agent and rich flexibility by allowing to copolymerize with other radically polymerizable monomers. Further, it is useful for synthesizing a flexible multifunctional (meth)acrylate containing urethane bonds by allowing to react with polyisocyanates. Products prepared by the present invention can be utilized, in addition to the above-mentioned coating, as a material for a photocurable resin, a reactive diluent for the photocurable resin, a flexibility agent for AS and ABS resins, an acrylic resin, a pressure sensitive adhesive, a flexible lens for a glass, an acrylic emulsion (particularly, a reaction type), a flexible reactive diluent for an unsaturated polyester resin instead of styrene, and a polymerizable polyurethane elastomer, etc.

As the other radically polymerizable monomers to be copolymerized with the polyester unsaturated monomer composition modified by a small amount of lactones of the present invention, there are enumerated an isocyanate group-contained unsaturated monomer, a polymerizable monomer containing an active hydrogen, and other polymerizable unsaturated monomers.

As the other polymerizable unsaturated monomers, the following ones are enumerated.

As (meth)acrylates, for example, there are enumerated alkyl or cycloalkyl(meth)acrylates having a carbon number of 1–20 such as methyl(meth)acrylate, ethyl(meth)acrylate, propyl(meth)acrylate, butyl(meth)acrylate, 2-ethylhexyl (meth)acrylate, octyl(meth)acrylate, lauryl(meth)acrylate, cyclohexyl(meth)acrylate, isobonyl(meth)acrylate, adamantyl(meth)acrylate; and alkoxyalkyl(meth)acrylates having a carbon number of 2–8 such as methoxybutyl(meth) acrylate, methoxyethyl(meth)acrylate, and ethoxybutyl (meth)acrylate.

As monomers other than the (meth)acrylates, for example, there are enumerated glycidyl(meth)acrylate; styrene, -methylstyrene, vinyltoluene, (meth)acrylonitrile, (meth) acrolein, butadiene, and isoprene, etc., and these can be employed in mixing.

As a polymerizable monomer containing an active hydrogen, there are enumerated (meth)acrylates containing hydroxyl group, and (meth)acrylates containing amino group, etc., and these can be employed in mixing.

As the (meth)acrylates containing hydroxyl group, there are enumerated hydroxyalkyl(meth)acrylates having a carbon number of 2–8 such as hydroxyethyl(meth)acrylate and hydroxypropyl (meth)acrylate, etc., and these can be employed in mixing.

As the (meth)acrylates containing amino group, for example, there are enumerated an aminoalkyl(meth)acrylate such as dimethylaminoethyl(meth)acrylate and diethylaminoethyl(meth)acrylate; and (meth)acrylamide, etc., and these can be employed in mixing.

As monomers containing isocyanate group, for example, there are enumerated isocyanateethyl(meth)acrylate, isocyanatepropyl (meth)acrylate, isocyanatebutyl(meth)acrylate, isocyanatehexyl (meth)acrylate, m-isopropenyl-α,α'-dimethylbenzyl isocyanate, and m-ethylenyl-α,α'-dimethylbenzyl isocyanate, etc., and there is enumerated an unsaturated compound in which a polyisocyanate compound such as hexamethylene diisocyanate is added to the polymerizable monomer containing an active hydrogen such as hydroxyethyl(meth)acrylate, and these can be employed in mixing.

The above-described radically polymerizable monomers can be also employed in mixing, and those are selected depending upon desired physical properties.

The acrylic resin of the present invention is prepared by radical polymerization of the polyester unsaturated monomer modified by a small amount of lactones of the present invention and the above-described radically polymerizable monomers by publicly-known solution polymerization methods under the presence of radical polymerization initiators.

As the radical polymerization initiators, there can be employed a peroxide initiator such as benzoyl peroxide, t-butylhydroperoxide, cumylhydroperoxide, cumenhydroperoxide, t-butylperoxybenzoate, and t-butylperoxy-2-ethylhexanoate, and an azo-based initiator such as azobisisobutyronitrile and azobisdimethylvaleronitrile.

As solvents to be employed in the solution polymerization, for example, there are enumerated benzene, toluene, and xylene; an ester-based solvent such as butyl acetate, ethyl acetate, propyl acetate, and cellosolve acetate; an ether-based solvent such as dioxane and ethyleneglycol dibutylether; and a ketone-based solvent such as methylethylketone and methylisobutylketone, etc, and these can be employed solely or in mixing of two or more kinds.

As a reaction apparatus to be employed in the above-described polymerization, there are preferably employed a reaction vessel equipped with an agitator, a reflux condenser having a tube for drying and a twin-screw extruder.

Polymerization temperature and polymerization time of period depend upon a kind of the polyester unsaturated monomer modified by a small amount of lactones of the present invention and the above-described radically polymerizable monomers, feeding ratio, a kind and amount of the catalysts, and the apparatus, those are not particularly limited, and are appropriately decided depending upon uses of a desired acrylic resin, for example, physical properties in, for example, a coating layer.

There is obtained a unitary compound of the polyester unsaturated monomer modified by a small amount of lactones or a mixture having a different addition mol amount of ε-caprolactone from a reaction solution containing thus-obtained polyester unsaturated monomer modified by a small amount of lactones.

Structure of the polyester unsaturated monomer modified by a small amount of lactones obtained can be identified and confirmed by measurement by an elementary analysis and a GPC analysis, of an acid value and double bond, etc.

According to the present invention, there can be prepared the polyester unsaturated monomer modified by a small amount of lactones having an identical radically polymerizable functional group to a radically polymerizable functional group contained in a radically polymerizable unsaturated monomer having carboxylic group in a short step and readily in an industrial fashion. Since the polyester unsaturated monomer modified by a small amount of lactones obtained has one radically polymerizable unsaturated group, and carboxylic group at a terminal, there can be expected a wide range utilization as a raw material or an intermediate for a thermosetting coating, an adhesive, a crosslinking agent, and an emulsion stabilizer, dispersant, and emulsifier for an emulsion, etc.

Further, in a composition in which the polyester unsaturated monomer modified by a small amount of lactones is employed, tackiness can be removed by elevating Tg of the composition, and it is particularly useful in an electric material field, etc.

EXAMPLES

Hereinafter, although the present invention is illustrated by Examples, the present invention is not limited thereto.

It is to be noted that in the Examples, part and % are all based on the weight so far as particularly being defined.

I and II

Example 1

A four-necked flask equipped with a tube for supplying air, a thermometer, a condenser, and an agitating device was charged with 2446 parts (18.8 mol) of 2-hydroxyethylmethacrylate (2-HEMA), 1610 parts (14.1 mol) of ε-caprolactone (ε-CL), 1.99 part of hydroquinone monomethylether (HQME) which is a polymerization inhibitor, and 0.199 part of stannous chloride ($SnCl_2$) which is a reaction catalyst, followed by allowing to react at 100° C. for 23 hour while streaming air.

Reaction ratio of -caprolactone was 99.4%, and color hue of a reaction product was 20 (APHA).

An excellent acrylic polyol resin was obtained by copolymerization of a lactone-modified 2-hydroxyethylmethacrylate composition obtained with other monomers.

Example 2

A four-necked flask equipped with a tube for supplying air, a thermometer, a condenser, and an agitating device was charged with 2446 parts (18.8 mol) of 2-hydroxyethylmethacrylate (2-HEMA), 1610 parts (14.1 mol) of ε-caprolactone (ε-CL), 1.99 part of hydroquinone monomethylether (HQME) which is a polymerization inhibitor, and 0.795 part of monobutyltin tris-2-ethylhexanate which is a reaction catalyst, followed by allowing to react at 100° C. for 6.5 hour while streaming air. Reaction ratio of ε-caprolactone was 99.3% (cf. Table 2), and color hue of a reaction product was 20 (APHA).

An excellent acrylic polyol resin was obtained by copolymerization of a lactone-modified 2-hydroxyethylmethacrylate composition obtained with other monomers (cf. Example 5).

Example 3

A four-necked flask equipped with an tube for supplying air, a thermometer, a condenser, and an agitating device was charged with 2446 parts (18.8 mol) of 2-hydroxyethylmethacrylate (2-HEMA), 1073 parts (9.4 mol) of ε-caprolactone (ε-CL), 1.72 part of hydroquinone monomethylether (HQME) which is a polymerization inhibitor, and 0.690 part of monobutyltin tris-2-ethylhexanate which is a reaction catalyst, followed by allowing to react at 100° C. for 7 hour while streaming air. Reaction ratio of ε-caprolactone was 99.6%, and color hue of a reaction product was 30 (APHA).

An excellent acrylic polyol resin was obtained by copolymerization of a lactone-modified 2-hydroxyethylmethacrylate composition obtained with other monomers (cf. Example 6).

Example 4

The same apparatus as in the Example 1 was charged with 504 parts (3.8 mol) of 2-hydroxyethylacrylate (2-HEA), 248 parts (2.2 mol) of ε-caprolactone, 0.368 part of hydroquinone monomethylether (HQME) which is a polymerization inhibitor, and 0.148 part of monobutyltin tris-2-ethylhexanate, followed by allowing to react at 100° C. for 7 hour while streaming air. Reaction ratio of ε-caprolactone was 99.3%, and color hue of a reaction product was 25 (APHA).

An excellent acrylic polyol resin was obtained by copolymerization of a composition obtained with other monomers (cf. Example 5).

Comparative Example 1

The same apparatus as in the Example 1 was charged with 2446 parts (18.8 mol) of 2-hydroxyethylmethacrylate, 2146 parts (18.8 mol) of ε-caprolactone, 2.25 part of hydroquinone monomethylether which is a polymerization inhibitor, and 0.900 part of monobutyltin tris-2-ethylhexanate which is a reaction catalyst, followed by allowing to react at 100° C. for 8 hour while streaming air. Reaction ratio of ε-caprolactone was 99.0%, and color hue of a reaction product was 25 (APHA).

An excellent acrylic polyol resin was obtained by copolymerization of a lactone-modified 2-hydroxyethylmethacrylate composition obtained with other monomers (cf. Comparative Example 7).

Comparative Example 2

The same apparatus as in the Example 1 was charged with 799 parts (6.1 mol) of 2-hydroxyethylmethacrylate, 701 parts (6.1 mol) of ε-caprolactone, 0.735 part of hydroquinone monomethylether, and 0.147 part of tetrabutyltitanate (TBT), followed by allowing to react at 100° C. for 64 hour while streaming air. Reaction ratio of -caprolactone was 99.6%, and color hue of a reaction product was 50 (APHA).

It was not able to obtain an acrylic polyol resin by the same copolymerization of a composition obtained with other monomers as in Example 5 because of an increased viscosity during reaction, and then gelation.

Comparative Example 3

The same apparatus as in the Example 1 was charged with 1816 parts (14.0 mol) of 2-hydroxyethylmethacrylate, 3184 parts (27.9 mol) of ε-caprolactone, 2.50 part of hydroquinone monomethylether, and 1.00 part of monobutyltin tris-2-ethylhexanate, followed by allowing to react at 100° C. for 8.5 hour while streaming air, and reaction ratio of ε-caprolactone was 99.2%, and color hue of a reaction product was 25 (APHA).

An excellent acrylic polyol resin was obtained by copolymerization of a lactone-modified 2-hydroxyethylmethacrylate composition obtained with other monomers (cf. Comparative Examples 9 and 10).

Comparative Example 4

The same apparatus as in the Example 1 was charged with 1816 parts (14.0 mol) of 2-hydroxyethylmethacrylate, 4776 parts (41.8 mol) of ε-caprolactone, 3.30 part of hydroquinone monomethylether, and 1.32 part of monobutyltin tris-2-ethylhexanate, followed by allowing to react at 100° C. for 8 hour while streaming air, and reaction ratio of ε-caprolactone was 99.2%, and color hue of a reaction product was 25 (APHA).

An excellent acrylic polyol resin was obtained by copolymerization of a lactone-modified 2-hydroxyethylmethacrylate composition obtained with other monomers (cf. Comparative Example 11).

Comparative Example 5

The same apparatus as in the Example 1 was charged with 1816 parts (14.0 mol) of 2-hydroxyethylmethacrylate, 6364 parts (55.8 mol) of ε-caprolactone, 4.10 part of hydroquinone monomethylether, and 1.64 part of monobutyltin tris-2-ethylhexanate, followed by allowing to react at 100° C. for 8.5 hour while streaming air, and reaction ratio of ε-caprolactone was 99.2%, and color hue of a reaction product was 30 (APHA).

It is to be noted that theoretical addition mol number of ε-caprolactone in the Examples and Comparative Examples is as follows.

Example 1: n=0.75, Example 2: n=0.75, Example 3: n=0.50, Example 4: n=0.50, Comparative Example 1: n=1, Comparative Example 2: n=1, Comparative Example 3: n=2, Comparative Example 4: n=3, Comparative Example 5: n=4

Product having n=0.5, product having n=0.75, product having n=1, product having n=2, and product having n=3 product having n=4 are shown as FM0.5, FM0.75, FM1, FM2, FM3, and FM4, respectively.

It is to be noted that FM shows a methacrylic acid series, and FA shows an acrylic acid series.

Table 1 and FIG. 1 show an ε-caprolactone continuous chain distribution in the compositions obtained from GPC, and % is GPC area %.

TABLE 1

| CLM numbers | 0 (HEMA) | 1 | 2 | 3 | ≧4* | >5 | 0~ ≧ 4 | MV/Mn | ≧2 (%) | ≧3 (%) |
|---|---|---|---|---|---|---|---|---|---|---|
| Reference Example 1 | 27.0 | 36.7 | 24.3 | 9.5 | 2.5 | | 100.0 | 1.27 | 36.3 | 12.0 |
| Reference Example 2 | 26.3 | 36.3 | 24.5 | 9.6 | 3.3 | | 100.0 | 1.24 | 37.4 | 12.9 |
| Reference Example 3 | 38.2 | 38.3 | 17.7 | 4.8 | 1.0 | | 100.0 | 1.21 | 23.5 | 5.8 |
| Reference Example 4 | 35.1 | 39.5 | 19.0 | 5.2 | 1.1 | | 100.0 | 1.22 | 25.4 | 6.4 |
| Reference Comparative Example 1 | 19.9 | 28.3 | 26.9 | 15.4 | 9.5 | | 100.0 | 1.30 | 51.8 | 24.9 |
| Reference Comparative Example 3 | 6.2 | 16.7 | 25.9 | 23.2 | 15.7 | 12.3 | 87.7 | 1.28 | 77.1 | 51.2 |
| Reference Comparative Example 4 | 3.1 | 8.1 | 17.0 | 21.9 | 20.7 | 29.3 | 70.7 | 1.28 | 88.8 | 71.8 |
| Reference Comparative Example 5 | 1.4 | 3.9 | 9.9 | 16.4 | 19.6 | 48.9 | 51.1 | 1.26 | 94.8 | 84.9 |

*In the case that a peak by addition number of CLM of not less than 5 in small and cannot be separated from a peak having number 4, it is shown by 4. In the Comparative Example 2, it was not able to conduct a measurement because of gelation.

Tables 2 and 3 collectively show a reaction composition, reaction conditions, and characteristics of reaction products in the Examples 1–4 and Comparative Examples 1–5.

TABLE 2

| | Reference Example | | | |
|---|---|---|---|---|
| | 1 | 2 | 3 | 4 |
| Reaction Composition | | | | |
| 2-HEMA (mol) | 1 | 1 | 1 | — |
| 2-HEA | — | — | — | 1 |
| ε-CL | 0.75 | 0.75 | 0.5 | 0.5 |
| HQME (ppm) | 500 | 500 | 500 | 500 |
| SnCl₂ (ppm) | 50 | — | — | — |
| MBTTH (ppm) | — | 200 | 200 | 200 |
| TBT (ppm) | — | — | — | — |
| Reaction Conditions | | | | |
| Reaction Temperature (° C.) | 100 | 100 | 100 | 100 |
| Reaction Time of period (hrs) | 23 | 6.5 | 7.0 | 7.0 |
| Characteristics of Reaction Product | | | | |
| ε-CL reaction ratio (%) | 99.4 | 99.3 | 99.6 | 99.3 |
| Hydroxyl group value (mgKOH/g) | 260 | 262 | 296 | 300 |
| Acid value (mgKOH/g) | 3.6 | 3.5 | 4.0 | 3.7 |
| Color Hue (APHA) | 20 | 20 | 30 | 25 |
| Ethyleneglycol dimethacrylate or Ethyleneglycol diacrylate (%) | 0.65 | 0.70 | 0.85 | 1.10 |

[*MBTTH: Monobutyltintris-2-ethylhexanoate]

TABLE 3

| | Reference Comparative Example | | | | |
|---|---|---|---|---|---|
| | 1 | 2 | 3 | 4 | 5 |
| Reaction Composition | | | | | |
| 2-HEMA (mol) | 1 | 1 | 1 | 1 | 1 |
| 2-HEA | — | — | — | — | — |
| ε-CL | 1.0 | 1.0 | 2.0 | 3.0 | 4.0 |
| HQME (ppm) | 500 | 500 | 500 | 500 | 500 |
| SnCl₂ (ppm) | — | — | — | — | — |
| MBTTH (ppm)* | 200 | — | 200 | 200 | 200 |
| TBT (ppm) | — | 100 | — | — | — |
| Reaction Conditions | | | | | |
| Reaction Temperature (° C.) | 100 | 100 | 100 | 100 | 100 |
| Reaction Time of period (hrs) | 8.0 | 6.4 | 8.5 | 8.0 | 8.5 |

TABLE 3-continued

| | Reference Comparative Example | | | | |
|---|---|---|---|---|---|
| | 1 | 2 | 3 | 4 | 5 |
| Characteristics of Reaction Product | | | | | |
| ε-CL reaction ratio (%) | 99.0 | 99.6 | 99.2 | 99.2 | 99.2 |
| Hydroxyl group value (mgKOH/g) | 223 | 225 | 153 | 116 | 94 |
| Acid value (mgKOH/g) | 3.7 | 3.7 | 2.7 | 2.0 | 1.7 |
| Color Hue (APHA) | 25 | 50 | 25 | 25 | 30 |
| Ethyleneglycol dimethacrylate or Ethyleneglycol diacrylate (%) | 0.35 | 3.96 | 0.28 | 0.20 | 0.15 |

Example 5

A four-necked flask equipped with a thermometer, a reflux condenser, a tube for supplying nitrogen gas, and an agitator was charged with 50 parts of butyl acetate, 50 parts of toluene, and 1.0 part of ditertiarybutyl peroxide (DTBPO), followed by elevating a temperature to 115° C. At a period having attained to 115° C., there were added dropwise 17.3 parts of styrene, 17.3 parts of butylmethacrylate, 17.3 parts of butylacrylate, 2.0 parts of methacrylic acid, 46 parts of the ε-caprolactone-modified 2-hydroxyethylmethacrylate composition synthesized in the Example 2, 0 part of 2-hydroxyethylmethacrylate, and 1.0 part of azobisisobutylnitrile over 3 hours, followed by continuing a reaction for 4 hours to obtain an excellent acrylic polyol resin transparent liquid (a-1). Table 4 and Table 5 show composition of raw materials and characteristics of the resin solution, and Table 6 and FIG. 2 show a relationship between feeding ratio of ε-caprolactone/HEMA and a continuous chain distribution of ε-caprolactone.

Example 6 and Comparative Examples 6–11

In the same apparatus and formulating conditions as in the Example 5, there were polymerized the ε-caprolactone-modified acrylate compositions obtained in the Example 3 and Comparative Examples 1–4 and HEMA. Although it was able to obtain an excellent acrylic polyol resin transparent liquid from the monomers obtained in the Example 3 and Comparative Examples 3 and 4, in the case of the monomer obtained in the Comparative Example 2, since a reaction liquid caused a viscosity increase and gelation during polymerization, it was not able to obtain a resin solution.

Figure 2:
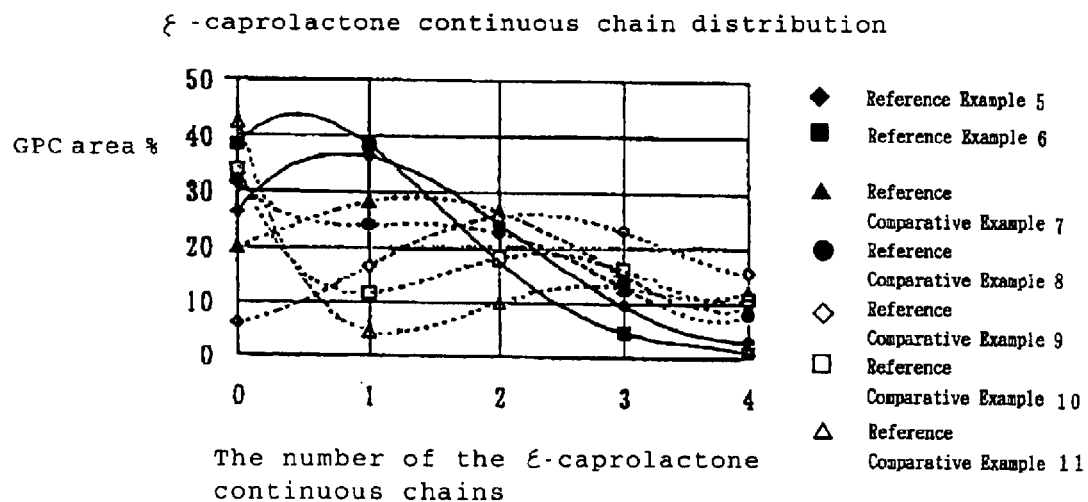
FIG. 2 shows a relationship of feeding ratio of ε-caprolactone/HEMA with a continuous chain distribution ratio of ε-caprolactone from a GPC analysis in Examples 5–6 and Comparative Examples 7–11.

Table 4 and Table 5 show composition of raw materials and characteristics of the resin solution in the respective Examples and Comparative Examples, and Table 6 and FIG. 2 show a relationship between feeding ratio of ε-caprolactone/HEMA and a continuous chain distribution of ε-caprolactone.

TABLE 4

| Raw Material fed | Reference Example | | Reference Comparative Example | | | | | |
|---|---|---|---|---|---|---|---|---|
| | 5 | 6 | 6 | 7 | 8 | 9 | 10 | 11 |
| Butyl acetate | 50 | 50 | 50 | 50 | 50 | 50 | 50 | 50 |
| Toluene | 50 | 50 | 50 | 50 | 50 | 50 | 50 | 50 |
| DTBPO | 1.0 | 1.0 | 1.0 | 1.0 | 1.0 | 1.0 | 1.0 | 1.0 |
| Styrene | 17.3 | 19 | 23.3 | 15 | 17 | 7.0 | 15.8 | 16.3 |
| Methyl methacrylate | 17.3 | 19 | 23.3 | 15 | 17 | 7.0 | 15.8 | 16.3 |
| Butyl methacrylate | 17.3 | 19 | 23.3 | 15 | 17 | 7.0 | 15.8 | 16.3 |
| Methacrylic acid | 2.0 | 2.0 | 2.0 | 2.0 | 2.0 | 2.0 | 2.0 | 2.0 |

| | Reference Example | | HEMA used | Reference Comparative Example | | | | |
|---|---|---|---|---|---|---|---|---|
| | 2 | 3 | | 1 | 1 | 3 | 3 | 4 |
| ε-caprolactone-modified acrylic monomer | 46 | 41 | 0 | 53.3 | 53.3 | 77 | 35.6 | 29.2 |
| HEMA | 0 | 0 | 28 | 0 | 9.1 | 0 | 15 | 20 |
| AIBN | 1.0 | 1.0 | 1.0 | 1.0 | 1.0 | 1.0 | 1.0 | 1.0 |

TABLE 5

| Acrylic poyol resin solution | Reference Example | | Reference Comparative Example | | | | | |
|---|---|---|---|---|---|---|---|---|
| | 5 | 6 | 6 | 7 | 8 | 9 | 10 | 11 |
| | a-1 | a-2 | RA-1 | RA-2 | RA-3 | RA-4 | RA-5 | RA-6 |
| Characteristics of Acrylic poyol resin solution | | | | | | | | |
| Solid content (%) | 50.1 | 51.1 | 50.0 | 50.0 | 50.6 | 50.5 | 50.3 | 51.1 |
| Viscosity (cp 25° C.) | 650 | 1210 | 550 | 560 | 800 | 750 | 680 | 1120 |
| Color hue (APHA) | 35 | 35 | 30 | 30 | 30 | 30 | 35 | 35 |
| (based on solid) Acid value (mg-KOH/g) | 15.8 | 16.5 | 16.2 | 16.3 | 16.2 | 16.2 | 15.8 | 16.5 |
| (based on solid) Hydroxyl group value (mg-KOH/g) | 120 | 123 | 120 | 118 | 118 | 121 | 120 | 120 |
| Tg (° C.) | 6 | 10 | 22 | 0 | 5 | −19 | 1 | 2 |

TABLE 6

| Continuous chain number→ | | ε-caprolactone continuous chain Distribution ratio (%) | | | | | | ratio (%) |
|---|---|---|---|---|---|---|---|---|
| | | 0 | 1 | 2 | 3 | 4 | ≥5 | ≥2 |
| Reference Example | | | | | | | | |
| 5 | FM0.75 | 26.3 | 36.3 | 24.5 | 9.6 | 3.3 | 0.0 | 37.4 |
| 6 | FM0.5 | 38.3 | 38.3 | 17.7 | 4.8 | 1.0 | 0.0 | 23.5 |
| Reference Comparative Example | | | | | | | | |
| 6 | HBMA | 100.0 | | | | | | |
| 7 | FM1 | 19.9 | 28.3 | 26.8 | 15.4 | 9.5 | 0.0 | 51.8 |
| 8 | FM1 + HEMA | 31.6 | 24.2 | 22.9 | 13.2 | 8.1 | 0.0 | 44.2 |
| 9 | FM2 | 6.2 | 16.7 | 25.9 | 23.2 | 15.7 | 12.3 | 77.1 |
| 10 | FM2 + HEMA | 34.0 | 11.8 | 18.2 | 16.3 | 11.0 | 8.7 | 54.2 |
| 11 | FM3 + HEMA | 42.5 | 4.8 | 10.1 | 13.0 | 12.3 | 17.4 | 52.7 |

*the above-described FM-Number shows the feeding ratio of ε-caprolactone/HEMA.

In HEMA, the continuous chain distribution of ε-caprolactone is counted as 0.

In the polymerization of the acrylic polyol resins, OHV was set up at 120 and Tg was set up at 0–10° C. in the Examples 5 and 6 and Comparative Examples 7, 8, 9, and 10. As a result, it is confirmed that a proportion of a 1 mol adduct (n=1) of ε-caprolactone is high in the Examples 5 and 6, and there becomes low a proportion of adducts in which 2 or more continuous chains of ε-caprolactone are added, and there lowers hardness in a melamine-cured product from the acrylic polyol resin.

In the case of employing a coating having a low proportion of the adducts in which 2 or more continuous chains of ε-caprolactone are added, for example, as a top-coating material for cars, there can be obtained a coating layer which is well-balanced among a hardness of a coating layer, a finishing outer appearance, weatherability, acid resistance, staining resistance, gloss, flexibility, and abrasion resistance.

Example III

1. Preparation of a Clear Coating

A clear coating (series C) was prepared based on the formulation shown in Table III-7 described hereinafter.

A comparative clear coating (series SC) was prepared based on the formulation shown in Table III-7 described hereinafter.

2. Preparation of a Solid Color Coating

Preparation of a solid color coating was conducted by adding titanium oxide to a mixture of a raw resin to be formulated with a melamine resin and dispersing by a motor mill (manufactured by Aiger Japan) for 30 minutes, and adding residual components to be formulated. A solid color coating (series S) was prepared based on the formulation shown in Table III-8 described hereinafter. A comparative solid color coating (series SR) was prepared based on the formulation shown in Table III-8 described hereinafter.

Evaluation of Properties of a Coating

1. Preparation of Test Pieces

A test piece molded from a polyolefin-based resin (X50 manufactured by Mitsui Kagaku) which is a body to be coated was washed by isopropylalcohol, and washed by a petroleum benzine.

2. Coating to a Test Piece (1) In the Case of a Clear Coating

A primer (Primax No. 1500 manufactured by Nihon Yushi) was coated in 15 m on the test piece and dried, and Primax No. 5500 (manufactured by Nihon Yushi) was coated as a base coat coating.

Subsequently, a clear coating prepared as hereinabove was diluted by a mixed thinner of xylene with Solvesso 100 as adjusted to 16 seconds in Ford cup No. 4, followed by coating the clear coating onto the test piece in wet-on-wet by air-spraying so that a dried coating layer becomes 30 μm in the clear coating. After having placed for 10 minutes at a room temperature, it was dried by heating at 120° C. for 30 minutes and 100° C. for 30 minutes, and properties of the coating layer were measured after 24 hours. It is to be noted that a test in the case of coating a clear coating without using a primer is as follows. A base coat coating X was prepared as described below, and diluted by a thinner of toluene/ethyl acetate (weight ratio of 60/40) as adjusted to 13 seconds in Ford cup No. 4, followed by air-spraying so that a dried coating layer becomes 15 μm. Subsequently, a clear coating prepared as hereinabove was diluted by a mixed thinner of xylene with Solvesso 100 as adjusted to 16 seconds in Ford cup No. 4, followed by coating the clear coating onto the test piece in wet-on-wet by air-spraying so that a dried coating layer becomes 30 μm in the clear coating. After having placed for 10 minutes at a room temperature, it was dried by heating at 120° C. for 30 minutes and 100° C. for 30 minutes, and properties of the coating layer were measured after 24 hours.

<Preparation of a Base Coat Coating X>

(a) Preparation of a Grafted Chlorinated Polyolefin Oligomer X having Primary Hydroxyl Groups A four-necked flask equipped with an agitating device, a thermometer, a tube for supplying an inert gas, a dropping funnel, and a reflux device was charged with 494 parts of toluene and 250 parts of Hardlene 14ML (a chlorinated polyolefin manufactured by Toyo Kasei: chlorine content of 26%), followed by temperature elevating to 100° C. while agitating. Subsequently, there was added dropwise a mixture composed of 142 parts of Placcel FM-3, 104 parts of isobonylmethacrylate, 6 parts of benzoylperoxide, and 4 parts of azobisisobutyronitrile over 3 hours, and reaction was further continued for 6 hours to obtain a grafted chlorinated polyolefin oligomer X.

(b) Preparation of a Base Coat Coating X

Formulation was conducted as follows.

| | Part |
|---|---|
| Oligomer X | 249 |
| Super Bekkamine L-121-60 | 50 |
| P-198 | 9 |
| Butyl acetate | 15 |

-continued

| | Part |
|---|---|
| Xylene | 15 |
| Tinuvin 384 | 3 |
| Tinuvin 123 | 1.5 |
| Aluminum paste | 15 |
| Modaflow | 0.45 |

(2) In the Case of a Solid Color Coating

A primer was coated as being adjusted to the thickness of 15 μm as a dried coating layer on the test piece and dried, followed by diluting a solid color coating prepared as hereinabove by a mixed thinner of xylene with butyl acetate as being adjusted to 14 seconds in Ford cup No. 4, and followed by coating the clear coating onto the test piece by air spraying so that there becomes 30 μm a dried coating layer in the solid color coating. After having placed for 10 minutes at a room temperature, it was dried by heating at 120° C. for 30 minutes and 100° C. for 30 minutes, and properties of the coating layer were measured after 24 hours.

2. Evaluation Method of Properties (1) Water Resistance Test

A molded article coated was partially immersed in warm water at 50° C. for 10 days. After having taken out, there was observed the presence or absence of adhesion and a blister.

Herein, test pieces of many peeling or blisters were evaluated as x, test pieces of no peeling or slight blisters were evaluated as , and test pieces of no causing peeling and blisters were evaluated as ◯.

(2) Gloss Retention Test

There was conducted an accelerating weatherability test by Sunshine-weatherometer (manufactured by Suga Shikenki), and there was measured a retention ratio (%) of a 60-mirror surface glossiness after 1000 hours according to JIS K5400 (1979), and there was conducted an adhesion test according to JIS K5400 (1976) 6.15. Test pieces having the gloss retention ratio of not less tan 80% and excellent adhesion were evaluated as, test pieces having the gloss retention ratio of not less than 70 and less than 80% and excellent adhesion were evaluated as, and test pieces having the gloss retention ratio of less than 70% and peeling in adhesion test were evaluated as x.

(3) Gasoline Resistance

A molded article coated was partially immersed in a regular gasoline (Nisseki Silver gasoline manufactured by Nihon Sekiyu) at 20° C. After having being taken out, a swelling property was visually evaluated. Test pieces showing remarkable swelling were evaluated as x, test pieces showing slight swelling were evaluated as, and test pieces not showing swelling so much were evaluated as ◯.

(4) Acid Resistance Test 0.2 ml of 5%-sulfuric acid aqueous solution was dropped on a coating layer, followed by drying at 40° C. for 30 minutes and visually observing a condition of the coating layer. Test pieces showing a mark were evaluated as x, test pieces slightly showing a mark were evaluated as, and test pieces not showing a mark were evaluated as ◯.

(5) Solid Content in a Coating

In a coating having a lower solid content, it is more difficult to prepare a thick coating layer. In the clear coating and solid color coating, a coating having not more than 30% of solid content was evaluated x, a coating having more than 30% and not more than 35% was evaluated as, a coating having not less than 35% and not more than 40% were evaluated as ◯, and a coating exceeding 40% were evaluated as ⊙.

Data of properties are collectively shown in Tables III-7 to III-8.

TABLE 8

| Clear coating | Example | | | | Comparative Example | | | | | |
|---|---|---|---|---|---|---|---|---|---|---|
| | C1 | C2 | C3 | C4 | SC-1 | SC-2 | SC-3 | SC-4 | SC-5 | SC-6 |
| Formulation | | | | | | | | | | |
| A-1 | 100 | 100 | | | | | | | | |
| A-2 | | | 100 | 100 | | | | | | |
| RA-1 | | | | | 100 | | | | | |
| RA-2 | | | | | | 100 | | | | |
| RA-3 | | | | | | | 100 | | | |
| RA-4 | | | | | | | | 100 | | |
| RA-5 | | | | | | | | | 100 | |
| RA-6 | | | | | | | | | | 100 |
| Superbekkamine L-121-60 (Dainippon Ink Kagaku Kogyo) | 28 | 28 | 28 | 28 | 28 | 28 | 28 | 28 | 28 | 28 |
| Tinuvin 384 (Ciba Geigy) | 2 | 2 | 2 | 2 | 2 | 2 | 2 | 2 | 2 | 2 |
| Sanol LS292 (Ciba Geigy) | 1 | 1 | 1 | 1 | 1 | 1 | 1 | 1 | 1 | 1 |
| Ajitol XL122 (Hoechst) | 0.4 | 0.4 | 0.4 | 0.4 | 0.4 | 0.4 | 0.4 | 0.4 | 0.4 | 0.4 |
| P-198* (Dainippon Ink Kagaku Kogyo) | 4 | 4 | 4 | 4 | 4 | 4 | 4 | 4 | 4 | 4 |
| Xylol | 24 | 24 | 24 | 24 | 24 | 24 | 24 | 24 | 24 | 24 |
| Sonolebetts 100 (Exon) | 40 | 70 | 70 | 100 | 70 | 70 | 70 | 70 | 70 | 70 |
| Properties | | | | | | | | | | |
| Glass transition temperature (° C.) | −10 | −13 | −7 | −5 | −3 | −15 | −10 | −35 | −10 | −13 |
| Weight average molecular weight | 13000 | 12500 | 13500 | 14000 | 12000 | 12500 | 12500 | 13000 | 13500 | 12500 |
| Number average molecular weight | 8500 | 8500 | 8500 | 8500 | 8000 | 8300 | 8200 | 8200 | 8500 | 8200 |
| Mw/Mn | 1.53 | 1.47 | 1.59 | 1.65 | 1.50 | 1.51 | 1.52 | 1.59 | 1.59 | 1.52 |
| Amount of functional group (mol/Kg resin) | 1.0 | 1.1 | 1.7 | 1.9 | 1.1 | 1.1 | 1.2 | 1.1 | 1.1 | 1.2 |
| Type* of melamine resin | B | B | B | B | B | B | B | B | B | B |
| Resin/melamine resin | 79/21 | ← | ← | ← | ← | ← | ← | ← | ← | ← |
| Total acid value (mgKOH/g) | 27 | ← | ← | ← | ← | ← | ← | ← | ← | ← |
| Characteristics 120° C., 30 minutes | | | | | | | | | | |
| Solid content in a coating | ⊚ | ○ | ○ | Δ | Δ | ○ | ○ | ○ | ○ | ○ |
| Water resistance | ○ | ○ | ○ | ○ | ○ | ○ | ○ | Δ | Δ | Δ |
| Gloss | ○ | ○ | ○ | ○ | ○ | ○ | ○ | ○ | ○ | Δ |
| Gasoline resistance | ○ | ○ | ○ | ⊚ | ○ | ○ | ○ | Δ | Δ | Δ |
| Acid resistance | ○ | ○ | ○ | Δ | ⊚ | Δ | Δ | X | X | X |
| Abrasion resistance | ○ | ○ | ○ | ○ | X | ○ | ○ | ○ | ○ | ⊚ |
| 100° C., 30 minutes | | | | | | | | | | |
| Solid content in a coating | ⊚ | ○ | ○ | Δ | Δ | ○ | ○ | ○ | ○ | ○ |
| Water resistance | ○ | ○ | ○ | ○ | ○ | Δ | Δ | Δ | Δ | X |
| Gloss | ○ | ○ | ○ | ○ | ○ | ○ | ○ | Δ | Δ | Δ |
| Gasoline resistance | ○ | ○ | ○ | ○ | ○ | ○ | ○ | Δ | Δ | Δ |
| Acid resistance | ○ | ○ | ○ | ○ | ⊚ | Δ | Δ | Δ | X | −X |
| Abrasion resistance | ○ | ○ | ○ | ○ | X | ○ | ○ | ○ | ○ | ⊚ |

Note) P-198 is a mixed phosphate (manufactured by Dainippon Ink Kagaku Kogyo) composed of monobutyl phosphate and dibutyl phosphate.
Note) "A" in a type of a melamine resin means an imino type melamine resin. "B" in a type of a melamine resin means a methylol type melamine resin.
Mn: Number average molecular weight
Mw: Weight average molecular weight (hereinafter, the same also in Table 9)

TABLE 9

| Solid color coating | S1 | S2 | S3 | S4 | RS-1 | RS-2 | RS-3 | RS-4 | RS-5 | RS-6 |
|---|---|---|---|---|---|---|---|---|---|---|
| Formulation | | | | | | | | | | |
| A-1 | 166 | 166 | | | | | | | | |
| A-2 | | | 166 | 166 | | | | | | |
| RA-1 | | | | | 166 | | | | | |
| RA-2 | | | | | | 166 | | | | |
| RA-3 | | | | | | | 166 | | | |
| RA-4 | | | | | | | | 166 | | |
| RA-5 | | | | | | | | | 166 | |
| RA-6 | | | | | | | | | | 166 |

TABLE 9-continued

| Solid color coating | S1 | S2 | S3 | S4 | RS-1 | RS-2 | RS-3 | RS-4 | RS-5 | RS-6 |
|---|---|---|---|---|---|---|---|---|---|---|
| Superbekkamine L-121-60 | 66 | 66 | 66 | 66 | 66 | 66 | 66 | 66 | 66 | 66 |
| P-198 | 6 | 6 | 6 | 6 | 6 | 6 | 6 | 6 | 6 | 6 |
| Butyl acetate | 120 | 160 | 160 | 180 | | | | | | |
| Xylene | 160 | 200 | 200 | 200 | 200 | ← | ← | ← | ← | ← |
| Tinuvin 384 | 4 | 4 | 4 | 4 | 4 | ← | ← | ← | ← | ← |
| Sanol LS292 | 2 | 2 | 2 | 2 | 2 | ← | ← | ← | ← | ← |
| CR95 | 100 | ← | ← | ← | ← | ← | ← | ← | ← | ← |
| Modaflow (Monsant) | 0.6 | ← | ← | ← | ← | ← | ← | ← | ← | ← |
| Properties | | | | | | | | | | |
| Glass transition temperature (° C.) | −10 | −13 | −7 | −5 | −3 | −15 | −10 | −35 | −10 | −13 |
| Weight average molecular weight | 13000 | 12500 | 13500 | 14000 | 12000 | 12500 | 12500 | 13000 | 13500 | 12500 |
| Number average molecular weight | 8500 | 8500 | 8500 | 8500 | 8000 | 8300 | 8200 | 8200 | 8500 | 8200 |
| Mw/Mn | 1.53 | 1.47 | 1.59 | 1.65 | 1.50 | 1.51 | 1.52 | 1.59 | 1.59 | 1.52 |
| Amount of functional group (mol/Kg resin) | 1.0 | 1.1 | 1.7 | 1.9 | 1.1 | 1.1 | 1.2 | 1.1 | 1.1 | 1.2 |
| Type of melamine resin | B | B | B | B | B | B | B | B | B | B |
| Resin/melamine resin | 70/30 | ← | ← | ← | ← | ← | ← | ← | ← | ← |
| Total acid value | 23 | ← | ← | ← | ← | ← | ← | ← | ← | ← |
| Characteristics | | | | | | | | | | |
| 120° C., 30 minutes | | | | | | | | | | |
| Solid content in a coating | ⊚ | ◯ | ◯ | Δ | Δ | ◯ | ◯ | ◯ | ◯ | ◯ |
| Water resistance | ◯ | ◯ | ◯ | ◯ | ◯ | ◯ | ◯ | Δ | Δ | Δ |
| Gloss | ◯ | ◯ | ◯ | ◯ | ◯ | ◯ | ◯ | ◯ | ◯ | Δ |
| Gasoline resistance | ◯ | ◯ | ◯ | ◯ | ◯ | ◯ | ◯ | Δ | Δ | Δ |
| Acid resistance | ◯ | ◯ | ◯ | Δ | ◯ | Δ | Δ | X | X | X |
| Abrasion resistance | ◯ | ◯ | ◯ | ◯ | X | ◯ | ◯ | ◯ | ◯ | ⊚ |
| 100° C., 30 minutes | | | | | | | | | | |
| Solid content in a coating | ◯ | ◯ | ◯ | Δ | Δ | ◯ | ◯ | ◯ | ◯ | ◯ |
| Water resistance | ◯ | ◯ | ◯ | ◯ | ◯ | Δ | Δ | Δ | Δ | X |
| Gloss | ◯ | ◯ | ◯ | ◯ | ◯ | ◯ | ◯ | Δ | Δ | Δ |
| Gasoline resistance | ◯ | ◯ | ◯ | ◯ | ◯ | ◯ | ◯ | Δ | Δ | Δ |
| Acid resistance | ◯ | ◯ | ◯ | ◯ | ◯ | Δ | Δ | Δ | X | X |
| Abrasion resistance | ◯ | ◯ | ◯ | ◯ | X | ◯ | ◯ | ◯ | ◯ | ⊚ |

By the Examples and Comparative Examples, it is clear that there can be prepared a coating layer well-balanced among hardness of the coating layer, outer appearance in finishing, weatherability, acid resistance, staining resistance, glossiness, and abrasion resistance in the case of employing products having a low proportion of two or more continuous chains of ε-caprolactone as a material for a top coating in cars.

Example IV

In the hydroxyalkyl(meth)acrylate composition modified by a small amount of lactones obtained in the Example I, the composition obtained in the Example 2 is designated as (a-1), the composition obtained in the Example 3 is designated as (a-2), and the composition obtained in the Example 4 is designated as (a-3).

In the lactone-modified hydroxyalkyl(meth)acrylate composition obtained in the Comparative Examples of the Example I, the composition obtained in the Comparative Example 1 is designated as (a-1'), the composition obtained in the Comparative Example 3 is designated as (a-2'), the composition obtained in the Comparative Example 4 is designated as (a-3'), and the composition obtained in the Comparative Example 5 is designated as (a-4').

<Production of an Acrylic Polyol Resin (A) Solution>

Production Example IV-1

A four-necked flask equipped with a thermometer, an agitator, a reflux condenser, an tube for supplying nitrogen gas was charged with 30 parts of ethyleneglycol monobutylether, followed by elevating a temperature to 120° C. and maintaining.

In the flask, there was added dropwise a mixed solution of 31 parts of styrene, 21 parts of methylmethacrylate, 19 parts of 2-ethylhexyl methacrylate, 15 parts of the composition (a-1), 10 parts of hydroxyethylmethacrylate, 4 parts of acrylic acid, and 10 parts of 2,2'-azobisisobutyronitrile which is a polymerization initiator over 3 hours. After that, aging was conducted at 120° C. for 1 hour and, subsequently, there was added dropwise a mixed liquid of 1 part of 2,2'-azobisisobutyronitrile which is an additional polymerization catalyst and 10 parts of ethyleneglycol monobutylether over 1 hour, aging was further conducted for 3 hours to obtain an acrylic polyol resin (A-1) solution having a solid content of approximately 71%.

In the resin (A-1) obtained, an acid value was 30, a weight average molecular weight (by GPC, hereinafter, the same) was approximately 9,500, and a glass transition temperature was 45° C.

Production Examples IV-2 to IV-3

The same procedures were conducted as in the Production Example IV-1, except that the composition (a-1) to be added dropwise was changed to the composition (a-2) or the composition (a-3) to obtain an acrylic polyol resin (A-2) solution or (A-3) solution.

Production Examples IV-4 to IV-7 (for references)

The same procedures were conducted as in the Production Example IV-1, except that the composition (a-1) to be added dropwise was changed to 2-hydroxyethylmethacrylate (HEMA) or the (a-1')-(a-4') in the Reference Comparative Examples to obtain acrylic polyol resin (A-1')-(A-4') solutions for references.

Production Example IV-8
Production Example of Other Acrylic Resin (A#) Solution

A four-necked flask equipped with a thermometer, an agitator, a reflux condenser, an tube for supplying nitrogen gas was charged with 30 parts of ethyleneglycol monobutylether, followed by elevating a temperature to 90° C. and maintaining.

Into the flask, there was added dropwise a mixed solution of 35 parts of n-butylacrylate, 30 parts of 2-ethylhexyl methacrylate, 30 parts of N-n-butoxymethylmethacrylic amide, and 5 parts of acrylic acid, and 6 parts of benzoyl peroxide which is a polymerization initiator over 3 hours.

Weight average molecular weight: It was measured according to JIS K0124-83. Using TSK GEL G4000+G3000+G2500+G2000 (manufactured by Toyo Soda, Ltd.) as a column for separation, a measurement was conducted at 40° C. and a flow rate of 1.0 mm/minute, and it was calculated by a calibration curve prepared by a chromatogram obtained by an RI refractometer and a standard Polystyrene using tetrahydrofran for GPC as an eluate.

Glass transition temperature (Tg point): Using a differential scanning calorimeter DSC-50Q (Shimadzu Seisakusyo, Ltd.), it was measured from thermal spectra obtained in temperature elevation rate of 5° C./minute.

In the following Tables, IV is omitted.

| Production No. | 1 | 2 | 3 | 4 | 5 | 6 | 7 |
|---|---|---|---|---|---|---|---|
| Mixed solution added dropwise | | | | | | | |
| Acrylic poyol resin | A-1 | A-2 | A-3 | A-4 | A-5 | A-6 | A-7 |
| 2-ethylhexylmethacrylate | 19 | ← | ← | ← | ← | ← | ← |
| Lactone-modified methacrylate | a-1:15 | a-2:15 | a-3:15 | — | a-1':15 | a-2':15 | a-3':15 |
| 2-hydroxyethylmethacrylate | 10 | ← | ← | 25 | ← | ← | ← |
| Acrylic acid | 4 | ← | ← | ← | ← | ← | ← |
| Styrene | 31 | ← | ← | ← | ← | ← | ← |
| Methylmethacrylate | 21 | ← | ← | ← | ← | ← | ← |
| 2,2'-azobisisobutylnitrile | 1 | ← | ← | ← | ← | ← | ← |
| Physical properties | | | | | | | |
| Resin acid value | 31 | 31 | 32 | 33 | 30 | 30 | 31 |
| Weight average molecular weight | 8500 | 9000 | 8700 | 9000 | 8800 | 8600 | 9000 |
| Glass transition temperature (° C.) | 47 | 45 | 43 | 50 | 42 | 40 | 39 |

| Production No. | 8 |
|---|---|
| Mixed solution added dropwise | |
| Acrylic resin | A# |
| N-butoxymethylacrylate | 30 |
| Acryli acid | 5 |
| 2-ethylhexylmethacrylate | 30 |
| N-butylacrylate | 35 |
| Benzoyl peroxide | 6 |
| Physical properties | |
| Resin acid value | 40 |
| Weight average molecular weight | 8500 |
| Glass transition temperature (° C.) | 47 |

After that, aging was conducted at 90° C. for 5 hour to obtain an acrylic resin (A#) solution having a solid content of approximately 77%. In the acrylic resin (A#) obtained, an acid value was 39, a weight average molecular weight was approximately 10,000, and a glass transition temperature was −21° C.

Table IV-7 shows formulation ratio in the Production Examples IV-1 to IV-7 and physical properties of the resins obtained.

Table IV-8 shows formulation ratio in the Production Example IV-8 and physical properties of the resins obtained.

It is to be noted that the physical properties were measured according to the following methods.

Acid value in the resins: Sample was dissolved in a mixed solution of ethanol and toluene, and it was measured by a neutralizing titration of 0.1N solution of potassium hydroxide-ethanol using phenolphthalein as an indicator.

Example IV-1

3.1 parts (amount corresponding to 1.0 mol with respect to 1 mol of carboxylic group in the acrylic resin) of N,N-dimethylaminoethanol was added to 70 parts of the acrylic polyol resin (A-1) solution having a solid content of approximately 71% obtained in the Production Example IV-1 and 13 parts of the acrylic resin (A#) solution having a solid content of approximately 77% obtained in the Production Example IV-8, followed by uniformly mixing at 50° C. and, followed by adding 50 parts of Nikalak N-6215 (a methyletherized methylolmelamine-benzoguanamine cocondensed resin manufactured by Sanwa Chemical, Ltd.) as an aminoplasto resin (IV-B) and 0.7 part of Nacure (Nacure) 5225 (a curing catalyst manufactured by King Industries, Ltd., USA). After having sufficiently mixed at 30° C., deionized water was gradually added to prepare a water-based coating having a solid content of approximately 40%.

Examples IV-2 to IV-3 and Comparative Examples IV-1 to IV-4

The same procedures were conducted as in the Example IV-1, except that respective acrylic polyol resin solutions, aminoplasto resin (IV-B), and formulation amount (solid content) of the resins were changed as shown in Table IV-9, and amount of N,N-dimethylaminoethanol were changed to an amount corresponding to 1.0 mol with respect to 1 mol of carboxylic group in the acrylic resin to be employed to prepare a water-based coating.

<Preparation of a Test Plate to be Coated>

A commercially supplied ink was coated on an aluminum plate having the thickness of 0.3 mm, and respective water-based coatings obtained in the Examples and Comparative Example were coated by wet-on-wet so that thickness of a coating layer becomes 5 m after having dried, subsequently, baking was conducted for 90 seconds at a condition in which a maximum temperature being capable of attaining in materials becomes 200° C. to obtain a coated plate. It is to be noted that it was not able to coat the coatings in the Comparative Example 2 and Comparative Example 9 because of a high viscosity.

In relation to thus-obtained coated plate, there were tested physical properties of the coating layer and a wet ink-adaptability. Test results are shown in Table IV-9.

Tests were conducted according to the methods described below.

Pencil Hardness: A pencil scratch test regulated in JIS K5400 8. 4.2 (1990) was conducted on the coated plate, and evaluated by scratches.

Retort resistance: A coated plate was immersed in a deionized water. A whitening condition of the coated layer and the pencil hardness were checked after having treated for 30 minutes at 125° C. in an autoclave.

The whitening condition of the coated layer was visually evaluated according to the following rules.

⊚: quite no whitened

○: slightly whitened

: very whitened x: whitened at all surface

After the coated plate was pulled up from water and placed in warm water of 80° C. for 3 minutes, the pencil scratch test was conducted in warm water of 80° C. according to JIS K-5400 8. 4. 2 (1990), and the coated layer was evaluated by scratches.

Processability: Test in relation to the coated plate was conducted at conditions of drop weight of 300 g, an edge diameter in a striking pin of ½ inch, and drop height of 20 (cm) according to a Dupon't style impact test by JIS K5400 8. 4. 2 (1990). Cracks of the coated layer were visually observed at an impact portion and a periphery thereof.

⊚: Cracks are not observed.

○: Cracks are slightly observed.

: Cracks are very observed at an impact portion.

x: Cracks are very observed also at a periphery of an impact portion.

Adhesion: 100 pieces of cross-hatches of 1 mm×1 mm were made on the coated plate according to a cross-hatched test by JIS K-5400 8. 5. 2 (1990), and a cellophane tape was stuck on the surface, and it was evaluated by counting the number of the cross-hatches remained after having abruptly stripped.

100 means that the coated layer was not stripped at all.

Wet ink adaptability: Finishing outer appearance of the coated plate was observed.

TABLE IV-9

| Example No. | 1 | 2 | 3 | 4 | 5 | 6 | 7 |
|---|---|---|---|---|---|---|---|
| Acrylic poyol resin | A-1 | A-2 | A-3 | A-1' | A-2' | A-3' | A-4' |
| amount | 50 | ← | ← | ← | ← | ← | ← |
| Acrylic resin | A# | ← | ← | ← | ← | ← | ← |
| amount | 10 | ← | ← | ← | ← | ← | ← |
| Amino plasto resin Nikalak-N-6215 | 40 | ← | ← | ← | ← | ← | ← |
| Properties of coating layer | | | | | | | |
| Pencil hardness | 4H | 4H | 4H | 4H | 3H | 2H | 2H |
| Retort property: whitening | ⊚ | ⊚ | ⊚ | ⊚ | ○ | ○ | Δ |
| Pencil hardness | 2H | 2H | 2H | 2H | H | HB | B |
| Processability | ○ | ⊚ | ⊚ | Δ | ⊚ | ⊚ | ⊚ |
| Adhesion | 100 | 100 | 100 | 80 | 100 | 100 | 100 |
| Wet ink adaptability | ⊚ | ⊚ | ⊚ | Δ | ⊚ | ⊚ | ⊚ |

It is confirmed that the melamine-curable water-based coating composition is excellent in physical properties of the coating layer and wetting adaptability, which is composed of an acrylic polyol resin (A) obtained using the above-described hydroxyethyl(meth)acrylate composition (a) modified by a small amount of lactones and the aminoplasto resin (IV-B).

Example V

1. Preparation of a Coating

In a coating (C series) and a comparative coating (SC series), there were employed a resin (A-1) obtained in Reference Example 5 and a resin (A-2) obtained in Reference Example 6 which are shown in Table 5, and respective resins (RA-1)-(RA-6) obtained in Comparative Reference Examples 6–11.

These acrylic polyol resins (A-1)-(RA-6) were formulated with the following substances to obtain a coating.

| | part |
|---|---|
| Acrylic polyol resin | 100 |
| Super Bekkamine L-121-60 | 28 |
| P-198 | 9 |
| Butyl acetate | 15 |
| Xylene | 15 |
| Tinuvin 384 | 3 |
| Tinuvin 123 | 1.5 |
| Modaflow | 0.45 |

In the above descriptions, P-198 (manufactured by Dainippon Ink, Ltd.) is a mixture of monobutyl phosphate with dibutyl phosphate.

A white enamel base was obtained by kneading for 60 minutes in a sand mill based on the above-described formulation, and an acrylic urethane coating was prepared by formulating a desired amount of a curing agent.

2. Formulation of a Multi-Layered Type Elastic Acrylic Emulsion Coating

| | part |
|---|---|
| Boncoat 3663 | 432.0 |
| Demor EP (Kao Atlas) | 6.0 |
| Ethyleneglycol (Mitsubishi Kagaku) | 4.3 |
| Adekanate B-187 (Asahi Denka) | 13.0 |

-continued

| | part |
|---|---|
| Celltop HP-103 (Teikoku Kako) | 4.3 |
| Calcium carbonate NS-100 (Nitto Funka) | 380.5 |
| ASP-600 (ENGEL HARD) | 67.7 |
| Taipe R-550 (Ishihara Sangyo) | 13.0 |
| 5% Highmetrose 90 SH-1500 (Shin-etsu Kagaku) | 28.9 |
| Adekanol UH-420 (Asahi Denka) | 2.7 |
| water | 47.6 |
| Total | 1,000.0 |

Evaluation of Properties of a Coating

1. Preparation of a Test Piece

As a test piece, a test piece molded from a polyolefin-based resin (X50 manufactured by Mitsui Kagaku) was washed by isopropylalcohol, and washed by a petroleum benzine.

2. Coating onto a Test Piece (1) A primer (Primax No. 1500 manufactured by Nihon Yushi) was coated in 15 µm onto the test piece and dried, and Primax No. 5500 (manufactured by Nihon Yushi) was coated as a base coating.

Subsequently, a clear coating prepared as hereinabove was diluted by a mixed thinner of xylene and Solvesso 100 as being adjusted to 16 seconds in Ford cup No. 4, followed by coating the clear coating onto the test piece in wet-on-wet by air-spraying so that a dried coating layer becomes 30 µm in the clear coating. After having placed for 10 minutes at a room temperature, it was dried by heating at 120° C. for 30 minutes and 100° C. for 30 minutes, and properties of the coating layer were measured after 24 hours. It is to be noted that a test in the case of coating a clear coating without using a primer is as follows. A base coat coating X was diluted by a thinner of toluene/ethyl acetate (weight ratio of 60/40) as being adjusted to 13 seconds in Ford cup No. 4, followed by air-spraying so that a dried coating layer becomes 15 µm.

Subsequently, respective coatings prepared as hereinabove were diluted by a mixed thinner of xylene and Solvesso 100 as being adjusted to 16 seconds in Ford cup No. 4, followed by coating the clear coating onto the test piece in wet-on-wet by air-spraying so that a dried coating layer becomes 30 µm in the clear coating. After having placed for 10 minutes at a room temperature, it was dried by heating at 120° C. for 30 minutes and 100° C. for 30 minutes, and properties of the coating layer were measured after 24 hours.

Preparation of a Base Coat Coating X (a) Preparation of a Grafted Chlorinated Polyolefin Oligomer X having a Primary Hydroxyl Group A four-necked flask equipped with an agitating device, a thermometer, an tube for supplying an inert gas, a dropping funnel, and a reflux device was charged with 494 parts of toluene and 250 parts of Hardlene 14ML (a chlorinated polyolefin manufactured by Toyo Kasei: chlorine content of 26%), followed by temperature elevating to 100° C. while agitating. Subsequently, there was added dropwise a mixture composed of 142 parts of Placcel FM-3, 104 parts of isobonylmethacrylate, 6 parts of benzoylperoxide, and 4 parts of azobisisobutyronitrile over 3 hours, and reaction was further continued for 6 hours to obtain the above-described grafted chlorinated polyolefin oligomer X.

(b) Preparation of a Base Coat Coating X

Formulation was conducted as follows.

| | Part |
|---|---|
| Oligomer X | 249 |
| Super Bekkamine L-121-60 | 50 |
| P-198 | 9 |
| Butyl acetate | 15 |
| Xylene | 15 |
| Tinuvin 384 | 3 |
| Tinuvin 123 | 1.5 |
| Aluminum paste | 15 |
| Modaflow | 0.45 |

2. Evaluation Method of Properties (1) Water Resistance Test

A molded article coated was partially immersed in warm water at 50° C. for 10 days. After having taken out, there was observed the presence or absence of adhesion and a blister.

Herein, test pieces having many peeling or blisters were evaluated as x, test pieces not having peeling or having slight blisters were evaluated as, and test pieces not causing peeling and blisters were evaluated as ○.

(2) Gloss Retention Test

There was conducted an accelerating weatherability test by Sunshine-weatherometer (manufactured by Suga Shikenki), there was measured a retention ratio (%) of a 60-mirror surface glossiness after 1000 hours according to JIS K5400 (1979), and there was measured an adhesion test according to JIS K5400 (1976) 6.15. Test pieces having gloss retention ratio of not less tan 80% and excellent adhesion were evaluated as ○, test pieces having gloss retention ratio of not less than 70 and kess than 80% and excellent adhesion were evaluated as and test pieces having gloss retention ratio of less than 70% and peeling in adhesion test were evaluated as x.

(3) Gasoline Resistance

A molded article coated was partially immersed in a regular gasoline (Nisseki Silver gasoline manufactured by Nihon Sekiyu) at 20° C. After having taken out, a swelling property was visually evaluated. Test pieces showing remarkable swelling were evaluated as x, test pieces showing slight swelling were evaluated as, and test pieces not showing swelling so much were evaluated as ○.

(4) Acid Resistance Test 0.2 ml of 5%-sulfuric acid aqueous solution was dropped on a coating layer, followed by drying at 40° C. for 30 minutes and visually observing a condition of the coating layer. Test pieces showing marks were evaluated as x, test pieces slightly showing marks were evaluated as and test pieces not showing marks were evaluated as ○.

(5) Solid Content in a Coating

In a lower solid content in a coating, it is more difficult to prepare a thick coating layer. In the clear coating and solid color coating, a coating having not more than 30% of solid content was evaluated x, a coating having not less than 30 and not more than 35% were evaluated as Δ, a coating having not less than 35 and not more than 40% were evaluated as ○, and a coating exceeding 40% were evaluated as ⊙.

(6) Pot Life

It was measured according to JIS K5400 (1999) 4.9.

Physical properties of a coating layer were measured as follows.

Coating: An acrylic urethane coating obtained was diluted by a solvent of xylene/butyl acetate=60/40 to a viscosity being capable of coating, and spray-coated onto respective base materials so that layer thickness becomes 70–75 µm after drying. Curing for drying was conducted by placing at a room temperature for 2 weeks.

(7) Extension, Tensile Strength Test: An acrylic urethane coating as prepared hereinabove was coated on an acrylic emulsion dried coating layer having a layer thickness of approximately 1 mm prepared using an elastic acrylic emulsion coating obtained hereinabove, and it was dried at an ordinary temperature for 2 weeks to prepare a coating layer. Using the coating layer, measurement was conducted according to JIS A6910 (1984) 5. 13.

(8) Deterioration Test in Extension: Measurement was conducted according to JIS A6910 (1984) 5. 13 using a multi-layered coating layer prepared in the (7).

(9) Adhesion Strength: Measurement was conducted according to JIS A6910 (1984) 5. 8 using a multi-layered coating layer prepared in the (7).

(10) Cold Cycle Test: It was conducted according to JIS A6910 (1984) 5. 9

(11) Dispersibility of Pigments (A Monochromatic Base)

carbon black:
  Royal Sbectramark I (Columbia Carbon, Ltd.) PWC5%
Shinkasya Red:
  Fastogen Super Red BN (Dainippon Ink Kagaku, Ltd.) PWC10%
Dianine Blue:
  Fastogen Blue FGS (Dainippon Ink Kagaku, Ltd.) PWC10%

Coagulation property and a thixotropic property were visually judged in relation to an original color enamel base kneaded under special conditions.

(Mixed Color Base)

The above-described respective color enamel bases were formulated so that it becomes white/original color=98/2 (pigments ratio), and a curing agent was formulated. After having diluted by a solvent, it was spray coated. After having confirmed dryness by finger touch, the same coating partially remained was flow-coated on an approximately half portion in the coated plate and cured.

Quality of dispersibility was judged by a color difference (E) between a spraying portion and flow coating portion. Smaller value is more excellent in dispersibility.

(12) Staining Resistance:

(i) Staining by a Felt Pen:

After having been stained by a felt pen, sample was placed at room temperatures for 2 hours, and wiped by a solvent of petroleum/ethanol=1/1, and a staining level was visually judged.

Herein, ⊚: Marks are not quite remained. ○: Marks are slightly remained.: Marks are fairly remained. x: Marks are very remained.

(ii) Staining by Wet Carbon:

Water dispersion containing 3% of carbon was made, and it was softly applied by cotton, and it was placed at an ordinary temperature for 1 day. After having washed by water, marks were visually judged.

Rules for judgement are the same as in the (i).

From the Examples and Comparative Examples, it is evident that in the case that a coating having a low proportion of the adducts in which not less than 2 mol of ε-caprolactone is added is employed as, for example, a top-coating material for cars, there can be obtained a coating layer which is well-balanced among excellent workability, a hardness of a coating layer, a finishing outer appearance, weatherability, acid resistance, staining resistance, gloss, flexibility, and abrasion resistance.

Example VI

Reference Example VI-7 [Preparation Example of a Copolymer (VIA-1)]

A four-necked flask replaced with nitrogen gas was charged with 294 parts of methylethylketone, followed by maintaining at 75° C. while agitating. Subsequently, there was added dropwise a mixture composed of 36.9 parts of methacrylic acid, 90.0 parts of styrene, 42.6 parts of butyl acrylate, 40.5 parts of an ε-caprolactone-modified acrylic monomer obtained in the Example 1, 90.0 parts of lauryl methacrylate, and 6.0 parts of Perbutyl O [tert-butylperoxy-2-ethylhexanoate manufactured by Nihon Yushi, Ltd.] over 2 hours. Further, reaction was conducted at the same temperature for 5 hours to obtain a copolymer (VIA-1) having nonvolatile components of 50.0% by weight, an acid value of 80 and, further, hydroxyl value of 58 (unit: mg-KOH/g, hereinafter, the same).

Reference Example VI-8 [Preparation Example of a Copolymer (VIA-2)]

A four-necked flask replaced with nitrogen gas was charged with 870 parts of methylethylketone, followed by maintaining at 80° C. while agitating. Subsequently, there was added dropwise a mixture composed of 207 parts of styrene, 150 parts of lauryl methacrylate, 72 parts of an ε-caprolactone-modified acrylic monomer obtained in the Example 3, 168 parts of butyl methacrylate, and 30 parts of "Perbutyl O" over 4 hours. Further, polymerization reaction was continued over 4 hours while agitating to obtain a resin having hydroxyl groups, which has a number average molecular weight of 26,000 and nonvolatile components of 40%.

Subsequently, 6.8 parts of methacrylic anhydride was added to the polymer solution, followed by agitating for 4 hours to obtain a vinyl group-modified resin (VIB-1) having hydroxyl groups. After that, the same flask as in the above-described flask was charged with 175 parts of the resin (VIB-1), followed by elevating temperature to 80° C. while agitating. There was added dropwise a mixture of 9.2 parts by weight of methacrylic acid, 7.6 parts of styrene, 7.5 parts of lauryl methacrylate, 3.4 parts of butyl acrylate, 2.3 parts of 2-hydroxyethyl methacrylate, 4.5 parts of "Perbutyl O", and 20 parts by weight of methylethylketone over 4 hours to allow to continue a polymerization.

Also after that, agitation was allowed to continue over 2 hours to obtain a vinyl-based copolymer (VIA-2). Non volatile components were 45.6%.

Reference Example VI-9 [Preparation Example of a Copolymer (VIA-3)]

A reaction vessel replaced with nitrogen was charged with 870 parts of methylethylketone, followed by elevating a temperature to 80° C. while agitating. Into the vessel, there was added dropwise a mixture composed of 180 parts of styrene, 150 parts of lauryl methacrylate, 78 parts of butyl acrylate, 72 parts of an ε-caprolactone-modified acrylic monomer obtained in the Example 3, 120 parts of glycidyl methacrylate, and 30 parts of "Perbutyl O" over 4 hours to allow to continue polymerization. Further, agitation was continued over 4 hours to obtain a polymer solution of a resin having glycidyl groups and hydroxyl groups, which has a number average molecular weight of 20,000 and nonvolatile components of 40%.

Subsequently, 6.8 parts of methacrylic anhydride was added to the polymer solution, followed by agitating at 60°

C. for 6 hours and adding 0.5 part of water to obtain a vinyl-modified resin (VIB-2) having hydroxyl groups, in which glycidyl groups are remained.

After that, the same vessel as in the above-described vessel was charged with 300 parts of the resin (VIB-2), followed by elevating temperature to 80° C. while agitating.

Subsequently, there was added dropwise a mixture composed of 39.2 parts of methacrylic acid, 27.0 parts of styrene, 45.0 parts of lauryl methacrylate, 41.0 parts of butylacrylate, 27.8 parts of 2-hydroxyethyl methacrylate, 27.0 parts of "Perbutyl O", and 40.0 parts by weight of methylethylketone over 4 hours to allow to conduct a polymerization. Also after that, agitation was allowed to continue over 2 hours to obtain a vinyl-based copolymer (VIA-3). Non volatile components were 54.8%.

Reference Example VI-10 [Preparation Example of a Copolymer (IVA-4)]

A reaction vessel replaced with nitrogen was charged with 150 parts of the resin (VIB-1) obtained in the Reference Example IV-8 and the resin (VIB-2) obtained in the Reference Example VI-10, respectively, followed by elevating temperature to 80° C. while agitating.

Subsequently, there was added dropwise a mixture composed of 39.2 parts of methacrylic acid, 27.0 parts of styrene, 45.0 parts of lauryl methacrylate, 41.0 parts of butylacrylate, 27.8 parts of 2-hydroxyethyl methacrylate, 27.0 parts of "Perbutyl O", and 40.0 parts by weight of methylethylketone over 4 hours to allow to conduct a polymerization. Also after that, agitation was allowed to continue over 2 hours to obtain a vinyl-based copolymer (VIA-4). Non volatile components were 54.8%.

Reference Example VI-11 [Preparation Example of a Copolymer (VIA-5)]

A reaction vessel was charged with 62.5 parts of a polycaprolactone diol having a number average molecular weight of 1,250, 167.8 parts of "AOGX 68" [a long chain olefin glycol manufactured by Daicel Chemical Industries, Ltd., hydroxyl value=290], and 111 parts of 1-isocyanate-3-isocyanatemethyl-3,5,5-trimethylcyclohexane (IPDI), and temperature was elevated to 110° C. under nitrogen atmosphere while agitating, followed by maintaining at the temperature for 60 minutes.

After that, the temperature was decreased to 80° C., and there were fed 33.5 parts of dimethylol propionic acid, 160.6 parts of ethyl acetate, and 0.05 part of tin octoate, followed by allowing to continue a reaction at 75° C. for 7 hours. After the completion of the reaction, 214.2 parts of ethyl acetate was added to obtain a urethane resin solution having hydroxyl groups which has non volatile components of 50%.

2.6 parts of methacrylic anhydride was fed into the resin solution, followed by agitating at 75° C. for 4 hours to obtain a vinyl-modified resin (VIB-3) having hydroxyl groups.

Subsequently, 100 parts of the resin (VIB-3) was fed into a same reaction vessel replaced with nitrogen, followed by elevating a temperature to 75° C. while agitating. There was added dropwise a mixture composed of 15.4 parts of methacrylic acid, 23.3 parts of styrene, 22.4 parts of isobutyl methacrylate, 5.5 parts of 2-hydroxyethyl methacrylate, 50.1 parts of the -caprolactone-modified acrylic monomer obtained in the Reference Example 3, 9.3 parts of "Niper BW" [benzoyl peroxide manufactured by Nihon Yushi, Ltd.], and 116.7 parts of ethyl acetate over 4 hours to allow to conduct a polymerization reaction. Also after that, agitation was allowed to continue over 4 hours to obtain a vinyl-based copolymer (VIA-5). Nonvolatile components were 48.6%.

Reference Comparative Example VI-12
[Preparation Example of a Copolymer (VIRA-1)]

The same polymerization was followed as in the Reference Example VI-7 except that the ε-caprolactone-modified acrylic monomer obtained in the comparative Example 1 was employed in place of 40.5 parts of the ε-caprolactone-modified acrylic monomer obtained in the Example 1 to obtain a vinyl-based copolymer having non volatile components of 50.0%, an acid value of 80, and a hydroxyl value of 58.

Reference Comparative Example VI-13
[Preparation Example of a Vinyl-Based Copolymer (VIRA-2)]

The same polymerization was followed as in the Reference Example VI-11 except that "Placcel FM3" [a lactone-modified hydroxyethylmethacrylate manufactured by Daicel Kagaku Kogyo, Ltd.] was employed in place of the ε-caprolactone-modified acrylic monomer obtained in the Comparative Example 3 to obtain a vinyl-based copolymer having non volatile components of 50.0%, an acid value of 80, and a hydroxyl value of 58.

Example VI-1

In a reaction vessel which is vigorously agitated there were mixed 200 parts of the vinyl-based copolymer (VIA-1) which is an acrylic polyol resin, 39.7 parts of "Vernok 980" [a polyisocyanate manufactured by Dainippon Ink Kagaku Kogyo, Ltd., nonvolatile components=75.6%], 100 parts of methylethylketone, and 5.0 parts of triethylamine, and 300 parts of distilled water was gradually added to the vessel. During a reaction, 0.02 part of dibutyltin dilaurate was added immediately before phase inversion, and 200 parts of distilled water was added after phase inversion.

Subsequently, solvents were distilled off at reduced pressure, and heating was continued at 60° C. for 1 hour to allow to accelerate a crosslinking in inside of particles. After that, water was partially distilled off at reduced pressure to obtain a water dispersion of crosslinked particles having 31.0% of nonvolatile components.

After that, the water dispersion of crosslinked particles was partially taken out, and tetrahydrofran was added in a 100 times amount and, as a result, it was muddy without transparently dissolving.

Further, the water dispersion was maintained at 50° C. for 20 days, and a change was observed with a lapse of time and, as a result, any change was not observed in stability of dispersibility.

However, when ethyleneglycol monobutylether was added in an amount corresponding to 20% based on solid components in the water dispersion, tendency of viscosity increase was observed in a system after 20 days at 50° C.

It is to be noted that it showed an average molecular weight of 570 between crosslinking points in thus-obtained crosslinked particles, which is a designed value. Still further, a solvent was added in an amount corresponding to 20% based on solid components and, as a result, a film-forming temperature was not more than a room temperature.

Example VI-2

The same procedures were followed as in the Example IV-1, except that there were employed 219.3 parts of the vinyl-based copolymer (VIA-2) which is an acrylic polyol resin, 39.7 parts of "Vernok 980", 100 parts of methylethylketone, and 10.8 parts of triethylamine. As a result, nonvolatile components were 31.6% in thus-obtained water dispersion of crosslinked particles and a dispersion state was also excellent.

Subsequently, the water dispersion of crosslinked particles was partially taken out, and tetrahydrofran was added in a 100 times amount and, as a result, it was muddy without transparently dissolving. Further, the water dispersion was maintained at 50° C. for 20 days, and a change was observed with a lapse of time and, as a result, any change was not observed in stability of dispersibility. Likewise, when ethyleneglycol monobutylether was added in an amount corresponding to 20% based on solid components in the water dispersion, tendency of viscosity increase was not observed in a system even after 20 days at 50° C. It is to be noted that it showed an average molecular weight of 630 between crosslinking points in thus-obtained crosslinked particles, which is a designed value. Still further, a solvent was added in an amount corresponding to 20% based on solid components and, as a result, a film-formable temperature was not more than a room temperature.

Example VI-3

The same procedures were followed as in the Example IV-1, except that there were employed 182.5 parts of the vinyl-based copolymer (VIA-3) which is an acrylic polyol resin, 26.5 parts of "Vernok 980", 150 parts of methylethylketone, and 15.3 parts of triethylamine. As a result, nonvolatile components were 30.5% in thus-obtained water dispersion of crosslinked particles and a dispersion state was also excellent.

Subsequently, the water dispersion of crosslinked particles was partially taken out, and tetrahydrofran was added in a 100 times amount and, as a result, it was muddy without transparently dissolving. Further, the water dispersion was maintained at 50° C. for 20 days, and a change was observed with a lapse of time and, as a result, any change was not observed in stability of dispersibility. Likewise, when ethyleneglycol monobutylether was added in an amount corresponding to 20% based on solid components in the water dispersion, tendency of viscosity increase was not observed in a system even after 20 days at 50° C. It is to be noted that it has an average molecular weight ranging in 510–680 between crosslinking points in the crosslinked particles, which is a designed value, and which only slightly changes through reaction between glycidyl groups.

Still further, a solvent was added in an amount corresponding to 20% based on solid components and, as a result, a film-forming temperature was not more than room temperatures.

Example VI-4

The same procedures were likewise followed as in the Example IV-1, except that there were employed 182.5 parts of the vinyl-based copolymer (VIA-4) which is an acrylic polyol resin, 26.5 parts of "Vernok 980", 150 parts of methylethylketone, and 15.3 parts of triethylamine and, thus-obtained water dispersion of crosslinked particles has nonvolatile components of 32.3% in thus-obtained water dispersion of crosslinked particles and a dispersion state was also excellent.

Subsequently, the water dispersion of crosslinked particles was partially taken out, and tetrahydrofran was added in a 100 times amount and, as a result, it was muddy without transparently dissolving. Further, the water dispersion was maintained at 50° C. for 20 days, and a change was observed with a lapse of time and, as a result, any change was not observed in stability of dispersibility.

Likewise, when ethyleneglycol monobutylether was added in amount corresponding to 20% based on solid components, any change was not observed in viscosity properties even after 20 days at 50° C. It is to be noted that it has an average molecular weight ranging in 580–680 between crosslinking points in the crosslinked particles, which is a designed value, and which only slightly changes through reaction between glycidyl groups.

Still further, a solvent was added in an amount corresponding to 20% based on solid components and, as a result, a film-forming temperature was not more than room temperatures.

Example VI-5

The same procedures were followed as in the Example 1, except that there were employed 205.8 parts of the vinyl-based copolymer (VIA-5) which is an acrylic polyol resin, 39.7 parts of "Vernok 980", 150 parts of methylethylketone, and 10.8 parts of triethylamine and, as a result, nonvolatile components were 35.3% in thus-obtained water dispersion of crosslinked particles and a dispersion state was also excellent.

Subsequently, the water dispersion of crosslinked particles was partially taken out, and tetrahydrofran was added in a 100 times amount and, as a result, it was muddy without transparently dissolving. Further, the water dispersion was maintained at 50° C. for 20 days, and a change was observed with a lapse of time and, as a result, any change was not observed in stability of dispersibility.

Likewise, when ethyleneglycol monobutylether was added in an amount corresponding to 20% based on solid components in the water dispersion, any change was not observed in viscosity properties even after 20 days at 50° C. It is to be noted that it showed an average molecular weight of 630 between crosslinking points in the crosslinked particles, which is a designed value.

Still further, a solvent was added in an amount corresponding to 20% based on solid components and, as a result, a film-forming temperature was not more than room temperatures.

Example VI-6

A 4-necked flask replaced with nitrogen was charged with 250 parts of "Unicef PT-200" [a polytetramethylene glycol having Mn=2,000 manufactured by Nihon Yushi, Ltd.] and 55.5 parts by weight of isophorone diisocyanate, and a reaction was conducted at 120° C. for 30 minutes. 0.05 part of tin octoate was supplied, and the reaction was further conducted for 60 minutes at the same temperature. After lowering the temperature to 80° C., 182.5 parts of methylethylketone and 33.5 parts of dimethylol propionic acid were supplied, and a reaction was conducted at 80° C. for 6 hours to obtain a urethane prepolymer having nonvolatile components of 65%, an acid value of 41.4, and an isocyanate group content of 3.0%.

After that, there were sufficiently mixed 200 parts of the polymer, 51.6 parts of "Vernok 980", 100 parts of methylethylketone, and 5.0 parts of triethylamine while sufficiently agitating, and 600 parts of distilled water was added while continuing agitation and, subsequently, there was also added an aqueous solution in which 12 parts of diethylene triamine is dissolved in 100 parts of distilled water, and solvent and water were partially distilled off at 60–70° C. while maintaining a system at a reduced pressure to obtain a water dispersion of crosslinked particles having nonvolatile components of 31.0%.

Subsequently, 194 parts of thus-obtained water dispersion of crosslinked particles, 407 parts of distilled water, and 12 parts of toluene were added into a 4-necked flask replaced with nitrogen, followed by elevating a temperature to 80° C. After that, there were added dropwise over 4 hours a solution in which there were mixed 4 parts of allyl methacrylate, 13 parts of methylmethacrylate, 13 parts of butylmethacrylate, and the ε-caprolactone-modified acrylic monomer obtained in the Example 4 and an aqueous solution in which there were mixed 0.15 part of ammonium persulphate is dissolved in 20 parts of distilled water, respectively, and a polymerization was conducted.

Also after that, agitation was continued for 2 hours at the same temperature. Subsequently, solvent and water were partially distilled off at a reduced pressure to obtain acryl/urethane composite crosslinked particles having nonvolatile components of 32.7%.

Subsequently, water dispersion of the crosslinked particles was partially taken out, and a 100 times amount of tetrahydrofran was added and, as a result, it was whitened without transparently dissolving. Further, a change with a lapse of time was observed while maintaining the water dispersion at 50° C. for 20 days and, as a result, any change was not observed in dispersion stability at all. Likewise, when ethyleneglycol monobutylether was added in amount corresponding to 20% based on solid components in the water dispersion, any change was not observed in viscosity properties even after 20 days at 50° C. It is to be noted that it showed an average molecular weight of 500 between crosslinking points in the crosslinked particles, which is a designed value.

Still further, a solvent was added in an amount corresponding to 20% based on solid components and, as a result, a film-forming temperature was not more than room temperatures.

Comparative Example VI-1

The same procedures were likewise followed as in the Example 1, except that the vinyl-based copolymer (VIRA-1) was employed in place of the vinyl-based copolymer (VIA-1).

Comparative Example VI-2

The same procedures were likewise followed as in the Example 1, except that the vinyl-based copolymer (VIRA-2) was employed in place of the vinyl-based copolymer (VIA-5) in the Example VI-5.

Comparative Example VI-3

The same procedures were likewise followed as in the Example 1, except that the vinyl-based copolymer (VIRA-1) was employed in place of the ε-caprolactone-modified acrylic monomer obtained in the Example 4 in the Example VI-6.

Comparative Examples VI-4 and VI-5

As a conventional type of method for forming a coating layer, there are employed a commercially supplied baking type thermosetting coating composed of an acrylic resin/melamine resin and a commercially supplied ordinary temperature-curing type coating composed of an acrylic resin/polyisocyanate resin, respectively, and both are a resin composition for a top coating for cars.

Application Examples VI-1 and VI-6 and
Comparative Application Examples VI-1 and VI-4

Subsequently, the respective crosslinked particles obtained in the Examples and Comparative Examples were employed solely or formulated with "MW12LF" [a melamine resin manufactured by Sanwa Chemical, Ltd., nonvolatile components=75.6%] which is a cross-linking agent, followed by spray coating on a metal plate, a white base, or an electro-deposited coating plate by a usual method, respectively, to allow to form a coating layer.

Subsequently, a variety of physical properties were evaluated in relation to respective coating layers.

Further, respective evaluations were conducted according to methods shown hereinafter.

[Boiling water resistance] Coated test plates were immersed in boiling water for 60 minutes, and surface coating conditions were visually observed and evaluated.

◯: Abnormal portions are not observed at all.

Δ: Softening or whitening are slightly observed.

x: Softening or whitening are remarkably observed.

[Staining resistance] Coated test plates were marked by a red or black oil-soluble type felt pen. After having placed for 60 minutes, those were wiped by alcohols, and staining conditions were visually observed and evaluated.

◯: Marks are almost not remained.

Δ: Marks are slightly remained.

x: Marks are almost not removed.

[Impact resistance] Using a Dupon't style impact tester, there was dropped a weight having 1 kg and radius of ½ inch in a striking pin, and impact resistance is shown by a maximum height ((cm)) at which cracks are not caused in coated surface.

[Chipping resistance] Using a sand blasting tester (a product manufactured by Suga Shikenki, Ltd.), a coated test plate was vertically set in a sample holder of the tester. 50 g of No. 7 crushed stones were sprayed by air pressure of 4 kg/(cm)$^2$ from the tester, and crushed stones were struck at right angles against the plate. After that, the test pieces were washed by water, and dried to evaluate and judge a condition of abrasion in the coating layer caused by chipping according to the following rules.

It is to be noted that the test pieces were placed in a thermostatic chamber cooled at −25° C. for 20 minutes, and chipping test was conducted according to the above-described methods immediately after having taken out.

⊙: Peeling and blisters of coating layer are not observed at all.

◯: Peeling and blisters of coating layer are slightly observed.

x: Peeling and blisters of coating layer are remarkably observed.

[Adhesion] 11 pieces of lines crossed at right angles were lengthwise and laterally made at an interval of 1 mm in a nearly center portion of the test pieces by a cutter knife until attaining to the plate itself, and 100 pieces of cross-hatches were made in 1 (cm)$^2$, and a cellophane tape was stuck on the surface, and it was visually evaluated by counting the number of the cross-hatches remained after having been abruptly stripped.

◯: Peeling of coating layer is not observed at all.

Δ: Peeling of coating layer is slightly observed.

x: Peeling of coating layer is remarkably observed.

[Gloss] It was evaluated by a mirror surface reflection using 60-mirror surface photometer.

[Solvent resistance] Xylene or acetone was absorbed in a felt, followed by rubbing 200 times while loading the weight of 1 kg using a rubbing apparatus. It is shown by gloss retention ratio in a surface of a coating layer.

[Acid resistance] 10% sulphric acid aqueous solution was spotted on a coating surface, and it was evaluated at 10 grades by visually observing blisters and damages of a coating layer after maintaining at 60° C. for 30 minutes.

[Alkali resistance] A coated plate was immersed in 5% KOH aqueous solution at room temperatures for 100 hours, and it was visually evaluated by a level of damages.

[Hardness] It was evaluated by pencil hardness.

[Weatherability] A coated plate was placed in "Sunshine weather-O-meter" manufactured by Suga Shikenki, Ltd., a weatherability accelerating test was conducted over 1,000 hours, and it is shown by gloss retention ratio.

[Pot life] It was measured according to JIS K5400 (1999) 4.9.

From the Examples and Comparative Examples, it is evident that in the case of employing a coating having a low proportion of -caprolactone adducts containing 2 continuous chains as, for example, a top-coating material for cars, there can be obtained a coating layer which is well-balanced among excellent workability, a hardness of a coating layer, a finishing outer appearance, weatherability, acid resistance, stain resistance, gloss, flexibility, and abrasion resistance.

Example VII

Examples VII-1 and VII-2

Synthesis of an Acrylic Polyol (VII-A)

A reaction vessel equipped with an agitator, a thermometer, a reflux condenser, tube for introducing nitrogen gas, and a dropping funnel was charged with 30 parts of isobutyl acetate and 9 parts of xylene, followed by elevating a temperature to 105° C. while supplying nitrogen gas. After that, a mixture described hereinafter was dropped from the dropping funnel over 4.5 hours to conduct a radical polymerization. After the completion of dropping of the mixture, a solution composed of 5 parts of xylene and 0.5 part of 2,2'-azobisisobutyronitrile (AIBN) was dropped over 1 hour at 110° C.

After the completion of dropping, aging was conducted at 115 for 1.5 hour, followed by cooling to obtain an acrylic polyol resin solution (solid content of 60%) described below.

Acrylic polyol resin (VIIA 1): 25.1 parts of styrene, 5.3 parts of MMA, 32.3 parts of butylacrylate, 4.9 parts of glycidyl methacrylate, 31.6 parts of the above-described FM0.50, 18 parts of xylene, 1.7 part of AIBN. In the acrylic polyol resin, a number average molecular weight was 9,700, and OHV was 74 mg-KOH/g.

Acrylic polyol resin (VIIA 2): The same polymerization was conducted as in the acrylic polyol resin (VIIA 1) except that FM0.75 was employed in place of the FM0.50, In the acrylic polyol resin, a number average molecular weight was 9,800, and OHV was 73 mg-KOH/g.

Acrylic polyol resin (VIIA3): (composition) 28.1 parts of styrene, 5.3 parts of MMA, 32.3 parts of butyl acrylate, 2.0 parts of methacrylic acid, 31.6 parts of FM1.0 (an adduct in which caprolactone is added to hydroxyethylmethacrylate in 1.0 mol on an average manufactured by Daicel Kagaku kogyo, Ltd.), 18 parts of xylene, 1.7 part of AIBN. In a copolymer obtained, a number average molecular weight was 9,500, and OHV was 74 mg-KOH/g.

Acrylic polyol resin (VIIA4): (composition) 25.1 parts of styrene, 5.3 parts of MMA, 32.3 parts of butyl acrylate, 4.9 parts of glycidyl methacrylate, 31.6 parts of FM1.0, 18 parts of xylene, 1.7 part of AIBN. In a copolymer obtained, a number average molecular weight was 9,700, and OHV was 74 mg-KOH/g.

Acrylic polyol resin (VIIA 5): (composition) 5.0 parts of dimethylaminomethacrylate, 28.5 parts of MMA, 32.3 parts of butyl acrylate, 2.0 parts of methacrylic acid, 4.9 parts of glycidyl methacrylate, 31.6 parts of FM1.0, 18 parts of xylene, 1.7 part of AIBN. In a copolymer obtained, a number average molecular weight was 9,800, and OHV was 74 mg-KOH/g.

Synthesis of a Copolymer (VII-B) Containing an Alkoxysilyl Group

A reaction vessel equipped with an agitator, a thermometer, a reflux condenser, tube for introducing nitrogen gas, and a dropping funnel was charged with 45.7 parts of xylene, followed by elevating a temperature to 108° C. while supplying nitrogen gas.

After that, a mixture described hereinafter was dropped from the dropping funnel over 5 hours to conduct a radical polymerization. After the completion of dropping of the mixture, 0.5 part of AIBN and 5 parts of xylene were dropped over 1 hour.

After the completion of dropping, aging was conducted at 115° C. for 1.5 hour, followed by cooling to obtain a solution of a copolymer containing an alkoxysilyl group (solid content of 60%) described below.

Copolymer (VII B1) containing an alkoxysilyl group: (composition) 12.7 parts of styrene, 44.9 parts of MMA, 6.8 parts of stearyl methacrylate, 30 parts of γ-methacryloxypropyl trimethoxysilane, 4.9 parts of glycidyl methacrylate, 18.4 parts of xylene, 4.5 part of 2,2'-azobisisobutyronitrile (AIBN). In a copolymer obtained, a number average molecular weight was 6000.

Copolymer (VII B2) containing an alkoxysilyl group: (composition) 12.7 parts of styrene, 44.9 parts of MMA, 6.8 parts of stearyl methacrylate, 30 parts of γ-methacryloxypropyl trimethoxysilane, 4.9 parts of maleic anhydride, 18.4 parts of xylene, 4.5 part of 2,2'-azobisisobutyronitrile (AIBN). In a copolymer obtained, a number average molecular weight was 6000.

[Preparation of a Coating]

A coating having composition shown in Table VII-7 was prepared using 36 parts of any one of the above-described acrylic polyol resins VIIA 1 to VII A5 and 24 parts of any one of the above-described copolymers VII B1 to VII B2 containing an alkoxysilyl group, respectively.

In Table VII-7, A-1120 and A-187 are a product manufactured by UCC, Co.; Tinuvin 900 is an ultraviolet ray absorbent manufactured by Ciba Geigy, AG., Tinuvin 144 is a photostabilizer manufactured by Ciba Geigy, AG.; PS399.7 is a polydimethyl siloxane having silanol group at terminals manufactured by Chisso, Co.; Solvesso #100 is an aromatic solvent having a high boiling point.

[Coating and Evaluation]

A coated plate for a test piece was prepared by coating an epoxy amide-based cationic electro-deposition primer and a middle coating surfacer for cars onto a mild steel plate degreased and treated by phosphatization (provided, a glass plate in an abrasion test). On the plate, there was coated a base coat (an acrylmelamine resin coating) a top coat clear coating having composition shown in Table No. 7 by weton-wet, followed by setting for 20 minutes and baking at 140° C. for 30 minutes.

Thickness of a dried coating layer was approximately 15 μm in base coat and approximately 30 μm in the topcoat clear coating. Coated articles obtained were evaluated as described below, and results are shown in the Table VI-7.

As a result, in the coatings composed of the composition of the present invention, an abrasion resistance is improved without loss of other properties.

Outer appearance: It was visually evaluated overall by gloss and a build feeling. ○ is excellent, Δ is usual, and x is worse.

Adhesion: Cross-hatched (2 mm×2 mm) test was conducted using a cellophane tape and, in evaluation, 25/25 is 10 scores, 0/25 is 0 score.

Hardness: It was measured according to JIS K5400.

Acid resistance: 5–6 droplets of 38% $H_2SO_4$ were spotted on test pieces, and the test pieces were placed at room temperature for 24 hours. After having wiped, marks were checked. ○: It is not abnormal, Δ: Marks are remained and sheariness is slightly caused, and x: sheariness is completely caused.

Staining resistance: An engine oil after approximately 5,000 km-running was coated on a test piece, and the test piece was placed in conditions of 50° C. and 98% RH for 24 hours. After having taken out and wiped, and the test piece was compared to an untested piece.

○: no change Δ: slight color change, and x: distinct change

Abrasion resistance: Using a Haze meter (a turbidimeter) NDH-300A manufactured by Nihon Densyoku Kogyo, there was measured a Haze value (Haze value before rubbing) in a glass-made base plate having a coating layer, and there was measured a Haze value (Haze value after rubbing) after having abraded at 5 cycles using stainless steel wool under a loading of 200 g, and difference was calculated. Measured value is an average value of 2 times.

Weatherability: Using Youbucon manufactured by Atlas Co., an ultraviolet ray was irradiated at 70° C. for 8 hours, and an accelerating test was conducted at a cycle of water coagulation (darkness) at 50° C. for 4 hours, in which a test is conducted for 7000 hour and 8000 hours, and retention ratio of gloss is evaluated.

Contact angle: A contact angle meter CA-P type manufactured by Kyowa Kaimen Kagaku, Ltd. was employed to measure a contact angle (degree) against water.

Rubbing property: MEK (methylethyl ketone) was absorbed in degreased cotton, and respective test pieces were rubbed 300 times at same conditions, and a condition was observed. Evaluation was conducted that ◎ is no change, and ○ is a condition having a small amount of scratches in the surface.

Transition of gel fraction: Coatings were coated on a fluorized resin film, respectively, and a film having a thickness of 30 μm was prepared by baking at 140° C. for 30 minutes. There were measured a gel fraction (an acetone-extracting method) of a film obtained and a gel fraction after having immersed in warmed water of 60° C. for 1 month.

In the Table shown below, VII is omitted

|  | Example | | Comparative Example | | | |
|---|---|---|---|---|---|---|
|  | 1 | 2 | 1 | 2 | 3 | 4 |
| [Composition] | | | | | | |
| Component A | A-1 | A-2 | A-3 | A-5 | A-4 | A-4 |
| Component B | B-2 | B-2 | B-2 | B-1 | B-2 | B-2 |
| Dioctyltin maleate | 0.72 | 0.72 | 0.72 | 0.72 | 0.72 | 0.72 |
| Reaction product of A-1120 with A-187 | 0.72 | 0.72 | 0.72 | 0.72 | 0.72 | 0.72 |
| Tinuvin 900 | 0.36 | 0.36 | 0.36 | 0.36 | 0.36 | 0.36 |
| Tinuvin 144 | 0.36 | 0.36 | 0.36 | 0.36 | 0.36 | 0.36 |
| PS399.7 | 1.8 | — | — | — | — | 1.8 |
| Solvesso #100 | 34.24 | 34.24 | 34.24 | 34.24 | 34.24 | 34.24 |
| Methanol | 1.8 | 1.8 | 1.8 | 1.8 | 1.8 | 1.8 |
| Ortho methyl acetate | 1.8 | 1.8 | 1.8 | 1.8 | 1.8 | 1.8 |
| [Coating] | | | | | | |
| Outer appearance | ○ | ○ | ○ | ○ | ○ | ○ |
| Adhesion | 10 | 10 | 10 | 10 | 10 | 10 |
| Hardness | 2H | 2H | 2H | 2H | 2H | 2H |
| Acid resistance | ○ | ○ | ○ | ○ | ○ | ○ |
| Staining resistance | ○ | ○ | ○ | ○ | ○ | ○ |
| Abrasion resistance (Haze value) | | | | | | |
| before rubbing | 0.16 | 0.16 | 0.37 | 0.31 | 0.34 | 0.39 |
| after rubbing | 2.76 | 2.81 | 3.75 | 3.28 | 3.45 | 3.95 |
| Difference between before and after | 2.60 | 2.65 | 3.38 | 2.97 | 3.11 | 3.56 |
| Weatherability | | | | | | |
| 700 hours | 97 | 98 | 98 | 99 | 97 | 98 |
| 2800 hours | 93 | 92 | 90 | 90 | 93 | 92 |
| Contact angle against water | 80 | 90 | 79 | 79 | 80 | 90 |
| MEK rubbing property (300 times) | ◎ | ◎ | ○ | ○ | ○ | ○ |
| Gel fraction | | | | | | |
| before immersion | 95.2 | 95.0 | 95.3 | 95.8 | 95.2 | 95.0 |
| after immersion | 92.2 | 92.3 | 91.2 | 91.0 | 92.2 | 92.3 |

Example VIII

Example VIII-1

A 500-ml glass-made flask equipped with an agitating device, a thermometer, and a water cooling condenser was charged with 88.4 g (0.41 mol) of the lactone-modified 2-hydroxyethylmethacrylate composition (a-1) obtained in the Example 1, 40.2 g (0.41 mol) of maleic anhydride, 0.39 g of N-methylimidazole, and 0.09 g of hydroquinone monomethylether.

Subsequently, the flask was heated while agitating and streaming air into a gas phase portion, and it was maintained at liquid temperature at 90° C. for 8 hours and, an esterification reaction was further conducted at 100° C. for 3 hours.

Reaction product was a light yellowish liquid, and it was confirmed by a GPC analysis that there disappeared maleic anhydride and the lactone-modified 2-hydroxyethylmethacrylate which are a starting raw material and there is newly produced a carboxylic group-contained acrylate monomer (c-1) modified by a small amount of lactones. As a result of the analysis, it was confirmed from an acid value of 180 mg KOH/g that the product is a carboxylic group-contained acrylate monomer modified by a small amount of lactones in which one molecule of maleic anhydride is added to the lactone-modified 2-hydroxyethylmethacrylate composition (a-1).

Example VIII-2

The quite same esterification reaction was conducted as in the Example VIII-1, except that 177 g (0.82 mol) of the lactone-modified 2-hydroxyethylmethacrylate composition (a-2) obtained in the Example 2 and 80.4 g (0.82 mol) of maleic anhydride were employed in place of 88.4 g (0.41 mol) of the lactone-modified 2-hydroxyethylmethacrylate composition (a-1) in the Example VIII-1.

Reaction product was a light yellowish liquid, and it was confirmed by a GPC analysis that there disappeared maleic anhydride and the lactone-modified 2-hydroxyethylmethacrylate which are a starting raw material and there is newly produced a carboxylic group-contained acrylate monomer (c-2) modified by a small amount of lactones. As a result of the analysis, it was confirmed from an acid value of 180 mg KOH/g that the product is a carboxylic group-contained acrylate monomer modified by a small amount of lactones in which one molecule of maleic anhydride is added to the lactone-modified 2-hydroxyethylmethacrylate composition (a-2).

Example VIII-3

The quite same esterification reaction was conducted as in the Example VIII-1, except that 153 g (0.82 mol) of the lactone-modified 2-hydroxyethylmethacrylate composition (a-3) obtained in the Example 3 and maleic anhydride (0.82 mol) were employed in place of 88.4 g (0.41 mol) of the lactone-modified 2-hydroxyethylmethacrylate composition (a-1) in the Example VIII-1.

Reaction product was a light yellowish liquid, and it was confirmed by a GPC analysis that there disappeared maleic anhydride and the lactone-modified 2-hydroxyethylmethacrylate which are a starting raw material and there is newly produced a carboxylic group-contained acrylate monomer (c-3) modified by a small amount of lactones. As a result of the analysis, it was confirmed from an acid value of 197 mg KOH/g that the product is a carboxylic group-contained acrylate monomer composition modified by a small amount of lactones in which one molecule of maleic anhydride is added to the lactone-modified 2-hydroxyethylmethacrylate composition (a-3).

Example VIII-4

The quite same esterification reaction was conducted as in the Example VIII-1, except that 161 g (0.82 mol) of the lactone-modified 2-hydroxyethylmethacrylate composition (a-4) obtained in the Example 4 and maleic anhydride (0.82 mol) were employed in place of 88.4 g (0.41 mol) of the lactone-modified 2-hydroxyethylmethacrylate composition (a-1) in the Example VIII-1.

Reaction product was a light yellowish liquid, and it was confirmed by a GPC analysis that there disappeared maleic anhydride and the lactone-modified 2-hydroxyethylmethacrylate which are a starting raw material and there is newly produced a carboxylic group-contained acrylate monomer (c-4) modified by a small amount of lactones. As a result of the analysis, it was confirmed from an acid value of 191 mg KOH/g that the product is a carboxylic group-contained acrylate monomer composition modified by a small amount of lactones in which one molecule of maleic anhydride is added to the lactone-modified 2-hydroxyethylmethacrylate composition (a-4).

Comparative Example VIII-1

The quite same esterification reaction was conducted as in the Example VIII-1, except that 200 g (0.82 mol) of the lactone-modified 2-hydroxyethylmethacrylate composition (a'-1) obtained in the Comparative Example 1 and maleic anhydride (0.82 mol) were employed in place of 88.4 g (0.41 mol) of the lactone-modified 2-hydroxyethylmethacrylate composition (a-1) in the Example VIII-1.

Reaction product was a light yellowish liquid, and it was confirmed by a GPC analysis that there disappear maleic anhydride and the lactone-modified 2-hydroxyethylmethacrylate which are a starting raw material and there is newly produced a carboxylic group-contained acrylate monomer (c'-1) modified by a small amount of lactones. As a result of the analysis, it was confirmed from an acid value of 164 mg KOH/g that the product is a carboxylic group-contained acrylate monomer composition modified by a small amount of lactones in which one molecule of maleic anhydride is added to the lactone-modified 2-hydroxyethylmethacrylate composition (a-1).

Comparative Example VIII-2

The quite same esterification reaction was conducted as in the Example VIII-1, except that 200 g (0.82 mol) of the lactone-modified 2-hydroxyethylmethacrylate composition (a'-2) obtained in the Comparative Example 2 and maleic anhydride (0.82 mol) were employed in place of 88.4 g (0.41 mol) of the lactone-modified 2-hydroxyethylmethacrylate composition (a-1) in the Example VIII-1.

Reaction product was a light yellowish liquid, and it was confirmed by a GPC analysis that there disappear maleic anhydride and the lactone-modified 2-hydroxyethylmethacrylate which are a starting raw material and there is newly produced a carboxylic group-contained acrylate monomer (c'-2) modified by a small amount of lactones. As a result of the analysis, it was confirmed from an acid value of 164 mg KOH/g that the product is a carboxylic group-contained acrylate monomer composition modified by a small amount of lactones in which one molecule of maleic anhydride is added to the lactone-modified 2-hydroxyethylmethacrylate composition (a-1).

Comparative Example VIII-3

The quite same esterification reaction was conducted as in the Example VIII-1, except that 286 g (0.82 mol) of the lactone-modified 2-hydroxyethylmethacrylate composition (a'-3) obtained in the Comparative Example 3 and maleic anhydride (0.82 mol) were employed in place of 88.4 g (0.41 mol) of the lactone-modified 2-hydroxyethylmethacrylate composition (a-1) in the Example VIII-1.

Reaction product was a light yellowish liquid, and it was confirmed by a GPC analysis that there disappear maleic anhydride and the lactone-modified 2-hydroxyethylmethacrylate which are a starting raw material and there is newly produced a carboxylic group-contained acrylate monomer (c'-3) modified by a small amount of lactones. As a result of the analysis, it was confirmed from an acid value of 123 mg KOH/g that the product is a carboxylic group-contained acrylate monomer composition modified by a small amount of lactones in which one molecule of maleic anhydride is added to the lactone-modified 2-hydroxyethylmethacrylate composition (a-1).

Comparative Example VIII-4

The quite same esterification reaction was conducted as in the Example VIII-1, except that 387 g (0.82 mol) of the lactone-modified 2-hydroxyethylmethacrylate composition (a'-4) obtained in the Comparative Example 4 and maleic anhydride (0.82 mol) were employed in place of 88.4 g (0.41 mol) of the lactone-modified 2-hydroxyethylmethacrylate composition (a-1) in the Example VIII-1.

Reaction product was a light yellowish liquid, and it was confirmed by a GPC analysis that there disappeared maleic anhydride and the lactone-modified 2-hydroxyethylmethacrylate which are a starting raw material and there is newly produced a carboxylic group-contained acrylate monomer (c'-4) modified by a small amount of lactones. As a result of the analysis, it was confirmed from an acid value of 98.4 mg KOH/g that the product is a carboxylic group-contained acrylate monomer composition modified by a small amount of lactones in which one molecule of maleic anhydride is added to the lactone-modified 2-hydroxyethylmethacrylate composition (a-1).

Comparative Example VIII-5

The quite same esterification reaction was conducted as in the Example VIII-1, except that 481 g (0.82 mol) of the lactone-modified 2-hydroxyethylmethacrylate composition (a'-5) obtained in the Comparative Example 5 and maleic anhydride (0.82 mol) were employed in place of 88.4 g (0.41 mol) of the lactone-modified 2-hydroxyethylmethacrylate composition (a-1) in the Example VIII-1.

Reaction product was a light yellowish liquid, and it was confirmed by a GPC analysis that there disappear maleic anhydride and the lactone-modified 2-hydroxyethylmethacrylate which are a starting raw material and there is newly produced a carboxylic group-contained acrylate monomer (c'-5) modified by a small amount of lactones. As a result of the analysis, it was confirmed from an acid value of 82.0 mg KOH/g that the product is a carboxylic group-contained acrylate monomer composition modified by a small amount of lactones in which one molecule of maleic anhydride is added to the lactone-modified 2-hydroxyethylmethacrylate composition (a-1).

Example VIII-5

The quite same esterification reaction was conducted as in the Example VIII-1, except that 60.7 g (0.41 mol) of phthalic anhydride was employed in place of maleic anhydride in the Example VIII-1.

Reaction product was a light yellowish liquid, and it was confirmed by a GPC analysis that there disappear phthalic anhydride and the lactone-modified 2-hydroxyethylmethacrylate which are a starting raw material and there is newly produced a carboxylic group-contained acrylate monomer (c-5) modified by a small amount of lactones. As a result of the analysis, it was confirmed from an acid value of 154 mg KOH/g that the product is a carboxylic group-contained acrylate monomer composition modified by a small amount of lactones in which one molecule of phthalic anhydride is added to the lactone-modified 2-hydroxyethylmethacrylate composition (a-1).

Example VIII-6

The quite same esterification reaction was conducted as in the Example VIII-1, except that 78.7 g (0.41 mol) of trimellitic anhydride was employed in place of maleic anhydride in the Example VIII-1.

Reaction product was a light yellowish liquid, and it was confirmed by a GPC analysis that there disappear trimellitic anhydride and the lactone-modified 2-hydroxyethylmethacrylate which are a starting raw material and there is newly produced a carboxylic group-contained acrylate monomer (c-6) modified by a small amount of lactones. As a result of the analysis, it was confirmed from an acid value of 275 mg KOH/g that the product is a carboxylic group-contained acrylate monomer composition modified by a small amount of lactones in which one molecule of trimellitic anhydride is added to the lactone-modified 2-hydroxyethylmethacrylate composition (a-1).

Example VIII-7

The quite same esterification reaction was conducted as in the Example VIII-1, except that 89.4 g (0.41 mol) of pyromellitic anhydride was employed in place of maleic anhydride in the Example VIII-1.

Reaction product was a light yellowish liquid, and it was confirmed by a GPC analysis that there disappeared pyromellitic anhydride and the lactone-modified 2-hydroxyethylmethacrylate which are a starting raw material and there is newly produced a carboxylic group-contained acrylate monomer (c-7) modified by a small amount of lactones. As a result of the analysis, it was confirmed from an acid value of 129 mg KOH/g that the product is a carboxylic group-contained acrylate monomer composition modified by a small amount of lactones having carboxylic group in which one molecule of pyromellitic anhydride is added to the lactone-modified 2-hydroxyethylmethacrylate composition (a-1).

Example IX

Synthesis of Carboxylic Group-Contained Acrylate Monomer Compositions (a'-1 to a'-7, a"-1 to a"-5) Modified by a Small Amount of Lactones Reference Example IX-5

A 500-ml glass-made flask equipped with an agitating device, a thermometer, and a water cooling condenser was charged with 88.4 g (a terminal hydroxyl group of 0.41 mol, hereinafter, the same) of the lactone-modified 2-hydroxyethylmethacrylate composition (a-1) obtained in the Example 1, 40.2 g (0.41 mol) of maleic anhydride, 0.39 g of N-methylimidazole, and 0.09 g of hydroquinone monomethylether.

Subsequently, the flask was heated while agitating and streaming air into a gas phase portion, and it was maintained at liquid temperature at 90° C. for 8 hours and, an esterification reaction was further conducted at 100° C. for 3 hours.

Reaction product was a light yellowish liquid, and it was confirmed that there disappear maleic anhydride and the lactone-modified 2-hydroxyethylmethacrylate which are a starting raw material and there is newly produced a carboxylic group-contained acrylate monomer (a'-1) modified by a small amount of lactones by a GPC analysis. As a result of the analysis, it was confirmed from an acid value of 180 mg KOH/g that the product is a carboxylic group-contained acrylate monomer composition (a'-1) modified by a small amount of lactones in which one molecule of maleic anhydride is added to the lactone-modified 2-hydroxyethylmethacrylate composition (a-1).

Reference Example IX-6

The quite same esterification reaction was conducted as in the Reference Example IX-5, except that 177 g (0.82 mol)

of the lactone-modified 2-hydroxyethylmethacrylate composition (a-2) obtained in the Example 2 and maleic anhydride (0.82 mol) were employed in place of 88.4 g (0.41 mol) of the lactone-modified 2-hydroxyethylmethacrylate composition (a-1) in the Reference Example IX-5.

Reaction product was a light yellowish liquid, and it was confirmed by a GPC analysis that there disappear maleic anhydride and the lactone-modified 2-hydroxyethylmethacrylate which are a starting raw material and there is newly produced a carboxylic group-contained acrylate monomer (a'-2) modified by a small amount of lactones. As a result of the analysis, it was confirmed from an acid value of 180 mg KOH/g that the product is a carboxylic group-contained acrylate monomer composition (a'-2) modified by a small amount of lactones in which one molecule of maleic anhydride is added to the lactone-modified 2-hydroxyethylmethacrylate composition (a-2).

Reference Example IX-7

The quite same esterification reaction was conducted as in the Reference Example IX-5, except that 153 g (0.82 mol) of the lactone-modified 2-hydroxyethylmethacrylate composition (a-3) obtained in the Example 3 and maleic anhydride (0.82 mol) were employed in place of 88.4 g (0.41 mol) of the lactone-modified 2-hydroxyethylmethacrylate composition (a-1) in the Reference Example IX-5.

Reaction product was a light yellowish liquid, and it was confirmed by a GPC analysis that there disappear maleic anhydride and the lactone-modified 2-hydroxyethylmethacrylate which are a raw material and there is newly produced a carboxylic group-contained acrylate monomer (a'-3) modified by a small amount of lactones. As a result of the analysis, it was confirmed from an acid value of 197 mg KOH/g that the product is a carboxylic group-contained acrylate monomer composition (a'-3) modified by a small amount of lactones in which one molecule of maleic anhydride is added to the lactone-modified 2-hydroxyethylmethacrylate composition (a-3).

Reference Example IX-8

The quite same esterification reaction was conducted as in the Reference Example IX-5, except that 161 g (0.82 mol) of the lactone-modified 2-hydroxyethylmethacrylate composition (a-4) obtained in the Example 4 and maleic anhydride (0.82 mol) were employed in place of 88.4 g (0.41 mol) of the lactone-modified 2-hydroxyethylmethacrylate composition (a-1) in the Reference Example IX-5.

Reaction product was a light yellowish liquid, and it was confirmed by a GPC analysis that there disappear maleic anhydride and the lactone-modified 2-hydroxyethylmethacrylate which are a starting raw material and there is newly produced a carboxylic group-contained acrylate monomer (a'-4) modified by a small amount of lactones. As a result of the analysis, it was confirmed from an acid value of 191 mg KOH/g that the product is a carboxylic group-contained acrylate monomer composition (a'-4) modified by a small amount of lactones in which one molecule of maleic anhydride is added to the lactone-modified 2-hydroxyethylmethacrylate composition (a-4).

Comparative Reference Example IX-6

The quite same esterification reaction was conducted as in the Reference Example IX-5, except that 200 g (0.82 mol) of the lactone-modified 2-hydroxyethylmethacrylate composition (a-1') obtained in the Comparative Example 1 and maleic anhydride (0.82 mol) were employed in place of 88.4 g (0.41 mol) of the lactone-modified 2-hydroxyethylmethacrylate composition (a-1) in the Reference Example IX-5.

Reaction product was a light yellowish liquid, and it was confirmed by a GPC analysis that there disappear maleic anhydride and the lactone-modified 2-hydroxyethylmethacrylate which are a starting raw material and there is newly produced a carboxylic group-contained acrylate monomer (a'-1') modified by a small amount of lactones. As a result of the analysis, it was confirmed from an acid value of 164 mg KOH/g that the product is a carboxylic group-contained acrylate monomer composition (a'-1') modified by a small amount of lactones in which one molecule of maleic anhydride is added to the lactone-modified 2-hydroxyethylmethacrylate composition (a-1').

Comparative Reference Example IX-7

The quite same esterification reaction was conducted as in the Reference Example IX-5, except that 200 g (0.82 mol) of the lactone-modified 2-hydroxyethylmethacrylate composition (a-2') obtained in the Comparative Example 2 and maleic anhydride (0.82 mol) were employed in place of 88.4 g (0.41 mol) of the lactone-modified 2-hydroxyethylmethacrylate composition (a-1) in the Reference Example IX-5.

Reaction product was a light yellowish liquid, and it was confirmed by a GPC analysis that there disappear maleic anhydride and the lactone-modified 2-hydroxyethylmethacrylate which are a starting raw material and there is newly produced a carboxylic group-contained acrylate monomer (a'-2') modified by a small amount of lactones. As a result of the analysis, it was confirmed from an acid value of 164 mg KOH/g that the product is a carboxylic group-contained acrylate monomer composition (a'-2') modified by a small amount of lactones in which one molecule of maleic anhydride is added to the lactone-modified 2-hydroxyethylmethacrylate composition (a-2').

Comparative Reference Example IX-8

The quite same esterification reaction was conducted as in the Reference Example IX-5, except that 286 g (0.82 mol) of the lactone-modified 2-hydroxyethylmethacrylate composition (a-3') obtained in the Comparative Example 3 and maleic anhydride (0.82 mol) were employed in place of 88.4 g (0.41 mol) of the lactone-modified 2-hydroxyethylmethacrylate composition (a-1) in the Reference Example IX-5.

Reaction product was a light yellowish liquid, and it was confirmed by a GPC analysis that there disappear maleic anhydride and the lactone-modified 2-hydroxyethylmethacrylate which are a starting raw material and there is newly produced a carboxylic group-contained acrylate monomer (a'-3') modified by a small amount of lactones. As a result of the analysis, it was confirmed from an acid value of 123 mg KOH/g that the product is a carboxylic group-contained acrylate monomer composition (a'-3') modified by a small amount of lactones in which one molecule of maleic anhydride is added to the lactone-modified 2-hydroxyethylmethacrylate composition (a-3').

Comparative Reference Example IX-9

The quite same esterification reaction was conducted as in the Reference Example IX-5, except that 387 g (0.82 mol)

of the lactone-modified 2-hydroxyethylmethacrylate composition (a-4') obtained in the Comparative Example 4 and maleic anhydride (0.82 mol) were employed in place of 88.4 g (0.41 mol) of the lactone-modified 2-hydroxyethylmethacrylate composition (a-1) in the Reference Example IX-5.

Reaction product was a light yellowish liquid, and it was confirmed by a GPC analysis that there disappear maleic anhydride and the lactone-modified 2-hydroxyethylmethacrylate which are a starting raw material and there is newly produced a carboxylic group-contained acrylate monomer (a'-4') modified by a small amount of lactones. As a result of the analysis, it was confirmed from an acid value of 98.4 mg KOH/g that the product is a carboxylic group-contained acrylate monomer composition (a'-4') modified by a small amount of lactones in which one molecule of maleic anhydride is added to the lactone-modified 2-hydroxyethylmethacrylate composition (a-4').

Comparative Reference Example IX-10

The quite same esterification reaction was conducted as in the Reference Example IX-5, except that 481 g (0.82 mol) of the lactone-modified 2-hydroxyethylmethacrylate composition (a-5') obtained in the Comparative Example 5 and maleic anhydride (0.82 mol) were employed in place of 88.4 g (0.41 mol) of the lactone-modified 2-hydroxyethylmethacrylate composition (a-1) in the Reference Example IX-5.

Reaction product was a light yellowish liquid, and it was confirmed by a GPC analysis that there disappear maleic anhydride and the lactone-modified 2-hydroxyethylmethacrylate which are a starting raw material and there is newly produced a carboxylic group-contained acrylate monomer (a'-5') modified by a small amount of lactones. As a result of the analysis, it was confirmed from an acid value of 82.0 mg KOH/g that the product is a carboxylic group-contained acrylate monomer composition (a'-5') modified by a small amount of lactones in which one molecule of maleic anhydride is added to the lactone-modified 2-hydroxyethylmethacrylate composition (a-5').

Reference IX-9

The quite same esterification reaction was conducted as in the Reference Example IX-5, except that 60.7 g (0.41 mol) of phthalic anhydride was employed in place of maleic anhydride in the Reference Example IX-5.

Reaction product was a light yellowish liquid, and it was confirmed by a GPC analysis that there disappeared phthalic anhydride and the lactone-modified 2-hydroxyethylmethacrylate which are a starting raw material and there is newly produced a carboxylic group-contained acrylate monomer (a'-5) modified by a small amount of lactones. As a result of the analysis, it was confirmed from an acid value of 154 mg KOH/g that the product is a carboxylic group-contained acrylate monomer composition (a'-5) modified by a small amount of lactones in which one molecule of phthalic anhydride is added to the lactone-modified 2-hydroxyethylmethacrylate composition (a-1).

Reference IX-10

The quite same esterification reaction was conducted as in the Reference Example IX-5, except that 78.7 g (0.41 mol) of trimellitic anhydride was employed in place of maleic anhydride in the Reference Example VIII-5.

Reaction product was a light yellowish liquid, and it was confirmed by a GPC analysis that there disappear trimellitic anhydride and the lactone-modified 2-hydroxyethylmethacrylate which are a starting raw material and there is newly produced a carboxylic group-contained acrylate monomer (a'-6) modified by a small amount of lactones. As a result of the analysis, it was confirmed from an acid value of 275 mg KOH/g that the product is a carboxylic group-contained acrylate monomer composition (a'-6) modified by a small amount of lactones in which one molecule of trimellitic anhydride is added to the lactone-modified 2-hydroxyethylmethacrylate composition (a-1).

Reference IX-11

The quite same esterification reaction was conducted as in the Reference Example IX-5, except that 89.4 g (0.41 mol) of pyromellitic anhydride was employed in place of maleic anhydride in the Reference Example IX-5.

Reaction product was a light yellowish liquid, and it was confirmed by a GPC analysis that there disappear pyromellitic anhydride and the lactone-modified 2-hydroxyethylmethacrylate which are a starting raw material and there is newly produced a carboxylic group-contained acrylate monomer (a'-7) modified by a small amount of lactones. As a result of the analysis, it was confirmed from an acid value of 129 mg KOH/g that the product is a tricarboxylic group-contained acrylate composition (a'-7) modified by a small amount of lactones in which one molecule of pyromellitic acid is added to the lactone-modified 2-hydroxyethylmethacrylate composition (a-1).

[Synthesis of an Acrylic Polycarboxylic Acid Resin (A'-1 to A'-6, A'-1' to A'-8)]

Synthesis Example IX-1

Synthesis of a Half-Esterified Acrylic Polycarboxylic Acid Resin (A'-1)

A 3-liter reaction vessel equipped with a thermometer, an agitator, a reflux condenser, a tube for introducing nitrogen, and a dropping funnel was charged with 200 parts of xylene, 100 parts of Solvesso 100, and 100 parts of propyleneglycol monomethylether acetate followed by elevating a temperature to 125° C. Into the vessel, there were added dropwise a monomer solution composed of 100 parts of the carboxylic group-contained acrylate composition (a'-1) modified by a small amount of lactones obtained in the Reference Example IX-5, 200 parts of styrene, 580 parts of cyclohexyl acrylate, 220 parts of maleic anhydride, and 400 parts of propyleneglycol monomethylether acetate and an initiator solution composed of 100 parts of t-butylperoxy-2-ethylhexanoate and 100 parts of xylene from the dropping funnel over 3 hours. After the completion of dropwise addition, the vessel was maintained at 130° C. over 30 minutes, followed by adding dropwise an initiator solution composed of 10 parts of t-butylperoxy-2-ethylhexanoate and 50 parts of xylene over 30 minutes. After the completion of dropwise addition, reaction was further continued at 130° C. over 1 hour to obtain a resin varnish (nonvolatile components of 50%) containing an acrylic polyacid anhydride having a number average molecular weight of 3,800.

86 parts of methanol was added to 2060 parts of the varnish, followed by allowing to react at 70° C. for 23 hours to obtain a half-esterified varnish having an acid value of 126 mg-KOH/g-solid.

It is to be noted that it was confirmed that infrared absorption spectra were measured in the resin obtained and there disappears an absorption (1785 (cm)$^{-1}$) by an acid anhydride.

Synthesis Example IX-2

Synthesis of an Acrylic Polycarboxylic Acid Resin (A'-2)

The same vessel as in the Synthesis Example IX-1 was charged with 700 parts of xylene and 500 parts of Solvesso 100, followed by elevating a temperature to 130° C. Into the vessel, there were added dropwise a monomer solution composed of 380 parts of the acrylate composition (a'-1) modified by a small amount of lactones having carboxylic group obtained in the Reference Example IX-5, 300 parts of styrene, 350 parts of 2-ethylhexyl acrylate, 150 parts of isobutylmethacrylate, and 200 parts of acrylic acid and an initiator solution composed of 150 parts of t-butylperoxy-2-ethylhexanoate and 300 parts of xylene from the dropping funnel over 3 hours. After the completion of dropwise addition, the vessel was maintained at 130° C. over 30 minutes, followed by adding dropwise an initiator solution composed of 20 parts of t-butylperoxy-2-ethylhexanoate and 20 parts of xylene over 30 minutes. After the completion of dropwise addition, reaction was further continued at 130° C. over 1 hour, followed by removing 1100 parts of solvents to obtain a resin varnish (nonvolatile components of 70%) having a number average molecular weight of 1,800 and an acid value of 156 mgKOH/g solid.

Synthesis Example IX-3

The same vessel as in the Synthesis Example IX-1 was charged with 700 parts of xylene and 350 parts of Solvesso 100, followed by elevating a temperature to 130° C. Into the vessel, there were added dropwise a monomer solution composed of 240 parts of the carboxylic group-contained acrylate composition (a'-1) modified by a amall amount of lactones obtained in the Reference Example 5, 300 parts of styrene, 258 parts of 2-ethylhexyl acrylate, 151 parts of isobutylmethacrylate, 51 parts of acrylic acid, 240 parts of maleic anhydride, and 300 parts of propyleneglycol monomethylether acetate and an initiator solution composed of 150 parts of t-butylperoxy-2-ethylhexanoate and 150 parts of xylene from the dropping funnel over 3 hours. After the completion of dropwise addition, the vessel was maintained at 125° C. over 30 minutes, followed by adding dropwise an initiator solution composed of 20 parts of t-butylperoxy-2-ethylhexanoate and 20 parts of xylene over 30 minutes. After the completion of dropwise addition, reaction was further continued at 125° C. over 1 hour, followed by removing 1000 parts of solvents to obtain a varnish containing a resin (nonvolatile components of 65%) having a number average molecular weight of 2,000.

125 parts of methanol was added to 1590 parts of the varnish, followed by allowing to react at 70° C. for 23 hours to obtain a varnish containing a half-esterified acrylic polycarboxylic acid resin (A'-3) having an acid value of 126 mg KOH/g-solid. It is to be noted that it was confirmed that infrared absorption spectra were measured in the resin obtained and an absorption by an acid anhydride disappears.

Synthesis Example IX-4

The quite same procedures were followed as in the Synthesis Example IX-1, except that the acrylate composition (a'-1) modified by a small amount of lactones having carboxylic group in the Synthesis Example IX-1 was replaced with 100 parts of the acrylate composition (a'-2) modified by a small amount of lactones having carboxylic group obtained in the Reference Example IX-6 to obtain a varnish containing a half-esterified resin (A'-4) having a number average molecular weight of 1,800 and an acid value of 158 mg-KOH/g-solid. It is to be noted that it was confirmed that infrared absorption spectra were measured in the resin obtained and there disappears an absorption by an acid anhydride.

Synthesis Example IX-5

Synthesis of an Acrylic Polycarboxylic Acid (A'-5)

The quite same procedures were followed as in the Synthesis Example IX-2, except that the acrylate composition (a'-1) modified by a small amount of lactones having carboxylic group in the Synthesis Example IX-2 was replaced with 345 parts of the acrylate composition (a'-7) modified by a small amount of lactones having carboxylic group obtained in the Reference Example IX-7 to obtain a varnish containing a resin having a number average molecular weight of 3,800 and an acid value of 126 mg-KOH/g-solid. It is to be noted that it was confirmed that infrared absorption spectra were measured in the resin obtained and there disappears an absorption by an acid anhydride.

Synthesis Example IX-6

The quite same procedures were followed as in the Synthesis Example IX-3, except that the acrylate composition (a'-1) modified by a small amount of lactones having carboxylic group in the Synthesis Example IX-3 was replaced with 225 parts of the acrylate composition (a'-8) modified by a small amount of lactones having carboxylic group obtained in the Reference Example IX-8 to obtain a varnish containing a resin (A'-6) having a number average molecular weight of 2,000 and an acid value of 126 mg-KOH/g-solid. It is to be noted that it was confirmed that infrared absorption spectra were measured in the resin obtained and there disappears an absorption (1785 (cm)$^{-1}$) by an acid anhydride.

Comparative Synthesis Example IX-1

Synthesis of an Acrylic Polycarboxylic Acid (A'-1')

The quite same procedures were followed as in the Synthesis Example IX-2, except that the acrylate composition modified by small amount of lactones having carboxylic group in the Synthesis Example IX-2 was replaced with 414 parts of the acrylate monomer (a'-1') modified by a small amount of lactones having carboxylic group obtained in the Comparative Reference Example IX-1 to obtain a varnish containing a resin having a number average molecular weight of 3,800 and an acid value of 126 mg-KOH/g-solid. It is to be noted that it was confirmed that infrared absorption spectra were measured in the resin obtained and there disappears an absorption (1785 (cm)$^{-1}$) by an acid anhydride.

Comparative Synthesis Example IX-2

Synthesis of an Acrylic Polycarboxylic Acid (A'-2')

The quite same procedures were followed as in the Synthesis Example IX-2, except that the acrylate composition modified by a small amount of lactones having carboxylic group in the Synthesis Example IX-2 was replaced with 414 parts of the acrylate composition (a'-2') modified by a small amount of lactones having carboxylic group obtained in the Comparative Reference Example IX-2 to obtain a varnish containing a resin having a number average molecular weight of 3,800 and an acid value of 126 mg-KOH/g-solid.

It is to be noted that it was confirmed that infrared absorption spectra were measured in the resin obtained and there disappears an absorption (1785 $(cm)^{-1}$) by an acid anhydride.

Comparative Synthesis Example IX-3

Synthesis of an Acrylic Polycarboxylic Acid (A'-3')

The quite same procedures were followed as in the Synthesis Example 2, except that the carboxylic group-contained acrylate composition modified by a small amount of lactones in the Synthesis Example IX-2 was replaced with 550 parts of the carboxylic group-contained acrylate composition (a'-3') modified by a small amount of lactones obtained in the Reference Comparative Example IX-3 to obtain a varnish containing an acrylic polycarboxylic acid resin (A'-3') having a number average molecular weight of 3,800 and an acid value of 126 mg-KOH/g-solid. It is to be noted that it was confirmed that infrared absorption spectra were measured in the resin obtained and there disappears an absorption (1785 $(cm)^{-1}$) by an acid anhydride.

Comparative Synthesis Example IX-4

Synthesis of an Acrylic Polycarboxylic Acid (A'-4')

The quite same procedures were followed as in the Synthesis Example IX-2, except that the carboxylic group-contained acrylate composition modified by a small amount of lactones in the Synthesis Example IX-2 was replaced with 690 parts of the carboxylic group-contained acrylate composition (a'-4') modified by small amount of lactones obtained in the Reference Comparative Example IX-4 to obtain a varnish containing an acrylic polycarboxylic acid resin (A'-4') having a number average molecular weight of 3,800 and an acid value of 126 mg-KOH/g-solid. It is to be noted that it was confirmed that infrared absorption spectra were measured in the resin and there disappears an absorption (1785 $(cm)^{-1}$) by an acid anhydride.

Comparative Synthesis Example IX-5

Synthesis of an Acrylic Polycarboxylic Acid (A'-5')

The quite same procedures as in the Synthesis Example IX-2 were followed except that the carboxylic group-contained acrylate composition modified by a small amount of lactones in the Synthesis Example IX-2 was replaced with 828 parts of the carboxylic group-contained acrylate composition (a'-5') modified by a small amount of lactones obtained in the Reference Comparative Example IX-5 to obtain a varnish containing an acrylic polycarboxylic acid resin (A'-5') having a number average molecular weight of 3,800 and an acid value of 126 mg KOH/g-solid. It is to be noted that it was confirmed that infrared absorption spectra were measured in the resin and there disappears an absorption (1785 $(cm)^{-1}$) by an acid anhydride.

Comparative Synthesis Example IX-6

Synthesis of a Half-Esterified Acrylic Polycarboxylic Acid (A'-6')

The quite same procedures were followed as in the Synthesis Example IX-1, except that the carboxylic group-contained acrylate composition (a'-1) modified by a small amount of lactones in the Synthesis Example IX-1 was not added to obtain a varnish containing a half-esterified acrylic polycarboxylic acid resin (A'-6') having a number average molecular weight of 1,800 and an acid value of 158 mg-KOH/g-solid. It is to be noted that it was confirmed that infrared absorption spectra were measured in the resin and there disappears an absorption (1785 $(cm)^{-1}$) by an acid anhydride.

Comparative Synthesis Example IX-7

Synthesis of an Acrylic Polycarboxylic Acid (A'-7')

The quite same procedures were followed as in the Synthesis Example IX-2, except that the carboxylic group-contained acrylate composition (a'-1) modified by a small amount of lactones in the Synthesis Example IX-2 was not added to obtain a varnish containing an acrylic polycarboxylic acid resin (A'-7') having a number average molecular weight of 3,800 and an acid value of 126 mg KOH/g-solid. It is to be noted that it was confirmed that infrared absorption spectra were measured in the resin and there disappears an absorption (1785 $(cm)^{-1}$) by an acid anhydride.

Comparative Synthesis Example IX-8

Synthesis of a Half-Esterified Acrylic Polycarboxylic Acid (A'-8')

The quite same procedures were followed as in the Synthesis Example IX-3 except that the carboxylic group-contained acrylate composition modified by a small amount of lactones in the Synthesis Example IX-3 was not added to obtain a varnish containing a half-esterified acrylic polycarboxylic acid resin (A'-8') having a number average molecular weight of 2,000 and an acid value of 125 mg-KOH/g-solid. It is to be noted that it was confirmed that infrared absorption spectra were measured in the resin and there disappears an absorption (1785 $(cm)^{-1}$) by an acid anhydride.

Synthesis of a Blocked Carboxylic Group-Contained Acrylic Polycarboxylic Acid (bA'-1 to bA'-2)

Synthesis Example IX-7

A four-necked flask equipped with an agitating device, a thermometer, a tube for introducing an inert gas, a dropping funnel, and a cooling device was charged with 412 g (2 mol) of the acrylic polycarboxylic acid resin (A'-1) obtained in the Synthesis Example 1, followed by adding 1000 g of tetrahydrofran, 1 mol of ethylvinyl ether (a blocking agent), and 0.2 part of 35% sulphuric acid at 35° C. and allowing to react for 24 hours at the temperature.

After the completion of reaction, a product was moved to a separating funnel, followed by alkali-washing using 100 g of 10% sodium bicarbonate and 100 g of a saturated aqueous salt. After having placed, a water layer was separated and removed. This operations were repeated 20 times, and washing by a saturated aqueous salt was conducted three times by adding sodium sulphate to an organic layer at room temperatures, and tertahydrofran was removed at a reduced pressure to obtain an acrylic polycarboxylic acid (bA'-1) in which carboxylic groups are blocked by ethylvinyl ether.

Synthesis Example IX-8

The same flask as in the Synthesis Example IX-7 was charged with 2 mol of the acrylic polycarboxylic acid resin (A'-2) obtained in the Synthesis Example 2, followed by cooling at not more than 10° C. by ice water and adding 300 g of tetrahydrofran and 111 g of triethylamine. A solution containing 1 mol of trimethylsilyl chloride (a blocking agent) dissolved in 100 g of tetrahydrofran was added dropwise into the flask over 30 minutes and, an ice water bath was removed at a period of 1 hour after the completion of dropwise addition, and a reaction was further continued for 10 hours. Subsequently, washing was conducted three times with 100 parts of ice water, and tetrahydrofran was removed at reduced pressures to obtain an acrylic polycarboxylic acid (bA'-2) in which carboxylic groups are blocked by trimethylsilyl chloride.

Synthesis Example IX-9

A 2-liter reaction vessel equipped with a thermometer, an agitator, a cooling device, a tube for introducing nitrogen, and a dropping funnel was charged with 300 parts of xylene and 50 parts of propyleneglycol monomethyletheracetate, followed by elevating a temperature to 125° C.

Into the reaction vessel, there were added dropwise over 3 hours a monomer solution composed of 320 parts of glycidyl methacrylate, 167 parts of styrene, 100 parts of 2-ethylhexyl acrylate, and 413 parts of FM0.75 obtained in the Reference Example IX-2 and an initiator solution composed of 120 parts of t-butylperoxy 2-ethylhexanoate and 150 parts of xylene.

After the completion of dropwise addition, the reaction vessel was maintained at 125° C. over 30 minutes, followed by adding dropwise an initiator solution composed of 10 parts of t-butylperoxy 2-ethylhexanoate and 200 parts of xylene over 30 minutes.

After the completion of dropwise addition, a reaction was further continued at 125° C. for 1 hour to obtain a varnish (nonvolatile components of 60%) containing a polyepoxide (IXB-1) having a number average molecular weight of 3500, an epoxy equivalent of 450, and a hydroxyl value of 95 mgKOH/g solid.

Example IX-1
(Preparation of Crosslinked Resin Particles)

A reaction vessel equipped with an agitating and heating device, a thermometer, a tube for introducing nitrogen, a reflux condenser, and a decanter was charged with 213 parts of bishydroxyethyl taurine, 208 parts of neopentylglycol, 296 parts of phthalic anhydride, 376 parts of azelaic acid, and 30 parts of xylene, followed by elevating a temperature. Water produced in a reaction was removed by azeotropic distillation together with xylene. Temperature in reaction was elevated to 210° C. over approximately 3 hours from initiation of reflux, and the reaction was continued while agitating and dehydrating until an acid value based on a carboxylic acid attains to 135 mgKOH/g solid. After having cooled the liquid temperature to 140° C., there was added dropwise 500 parts of "Kardula E10" (glycidyl versate manufactured by Shell, Co.) over 30 minutes, followed by continuing agitation for 2 hours to complete the reaction. There was obtained a polyester resin having amphoteric ion groups which has an acid value of 55 mgKOH/g solid, a hydroxyl value of 91 mgKOH/g solid, and a number average molecular weight of 1250 in solid components.

There was prepared a monomer suspension by vigorously agitating 10 parts of the polyester resin having amphoteric ion groups, 140 parts of deionized water, 1 part of dimethylethanol amine, 50 parts of styrene, and 50 parts of ethyleneglycol dimethacrylate in a stainless steel-made beaker.

Further, there was prepared an initiator aqueous solution by mixing 0.5 part of azobiscyano valeric acid, 40 parts of deionized water, and 0.32 part of dimethylethanol amine.

A reaction vessel equipped with an agitating and heating device, a thermometer, a tube for introducing nitrogen, and a reflux condenser was charged with 5 parts of the polyester resin having amphoteric ion groups, 280 parts of deionized water, and 0.5 part of dimethylethanol amine, followed by elevating a temperature 80° C. Into the reaction vessel, 251 parts of the monomer suspension and 40.82 parts of the initiator aqueous solution were simultaneously added dropwise over 60 minutes, and a reaction was further continued for 60 minutes, followed by terminating the reaction. There was obtained an emulsion of crosslinked resin particles having particle diameter of 55 nm which was measured by a dynamic light scattering method.

Into the emulsion, xylene was added, and water was removed by azeotropic distillation at a reduced pressure. There was obtained a xylene solution of crosslinked resin particles having solid content of 20% by weight by replacing a medium with xylene.

(Preparation of a Clear Coating Composition)

There were formulated the acrylic polycarboxylic acid resin (A'-1) obtained in the Synthesis Example X-1, a polyepoxide (IXB-1) obtained in the Synthesis Example X-9, "Sumilizer BHT" (IXC-1) and "Sumilizer TPP-R" (IXC-2) which are manufactured by Sumitomo Kagaku, Co., and there were further added 0.5 part of tetrabutyl ammonium bromide which is a curing catalyst (IXF-1), 1 part of dibutyltin bis(butylmaleate) which is a curing catalyst (IXG-1), 2 parts of "Tinuvin 900" which is an ultraviolet ray absorbent manufactured by Ciba Geigy, AG., 1 part of "Sanol LS-440" which is a photostabilizer manufactured by Sankyo, Co., and 0.1 part of "Modaflow" which is a surface controller manufactured by Monsanto Co. while agitating in Disper to prepare a curable resin composition. In the resin composition obtained, there was further added 10 parts of a xylene solution of the crosslinked resin particles prepared as described hereinabove, and viscosity was adjusted to 30 seconds by Ford Cup No. 4 using a solvent composed of butyl acetate/xylene=1/1 to obtain a clear coating composition.

Nonvolatile components and color difference were measured in order to evaluate solid content and yellowing resistance in the clear coating composition obtained.

<Nonvolatile Components in a Coating (NV)>

Viscosity of a coating was adjusted to 30 seconds at 20° C. by Ford Cup No. 4 using a solvent, and 0.5 g of a coating composition was precisely weighed and, it was diluted by 3 cc of toluene, and then, baked at 110° C. for 1 hour to measure nonvolatile components (% by weight) in the coating.

<Color Difference>

A clear coating alone was coated on two pieces of a white plate so that layer thickness after drying becomes 50, and one piece was baked at 160° C. for 30 minutes, and another one was baked at 140° C. for 30 minutes. Using an SM color computer SM-4 manufactured by Suga Shikenki Co., "b" value was measured in a clear layer thickness of 50 $\mu$m, and difference from the white plate, that is, b of 160° C. and b of 140° C. were measured, and the difference, ($\Delta$b)=($\Delta$b160° C.-$\Delta$b140° C.) is defined as the color difference.

On the other hand, a cationic electro-deposition coating (Power Top U-50 manufactured by Nihon Paint, Ltd.) and a middle-coating (Orga P-2 manufactured by Nihon Paint, Ltd.) were coated on a steel plate treated by a phosphate having thickness of 0.8 mm, so that the thickness after drying becomes 25 μm and 40 μm, respectively, to obtain a coated test plate. And, a solvent-type high solid base coating (manufactured by Nihon Paint, Ltd.) was coated by air spraying on a coated test plate so that thickness becomes approximately 16 μm by setting for approximately 7 minutes to form a base coat layer.

On the plate, the clear coating composition obtained was coated by an electrostatic coating machine ("Auto-Rea" manufactured by Lansberg Gema, Co.) at an atomizing pressure of 5 kg/(cm)$^2$ and set for approximately 7 minutes and baked at 140° C. for 25 minutes, so that the thickness after drying becomes approximately 40 μm.

It is to be noted that in the solvent-type high solid base coating, there are formulated 20 parts of an acrylic resin (nonvolatile components of 80%, a hydroxyl group value of 100 mgKOH/g solid, an acid value of 30 mgKOH/g solid, and a number average molecular weight of 1800) manufactured by Nihon Paint, Ltd., 30 parts of a polyester (nonvolatile components of 80%, a hydroxyl group value of 100 mgKOH/g solid, an acid value of 12 mgKOH/g solid, and a number average molecular weight of 2600) manufactured by Nihon Paint, Ltd., 40 parts of a melamine resin "Cymel 202" (nonvolatile components of 80%) manufactured by Mitsui Cyanamid, Co., 10 parts of a melamine resin "Cymel 327" (nonvolatile components of 90%) manufactured by Mitsui Cyanamid, Co., 10 parts of "Alupaste A160–600" (nonvolatile components of 65%) manufactured by Toyo Aluminum, Co., and 7 parts of isopropylalcohol.

<Pencil Hardness>

It was conducted according to JIS K5400 8, 4.2.

<Water Resistance>

Cured coating layer obtained was immersed in a tap water at 40° C. for 10 days, and coating surface was visually observed according to rules described below.

In the case that a change is not observed, it is ○, in the case that marks are slightly observed, it is Δ, and in the case that a coating layer is abnormal, it is x.

<Abrasion Resistance>

A flannel-made cloth having 2 (cm)×2 (cm) was fitted at an abrasion head of a Gakushin type dye abrasion resistance tester (manufactured by Daiei Kagaku Seiki, Co.). On the cloth, there was coated 1 g of a water dispersion containing 50% of a cleanser ("New Homing Cleanser" manufactured by Kao, Co. (abrasive particles of 87%, a surface active agent of 5%, and other components)). 500 g of weight was loaded to the abrasion head, and it was allowed to go and return 20 times over a cured coating layer, followed by measuring 20-gloss in a test portion to calculate a gloss retention ratio (%).

<Acid Resistance>

Cured coating layer obtained was immersed in 0.5 ml of 1 wt % sulphuric acid at 75° C. for 30 minutes, and coating surface was visually observed according to rules described below.

In the case that an abnormality is not observed, it is 5, in the case that marks are in distinctly observed, it is 4, in the case that marks are clearly observed, it is 3, in the case that several pieces of groups of microscopic holes are observed, it is 2, and in the case that the groups of microscopic holes are observed as a whole, it is 1.

<Weatherability>

100 mW/(cm)$^2$ of an ultraviolet ray was irradiated in "Aisuper UV tester SUV-W13" manufactured by Iwasaki Denki, Co. for 24 hours under conditions of a black panel temperature of 63° C. and humidity of 70%, and 5 cycles were repeated as 24 hours/1 cycle which is a placing time under conditions of a black panel temperature of 50° C. and humidity of 100%, and after that, a coating surface was visually observed according to rules described below.

In the case that an abnormality is not observed, it is ○, in the case that cracks are slightly observed, it is Δ, and in the case that cracks are remarkably observed, it is x.

<Adhesion (a Non Sand-Recoatability)>

High solid base coating (manufactured by Nihon Paint, Co.) was air-sprayed on a coated plate on which an intermediate coating is coated, so that thickness of a coating layer after drying becomes approximately 16 m, followed by setting for approximately 7 minutes, provided that in the case of employing a water-based coating (manufactured by Nihon Paint, Co.), setting was conducted for approximately 1 minute after air-spraying, followed by preheating at 80° C. for 5 minutes.

Subsequently, respective resin components were formulated in formulation (solid components) shown in Tables IX-6 and IX-7, and viscosity was adjusted to 30 seconds by Ford Cup No. 4, and a clear coating composition obtained was coated at an atomizing pressure of 5 kg/(cm)$^2$ using an electrostatic coating machine "Auto-Rea" (manufactured by Lansburg Gema, Co.), so that thickness of a coating layer after drying becomes approximately 40 μm, followed by setting for approximately 7 minutes and baking at 160° C. for 30 minutes.

A coated plate obtained was placed in a desiccator for 30 minutes and, after that, the above-described high solid base coating (manufactured by Nihon Paint, Co.) was likewise coated and set again on the coated plate. The above-described clear coating composition was likewise coated and set as described hereinabove on a coating layer obtained, followed by baking at 120° C. for 30 minutes.

On surface of a coating layer formed, cross-cuts attaining to the coated plate passing through the coating layer were lengthwise and laterally formed using a cutter knife (NT cutter S type or A type) at interval of 2 mm, and which has lengthwise 11 lines and laterally 11 lines, whereby, 100 pieces of squares were formed on the coating layer. A cellophane sticking (manufactured by Nichiban, Co.) tape having width of 24 mm was stuck and uniformly pressed down on the coating layer having cross-cuts while preventing formation of air bubbles by fingers. Immediately after that, one side of the sticking tape was abruptly pulled up vertically to strip the sticking tape from surface of the coating layer.

Adhesion of the coating layer was evaluated according to rules described below based on an area ratio in the coating layer stripped together with the sticking tape.

<Evaluation by Area Ratio Stripped>

It is 5 in 0%, it is 4 in the case that it is less than 5% and complete strip of the squares is absent, it is 3 in the case that it is less than 15% and complete strip of the square is absent, it is 2 in less than 35%, and it is 1 in not less than 35%.

As a result, it was confirmed that it is able to obtain a coating layer which is excellent in abrasion resistance and the coating layer can be cured at a low temperature and, in which other properties are maintained.

Example X

Example X-1

A four-necked flask equipped with a tube for introducing air, a thermometer, a reflux condenser, and an agitating device was charged with 1616 parts (18.8 mol) of methacrylic acid, 1610 parts (14.1 mol) of ε-caprolactone (ε-CL), 1.99 part of hydroquinone monomethylether (HOME) which is a polymerization inhibitor, and 0.199 part of stannous chloride (SnCl$_2$) which is a reaction catalyst, followed by allowing to react at 100° C. for 23 hours while streaming air. Reaction ratio of ε-caprolactone was 99.3%, and color hue of a reaction product was 20 (APHA).

Other monomers were copolymerized with a lactone-modified methacrylate composition obtained to prepare an excellent acrylic polyol resin.

Example X-2

The same procedures were likewise followed as in the Example X-1, except that 0.795 part of monobutyltin tris- 2-ethylhexanate was employed as a reaction catalyst. Reaction ratio of ε-caprolactone was 99.5%, and color hue of a reaction product was 20 (APHA).

Other monomers were copolymerized with a lactone-modified methacrylate composition obtained to prepare an excellent acrylic polyol resin.

Comparative Example X-1

The same procedures were likewise followed as in the Example 1, except that 0.147 part of tetrabutyl titanate (TBT) was employed as a reaction catalyst, followed by allowing to react at 100° C. for 64 hours while streaming air. Reaction ratio of ε-caprolactone was 99.6%, and color hue of a reaction product was 50 (APHA).

Comparative Example X-2

A four-necked flask equipped with a tube for introducing air, a thermometer, a reflux condenser, and an agitating device was charged with 1616 parts (18.8 mol) of methacrylic acid, 4286 parts (37.6 mol) of ε-caprolactone (ε-CL), 1.99 part of hydroquinone monomethylether (HQME) which is a polymerization inhibitor, and 0.4 part of 1 H₂O salt of p-toluene sulphonic acid which is a reaction catalyst, followed by allowing to react at 100° C. for 16 hours while streaming air. Reaction ratio of ε-caprolactone was 99.4%, and color hue of a reaction product was 40 (APHA).

Example X-3

A four-necked flask equipped with a thermometer, a reflux condenser, a tube for introducing nitrogen gas, and an agitating device was charged with 50 parts of butylacetate, 50 parts of toluene, and 1.0 part of ditertiary butylperoxide (DTBPO), followed by elevating a temperature to 115° C. At a period having attained to 115° C., there were added dropwise over 3 hours 17.3 parts of styrene, 17.3 parts of butyl methacrylate, 17.3 parts of butyl acrylate, 2.0 parts of methacrylic acid, 46 parts of the caprolactone-modified methacrylate composition synthesized in the Example 1, 0 part of methacrylic acid, and 1.0 part of azobisisobutyronitrile, and a reaction was further continued for 4 hours to obtain an excellent transparent acrylic polyol resin solution.

Example X-4 and Comparative Examples X-3 and X-4

The caprolactone-modified methacrylate compositions obtained in the Example X-2 and Comparative Examples X-1 and X-2 and 2-hydroxyethylmethacrlyate (HEMA) were polymerized, respectively, in the same apparatus and formulation conditions as in the Example X-3. As a result, although it was able to obtain an excellent transparent acrylic polyol resin solution from the monomer obtained in the Example X-2, in the case of the monomer obtained in the Comparative Example X-1, discoloration of a reaction liquid was remarkable during the polymerization.

In the case of preparing a material for a coating employing the monomer obtained in the Comparative Example 2, abrasion resistance is worse in a coating layer.

It is confirmed that in the above Examples 3–4 and Comparative Example 4 in which a hydroxyl value (OHV) is adjusted to 120 and Tg is adjusted to 0–10° C. in the polymerization of the acrylic polyol resin, and that in Examples 3–4, a proportion of an adduct (n=1) in which one mol of ε-caprolactone is added is high, and a proportion of an adduct in which two or more continuous chains of ε-caprolactone are added is low which lowers hardness in a cured acrylic resin.

In the case of employing the adducts in which proportion of two or more continuous chains of ε-caprolactone are added is small as, for example, a coating material for a cars top coating, there can be obtained a coating layer well-balanced among hardness of a coating layer, a finishing appearance, weatherability, acid resistance, staining resistance, gloss, flexibility, and abrasion resistance.

Example X-5

A glass-made flask equipped with an agitator, a reflux condenser, a dropping funnel, and a thermometer was charged with 144 parts (2 mol) of acrylic acid, 8 parts of 1 H₂O salt of p-toluene sulphonic acid, and 0.08 part of hydroquinone monomethylether which is a polymerization inhibitor, and 171 parts (1.5 mol) of ε-caprolactone was dropped over 4 hours from the dropping funnel while maintaining a liquid temperature at 80° C., followed by allowing to react.

After the completion of dropwise addition, a reaction was further continued for 2 hours at the same temperature to terminate the reaction. As a result of a gaschromatgraphic analysis of the reaction liquid, conversion of ε-caprolactone was 99.3%.

In order to confirm a structure of a caprolactone-modified acrylate composition obtained, p-toluene sulphonic acid in a reaction liquid was neutralized by a methanol solution containing 1.1 times equivalent of 5%-sodium hydroxide, and an excessive amount of acrylic acid was removed at 110° C. and a reduced pressure using a rotary evaporator.

The caprolactone-modified acrylate composition was obtained by filtering a reaction liquid obtained.

Physical properties of the caprolactone-modified acrylate composition (FA075A) obtained were measured. Analytical results obtained are shown as follows.

Acid value: 3.59 mg-KOH/g

Double bond: 3.68 mg equivalent/g

Number average molecular weight converted to a polystyrene by GPC: 273

Elementary analysis: C 59.9%, H 7.6%

Further, a rational formula is as follows in the caprolactone-modified acrylate composition obtained, and n is 1.76.

$$CH_2=CH-COO(-CH_2CH_2CH_2CH_2CH_2COO-)_nH$$

Example X-6

The same procedures were followed as in the Example X-5, except that 8 parts of 98% sulphuric acid was employed as an acidic catalyst to prepare a caprolactone-modified acrylate composition.

As a result of a gaschromatgraphic analysis of a reaction liquid, conversion of ε-caprolactone was 99.1%.

Further, the same operations were followed as in the Example X-5, and a caprolactone-modified acrylate composition was obtained by removing acrylic acid and filtering after neutralization of sulphuric acid.

The caprolactone-modified acrylate composition (FA075A2) obtained was analyzed. Results obtained are shown as follows.

Acid value: 3.61 mg-KOH/g

Double bond: 3.73 mg equivalent/g

Number average molecular weight converted to a polystyrene by GPC: 275

Example 7

The same procedures were followed as in the Example 5, except that 172 parts (2.0 mol) of methacrylic acid was employed as a radically polymerizable unsaturated monomer having carboxylic group to prepare a caprolactone-modified acrylate composition.

As a result of a gaschromatgraphic analysis of the reaction liquid obtained, conversion of ε-caprolactone was 99.2%.

Further, the same purification were conducted as in the Example X-5, and a caprolactone-modified acrylate composition (FM075A) was obtained.

The same analysis was conducted as in the Example X-5 in relation to the caprolactone-modified acrylate composition obtained. Results are as follows.

Acid value: 3.41 mg-KOH/g

Double bond: 3.51 mg equivalent/g

Number average molecular weight converted to a polystyrene by GPC: 287

Comparative Example X-5

The same procedures were followed as in the Example X-5, except that 236 parts (2 mol) of ε-caprolactone was employed to prepare a caprolactone-modified acrylate composition.

The caprolactone-modified acrylate composition (FA200A) was obtained by filtration of a reaction liquid obtained.

Physical properties were measured in relation to the caprolactone-modified acrylate composition obtained. Analytical results obtained are as follows.

Acid value: 3.30 mg-KOH/g

Double bond: 3.38 mg equivalent/g

Number average molecular weight converted to a polystyrene: 297

Elementary analysis: C 59.9%, H 7.6%

Further, "n" is 1.97 in the caprolactone-modified acrylate composition obtained.

Likewise, acrylic acid was allowed to react with ε-caprolactone in molar ratio of 1/0.5 to obtain FA050A for Example.

Likewise, methacrylic acid was allowed to react with ε-caprolactone in molar ratio of 1/0.5 to obtain FM050A for Example, and methacrylic acid was allowed to react with ε-caprolactone in molar ratio of 1/2.0 to obtain FM200A for Comparative Example.

Results are shown in Table X-1.

Application Example

A four-necked flask equipped with a thermometer, a reflux condenser, a tube for introducing nitrogen gas, and an agitator was charged with 50 parts of butyl acetate, 50 parts of toluene, and 1.0 part of ditertiarybutyl peroxide (DTBPO), followed by elevating a temperature to 115° C. At a period having attained to 115° C., there were added dropwise over 3 hours 17.3 parts of styrene, 17.3 parts of butyl methacrylate, 17.3 parts of butyl acrylate, 2.0 parts of methacrylic acid, 46 parts of the caprolactone-modified methacrylate composition synthesized in the Example 5, 0 part of 2-hydroxyethylmethacrylate, and 1.0 part of azobisisobutyronitrile, and a reaction was further continued for 4 hours to obtain an excellent transparent acrylic polyol resin solution.

In the case of employing a coating having a low proportion of the adducts in which not less than 2 mol of ε-caprolactone is added as, for example, a top-coating material for cars, there can be obtained a coating layer which is well-balanced among a hardness of a coating layer, a finishing outer appearance, weatherability, acid resistance, stain resistance, gloss, flexibility, and abrasion resistance.

Possibility of Utilization in Industry

According to the present inventions No. I to No. VII, there can be obtained a hydroxyalkyl(meth)acrylate composition modified by a small amount of lactones, an acrylic polyol resin (A) obtained by allowing to react the composition with other ethylenic unsaturated monomer, and a curable resin composition containing the resin can be employed as a raw material for, for example, a well-balanced high quality finishing agent for industry, for example, a coating, a pressure sensitive adhesive, an ultraviolet ray- and electron beam-curable coating agent, and a reactive improver, etc. by formulating various conventional crosslinking agents and usually employed components.

A composition containing the curable resin composition is excellent in workability, water resistance of a coating layer, acid rain resistance, staining resistance, retort resistance, adhesion, a low temperature curability, and wet ink adaptability and, by which there can be prepared a coating well-balanced between abrasion resistance and acid resistance, which is excellent in flexural resistance and recoat adhesion, and which can be employed as a raw material for coatings for cars, home electric appliances, a water-based coating for coating an outside and inside of cans for foods and beverages, particularly, a clear coating for finishing an outside of the cans, and a top coating for cars.

In a conventional type coating composition using a layer-formable resin, even in the case of employing a melamine resin curing agent causing a worse acid resistance, there is produced a large merit that any problems are not caused by the use of a coating of the present invention.

The carboxylic group-contained acrylate monomer composition modified by a small amount of lactones in the present inventions No. VII to No. VIII has (meth)acryloyl

|  | lactone-added numbers | 0 | 1 | 2 | 3 | 4 | Total | average-added numbers | Mn |
|---|---|---|---|---|---|---|---|---|---|
| before removal of AA | FA050A | 35.1 | 39.5 | 19 | 5.2 | 1.1 | 99.9 | 0.98 | 183 |
| after removal of AA |  | 0.0 | 61.0 | 29.3 | 8.0 | 1.7 | 100.0 | 1.50 | 244 |
| before removal of AA | FA075A | 23.4 | 36.4 | 25.8 | 10.5 | 3.9 | 100.0 | 1.35 | 226 |
| after removal of AA |  | 0 | 47.5 | 33.7 | 13.7 | 5.1 | 100.0 | 1.76 | 273 |
| before removal of AA | FA200A | 16.3 | 32.2 | 28.9 | 14.8 | 7.6 | 99.8 | 1.65 | 260 |
| after removal of AA |  | 0 | 38.6 | 34.6 | 17.7 | 9.1 | 100.0 | 1.97 | 297 |
| before removal of MAA | FM050A | 38.2 | 38.3 | 17.7 | 4.8 | 1 | 100.0 | 0.92 | 191 |
| after removal of MAA |  | 0 | 62.0 | 28.6 | 7.8 | 1.6 | 100.0 | 1.49 | 256 |
| before removal of MAA | FM075A | 23.4 | 36.4 | 25.8 | 10.5 | 3.9 | 100.0 | 1.35 | 240 |
| after removal of MAA |  | 0 | 47.5 | 33.7 | 13.7 | 5.1 | 100.0 | 1.76 | 287 |
| before removal of MAA | FM200A | 16.3 | 32.2 | 28.9 | 14.8 | 7.6 | 99.8 | 1.65 | 274 |
| after removal of MAA |  | 0 | 38.6 | 34.6 | 17.7 | 9.1 | 100.0 | 1.97 | 311 | group and carboxylic group in the molecule, and it has an effect in adhesion to a metal and other materials, solubility to water and an aqueous alkali solution and, above-all, reduction of a developing time of period in an alkali developing step for forming a pattern utilizing ultraviolet ray curing, and an improvement in removal property of an uncured portion. Further, the compound of the present invention can be industrially prepared at economical cost by an applicable method for the preparation thereof.

From the curable resin composition prepared by polymerization of the carboxylic group-contained acrylate monomer composition modified by a small amount of lactones, a high solid coating can be prepared, and a coating layer obtained from the coating is excellent in acid resistance against acidic rain, abrasion resistance, yellowing resistance, and outer appearance, and the coating can be cured at low temperature.

The polyester unsaturated monomer modified by a small amount of lactones of the present invention No. X can be readily prepared by an industrial fashion in a short step.

Since the polyester unsaturated monomer modified by a small amount of lactones obtained has one radically polymerizable unsaturated group, and it has carboxylic group at terminal, there can be widely expected an application as a raw material or an intermediate for a thermosetting coating, an adhesive, a crosslinking agent, a stabilizer for an emulsion, a dispersant, and an emulsifier, etc.

Further, in a composition using the polyester unsaturated monomer modified by a small amount of lactones, since tackiness can be removed by elevating Tg of the composition, it is particularly useful in an electric material field, etc.

Still further, there can be obtained the polyester unsaturated monomer modified by a small amount of lactones in which discoloration is low.

According to the present invention, there can be prepared a polyester unsaturated monomer modified by a small amount of lactones in which the amount of the lactones added is not less than 0.3 and more than 1 mol, and which has an identical radical polymerizable functional group to the number of a radical polymerizable functional group existing in a radically polymerizable unsaturated monomer having carboxylic group which is employed as a raw material. Particularly, in the case that acrylic acid and methacrylic acid are employed as the radically polymerizable unsaturated monomer having carboxylic group, there can be produced a polyester unsaturated monomer modified by a small amount of lactones which certainly has one piece of a radically polymerizable functional group without producing a compound not containing the radically polymerizable functional groups at all and a compound having two or more pieces of the radically polymerizable functional groups.

The polyester unsaturated monomer modified by a small amount of lactones obtained is characterized in that it has reactive carboxylic group at one terminal and, further, it has a radically polymerizable unsaturated group apart from the carboxylic group.

What is claimed is:

1. A curable resin composition comprising:
   (i) 0.5–80 parts by weight of an acrylic polyol resin (A) comprising
       a hydroxyalkyl(meth)acrylate composition having
           0.3 to less than 1.0 mole of polymerized lactone monomer being polymerized by ring-opening with respect to 1 mole of hydroxyalkyl(meth)acrylate, wherein the content of the lactone monomer in the hydroxyalkyl(meth)acrylate composition is 0–10% by weight, and
       a proportion of monomers having two or more continuous chains (n≧2) of lactones less than 37.4% (area by GPC),
       the hydroxyalkyl(meth)acrylate composition being represented by formula (1) described below,

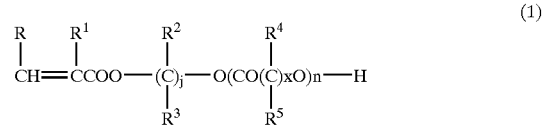

where
       R, $R^1$, $R^2$, and $R^3$ are independently a hydrogen or a methyl group,
       "j" is an integer of 2–6,
       xn pieces of $R^4$ and $R^5$ are independently a hydrogen or an alkyl group having a carbon number of 1–12,
       "n" is an integer greater than or equal to zero, and an average value of "n" in the composition is not less than 0.3 to less than 1.0, and
   (ii) 0.5 parts by weight of a melamine resin (B),
   wherein the total of (A) and (B) does not exceed 100 parts by weight.

2. A curable resin composition as claimed in claim 1, wherein said hydroxyalkyl(meth)acrylate composition is obtained using a hydroxyethyl (meth) acrylate.

3. A thermosetting resin composition which comprises:
   2–50 parts of an acrylic polyol resin (VII-A) containing a the hydroxyalkyl(meth)acrylate composition comprising
       0.3 to less than 1.0 mole of polymerized lactone monomer being polymerized by ring-opening with respect to 1 mole of hydroxyalkyl(meth)acrylate, wherein the content of the lactone monomer in the hydroxyalkyl(meth)acrylate composition is 0–10% by weight, and
       a proportion of monomers having two or more Continuous chains (n≧2) of lactones less than 37.4% (area by GPC),
       the hydroxyalkyl(meth)acrylate composition being represented by formula (1) described below,

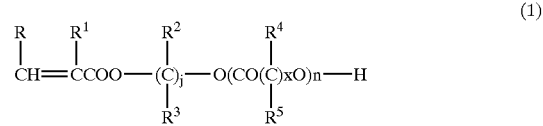

where
   R, $R^1$, $R^2$, and $R^3$ are independently a hydrogen or a methyl group,
   "j" is an integer of 2–6,
   xn pieces of $R^4$ and $R^5$ are independently a hydrogen or an alkyl group having a carbon number of 1–12,
   "x" is 4–7,
   "n" is an integer greater than or equal to zero, and
   an average value of "n" in the hydroxyalkyl(meth)acrylate composition is not less than 0.3 to less than 1.0,
and 30–80 parts of an acrylic copolymer (VII-B) having an alkoxylsilyl group, wherein the total of (VII-A) and (VII-B) is 100 parts by weight.

4. A thermosetting resin composition as claimed in claim 3, wherein said acrylic polyol resin (VII-A) has at least one kind of group selected from the group consisting of an acid anhydride group, an epoxy group, amino group, and carboxylic group.

5. A method for the preparation of a carboxylic group-containing acrylate composition (a') represented by a general formula (VIII-3) described below, said method comprising:

reacting a hydroxyalkyl(meth)acrylate composition, said hydroxyalkyl(meth)acrylate composition comprising 0.3 to less than 1.0 mole of polymerized lactone monomer being polymerized by ring-opening with respect to 1 mole of hydroxyalkyl(meth)acrylate, wherein the content of the lactone monomer in the composition is 0–10% by weight, and a proportion of monomers having two or more continuous chains (n≧2) of lactones less than 37.4% (area by GPC), the composition being represented by formula (1) described below,

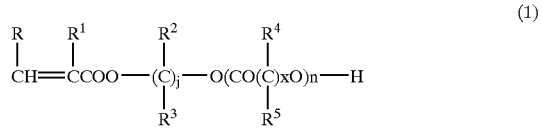

(1)

where

R, $R^1$, $R^2$, and $R^3$ are independently a hydrogen or a methyl group,

"j" is an integer of 2–6, xn nieces of $R^4$ and $R^5$ are independently a hydrogen or an alkyl group having a carbon number of 1–12, x is 4–7, "n" is an integer greater than or equal to zero, and an average value of "n" in the composition is not less than 0.3 to less than 1.0, with a carboxylic acid or anhydride thereof (VIII-b) represented by a general formula (VIII-2) described below,

(VIII-2)

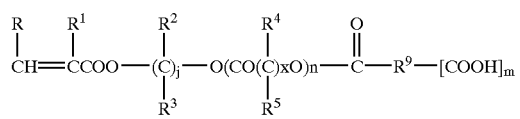

(VIII-3)

(in the formula, R, $R^1$, $R^2$, and $R^3$ are independently a hydrogen or a methyl group, j is an integer of 2–6, xn pieces of $R^4$ and $R^5$ are independently a hydrogen or an alkyl group having a carbon number of 1–12, "x" is 4–7, "n" is an integer greater than or equal to zero, an average value of "n" in said composition is not less than 0.3 to less than 1.0, $R^9$ is a residual group of a carboxylic acid, and "m" is an integer of 1–3).

6. A method for the preparation of a carboxylic group-contained acrylate composition (a') as claimed in claim 5, wherein said reaction of said hydroxyalkyl(meth)acrylate composition with said carboxylic acid or anhydride thereof (VIII-b) is conducted at a temperature range of 40–160° C.

7. A curable resin composition which comprises 10–70 parts of an acrylic polycarboxylic acid resin (A') comprising:

the carboxylic group-containing acrylate composition (a'), comprising a small amount of lactones, represented by the general formula (VIII-3) as claimed in claim 5, in which a proportion of monomers having not less than 2 continuous chains (n≧2) of lactones is less than 50% (GPC area %), as a polymerizing component, and 10–80 parts of a polyepoxide (IX-B).

8. A curable resin composition as claimed in claim 7, wherein said carboxylic group-containing hydroxy(meth) acrylate composition (a') is obtained by allowing to react said hydroxyalkyl(meth)acrylate composition, in which a proportion of monomers having not less than 2 continuous chains (n≧2) of lactones is less than 50% (GPC area %), with said carboxylic acid or anhydride thereof represented by the following general formula:

wherein $R^9$ is a residual group of a carboxylic acid, and "in" is an integer of 1–3.

9. A curable resin composition as claimed in claim 8, wherein said carboxylic group-containing hydroxy(meth) acrylate composition (a') comprising a small amount of lactones is obtained by allowing to react 0.9–1.1 mol of said carboxylic acid or anhydride thereof with respect to 1 mol of said hydroxy(meth)acrylate composition (a) comprising a small amount of lactones.

10. A method for the preparation of a polyester unsaturated monomer composition, comprising a small amount of lactones, wherein 0.3-less than 1.0 mole of a lactone monomer is polymerized by ring-opening with respect to 1 mole of a radically polymerizable unsaturated monomer containing carboxylic group, whereby, a proportion of monomers having not less than 2 continuous chains (n≧2) of lactones is adjusted to less than 50% (GPC area).

11. A method for the preparation of a polyester unsaturated monomer composition comprising a small amount of lactone as claimed in claim 10, wherein an acidic catalyst is a Lewis acid or a Bronsted acid.

12. A method for the preparation of a polyester unsaturated monomer composition comprising:

polymerizing, by ring-opening, 0.3 - less than 1.0 mole of a lactone monomer with respect to 1 mole of a radically polymerizable unsaturated monomer containing carboxylic group by using stannous halide, monobutylin tris-2-ethylhexanate, stannous octoate, dibutylin dilaurate, or a mixture thereof as a catalyst, and separating the unreacted radically polymerizable unsaturated monomer containing carboxylic group.

13. A method of the preparation of a polyester unsaturated monomer composition as claimed in claim 12, wherein the catalyst to be employed in said polymerization is less than 1000 ppm by weight based on total amount to be fed.

* * * * *